United States Patent
Obama et al.

(10) Patent No.: US 7,336,425 B2
(45) Date of Patent: Feb. 26, 2008

(54) ZOOM LENS SYSTEM

(75) Inventors: Akihiko Obama, Tokyo (JP);
Toshinori Take, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/548,954

(22) Filed: Oct. 12, 2006

(65) Prior Publication Data

US 2007/0070516 A1 Mar. 29, 2007

Related U.S. Application Data

(62) Division of application No. 11/220,647, filed on Sep. 8, 2005, now Pat. No. 7,199,940.

(30) Foreign Application Priority Data

| Sep. 15, 2004 | (JP) | ............................. | 2004-268961 |
| Mar. 30, 2005 | (JP) | ............................. | 2005-098725 |
| Mar. 30, 2005 | (JP) | ............................. | 2005-098737 |
| Jul. 5, 2005 | (JP) | ............................. | 2005-196621 |
| Jul. 5, 2005 | (JP) | ............................. | 2005-196624 |

(51) Int. Cl.
*G02B 15/14* (2006.01)
(52) U.S. Cl. ....................... 359/683; 359/676
(58) Field of Classification Search ................ 359/676, 359/683, 684
See application file for complete search history.

(56) References Cited

U.S. PATENT DOCUMENTS

| 4,501,475 | A | * | 2/1985 | Fujita et al. ................ 359/683 |
| 5,583,701 | A | * | 12/1996 | Yamanashi ................... 359/695 |
| 6,473,231 | B2 | | 10/2002 | Hamano et al. |
| 6,606,194 | B2 | | 8/2003 | Hamano et al. |
| 6,721,105 | B2 | | 4/2004 | Ohtake et al. |
| 2005/0195482 | A1 | | 9/2005 | Yamada et al. |
| 2005/0270646 | A1 | | 12/2005 | Yamada et al. |

FOREIGN PATENT DOCUMENTS

| JP | 10-260356 A | 9/1998 |
| JP | 11-23969 A | 1/1999 |
| JP | 2000-298235 A | 10/2000 |
| JP | 2002-98893 A | 4/2002 |
| JP | 2002-365548 A | 12/2002 |
| JP | 2003-177317 A | 6/2003 |
| JP | 2003-177318 A | 6/2003 |
| JP | 2003-207715 A | 7/2003 |
| JP | 2004-252196 A | 9/2004 |

* cited by examiner

*Primary Examiner*—Ricky Mack
*Assistant Examiner*—William C Choi
(74) *Attorney, Agent, or Firm*—Miles & Stockbridge P.C.

(57) ABSTRACT

A zoom lens system includes, in order from an object, a first lens group having positive power, a second lens group having negative power, a third lens group having positive power, a fourth lens group having positive power, and a fifth lens group having positive power. Upon zooming from a wide-angle end state to a telephoto end state, the first and fifth lens groups moves with respect to the image plane, the second lens group moves at first to the image and then to the object, and the third and fourth lens groups move to the object such that a distance between the first and second lens groups increases, a distance between the second and third lens group decreases, a distance between the third and fourth lens groups decreases, and a distance between the fourth and fifth lens groups increases. Given conditional expressions are satisfied.

7 Claims, 61 Drawing Sheets

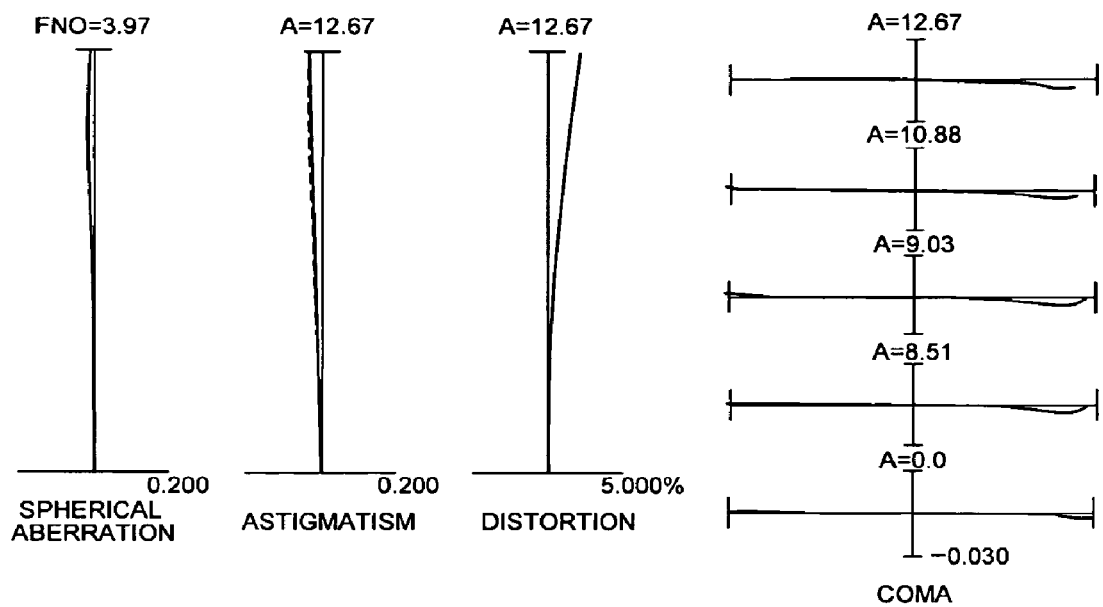
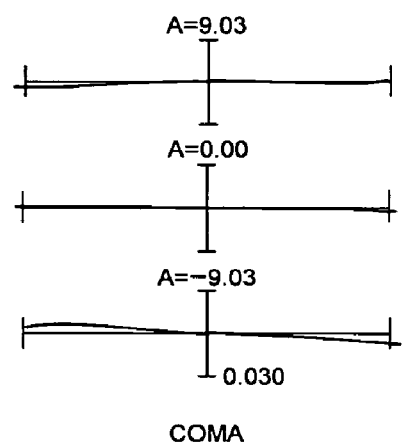

FIG.36A
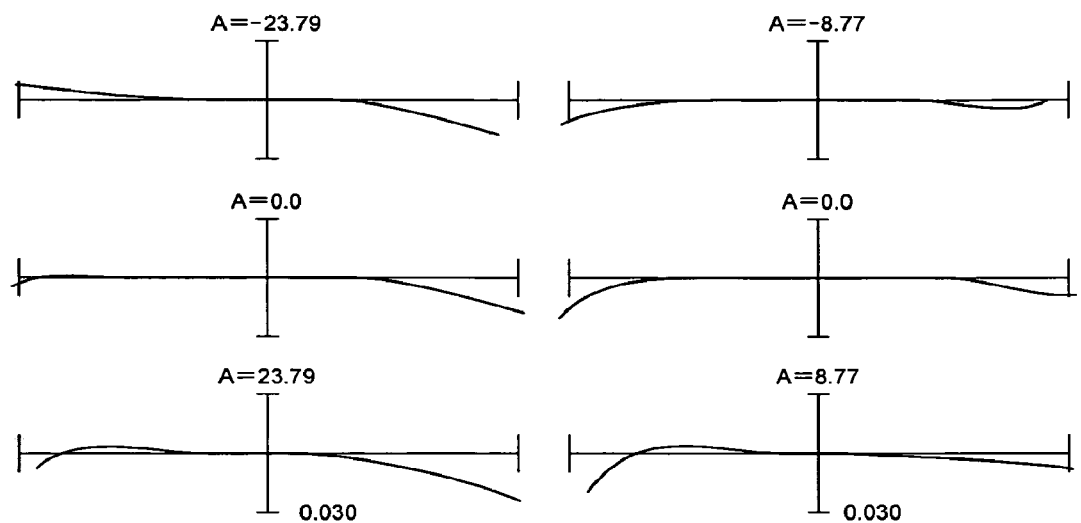
FIG.36B
FIG.36C
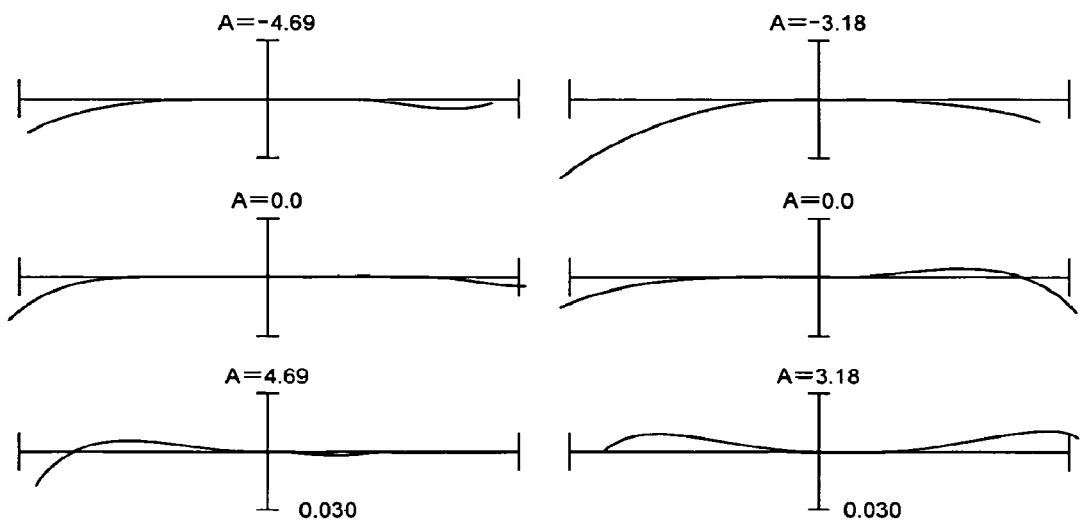
FIG.36D

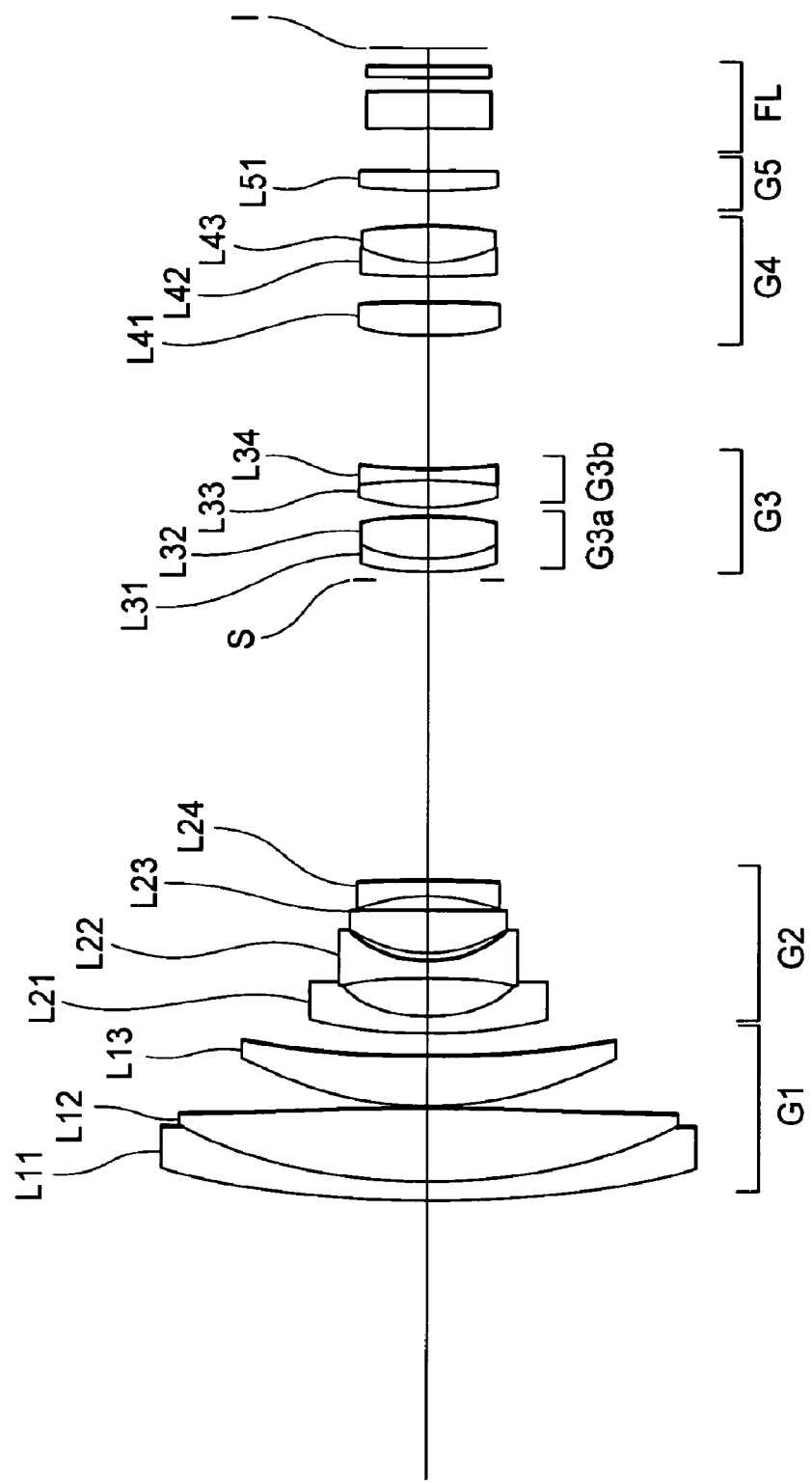

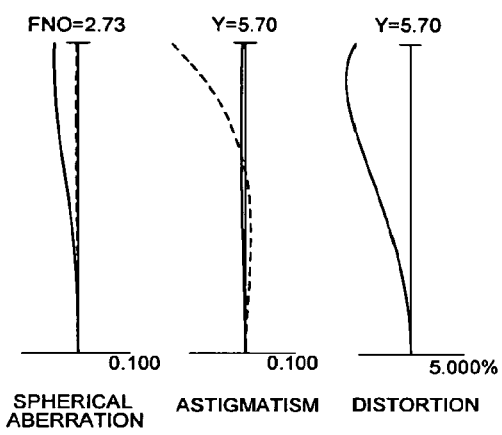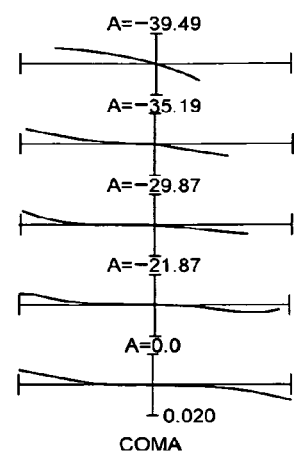
FIG.54A
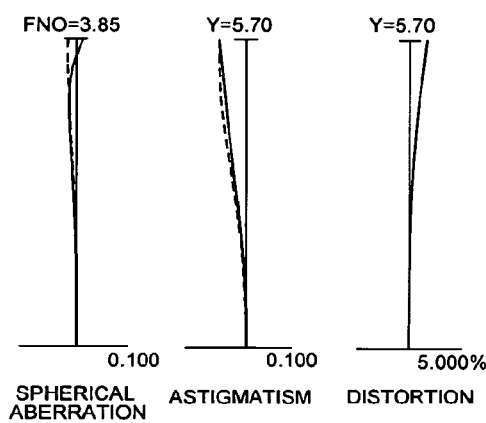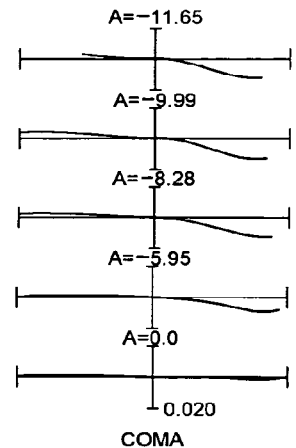
FIG.54B
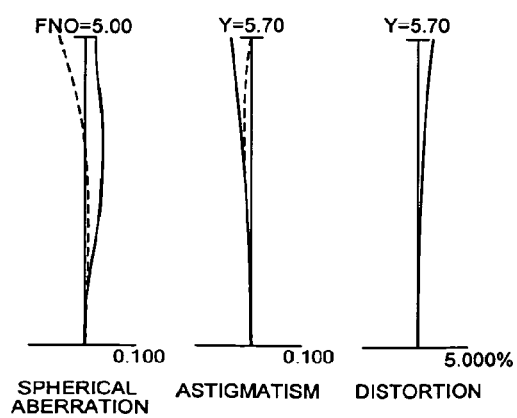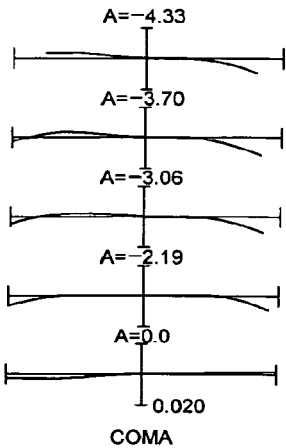
FIG.54C

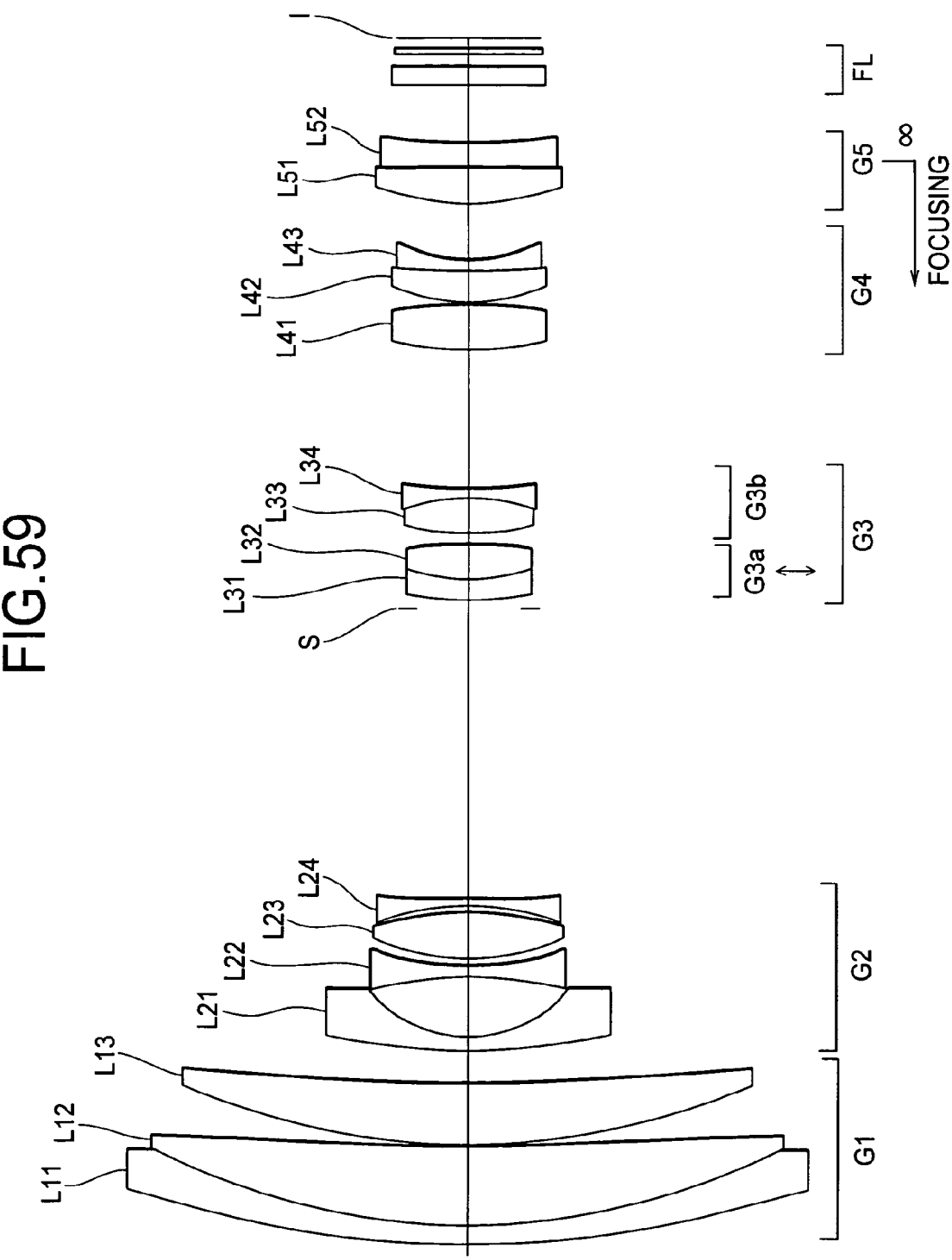

ZOOM LENS SYSTEM

CROSS-REFERENCE TO RELATED APPLICATION

This application is a division of application Ser. No. 11/220,647 filed Sep. 8, 2005, now U.S. Pat. No. 7,199,940.

The disclosure of the following priority applications are herein incorporated by reference:

Japanese Patent Application No. 2004-268961 filed on Sep. 15, 2004,

Japanese Patent Application No. 2005-098725 filed on Mar. 30, 2005,

Japanese Patent Application No. 2005-098737 filed on Mar. 30, 2005,

Japanese Patent Application No. 2005-196621 filed on Jul. 5, 2005, and

Japanese Patent Application No. 2005-196624 filed on Jul. 5, 2005.

BACKGROUND OF THE INVENTION

1. Field of the Invention

The present invention relates to a zoom lens system suitable for a video camera and an electronic still camera using a solid-state imaging device and the like.

2. Related Background Art

A lot of zoom lens systems suitable for a video camera and an electronic still camera using a solid-state imaging device and the like as an imaging medium have been proposed. Among them, it has been known that those having a high zoom ratio of five or more are constructed by five lens groups or more and have such lens type that the most object side lens group has positive refractive power as described in Japanese Patent Application Laid-Open No. 2002-98893.

On the other hand, a high zoom ratio zoom lens system has a problem that a camera shake caused by a photographer tends to occur on the telephoto side. In order to avoid degradation in the shot image caused by the camera shake, various methods for canceling the image blur caused by the camera shake by shifting an image by means of shifting a portion of the optical system substantially perpendicularly to the optical axis have been proposed. Moreover, a lot of optical systems equipped with such vibration reduction mechanism have been proposed as shown in Japanese Patent Application Laid-Open No. 2003-207715.

In a video camera or an electronic still camera using a solid-state imaging device and the like, recent trend of increasing the number of pixels is continuing, so that higher optical performance is strongly required for a shooting lens. In view of convenience for shooting, a high-zoom-ratio zoom lens is strongly required and in view of portability, compactness is also strongly required. Although both of these requirements have to be satisfied simultaneously, in the zoom lens systems disclosed in Japanese Patent Application Laid-Open No. 2002-98893, optical performance is not sufficiently high over entire focal length range from the wide-angle end state to the telephoto end state and although a high zoom ratio is secured, compactness is not sufficient.

On the other hand, while the request for the function of canceling a camera shake recently becomes high, in the zoom lens systems disclosed in Japanese Patent Application Laid-Open No. 2003-207715, optical performance is not sufficiently high over entire focal length range from the wide-angle end state to the telephoto end state and optical performance upon shifting a portion of the optical system substantially perpendicularly to the optical axis is not sufficiently high. In addition, the zoom ratio is not sufficient since it is less than five.

Although various zoom lens systems of this kind have been proposed in Japanese Patent Application Laid-Open Nos. 2004-252196, 10-260356, 11-23969, 2000-298235, and 2003-177318, any one of them has satisfied not all requirements such as a sufficient zoom ratio, an enough angle of view in the wide-angle end state, compactness, and good optical performance.

SUMMARY OF THE INVENTION

The present invention is made in view of the aforementioned problems and has an object to provide a zoom lens system suitable for a video camera and an electronic still camera using a solid-state imaging device and the like, having a zoom ratio of about five or more with superb optical performance and compactness.

In view of vibration reduction, the present invention has an object to provide a zoom lens system suitable for a video camera and an electronic still camera using a solid-state imaging device and the like, having a zoom ratio of about five or more with compactness and superb optical performance even if a portion of the optical system is shifted substantially perpendicularly to the optical axis.

A first aspect of the present invention provides a zoom lens system including, in order from an object along an optical axis, a first lens group having positive refractive power, a second lens group having negative refractive power, a third lens group having positive refractive power, a fourth lens group having positive refractive power, and a fifth lens group having positive refractive power. When a state of lens group positions varies from a wide-angle end state to a telephoto end state upon focusing on infinity, the first lens group moves with respect to an image plane, the second lens group moves at first to the image and then to the object, the third lens group moves to the object, the fourth lens group moves to the object, and the fifth lens group moves with respect to the image plane along the optical axis such that a variable distance between the first lens group and the second lens group increases, a variable distance between the second lens group and the third lens group decreases, a variable distance between the third lens group and the fourth lens group decreases, and a variable distance between the fourth lens group and the fifth lens group increases. The following conditional expressions (1) and (2) are satisfied:

$$0.02 < (D5iT - D5iW)/fW < 0.50 \qquad (1)$$

$$0.09 < (-f2)/fT < 0.18 \qquad (2)$$

where fW denotes the focal length of the zoom lens system in the wide-angle end state, fT denotes the focal length of the zoom lens system in the telephoto end state, f2 denotes the focal length of the second lens group, D5iW denotes a distance between the most image side lens surface of the fifth lens group and the image plane in the wide-angle end state, and D5iT denotes a distance between the most image side lens surface of the fifth lens group and the image plane in the telephoto end state.

In one preferred embodiment of the first aspect, it is preferable that when a state of lens group positions varies from the wide-angle end state to the telephoto end state, the fifth lens group moves to the image from the wide-angle end state to a wide-angle side intermediate focal length state, moves to the object from the wide-angle side intermediate focal length state to a telephoto side intermediate focal length state, and moves to the image from the telephoto side intermediate focal length state to the telephoto end state.

In one preferred embodiment of the first aspect, the following conditional expression (3) is preferably satisfied:

$$0.40 < f5/fT < 0.50 \quad (3)$$

where fT denotes the focal length of the zoom lens system in the telephoto end state, and f5 denotes the focal length of the fifth lens group.

In one preferred embodiment of the first aspect, it is preferable that the third lens group includes, in order from the object along the optical axis, a front lens group having positive refractive power, an aperture stop, and a rear lens group, the front lens group is composed only of a cemented lens constructed by, in order from the object along the optical axis, a negative lens cemented with a positive lens, and the rear lens group is composed only of a cemented lens constructed by, in order from the object along the optical axis, a positive lens cemented with a negative lens.

In one preferred embodiment of the first aspect, the third lens group preferably includes, in order from the object along the optical axis, a front lens group having positive refractive power, an aperture stop, and a rear lens group and the following conditional expression (4) is preferably satisfied:

$$-0.50 < f3a/f3b < 0.50 \quad (4)$$

where f3a denotes the focal length of the front lens group and f3b denotes the focal length of the rear lens group.

A second aspect of the present invention provides a zoom lens system including, in order from an object along an optical axis, a first lens group having positive refractive power, a second lens group having negative refractive power, a third lens group having positive refractive power, a fourth lens group having positive refractive power, a fifth lens group having positive refractive power. When a state of lens group positions varies from a wide-angle end state to a telephoto end state upon focusing on infinity, the first lens group moves with respect to an image plane, the second lens group moves at first to the image and then to the object, the third lens group moves to the object, and the fourth lens group moves to the object along the optical axis such that a variable distance between the first lens group and the second lens group increases, a variable distance between the second lens group and the third lens group decreases, a variable distance between the third lens group and the fourth lens group decreases, and a variable distance between the fourth lens group and the fifth lens group increases. The third lens group includes, in order from the object along the optical axis, a front lens group having positive refractive power, and a rear lens group. An image can be shifted by shifting the front lens group substantially perpendicularly to the optical axis.

In one preferred embodiment of the second aspect, the third lens group preferably includes an aperture stop and the aperture stop is arranged between the front lens group and the rear lens group.

In one preferred embodiment of the second aspect, the front lens group is preferably composed only of a cemented lens constructed by, in order from the object along the optical axis, a negative lens cemented with a positive lens.

In one preferred embodiment of the second aspect, it is preferable that the front lens group is composed only of a cemented lens constructed by, in order from the object along the optical axis, a negative lens cemented with a positive lens, and the rear lens group is composed only of a cemented lens constructed by, in order from the object along the optical axis, a positive lens cemented with a negative lens.

In one preferred embodiment of the second aspect, the following conditional expression (4) is preferably satisfied:

$$-0.50 < f3a/f3b < 0.50 \quad (4)$$

where f3a denotes the focal length of the front lens group and f3b denotes the focal length of the rear lens group.

In one preferred embodiment of the second aspect, the following conditional expression (5) is preferably satisfied:

$$0.2 < (1-\beta 3aT)\beta RT < 3.0 \quad (5)$$

where β3aT denotes a using lateral magnification of the front lens group in the telephoto end state, and βRT denotes a using lateral magnification of the whole optical system locating between the front lens group and the image plane in the telephoto end state.

A third aspect of the present invention provides a zoom lens system including, in order from an object along an optical axis, a first lens group having positive refractive power, a second lens group having negative refractive power, a third lens group having positive refractive power, a fourth lens group having positive refractive power, a fifth lens group having positive refractive power. When a state of lens group positions varies from a wide-angle end state to a telephoto end state upon focusing on infinity, the first lens group moves with respect to an image plane, the second lens group moves at first to the image and then to the object, the third lens group moves to the object, and the fourth lens group moves to the object such that a distance between the first lens group and the second lens group increases, a distance between the second lens group and the third lens group decreases, a distance between the third lens group and the fourth lens group varies, and a distance between the fourth lens group and the fifth lens group increases. The following conditional expressions (7), (8) and (9) are satisfied:

$$7.0 < f1/fW < 12.8 \quad (7)$$

$$3.0 < f5/fW < 10.0 \quad (8)$$

$$5.8 < f1/(-f2) < 10.0 \quad (9)$$

where fW denotes the focal length of the zoom lens system in the wide-angle end state, f1 denotes the focal length of the first lens group, f2 denotes the focal length of the second lens group, and f5 denotes the focal length of the fifth lens group.

In one preferred embodiment of the third aspect, it is preferable that the distance along the optical axis between the third lens group and the fourth lens group focusing on infinity in the telephoto end state is at least smaller than that in the wide-angle end state.

In one preferred embodiment of the third aspect, upon zooming from the wide-angle end state to the telephoto end state, the fifth lens group preferably moves along the optical axis with respect to the image plane upon focusing on infinity.

In one preferred embodiment of the third aspect, the third lens group preferably includes, in order from the object along the optical axis, a front lens group having positive refractive power, an aperture stop, and a rear lens group.

A fourth aspect of the present invention provides a zoom lens system including, in order from an object along an optical axis, a first lens group having positive refractive power, a second lens group having negative refractive power, a third lens group having positive refractive power, a fourth lens group having positive refractive power, and a fifth lens group having positive refractive power. When a state of lens group positions varies from a wide-angle end state to a telephoto end state upon focusing on infinity, the first lens group moves with respect to an image plane, the second lens group moves at first to the image and then to the object, the third lens group moves to the object, and the fourth lens group moves to the object such that a distance between the first lens group and the second lens group increases, a distance between the second lens group and the third lens group decreases, a distance between the third lens group and the fourth lens group varies, and a distance between the fourth lens group and the fifth lens group increases. The third lens group includes, in order from an object along the optical axis, a front lens group having positive refractive power, an aperture stop, and a rear lens group. An image on an image plane can be moved by shifting the front lens group substantially perpendicularly to the optical axis. The following conditional expression (7) is satisfied:

$$7.0 < f1/fW < 12.8 \qquad (7)$$

where fW denotes the focal length of the zoom lens system in the wide-angle end state, and f1 denotes the focal length of the first lens group.

In one preferred embodiment of the fourth aspect, it is preferable that the distance along the optical axis between the third lens group and the fourth lens group upon focusing on infinity in the telephoto end state is at least smaller than that in the wide-angle end state.

In one preferred embodiment of the fourth aspect, upon zooming from the wide-angle end state to the telephoto end state, the fifth lens group preferably moves along the optical axis with respect to the image plane upon focusing on infinity.

In one preferred embodiment of the fourth aspect, the following conditional expression (8) is preferably satisfied:

$$3.0 < f5/fW < 10.0 \qquad (8)$$

where f5 denotes the focal length of the fifth lens group.

In one preferred embodiment of the fourth aspect, the following conditional expression (9) is preferably satisfied:

$$5.8 < f1/(-f2) < 10.0 \qquad (9)$$

where f2 denotes the focal length of the second lens group.

In one preferred embodiment of the fourth aspect, the following conditional expression (5) is preferably satisfied:

$$0.2 < (1-\beta 3aT)\beta RT < 3.0 \qquad (5)$$

where $\beta 3aT$ denotes a using lateral magnification of the front lens group in the telephoto end state, and $\beta RT$ denotes a using lateral magnification of the whole optical system locating between the front lens group and the image plane in the telephoto end state.

In one preferred embodiment of the fourth aspect, the front lens group is preferably composed only of a cemented lens constructed by, in order from the object along the optical axis, a negative lens cemented with a positive lens, and the rear lens group is preferably composed only of a cemented lens constructed by, in order from the object along the optical axis, a positive lens cemented with a negative lens.

In one preferred embodiment of the fourth aspect, the following conditional expression (10) is preferably satisfied:

$$-0.50 < f3a/f3b < 0.80 \qquad (10)$$

where f3a denotes the focal length of the front lens group and f3b denotes the focal length of the rear lens group.

A fifth aspect of the present invention provides a zoom lens system including, in order from an object, a first lens group having positive refractive power, a second lens group having negative refractive power, a third lens group having positive refractive power, a fourth lens group having positive refractive power, and a fifth lens group having positive refractive power. When a state of lens group positions varies from a wide-angle end state to a telephoto end state, a distance between the first lens group and the second lens group varies, a distance between the second lens group and the third lens group decreases, a distance between the third lens group and the fourth lens group varies, a distance between the fourth lens group and the fifth lens group increases, and the third and fourth lens groups move to the object. Focusing is carried out by the fifth lens group. The third lens group is composed of a front lens group having positive refractive power and a rear lens group having positive refractive power locating to an image side of the front lens group with a space. An image is shifted by shifting the front lens group substantially perpendicularly to an optical axis. The following conditional expressions (11) through (14) are satisfied:

$$0.02 < |1/\beta 3aW| < 0.08 \qquad (11)$$

$$3.9 < (\beta 3aT)^2 < 7.4 \qquad (12)$$

$$0.15 < fW/f3a < 0.19 \qquad (13)$$

$$1.1 < f5/fT < 4.2 \qquad (14)$$

where fW denotes the focal length of the zoom lens system in the wide-angle end state, fT denotes the focal length of the zoom lens system in the telephoto end state, f3a denotes the focal length of the front lens group, f5 denotes the focal length of the fifth lens group, $\beta 3aW$ denotes a using lateral magnification of the front lens group in the wide-angle end state, and $\beta 3aT$ denotes a using lateral magnification of the front lens group in the telephoto end state.

In one preferred embodiment of the fifth aspect, the third lens group preferably satisfies the following conditional expression (15):

$$1.3 < f3a/f3 < 1.6 \qquad (15)$$

where f3 denotes the focal length of the third lens group.

In one preferred embodiment of the fifth aspect, it is preferable that the front lens group is composed of a cemented lens constructed by a negative meniscus lens having convex surface facing to the object cemented with a positive lens having a convex surface facing to the object, and the rear lens group is composed of a cemented lens constructed by a positive lens having a convex surface facing to the object cemented with a negative lens having a concave surface facing to the image.

In one preferred embodiment of the fifth aspect, the front lens group preferably includes an aperture stop locating adjacent to the object side of the front lens group.

A sixth aspect of the present invention provides a zoom lens system including, in order from an object, a first lens group having positive refractive power, a second lens group having negative refractive power, a third lens group having positive refractive power, a fourth lens group having positive refractive power, and a fifth lens group having positive refractive power. When a state of lens group positions varies from a wide-angle end state to a telephoto end state, the first lens group moves with respect to an image plane, a distance between the first lens group and the second lens group varies, a distance between the second lens group and the third lens group decreases, a distance between the third lens group and the fourth lens group decreases, and a distance between the fourth lens group and the fifth lens group increases. The third lens group is composed of, in order from the object, an aperture stop, a front lens group having positive refractive power and a rear lens group having positive refractive power locating to an image side of the front lens group with a space. An image is shifted by shifting the front lens group substantially perpendicularly to an optical axis. The following conditional expression (16) is satisfied:

$$10.0 < f1/fW < 14.0 \tag{16}$$

where f1 denotes the focal length of the first lens group and fW denotes the focal length of the zoom lens system in the wide-angle end state.

In one preferred embodiment of the sixth aspect, it is preferable that the front lens group is composed of a cemented lens constructed by a negative meniscus lens having a convex surface facing to the object cemented with a positive lens having a convex surface facing to the object, and the rear lens group is composed of a cemented lens constructed by a positive lens having a convex surface facing to the object cemented with a double concave negative lens.

In one preferred embodiment of the sixth aspect, the following conditional expression (17) is preferably satisfied:

$$1.0 < f3a/f3 < 1.5 \tag{17}$$

where f3 denotes the focal length of the third lens group and f3a denotes the focal length of the front lens group.

In one preferred embodiment of the sixth aspect, the following conditional expression (18) is preferably satisfied:

$$0.8 < (1-\beta 3aT)\beta RT < 1.2 \tag{18}$$

where β3aT denotes a using lateral magnification of the front lens group in the telephoto end state, and βRT denotes a using lateral magnification of the whole optical system locating between the front lens group and the image plane in the telephoto end state.

In one preferred embodiment of the sixth aspect, the following conditional expression (19) is preferably satisfied:

$$7.0 < |f1/f2| < 11.0 \tag{19}$$

where f2 denotes the focal length of the second lens group.

In one preferred embodiment of the sixth aspect, the following conditional expression (20) is preferably satisfied:

$$0.10 < fW/f3a < 0.20 \tag{20}$$

where f3a denotes the focal length of the front lens group.

A seventh aspect of the present invention provides a zoom lens system comprising, in order from an object, a first lens group having positive refractive power, a second lens group having negative refractive power, a third lens group having positive refractive power, a fourth lens group having positive refractive power, and a fifth lens group having positive refractive power. When a state of lens group positions varies from a wide-angle end state to a telephoto end state, the first lens group moves with respect to an image plane, the fifth lens group is fixed with respect to the image plane, a distance between the first lens group and the second lens group varies, a distance between the second lens group and the third lens group decreases, a distance between the third lens group and the fourth lens group decreases, and a distance between the fourth lens group and the fifth lens group increases. The following conditional expression (16) is satisfied:

$$10.0 < f1/fW < 14.0 \tag{16}$$

where fW denotes the focal length of the zoom lens system in the wide-angle end state and f1 denotes the focal length of the first lens group.

In one preferred embodiment of the seventh aspect, focusing from infinity to a close object is preferably carried out by moving the fifth lens group to the object.

In one preferred embodiment of the seventh aspect, the following conditional expression (21) is preferably satisfied:

$$4.0 < f5/fW < 9.0 \tag{21}$$

where f5 denotes the focal length of the fifth lens group.

In one preferred embodiment of the seventh aspect, the following conditional expression (19) is preferably satisfied:

$$7.0 < |f1/f2| < 11.0 \tag{19}$$

where f2 denotes the focal length of the second lens group.

In one preferred embodiment of the seventh aspect, it is preferable that the third lens group is composed of, in order from the object, an aperture stop, a front lens group, and a rear lens group, the front lens group is composed of a cemented lens constructed by, in order from the object, a negative meniscus lens having a convex surface facing to the object cemented with a positive lens having a convex surface facing to the object, and the rear lens group is composed of a cemented lens constructed by, in order from the object, a positive lens having a convex surface facing to the object cemented with a double concave negative lens.

In one preferred embodiment of the seventh aspect, the following conditional expression (17) is preferably satisfied:

$$1.0 < f3a/f3 < 1.5 \tag{17}$$

where f3 denotes the focal length of the third lens group, and f3a denotes the focal length of the front lens group.

In one preferred embodiment of the seventh aspect, the following conditional expression (20) is preferably satisfied:

$$0.10 < fW/f3a < 0.20 \tag{20}$$

where f3a denotes the focal length of the front lens group.

A eighth aspect of the present invention provides a zoom lens system including, in order from an object, a first lens group having positive refractive power, a second lens group having negative refractive power, a third lens group having positive refractive power, a fourth lens group having positive refractive power, and a fifth lens group having positive refractive power. When a state of lens group positions varies from a wide-angle end state to a telephoto end state, a distance between the first lens group and the second lens group varies, a distance between the second lens group and the third lens group decreases, a distance between the third lens group and the fourth lens group varies, a distance between the fourth lens group and the fifth lens group increases. The third lens group is composed of a front sub-lens group having positive refractive power and a rear sub-lens group locating to an image side of the front sub-lens group with a space. An image is shifted by shifting a lens group in the third lens group including at least either one of the sub-lens groups substantially perpendicularly to an optical axis.

Other features and advantages according to the present invention will be readily under stood from the detailed description of the preferred embodiments in conjunction with the accompanying drawings.

BRIEF DESCRIPTION OF THE DRAWINGS

FIG. 22A shows various aberrations of the zoom lens system according to Example 5 of the second embodiment at d-line (λ=587.6 nm) in the intermediate focal length state (M).

FIG. 22B shows coma of the zoom lens system according to Example 5 of the second embodiment at d-line (λ=587.6 nm) in the intermediate focal length state (M) upon shifting the front lens group perpendicularly to the optical axis by 0.5 mm.

FIG. 36A is graphs showing lateral aberrations of the zoom lens system according to Example 8 in the wide-angle end state W upon shifting.

FIG. 36B is graphs showing lateral aberrations of the zoom lens system according to Example 8 in the wide-angle side intermediate focal length state M1 upon shifting.

FIG. 36C is graphs showing lateral aberrations of the zoom lens system according to Example 8 in the telephoto side intermediate focal length state M2 upon shifting.

FIG. 36D is graphs showing lateral aberrations of the zoom lens system according to Example 8 in the telephoto end state T upon shifting.

FIG. 41 is a sectional view showing lens construction of a zoom lens system according to Example 10 of the third embodiment of the present invention.

FIG. 54A shows various aberrations at d-line ($\lambda$=587.6 nm) of the zoom lens system according to Example 13 of the fourth embodiment in a wide-angle end state (f=7.31 mm).

FIG. 54B shows various aberrations at d-line ($\lambda$=587.6 nm) of the zoom lens system according to Example 13 of the fourth embodiment in an intermediate focal length state (f=27.23 mm).

FIG. 54C shows various aberrations at d-line ($\lambda$=587.6 nm) of the zoom lens system according to Example 13 of the fourth embodiment in a telephoto end state (f=74.15 mm).

FIG. 59 is a sectional view showing lens construction of a zoom lens system according to Example 15 of the fourth embodiment of the present invention.

FIG. 61B shows lateral aberrations upon shifting at d-line (λ=587.6 nm) of the zoom lens system according to Example 15 of the fourth embodiment in the intermediate focal length state (f=27.50 mm).

FIG. 61C shows lateral aberrations upon shifting at d-line (λ=587.6 nm) of the zoom lens system according to Example 15 of the fourth embodiment in the telephoto end state (f=86.40 mm).

DESCRIPTION OF THE MOST PREFERRED EMBODIMENTS

First Embodiment

Figure 1:
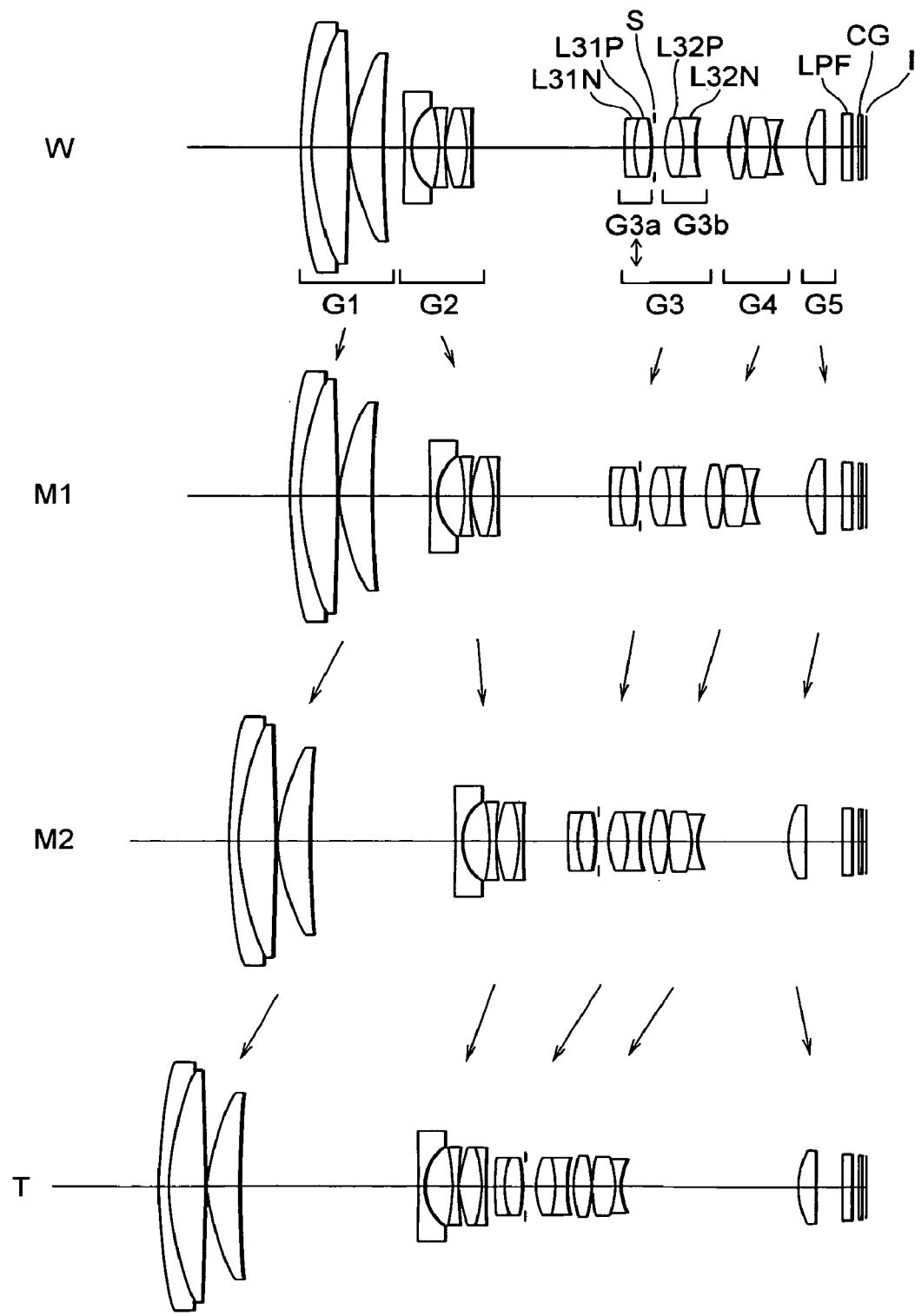
FIG. 1 shows cross-sectional views of a zoom lens system according to Example 1 of a first embodiment of the present invention upon focusing on infinity.
Figure 2A:
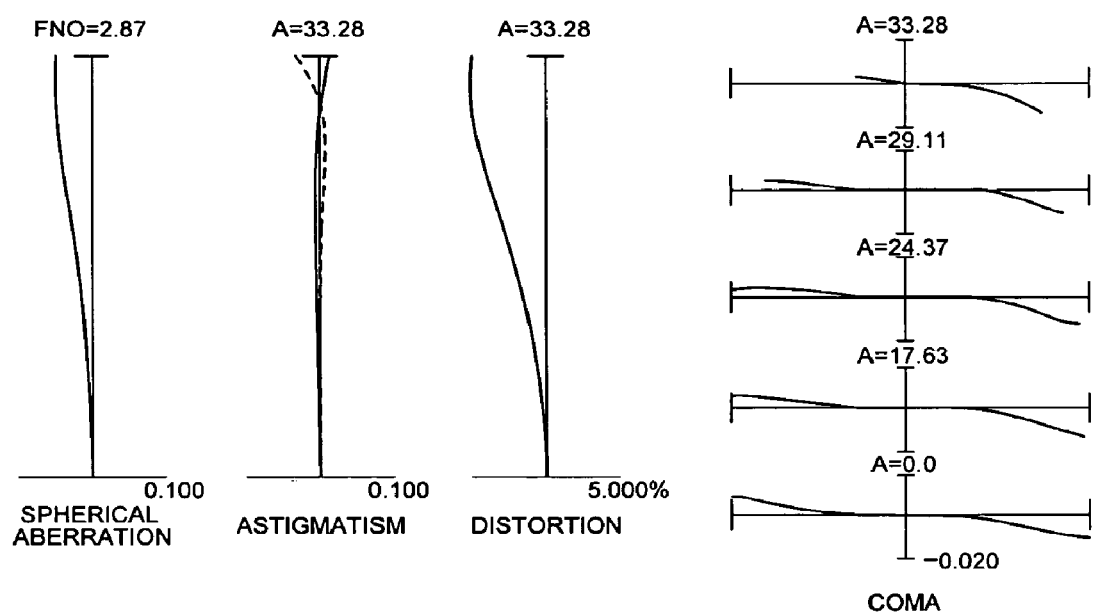
FIG. 2A shows various aberrations of the zoom lens system according to Example 1 of the first embodiment at d-line upon focusing on infinity in a wide-angle end state.
Figure 2B:
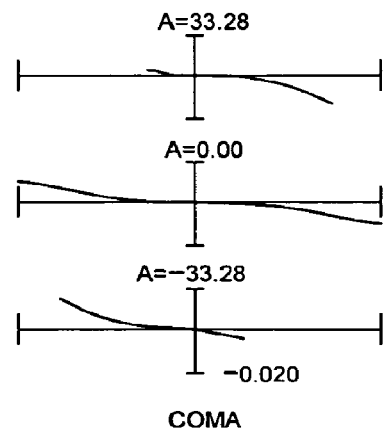
FIG. 2B shows coma of the zoom lens system according to Example 1 of the first embodiment at d-line upon focusing on infinity when the front lens group G3a is shifted by 0.1 mm perpendicularly to the optical axis in the wide-angle end state.
Figure 3A:
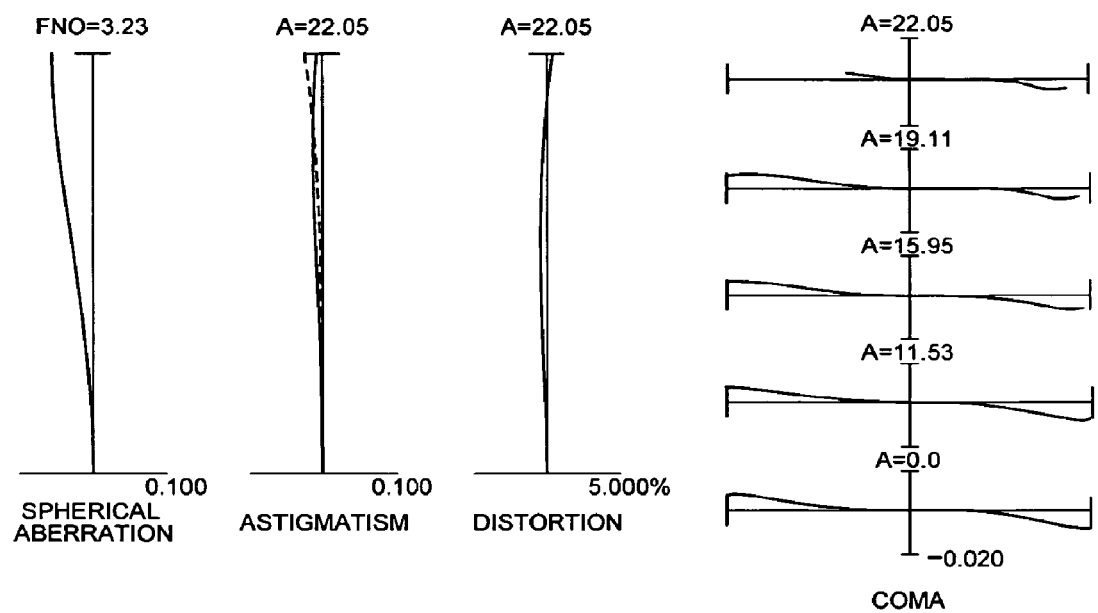
FIG. 3A shows various aberrations of the zoom lens system according to Example 1 of the first embodiment at d-line upon focusing on infinity in a wide-angle side intermediate focal length state.
Figure 3B:
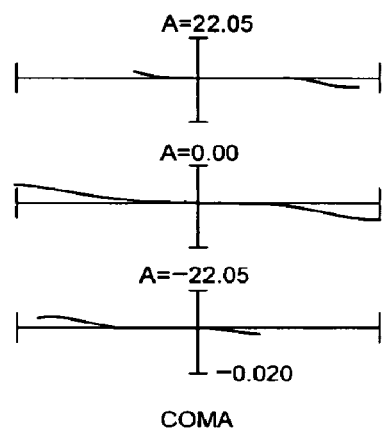
FIG. 3B shows coma of the zoom lens system according to Example 1 of the first embodiment at d-line upon focusing on infinity when the front lens group G3a is shifted by 0.1 mm perpendicularly to the optical axis in the wide-angle side intermediate focal length state.
Figure 4A:
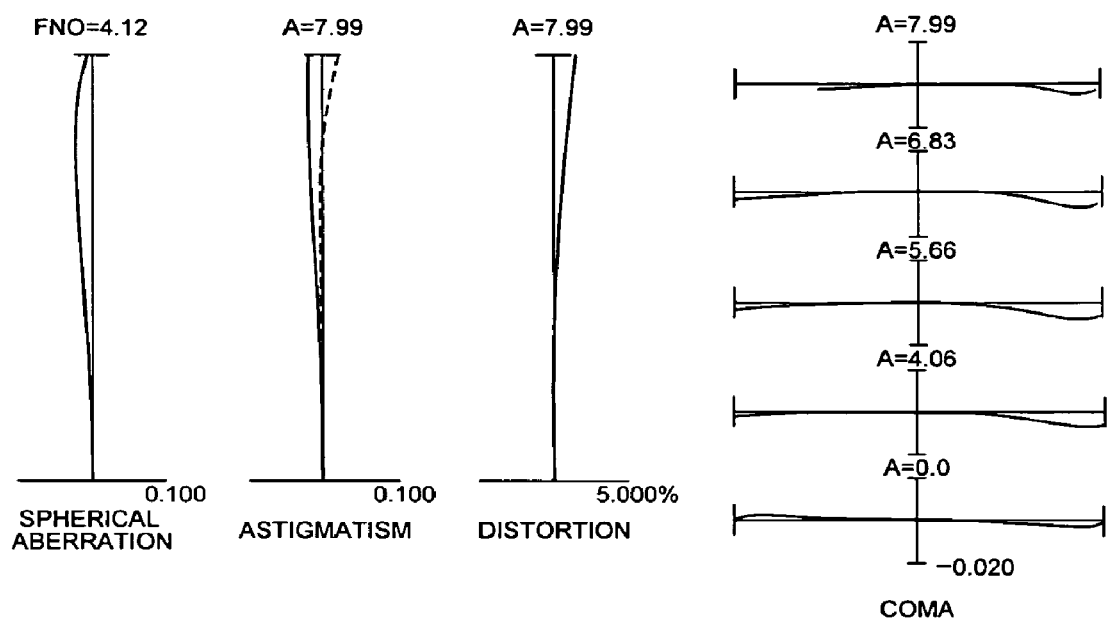
FIG. 4A shows various aberrations of the zoom lens system according to Example 1 of the first embodiment at d-line upon focusing on infinity in a telephoto side intermediate focal length state.
Figure 4B:
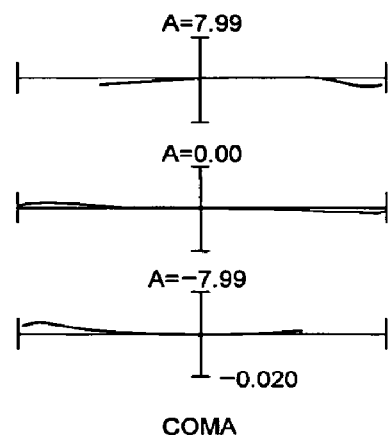
FIG. 4B shows coma of the zoom lens system according to Example 1 of the first embodiment at d-line upon focusing on infinity when the front lens group G3a is shifted by 0.1 mm perpendicularly to the optical axis in the telephoto side intermediate focal length state.
Figure 5A:
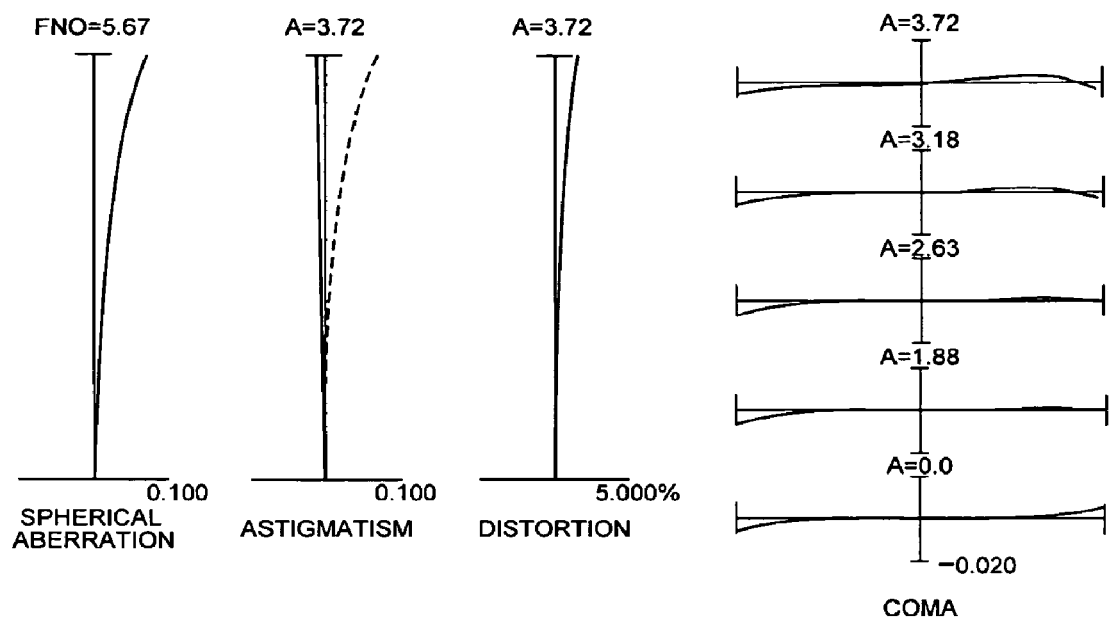
FIG. 5A shows various aberrations of the zoom lens system according to Example 1 of the first embodiment at d-line upon focusing on infinity in a telephoto end state.
Figure 5B:
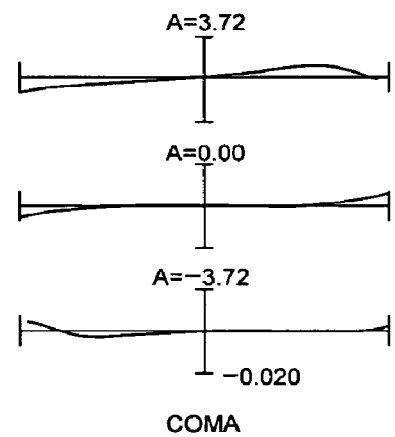
FIG. 5B shows coma of the zoom lens system according to Example 1 of the first embodiment at d-line upon focusing on infinity when the front lens group G3a is shifted by 0.1 mm perpendicularly to the optical axis in the telephoto end state.

A zoom lens system according to a first embodiment of the present invention is composed of, in order from an object along an optical axis, a first lens group having positive refractive power, a second lens group having negative refractive power, a third lens group having positive refractive power, a fourth lens group having positive refractive power, and a fifth lens group having positive refractive power.

In a video camera and an electronic still camera using a solid-state imaging device and the like, a zoom lens system is required to have an exit pupil locating far away from an image plane because of the characteristics of the imaging device, so that it is preferable that the lens group locating near to the image plane has positive refractive power as a whole.

Accordingly, in the zoom lens system according to the first embodiment of the present invention, the above-mentioned requirement is satisfied by constructing, in order from an object along the optical axis, a first lens group having positive refractive power, a second lens group having negative refractive power, a third lens group having positive refractive power, a fourth lens group having positive refractive power, and a fifth lens group having positive refractive power, as described above.

In the zoom lens system according to the first embodiment of the present invention, when a state of lens group positions varies from a wide-angle end state to a telephoto end state upon focusing on infinity, the first lens group moves with respect to an image plane, the second lens group moves at first to the image and then to the object, the third lens group moves to the object, the fourth lens group moves to the object, and the fifth lens group moves with respect to the image plane along the optical axis such that, a variable distance between the first lens group and the second lens group increases, a variable distance between the second lens group and the third lens group decreases, a variable distance between the third lens group and the fourth lens group decreases, and a variable distance between the fourth lens group and the fifth lens group increases. In this construction, it is possible to obtain zooming effect efficiently.

The zoom lens system according to the first embodiment of the present invention is constructed to satisfy the following conditional expressions (1) and (2) so as to accomplish a purpose of the present invention to realize a compact zoom lens system having higher optical performance with securing a zoom ratio of about five or more:

$$0.02 < (D5iT - D5iW)/fW < 0.50 \tag{1}$$

$$0.09 < (-f2)/fT < 0.18 \tag{2}$$

where fW denotes the focal length of the zoom lens system in a wide-angle end state, fT denotes the focal length of the zoom lens system in a telephoto end state, f2 denotes the focal length of the second lens group, D5iW denotes a distance between the most image side lens surface of the fifth lens group and the image plane in the wide-angle end state, and D5iT denotes a distance between the most image side lens surface of the fifth lens group and the image plane in the telephoto end state.

Conditional expression (1) defines an appropriate moving amount of the fifth lens group. When the ratio (D5iT−D5iW)/fW is equal to or exceeds the upper limit of conditional expression (1), the fifth lens group moves largely to the fourth lens group side in the telephoto end state. Accordingly, off-axis ray passes relatively near the optical axis, so that it becomes difficult to locate the exit pupil of the zoom lens system far away from the image plane. Accordingly, it becomes difficult to satisfy the requirement from the characteristics of the solid-state imaging device. Moreover, it becomes impossible to effectively correct variation of curvature of field, so that the purpose of the present invention to obtain high optical performance cannot be accomplished.

On the other hand, when the ratio (D5iT−D5iW)/fW is equal to or falls below the lower limit of conditional expression (1), in the telephoto end state, the fifth lens group makes almost no change in position or near to the image relative to the wide-angle end state. Accordingly, off-axis ray passes relatively far from the optical axis, so that the position of the exit pupil varies largely relative to wide-angle end state. Accordingly, it becomes impossible to satisfy the requirement from the characteristics of the solid-state imaging device. Moreover, it becomes impossible to effectively correct variation of curvature of field, so that the purpose of the present invention to obtain high optical performance cannot be accomplished.

It is more preferable that the zoom lens system according to the first embodiment of the present invention satisfies conditional expression (1) with the upper limit thereof set to 0.35.

Conditional expression (2) defines an appropriate range of the focal length of the second lens group. When the ratio (−f2)/fT is equal to or exceeds the upper limit of conditional expression (2), the focal length of the second lens group becomes relatively long, so that the second lens group cannot effectively contribute to zooming. Accordingly, it becomes difficult to secure a high zoom ratio of five or more or the moving amount of the second lens group becomes large, so that it becomes difficult to miniaturize the zoom lens system. Accordingly, the purpose of the present invention to obtain high optical performance cannot be accomplished.

On the other hand, when the ratio (−f2)/fT is equal to or falls below the lower limit of conditional expression (2), the focal length of the second lens group becomes relatively short, so that refractive power becomes too strong resulting in excessively large aberration produced in the second lens group. Accordingly, high optical performance cannot be obtained, so that the purpose of the present invention cannot be accomplished.

It is more preferable that the zoom lens system according to the first embodiment of the present invention satisfies conditional expression (2) with the upper limit of 0.16 and the lower limit of 0.10.

In a preferable aspect of the zoom lens system according to the first embodiment of the present invention, when the state of lens group positions varies from the wide-angle end state to the telephoto end state, the fifth lens group moves to the image from the wide-angle end state to a wide-angle side intermediate focal length state, moves to the object from the wide-angle side intermediate focal length state to a telephoto side intermediate focal length state, and moves to the image from the telephoto side intermediate focal length state to the telephoto end state.

By moving the fifth lens group with such moving trajectory, curvature of field can effectively be corrected all over the intermediate focal length range between the wide-angle end state and the telephoto end state, so that the purpose of the present invention of obtaining high optical performance can be accomplished.

In a preferable aspect of the zoom lens system according to the first embodiment of the present invention, it is preferable to satisfy the following conditional expression (3):

$$0.40 < f5/fT < 0.50 \quad (3)$$

where fT denotes the focal length of the zoom lens system in the telephoto end state, and f5 denotes the focal length of the fifth lens group.

Conditional expression (3) defines an appropriate range of the focal length of the fifth lens group. When the ratio f5/fT is equal to or exceeds the upper limit of conditional expression (3), the focal length of the fifth lens group becomes relatively long, so that the fifth lens group cannot effectively locate the position of the exit pupil far away from the image plane. Accordingly, the requirement of the characteristics of the solid-state imaging device cannot be satisfied.

On the other hand, when the ratio f5/fT is equal to or falls below the lower limit of conditional expression (3), refractive power of the fifth lens group becomes relatively strong. Accordingly, it becomes difficult to correct curvature of field over the entire range from the wide-angle end state to the telephoto end state with suppressing variation in the position of the exit pupil to satisfy the requirement of the characteristics of the solid-state imaging device. Accordingly, it becomes impossible to accomplish the purpose of the present invention to obtain high optical performance.

In a preferable aspect of the zoom lens system according to the first embodiment of the present invention, the third lens group preferably includes, in order from the object along the optical axis, a front lens group having positive refractive power, an aperture stop, and a rear lens group. The front lens group is preferably composed only of a cemented lens constructed by, in order from the object along the optical axis, a negative lens cemented with a positive lens. The rear lens group is preferably composed only of a cemented lens constructed by, in order from the object along the optical axis, a positive lens cemented with a negative lens.

In the zoom lens system according to the first embodiment of the present invention, the third lens group strongly contributes to zooming and assumes important role for correcting aberration of the whole lens system. By arranging the front lens group having positive refractive power, the rear lens group, and the aperture stop in between, on-axis aberrations can effectively be corrected. Moreover, since the front lens group locating to the object side of the aperture stop is composed only of a cemented lens constructed by a negative lens cemented with a positive lens, and the rear lens group locating to the image side of the aperture stop is composed only of a cemented lens constructed by a positive lens cemented with a negative lens, the lens construction becomes a so-called symmetric type locating the aperture stop in between, so that it becomes possible to correct on-axis aberrations. Accordingly, aberration correction can be carried out very preferably as a whole lens system, so that the purpose of the present invention to obtain high optical performance can be accomplished.

In a preferable aspect of the zoom lens system according to the first embodiment of the present invention, the third lens group includes, in order from the object along the optical axis, a front lens group having positive refractive power, an aperture stop, and a rear lens group and the following conditional expression (4) is preferably satisfied:

$$-0.50 < f3a/f3b < 0.50 \quad (4)$$

where f3a denotes the focal length of the front lens group and f3b denotes the focal length of the rear lens group.

The reason to construct the third lens group by the front lens group having positive refractive power, the aperture stop, and the rear lens group is as described above, and conditional expression (4) defines an appropriate range of the ratio of the focal length of the front lens group to that of the rear lens group.

When the ratio f3a/f3b is equal to or exceeds the upper limit of the conditional expression (4), refractive power of the rear lens group becomes strong relative to that of the front lens group. Accordingly, positive refractive power arranged to the image side of the aperture stop becomes excessively stronger than that arranged to the object side of the aperture stop in combination with the forth lens group having positive refractive power arranged to the image side of the rear lens group. Therefore, it becomes difficult to correct off-axis aberrations, so that the purpose of the present invention to obtain high optical performance cannot be accomplished.

On the other hand, when the ratio f3a/f3b is equal to or falls below the lower limit of conditional expression (4), refractive power of the third lens group as a whole becomes weak to be difficult to effectively contribute to zooming, so that a high zoom ratio of about five or more cannot be secured, or the moving amount of the third lens group becomes large, so that it becomes difficult to miniaturize the zoom lens system. Accordingly, the purpose of the present invention cannot be accomplished.

In the zoom lens system according to the first embodiment of the present invention, it is preferable to set the upper limit of conditional expression (4) to 0.40 and the lower limit to −0.20.

In a preferable aspect of the zoom lens system according to the first embodiment of the present invention, the third lens group is composed of, in order from the object along the optical axis, a front lens group having positive refractive power, and a rear lens group. It is preferable to shift the image by shifting the front lens group substantially perpendicularly to the optical axis.

With this construction, a function to cancel out image blur can be realized. Moreover, even in a state the front lens group is shifted substantially perpendicularly to the optical axis, preferable aberration correction can be carried out, so that it becomes possible to obtain high optical performance and the purpose of the present invention can be accomplished.

In a preferable aspect of the zoom lens system according to the first embodiment of the present invention, it is preferable that the third lens group includes an aperture stop and the aperture stop is arranged between the front lens group and the rear lens group.

In the zoom lens system according to the first embodiment of the present invention, the third lens group has a large contribution to zooming and assumes an important role of aberration correction in the whole lens system. With constructing as described above, it becomes possible to effectively correct on-axis aberrations and aberration correction as a whole lens system can be preferably carried out, so that the purpose of the present invention to obtain high optical performance can be accomplished.

In a preferable aspect of the zoom lens system according to the first embodiment of the present invention, it is preferable that the front lens group is composed only of a cemented lens constructed by, in order from the object along the optical axis, a negative lens cemented with a positive lens.

By composing the front lens group only of a cemented lens constructed by a negative lens cemented with a positive lens, it becomes possible to suppress variation in various aberrations upon shifting the front lens group substantially perpendicularly to the optical axis. Accordingly, aberration correction as a whole lens system can be preferably carried out, so that the purpose of the present invention to obtain high optical performance can be accomplished.

In a preferable aspect of the zoom lens system according to the first embodiment of the present invention, it is preferable that the front lens group is composed only of a cemented lens constructed by, in order from the object along the optical axis, a negative lens cemented with a positive lens and the rear lens group is composed only of a cemented lens constructed by, in order from the object along the optical axis, a positive lens cemented with a negative lens.

Since the front lens group locating to the object side of the aperture stop is composed only of a cemented lens constructed by a negative lens cemented with a positive lens, and the rear lens group locating to the image side of the aperture stop is composed only of a cemented lens constructed by a positive lens cemented with a negative lens, the lens construction becomes a so-called symmetric type locating the aperture stop in between, so that it becomes possible to further correct on-axis aberrations. Accordingly, aberration correction can be carried out very preferably as a whole lens system, so that the purpose of the present invention to obtain high optical performance can be accomplished.

In a preferable aspect of the zoom lens system according to the first embodiment of the present invention, the following conditional expression (4) described above is preferably satisfied:

$$-0.50 < f3a/f3b < 0.50 \quad (4)$$

where f3a denotes the focal length of the front lens group and f3b denotes the focal length of the rear lens group.

Conditional expression (4) defines an appropriate range of the ratio of the focal length of the front lens group to that of the rear lens group and further explanation is omitted as already described above.

In a preferable aspect of the zoom lens system according to the first embodiment of the present invention, the following conditional expression (5) is preferably satisfied:

$$0.2 < (1-\beta 3aT)\beta RT < 3.0 \quad (5)$$

where β3aT denotes a using lateral magnification of the front lens group in the telephoto end state, and βRT denotes a using lateral magnification of the whole optical system locating between the front lens group and the image plane in the telephoto end state.

Conditional expression (5) defines an appropriate range of a so-called blurring correctional coefficient that is the shift amount of the image relative to the shift amount of the front lens group perpendicularly to the optical axis in the telephoto end state.

When the value $(1-\beta 3aT)\beta RT$ is equal to or exceeds the upper limit of conditional expression (5), the shift amount of the image relative to that of the front lens group perpendicularly to the optical axis becomes too large. Accordingly, control accuracy required to the front lens group becomes too high to obtain sufficient accuracy, so that the purpose of the present invention to obtain high optical performance cannot be accomplished.

On the other hand, when the value $(1-\beta 3aT)\beta RT$ is equal to or falls below the lower limit of conditional expression (5), the shift amount of the image relative to that of the front lens group perpendicularly to the optical axis becomes relatively small. Accordingly, in order to secure enough shifting amount of image to cancel out the image blur by the camera shake, the shift amount of the front lens group perpendicularly to the optical axis has to be large, so that the purpose of the present invention to obtain a compact zoom lens system cannot be accomplished.

In the zoom lens system according to the first embodiment of the present invention, it is more preferable to set the upper limit of conditional expression to 2.0 and the lower limit to 0.4.

In a preferable aspect of the zoom lens system according to the first embodiment of the present invention, the fourth lens group is composed only of spherical lenses and includes a single lens having positive refractive power and the following conditional expression (6) is preferably satisfied:

$$1.700 < nL4P \qquad (6)$$

where nL4P denotes refractive index of the medium of the single lens at d-line (wave length $\lambda$=587.6 nm).

In the zoom lens system according to the first embodiment of the present invention, the fourth lens group has a large contribution to zooming as same as the third lens group and assumes an important role of aberration correction in the whole lens system. As described above, the fourth lens group is composed only of spherical lenses easy to secure manufacturing accuracy. Accordingly, deterioration in individual lens accuracy caused by manufacturing process can be suppressed, so that high optical performance can finally be secured and, as a result, the purpose of the present invention can be accomplished.

Conditional expression (6) defines an appropriate range of refractive index of the single lens having positive refractive power included in the fourth lens group.

When the value nL4P is equal to or falls below the lower limit of conditional expression (6), spherical aberration produced in the single lens becomes large in negative direction. Accordingly, it becomes difficult to correct spherical aberration by the fourth lens group, so that the purpose of the present invention to obtain high optical performance cannot be accomplished.

It is more preferable that the zoom lens system according to the first embodiment of the present invention sets the lower limit of conditional expression (6) to 1.740.

In a preferable aspect of the zoom lens system according to the first embodiment of the present invention, it is preferable that each of all elements of the zoom lens system is made of a spherical lens.

Each of the whole lens elements of the zoom lens system is made of a spherical lens which is easy to secure manufacturing accuracy. Accordingly, deterioration in individual lens accuracy caused by manufacturing process can be suppressed, so that high optical performance can finally be secured and, as a result, the purpose of the present invention can be accomplished.

In a preferable aspect of the zoom lens system according to the first embodiment of the present invention, it is preferable that the fourth lens group includes an aspherical lens.

By arranging an aspherical lens in the fourth lens group, spherical aberration produced in the fourth lens group can effectively be corrected. Accordingly, the purpose of the present invention to obtain high optical performance can be accomplished.

In this case, it is needless to say that the spherical lens means non-aspherical lens and includes a plane. The following explanations are in the same way.

A zoom lens system according to the first embodiment of the present invention seen from another point of view is composed of, in order from an object along an optical axis, a first lens group having positive refractive power, a second lens group having negative refractive power, a third lens group having positive refractive power, a fourth lens group having positive refractive power, and a fifth lens group having positive refractive power.

As the same as the previous invention, in a video camera or an electronic still camera using a solid-state imaging device and the like as an imaging medium, a lens group locating near to an image plane preferably has positive refractive power as a whole since the position of the exit pupil of the zoom lens system is required to locate far away from the image plane due to the characteristics of a solid-state imaging device.

As described above, a zoom lens system according to the first embodiment of the present invention seen from another point of view satisfies the abovementioned requirement of locating the position of the exit pupil far away from the image plane by being composed of, in order from an object along an optical axis, a first lens group having positive refractive power, a second lens group having negative refractive power, a third lens group having positive refractive power, a fourth lens group having positive refractive power, and a fifth lens group having positive refractive power.

In a zoom lens system according to the first embodiment of the present invention seen from another point of view, when a state of lens group positions varies from a wide-angle end state to a telephoto end state upon focusing on infinity, the first lens group moves with respect to an image plane, the second lens group moves at first to the image and then to the object, the third lens group moves to the object, and the fourth lens group moves to the object along the optical axis such that, a variable distance between the first lens group and the second lens group increases, a variable distance between the second lens group and the third lens group decreases, a variable distance between the third lens group and the fourth lens group decreases, and a variable distance between the fourth lens group and the fifth lens group increases. In this construction, it is possible to obtain zooming effect efficiently and the purpose of the present invention to realize a compact zoom lens system securing a zoom ratio of about five or more can be accomplished.

In a zoom lens system according to the first embodiment of the present invention seen from another point of view, the third lens group is composed of, in order from the object along the optical axis, a front lens group having positive refractive power, an aperture stop, and a rear lens group. By shifting the front lens group substantially perpendicularly to the optical axis, the image can be shifted.

With this construction, a function to cancel out image blur can be realized. Moreover, even in a state the front lens group is shifted substantially perpendicularly to the optical axis, preferable aberration correction can be carried out, so that it becomes possible to obtain high optical performance and the purpose of the present invention can be accomplished.

In a preferable aspect of the zoom lens system according to the first embodiment of the present invention seen from another point of view, it is preferable that the front lens group is composed only of a cemented lens constructed by, in order from the object along the optical axis, a negative lens cemented with a positive lens.

By composing the front lens group only of a cemented lens constructed by a negative lens cemented with a positive lens, it becomes possible to suppress variation in various aberrations upon shifting the front lens group substantially perpendicularly to the optical axis. Accordingly, aberration correction as a whole lens system can be preferably carried out, so that the purpose of the present invention to obtain high optical performance can be accomplished.

In a preferable aspect of the zoom lens system according to the first embodiment of the present invention seen from another point of view, it is preferable that the front lens group is composed only of a cemented lens constructed by, in order from the object along the optical axis, a negative lens cemented with a positive lens and the rear lens group is composed only of a cemented lens constructed by, in order from the object along the optical axis, a positive lens cemented with a negative lens.

Since the front lens group locating to the object side of the aperture stop is composed only of a cemented lens constructed by a negative lens cemented with a positive lens, and the rear lens group locating to the image side of the aperture stop is composed only of a cemented lens constructed by a positive lens cemented with a negative lens, the lens construction becomes a so-called symmetric type locating the aperture stop in between, so that it becomes possible to further correct on-axis aberrations. Accordingly, aberration correction can be carried out very preferably as a whole lens system, so that the purpose of the present invention to obtain high optical performance can be accomplished.

In a preferable aspect of the zoom lens system according to the first embodiment of the present invention seen from another point of view, the following conditional expression (4) described above is preferably satisfied:

$$-0.50 < f3a/f3b < 0.50 \quad (4)$$

where f3a denotes the focal length of the front lens group and f3b denotes the focal length of the rear lens group.

Conditional expression (4) defines an appropriate range of the ratio of the focal length of the front lens group to that of the rear lens group and further explanation is omitted as already described above.

In a preferable aspect of the zoom lens system according to the first embodiment of the present invention seen from another point of view, the following conditional expression (5) described above is preferably satisfied:

$$0.2 < (1-\beta 3aT)\beta RT < 3.0 \quad (5)$$

where β3aT denotes a using lateral magnification of the front lens group in the telephoto end state, and βRT denotes a using lateral magnification of the whole optical system locating between the front lens group and the image plane in the telephoto end state.

Conditional expression (5) defines an appropriate range of a so-called blurring correctional coefficient that is the shift amount of the image relative to the shift amount of the front lens group perpendicularly to the optical axis in the telephoto end state and further explanation is omitted as already described above.

In a preferable aspect of the zoom lens system according to the first embodiment of the present invention seen from another point of view, when the state of lens group positions varies from the wide-angle end state to the telephoto end state, the fifth lens group moves with respect to the image plane and following conditional expression described above is preferably satisfied:

$$0.02 < (D5iT-D5iW)/fW < 0.50 \quad (1)$$

where fW denotes the focal length of the zoom lens system in a wide-angle end state, D5iW denotes a distance between the most image side lens surface of the fifth lens group and the image plane in the wide-angle end state, and D5iT denotes a distance between the most image side lens surface of the fifth lens group and the image plane in the telephoto end state.

By moving the fifth lens group with respect to the image plane as described above, zooming effect can be obtained more effectively, so that the purpose of the present invention to realize a compact zoom lens system securing a zoom ratio of about five or more can be accomplished.

In a preferable aspect of the zoom lens system according to the first embodiment of the present invention seen from another point of view, it is preferable that the following conditional expression (2) as described above is satisfied:

$$0.09 < (-f2)/fT < 0.18 \quad (2)$$

where fT denotes the focal length of the zoom lens system in a telephoto end state, and f2 denotes the focal length of the second lens group.

Conditional expression (2) defines an appropriate range of the focal length of the second lens group and the further explanation is omitted as already described above.

In a preferable aspect of the zoom lens system according to the first embodiment of the present invention seen from another point of view, it is preferable that when the state of lens group positions varies from the wide-angle end state to the telephoto end state, the fifth lens group moves to the image from the wide-angle end state to a wide-angle side intermediate focal length state, moves to the object from the wide-angle side intermediate focal length state to a telephoto side intermediate focal length state, and moves to the image from the telephoto side intermediate focal length state to the telephoto end state.

By moving the fifth lens group with such moving trajectory, curvature of field can effectively be corrected all over the intermediate focal length range between the wide-angle end state and the telephoto end state, so that the purpose of the present invention of obtaining high optical performance can be accomplished.

In a preferable aspect of the zoom lens system according to the first embodiment of the present invention seen from another point of view, it is preferable that the following conditional expression (3) as described above is satisfied:

$$0.40 < f5/fT < 0.50 \quad (3)$$

where fT denotes the focal length of the zoom lens system in the telephoto end state, and f5 denotes the focal length of the fifth lens group.

Conditional expression (3) defines an appropriate range of the focal length of the fifth lens group and the further explanation is omitted as already described above.

In a preferable aspect of the zoom lens system according to the first embodiment of the present invention seen from another point of view, it is preferable that the fourth lens group is composed only of spherical lenses and includes a single lens having positive refractive power and the following conditional expression (6) described above is satisfied:

$$1.700 < nL4P \quad (6)$$

where nL4P denotes refractive index of the medium of the single lens at d-line (wave length λ=587.6 nm).

In the zoom lens system according to the first embodiment of the present invention, the fourth lens group has a large contribution to zooming as same as the third lens group and assumes an important role of aberration correction in the whole lens system. As described above, the fourth lens group is composed only of spherical lenses easy to secure manufacturing accuracy. Accordingly, deterioration in individual lens accuracy caused by manufacturing process can be suppressed, so that high optical performance can finally be secured and, as a result, the purpose of the present invention can be accomplished.

Conditional expression (6) defines an appropriate range of refractive index of the single lens having positive refractive power included in the fourth lens group and the further explanation is omitted as already described above.

In a preferable aspect of the zoom lens system according to the first embodiment of the present invention seen from another point of view, it is preferable that each of all elements of the zoom lens system is made of a spherical lens.

Each of the whole lens elements of the zoom lens system is made of a spherical lens which is easy to secure manufacturing accuracy. Accordingly, deterioration in individual lens accuracy caused by manufacturing process can be suppressed, so that high optical performance can finally be secured and, as a result, the purpose of the present invention can be accomplished.

In a preferable aspect of the zoom lens system according to the first embodiment of the present invention seen from another point of view, it is preferable that the fourth lens group includes an aspherical lens.

By arranging an aspherical lens in the fourth lens group, spherical aberration produced in the fourth lens group can effectively be corrected. Accordingly, the purpose of the present invention to obtain high optical performance can be accomplished.

In this case, it is needless to say that the spherical lens means non-aspherical lens and includes a plane. The following explanations are in the same way.

A zoom lens system according to each example of the first embodiment of the present invention is explained below with reference to accompanying drawings.

EXAMPLE 1

FIG. 1 shows cross-sectional views of a zoom lens system according to Example 1 of the first embodiment of the present invention upon focusing on infinity in which, in order from top to bottom, a wide-angle end state (W), a wide-angle side intermediate focal length state (M1), a telephoto side intermediate focal length state (M2), and a telephoto end state (T) are shown, respectively.

The zoom lens system according to Example 1 is composed of, in order from an object along an optical axis, a first lens group G1 having positive refractive power, a second lens group G2 having negative refractive power, a third lens group G3 having positive refractive power, a fourth lens group G4 having positive refractive power, and a fifth lens group G5 having positive refractive power.

In the zoom lens system according to Example 1, when the state of lens group positions varies from the wide-angle end state to the telephoto end state upon focusing on infinity, the first lens group G1 moves with respect to the image plane I, the second lens group moves at first to the image plane I and then moves to the object side, the third lens group G3 moves to the object side, the fourth lens group G4 moves to the object side, and the fifth lens group G5 moves with respect to the image plane I along the optical axis such that a variable distance between the first lens group G1 and the second lens group G2 increases, a variable distance between the second lens group G2 and the third lens group G3 decreases, a variable distance between the third lens group G3 and the fourth lens group G4 decreases, and a variable distance between the fourth lens group G4 and the fifth lens group G5 increases.

In detail, when the state of lens group positions varies from the wide-angle end state to the telephoto end state, the fifth lens group G5 moves to the image plane I from the wide-angle end state to the wide-angle side intermediate focal length state, moves to the object side from the wide-angle side intermediate focal length state to the telephoto side intermediate focal length state, and moves to the image plane I from the telephoto side intermediate focal length state to the telephoto end state.

The first lens group G1 according to Example 1 of the first embodiment is composed of, in order from the object along the optical axis, a cemented positive lens constructed by a negative meniscus lens having a convex surface facing to the object side cemented with a double convex positive lens having a larger curvature surface facing to the object side, and a positive meniscus lens having a convex surface facing to the object side.

The second lens group G2 is composed of, in order from the object along the optical axis, a double concave negative lens having a stronger refractive power surface facing to the image plane I, a double concave negative lens having a stronger refractive power surface facing to the object side, and a cemented positive lens constructed by a double convex positive lens cemented with a double concave negative lens having a smaller curvature surface facing to the image plane I.

The third lens group G3 is composed of, in order from the object along the optical axis, a front lens group G3a having positive refractive power, an aperture stop S, and a rear lens group G3b having positive refractive power. The front lens group G3a is composed of, in order from the object along the optical axis, a cemented positive lens constructed by a negative meniscus lens L31N having a convex surface facing to the object side cemented with a double convex positive lens L31P. The rear lens group G3b is composed of, in order from the object along the optical axis, a cemented positive lens constructed by a double convex positive lens L32P cemented with a double concave negative lens L32N.

In order to shift an image substantially perpendicularly to the optical axis, the front lens group G3a is movably arranged substantially perpendicularly to the optical axis.

The fourth lens group G4 is composed of, in order from the object along the optical axis, a double convex positive lens having an aspherical surface facing to the object side, and a cemented negative lens constructed by a double convex positive lens having a smaller curvature surface facing to the object side cemented with a double concave negative lens.

The fifth lens group G5 is composed of a positive meniscus lens having a convex surface facing to the object side.

Between the fifth lens group G5 and the image plane I, an optical low-pass filter LPF and a cover glass CG are arranged in order from the object along the optical axis.

Various values associated with Example 1 are listed in Table 1.

In [Specifications], f denotes the focal length (unit: mm), FNO denotes the f-number, 2ω denotes an angle of view (unit: degrees), and TL denotes the total lens length (unit: mm).

In [Lens Data], the first column shows the lens surface number counted in order from the object side, the second column "r" shows a radius of curvature of the lens surface, the third column "d" shows a distance between adjacent lens surfaces, the fourth column "nd" shows refractive index of the medium at d-line, and the fifth column "vd" shows Abbe number of the medium at d-line (λ=587.6 nm). In "radius of curvature", "∞" denotes a plane surface. Refractive index of the air 1.000000 is omitted. Bf denotes the back focal length.

In [Specifications] and [Variable distances], W denotes a wide-angle end state, M1 denotes a wide-angle side intermediate focal length state, M2 denotes a telephoto side intermediate focal length state, and T denotes a telephoto end state.

In [Aspherical Data], E-n denotes $\times 10^{-n}$. An aspherical surface is expressed by the following expression:

$$S(y)=(y^2/R)/\{1+(1-\kappa \cdot y^2/R^2)^{1/2}\}+C4 \cdot y^4+C6 \cdot y^6+C8 \cdot y^8+C10 \cdot y^{10}$$

where S(y) denotes the (sag amount) distance along the optical axis from the tangent surface at the vertex of the aspherical surface to the aspherical surface at the vertical height y from the optical axis, R denotes a paraxial radius of curvature (radius of curvature of a reference sphere), $\kappa$ denotes the conical coefficient, Ci denotes the i-th order aspherical coefficient. The aspherical expression is used in the following Examples, and also Examples in the other embodiments.

In each Examples, an asterisk "*" is attached to the right side of the surface number of an aspherical surface.

In the tables for various values, "mm" is generally used for the unit of length such as the focal length, the radius of curvature, and the distance between optical surfaces. However, since an optical system proportionally enlarged or reduced its dimension can be obtained similar optical performance, the unit is not necessary to be limited to "mm" and any other suitable unit can be used.

TABLE 1

[Specifications]

| | \multicolumn{4}{c}{Lens State} | | | |
|---|---|---|---|---|
| | W | M1 | M2 | T |
| f = | 9.17 | 14.00 | 40.00 | 86.40 |
| FNO = | 2.9 | 3.2 | 4.1 | 5.7 |
| 2ω = | 66.6 | 44.1 | 16.0 | 7.4 |

[Lens Data]

| | r | d | nd | νd |
|---|---|---|---|---|
| 1 | 104.9674 | 1.800 | 1.84666 | 23.78 |
| 2 | 57.7700 | 6.900 | 1.64000 | 60.09 |
| 3 | −449.0606 | 0.100 | | |
| 4 | 37.6081 | 5.500 | 1.49782 | 82.52 |
| 5 | 146.3156 | (D5) | | |
| 6 | −383.8145 | 1.200 | 1.83400 | 37.17 |
| 7 | 11.0333 | 4.950 | | |
| 8 | −27.7390 | 0.900 | 1.81600 | 46.63 |
| 9 | 59.3532 | 0.300 | | |
| 10 | 25.1431 | 3.750 | 1.84666 | 23.78 |
| 11 | −25.1270 | 0.900 | 1.71300 | 53.85 |
| 12 | 133.1648 | (D12) | | |
| 13 | 50.4203 | 1.600 | 1.62004 | 36.26 |
| 14 | 19.0995 | 3.000 | 1.49782 | 82.52 |
| 15 | −34.0289 | 0.800 | | |
| 16 | ∞ | 1.800 | \multicolumn{2}{c}{Aperture Stop S} | |
| 17 | 13.0090 | 3.600 | 1.65844 | 50.88 |
| 18 | −16.3853 | 2.000 | 1.79952 | 42.24 |
| 19 | 18.9993 | (D19) | | |
| 20* | 21.2799 | 3.100 | 1.76802 | 49.23 |
| 21 | −24.3268 | 0.100 | | |
| 22 | 31.6627 | 3.900 | 1.48749 | 70.24 |
| 23 | −16.2608 | 0.900 | 1.83400 | 37.17 |
| 24 | 13.1942 | (D24) | | |
| 25 | 17.1071 | 2.900 | 1.48749 | 70.24 |
| 26 | 104.4871 | (D26) | | |

TABLE 1-continued

| 27 | ∞ | 1.720 | 1.54437 | 70.51 (LPF) |
|---|---|---|---|---|
| 28 | ∞ | 1.441 | | |
| 29 | ∞ | 0.500 | 1.51680 | 64.20 (CG) |
| 30 | ∞ | (Bf) | | |

[Aspherical Data]
Surface Number 20

κ = 1.0000
C4 = −6.13040E−05
C6 = −1.43250E−07
C8 = +1.90490E−09
C10 = −3.14900E−11

[Variable Distances]

| | \multicolumn{4}{c}{Lens State} | | | |
|---|---|---|---|---|
| | W | M1 | M2 | T |
| f = | 9.17 | 14.00 | 40.00 | 86.40 |
| D5 = | 3.8000 | 10.5769 | 26.0958 | 31.7742 |
| D12 = | 28.0445 | 21.0041 | 8.6209 | 2.1979 |
| D19 = | 6.2596 | 4.4013 | 2.2032 | 1.6021 |
| D24 = | 5.9789 | 10.0029 | 16.8265 | 32.7317 |
| D26 = | 3.2010 | 3.1976 | 6.4023 | 4.6811 |

[Values for Conditional Expressions]

(1): (D5iT − D5iW)/fW = 0.15
(2): (−f2)/fT = 0.13
(3): f5/fT = 0.48
(4): f3a/f3b = 0.37
(5): (1 − β3aT)βRT = 1.08

As is apparent from Table 1, the zoom lens system according to Example 1 of the first embodiment is made compact.

FIGS. 2A, 3A, 4A, and 5A show various aberrations of the zoom lens system according to Example 1 of the first embodiment at d-line (λ=587.6 nm) upon focusing on infinity in the wide-angle end state, the wide-angle side intermediate focal length state, the telephoto side intermediate focal length state, and the telephoto end state, respectively.

FIGS. 2B, 3B, 4B, and 5B show coma of the zoom lens system according to Example 1 of the first embodiment at d-line (λ=587.6 nm) upon focusing on infinity when the front lens group G3a is shifted by 0.1 mm perpendicularly to the optical axis, in the wide-angle end state, the wide-angle side intermediate focal length state, the telephoto side intermediate focal length state, and the telephoto end state, respectively.

In respective graphs, FNO denotes the f-number, A denotes an incident angle of the light ray (a half angle of view, unit: degrees). In the graphs showing spherical aberration, f-number in accordance with the maximum aperture is shown. In graphs showing astigmatism and distortion, the maximum value of incident angle is shown. In graphs showing coma, coma in accordance with each incident angle is shown. In graphs showing astigmatism, a solid line indicates a sagittal image plane, and a broken line indicates a meridional image plane. In the following Examples, the same reference symbols as Example 1 are used, so that duplicated explanations are omitted.

As is apparent from FIGS. 2A, 3A, 4A, and 5A, the zoom lens system according to Example 1 of the first embodiment shows high optical performance preferably correcting aberrations over entire range from the wide-angle end state to the telephoto end state.

Moreover, as is apparent from FIGS. 2B, 3B, 4B, and 5B, the zoom lens system according to Example 1 of the first embodiment shows high optical performance preferably correcting coma over entire range from the wide-angle end state to the telephoto end state even if the front lens group G3a is shifted substantially perpendicularly to the optical axis.

EXAMPLE 2

Figure 6:
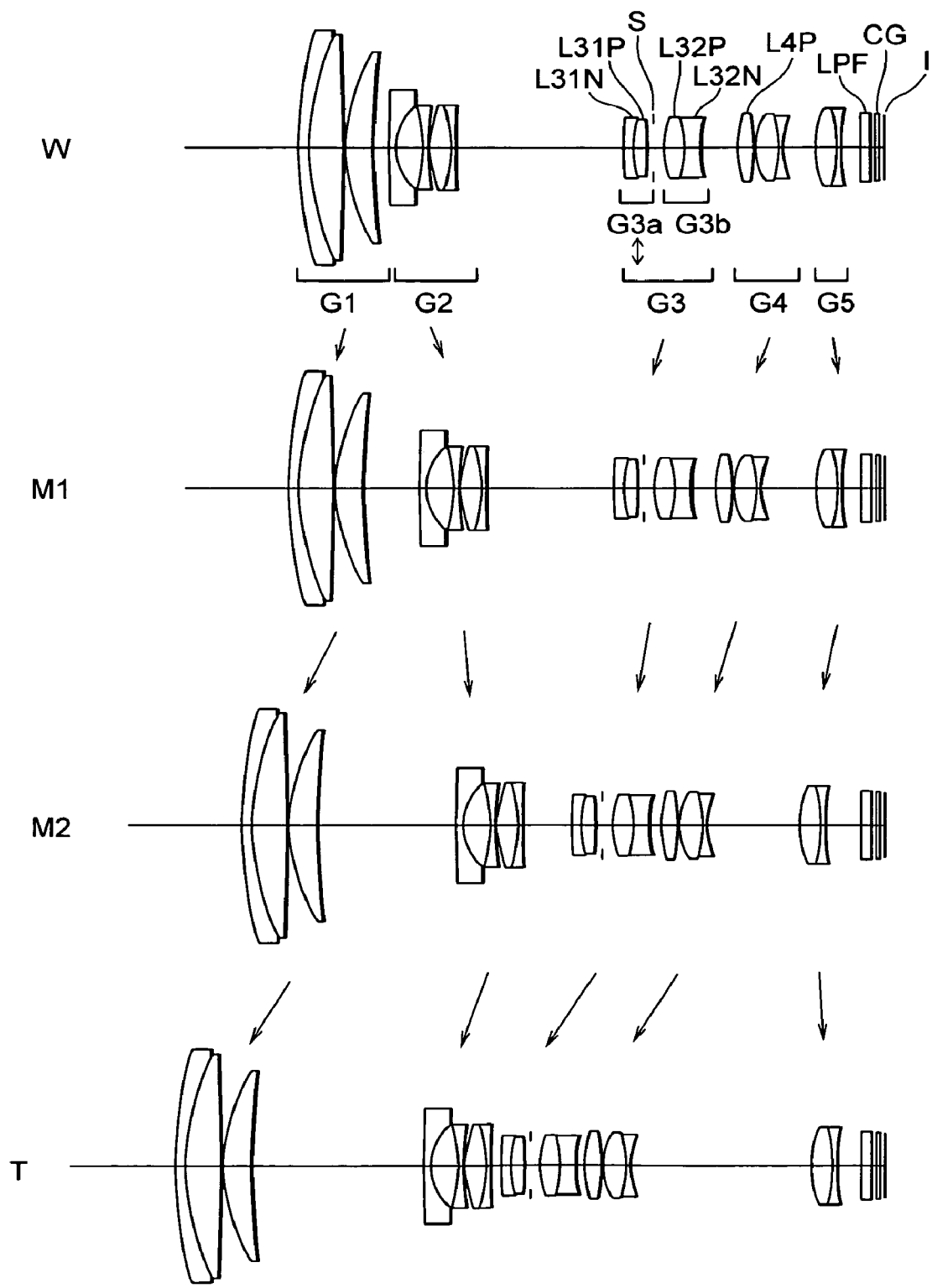
FIG. 6 shows cross-sectional views of a zoom lens system according to Example 2 of the first embodiment of the present invention upon focusing on infinity.
Figure 7A:
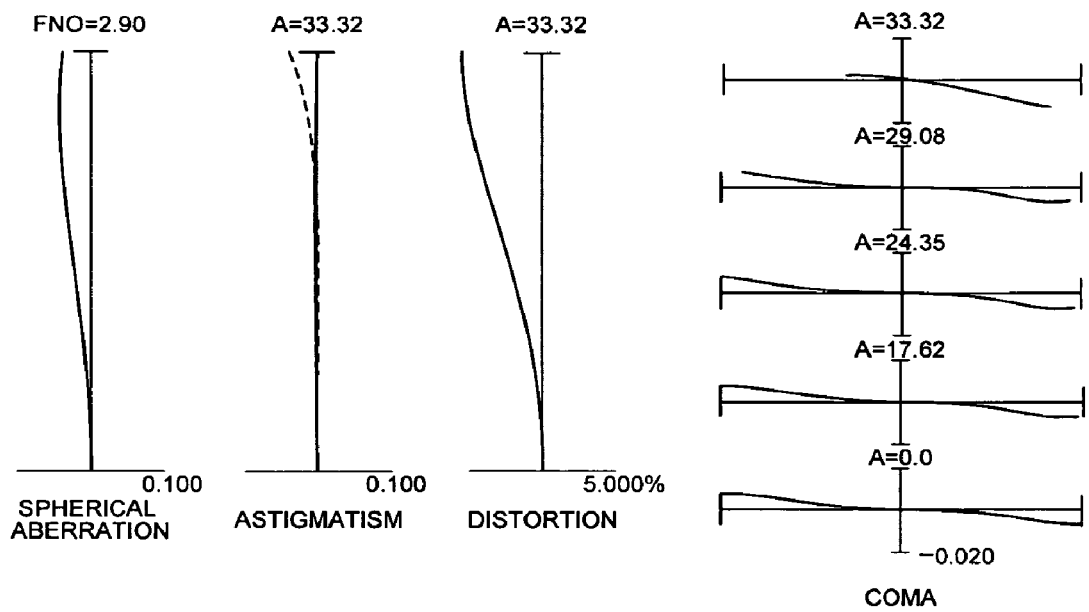
FIG. 7A shows various aberrations of the zoom lens system according to Example 2 of the first embodiment at d-line upon focusing on infinity in the wide-angle end state.
Figure 7B:
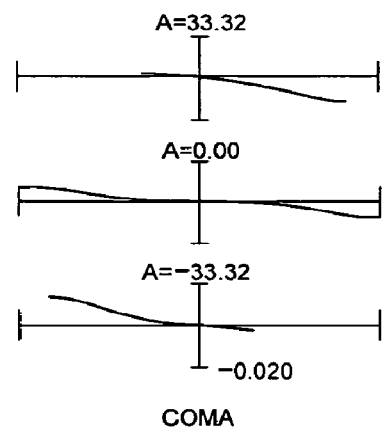
FIG. 7B shows coma of the zoom lens system according to Example 2 of the first embodiment at d-line upon focusing on infinity when the front lens group G3a is shifted by 0.1 mm perpendicularly to the optical axis in the wide-angle end state.
Figure 8A:
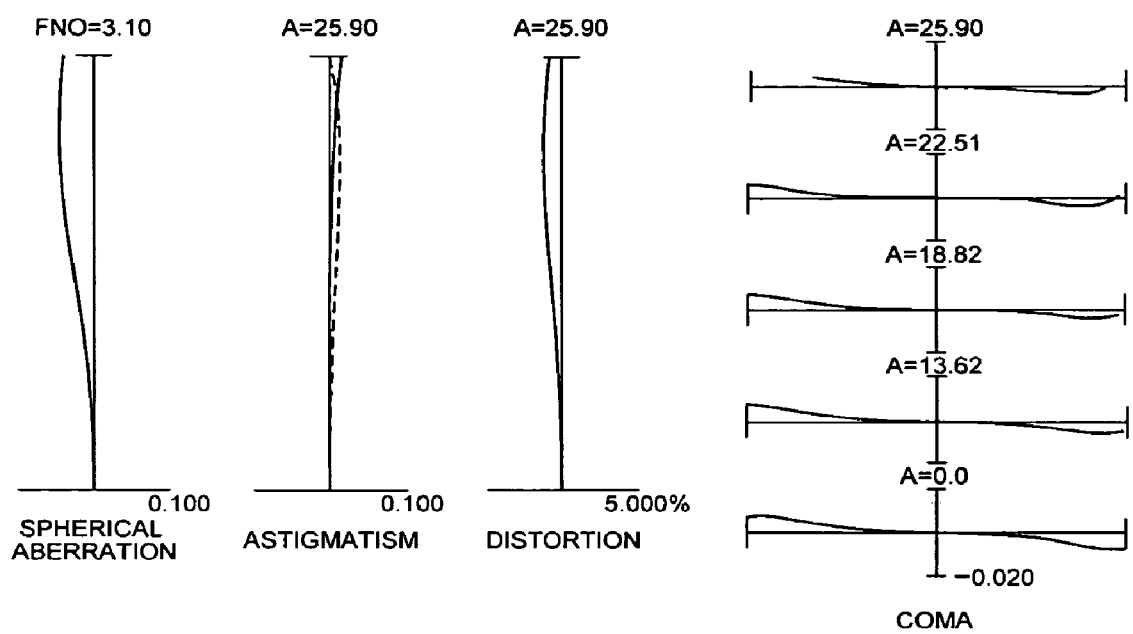
FIG. 8A shows various aberrations of the zoom lens system according to Example 2 of the first embodiment at d-line upon focusing on infinity in the wide-angle side intermediate focal length state.
Figure 8B:
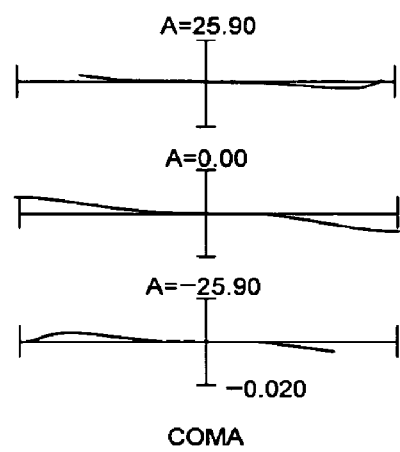
FIG. 8B shows coma of the zoom lens system according to Example 2 of the first embodiment at d-line upon focusing on infinity when the front lens group G3a is shifted by 0.1 mm perpendicularly to the optical axis in the wide-angle side intermediate focal length state.
Figure 9A:
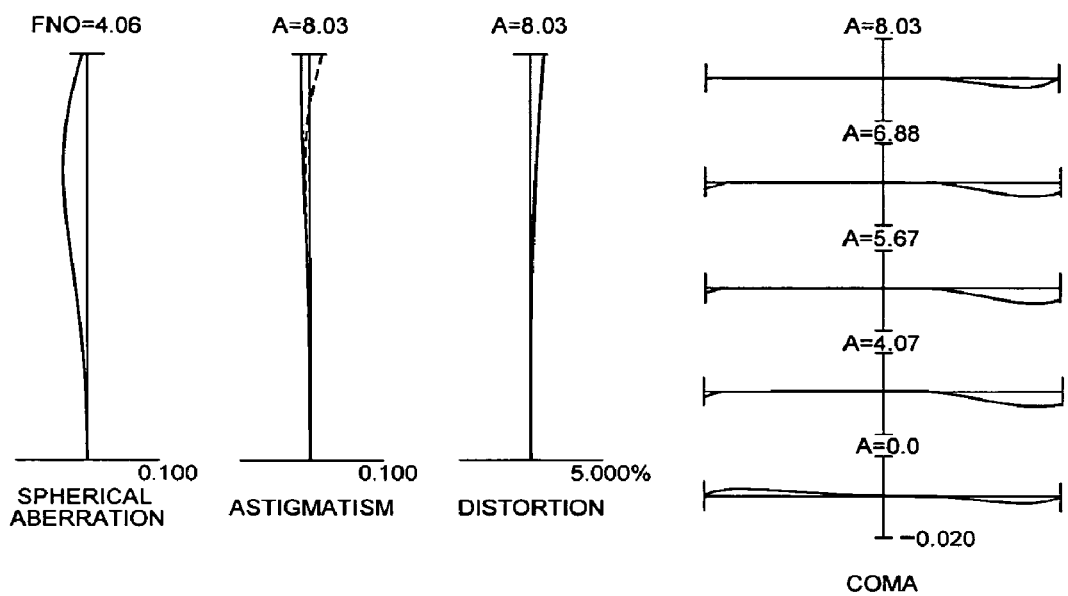
FIG. 9A shows various aberrations of the zoom lens system according to Example 2 of the first embodiment at d-line upon focusing on infinity in the telephoto side intermediate focal length state.
Figure 9B:
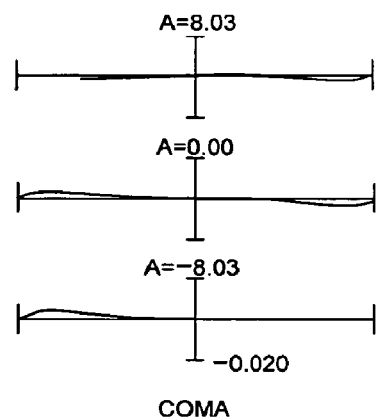
FIG. 9B shows coma of the zoom lens system according to Example 2 of the first embodiment at d-line upon focusing on infinity when the front lens group G3a is shifted by 0.1 mm perpendicularly to the optical axis in the telephoto side intermediate focal length state.
Figure 10A:
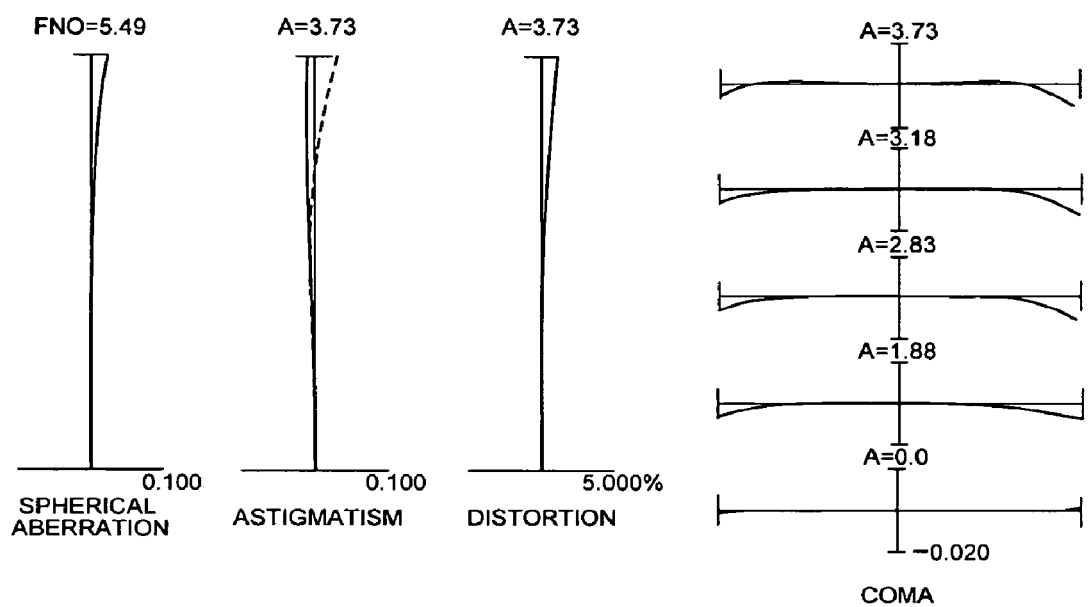
FIG. 10A shows various aberrations of the zoom lens system according to Example 2 of the first embodiment at d-line upon focusing on infinity in the telephoto end state.
Figure 10B:
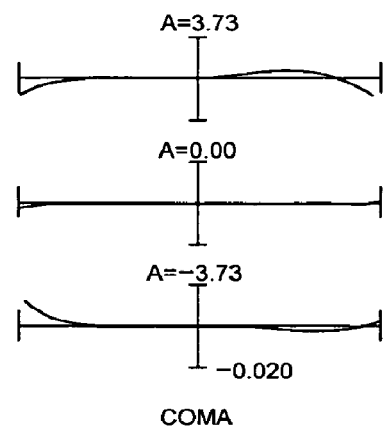
FIG. 10B shows coma of the zoom lens system according to Example 2 of the first embodiment at d-line upon focusing on infinity when the front lens group G3a is shifted by 0.1 mm perpendicularly to the optical axis in the telephoto end state.

FIG. 6 shows cross-sectional views of a zoom lens system according to Example 2 of the first embodiment of the present invention upon focusing on infinity in which, in order from top to bottom, a wide-angle end state (W), a wide-angle side intermediate focal length state (M1), a telephoto side intermediate focal length state (M2), and a telephoto end state (T) are shown, respectively.

The zoom lens system according to Example 2 is composed of, in order from an object along an optical axis, a first lens group G1 having positive refractive power, a second lens group G2 having negative refractive power, a third lens group G3 having positive refractive power, a fourth lens group G4 having positive refractive power, and a fifth lens group G5 having positive refractive power.

In the zoom lens system according to Example 2, when the state of lens group positions varies from the wide-angle end state to the telephoto end state upon focusing on infinity, the first lens group G1 moves with respect to the image plane I, the second lens group moves at first to the image plane I and then moves to the object side, the third lens group G3 moves to the object side, the fourth lens group G4 moves to the object side, and the fifth lens group G5 moves with respect to the image plane I along the optical axis such that a variable distance between the first lens group G1 and the second lens group G2 increases, a variable distance between the second lens group G2 and the third lens group G3 decreases, a variable distance between the third lens group G3 and the fourth lens group G4 decreases, and a variable distance between the fourth lens group G4 and the fifth lens group G5 increases.

In detail, when the state of lens group positions varies from the wide-angle end state to the telephoto end state, the fifth lens group G5 moves to the image plane I from the wide-angle end state to the wide-angle side intermediate focal length state, moves to the object side from the wide-angle side intermediate focal length state to the telephoto side intermediate focal length state, and moves to the image plane I from the telephoto side intermediate focal length state to the telephoto end state.

The first lens group G1 according to Example 2 of the first embodiment is composed of, in order from the object along the optical axis, a cemented positive lens constructed by a negative meniscus lens having a convex surface facing to the object side cemented with a double convex positive lens having a larger curvature surface facing to the object side, and a positive meniscus lens having a convex surface facing to the object side.

The second lens group G2 is composed of, in order from the object along the optical axis, a negative meniscus lens having a convex surface facing to the object side, a double concave negative lens having a stronger refractive power surface facing to the object side, and a cemented positive lens constructed by a double convex positive lens cemented with a double concave negative lens having a smaller curvature surface facing to the image plane I.

The third lens group G3 is composed of, in order from the object along the optical axis, a front lens group G3a having positive refractive power, an aperture stop S, and a rear lens group G3b having positive refractive power. The front lens group G3a is composed of, in order from the object along the optical axis, a cemented positive lens constructed by a negative meniscus lens L31N having a convex surface facing to the object side cemented with a double convex positive lens L31P. The rear lens group G3b is composed of, in order from the object along the optical axis, a cemented positive lens constructed by a double convex positive lens L32P cemented with a double concave negative lens L32N.

In order to shift an image substantially perpendicularly to the optical axis, the front lens group G3a is movably arranged substantially perpendicularly to the optical axis.

The fourth lens group G4 is composed of, in order from the object along the optical axis, a double convex positive lens L4P having a weaker refractive power surface facing to the object side, and a cemented negative lens constructed by a double convex positive lens having a larger curvature surface facing to the object side cemented with a double concave negative lens having a larger curvature surface facing to the image plane I and each of all lenses is made of a spherical lens.

The fifth lens group G5 is composed of, in order from the object along the optical axis, a cemented positive lens constructed by a double convex positive lens having a larger curvature surface facing to the object side cemented with a double concave negative lens.

Between the fifth lens group G5 and the image plane I, an optical low-pass filter LPF and a cover glass CG are arranged in order from the object along the optical axis.

Various values associated with Example 2 are listed in Table 2.

TABLE 2

[Specifications]

| | Lens State | | | |
|---|---|---|---|---|
| | W | M1 | M2 | T |
| f = | 9.17 | 11.85 | 40.00 | 86.40 |
| FNO = | 2.9 | 3.1 | 4.1 | 5.5 |
| 2ω = | 66.6 | 51.8 | 16.1 | 7.5 |

[Lens Data]

| | r | d | nd | vd |
|---|---|---|---|---|
| 1 | 82.5209 | 1.800 | 1.84666 | 23.78 |
| 2 | 49.8330 | 6.550 | 1.62041 | 60.29 |
| 3 | −2162.3403 | 0.100 | | |
| 4 | 37.3675 | 5.200 | 1.49782 | 82.56 |
| 5 | 148.7011 | (D5) | | |
| 6 | 345.7589 | 1.200 | 1.83400 | 37.16 |
| 7 | 10.6448 | 5.150 | | |
| 8 | −29.4991 | 0.900 | 1.77250 | 49.60 |
| 9 | 39.4838 | 0.400 | | |
| 10 | 23.0042 | 3.700 | 1.84666 | 23.78 |
| 11 | −34.2530 | 0.900 | 1.65844 | 50.88 |
| 12 | 180.0276 | (D12) | | |
| 13 | 35.6811 | 1.700 | 1.74950 | 35.28 |
| 14 | 18.4110 | 2.900 | 1.49782 | 82.56 |
| 15 | −36.7771 | 0.950 | | |
| 16 | ∞ | 1.650 | Aperture Stop S | |
| 17 | 14.5358 | 4.000 | 1.67003 | 47.23 |
| 18 | −17.5011 | 3.000 | 1.79952 | 42.22 |
| 19 | 17.5011 | (D19) | | |
| 20 | 38.2155 | 3.000 | 1.80400 | 46.57 |
| 21 | −29.6242 | 0.100 | | |
| 22 | 13.6535 | 4.100 | 1.48749 | 70.23 |
| 23 | −19.2970 | 0.900 | 1.83400 | 37.16 |
| 24 | 13.2469 | (D24) | | |
| 25 | 20.9062 | 3.800 | 1.80400 | 46.57 |

TABLE 2-continued

| 26 | −44.9980 | 0.900 | 1.68893 | 31.07 |
| 27 | 44.9980 | (D27) | | |
| 28 | ∞ | 1.720 | 1.54437 | 70.51 (LPF) |
| 29 | ∞ | 0.956 | | |
| 30 | ∞ | 0.500 | 1.51680 | 64.20 (CG) |
| 31 | ∞ | (Bf) | | |

[Variable Distances]

Lens State

| | W | M1 | M2 | T |
|---|---|---|---|---|
| f = | 9.17 | 11.85 | 40.00 | 86.40 |
| D5 = | 2.8000 | 7.3481 | 25.4371 | 31.2435 |
| D12 = | 30.8768 | 26.2826 | 9.4395 | 2.1507 |
| D19 = | 6.5581 | 5.3364 | 1.9683 | 1.6177 |
| D24 = | 5.9883 | 8.4626 | 16.9019 | 32.8851 |
| D27 = | 3.6766 | 3.6141 | 6.8119 | 5.0128 |

[Values for Conditional Expressions]

(1): (D5iT − D5iW)/fW = 0.14
(2): (−f2)/fT = 0.14
(3): f5/fT = 0.43
(4): f3a/f3b = 0.09
(5): (1 − β3aT)βRT = 1.05
(6): nL4P = 1.80400

As is apparent from Table 2, the zoom lens system according to Example 2 of the first embodiment is made compact.

FIGS. 7A, 8A, 9A, and 10A show various aberrations of the zoom lens system according to Example 2 of the first embodiment at d-line (λ=587.6 nm) upon focusing on infinity in the wide-angle end state, the wide-angle side intermediate focal length state, the telephoto side intermediate focal length state, and the telephoto end state, respectively.

FIGS. 7B, 8B, 9B, and 10B show coma of the zoom lens system according to Example 2 of the first embodiment at d-line (λ=587.6 nm) upon focusing on infinity when the front lens group G3a is shifted by 0.1 mm perpendicularly to the optical axis, in the wide-angle end state, the wide-angle side intermediate focal length state, the telephoto side intermediate focal length state, and the telephoto end state, respectively.

As is apparent from FIGS. 7A, 8A, 9A, and 10A, the zoom lens system according to Example 2 of the first embodiment shows high optical performance preferably correcting aberrations over entire range from the wide-angle end state to the telephoto end state.

Moreover, as is apparent from FIGS. 7B, 8B, 9B, and 10B, the zoom lens system according to Example 2 of the first embodiment shows high optical performance preferably correcting coma over entire range from the wide-angle end state to the telephoto end state even if the front lens group G3a is shifted substantially perpendicularly to the optical axis.

EXAMPLE 3

Figure 11:
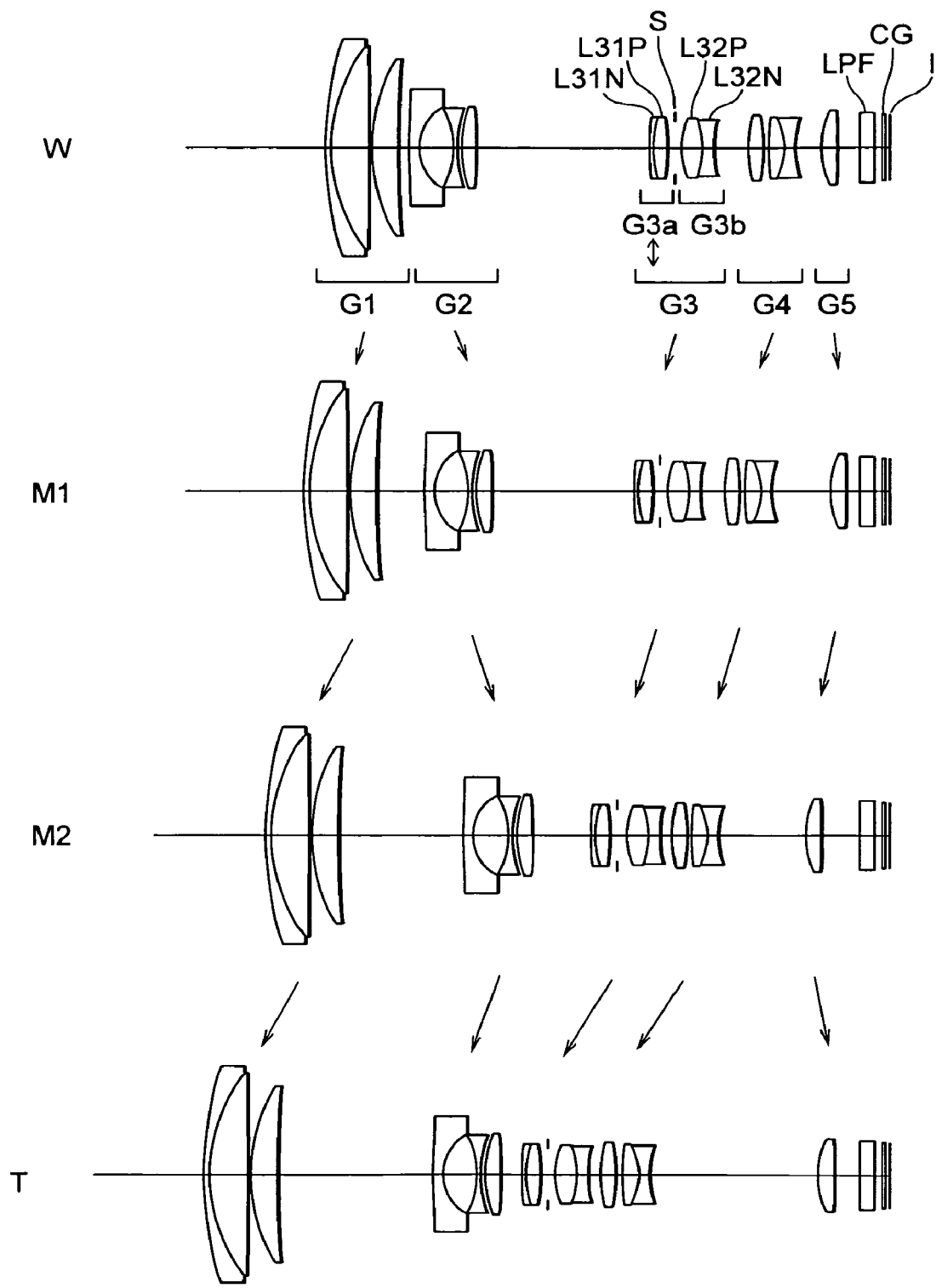
FIG. 11 shows cross-sectional views of a zoom lens system according to Example 3 of the first embodiment of the present invention upon focusing on infinity.
Figure 12A:
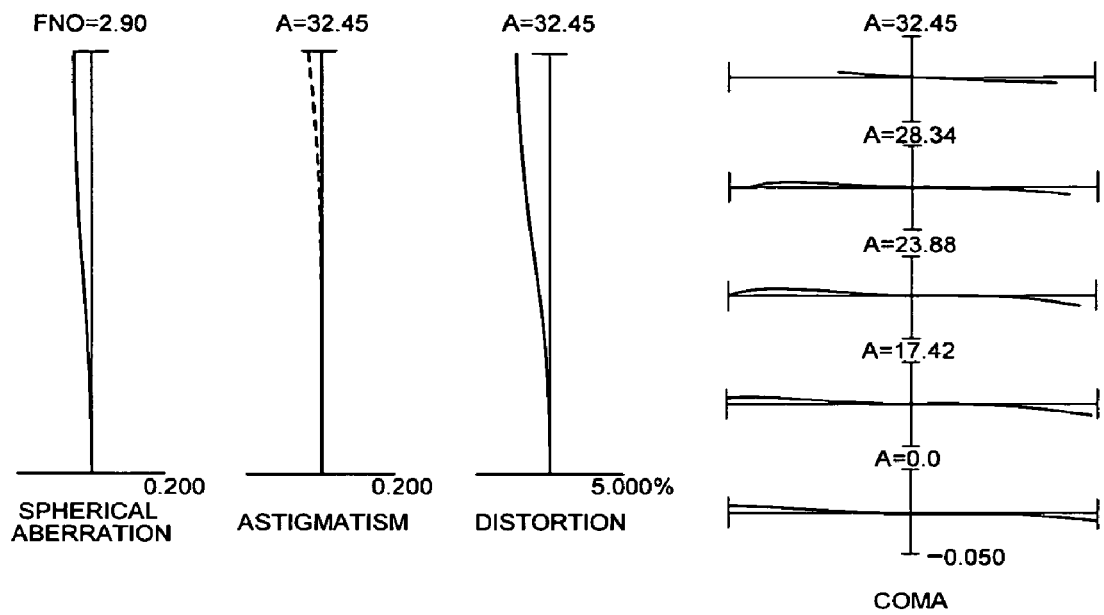
FIG. 12A shows various aberrations of the zoom lens system according to Example 3 of the first embodiment at d-line upon focusing on infinity in the wide-angle end state.
Figure 12B:
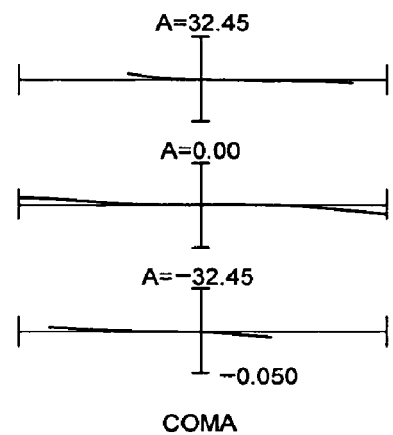
FIG. 12B shows coma of the zoom lens system according to Example 3 of the first embodiment at d-line upon focusing on infinity when the front lens group G3a is shifted by 0.1 mm perpendicularly to the optical axis in the wide-angle end state.
Figure 13A:
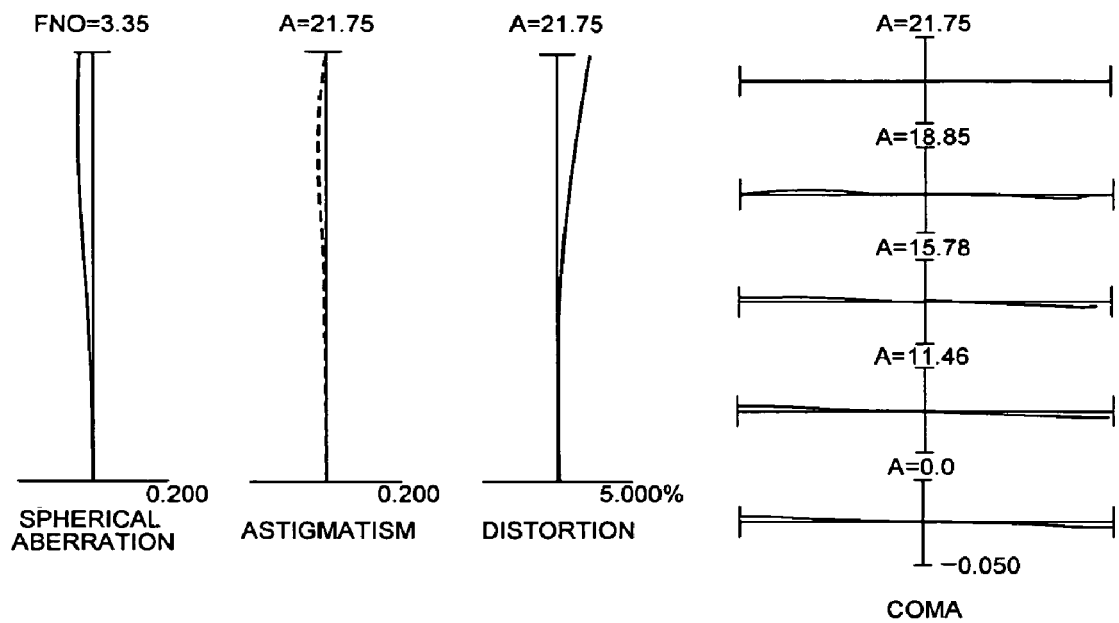
FIG. 13A shows various aberrations of the zoom lens system according to Example 3 of the first embodiment at d-line upon focusing on infinity in the wide-angle side intermediate focal length state.
Figure 13B:
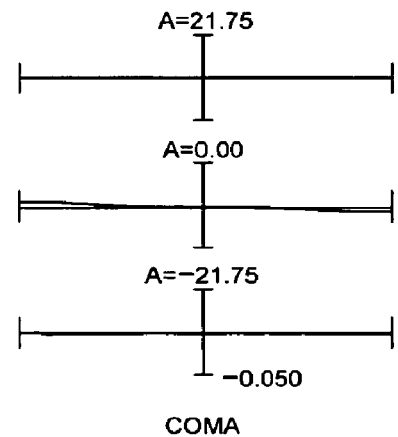
FIG. 13B shows coma of the zoom lens system according to Example 3 of the first embodiment at d-line upon focusing on infinity when the front lens group G3a is shifted by 0.1 mm perpendicularly to the optical axis in the wide-angle side intermediate focal length state.
Figure 14A:
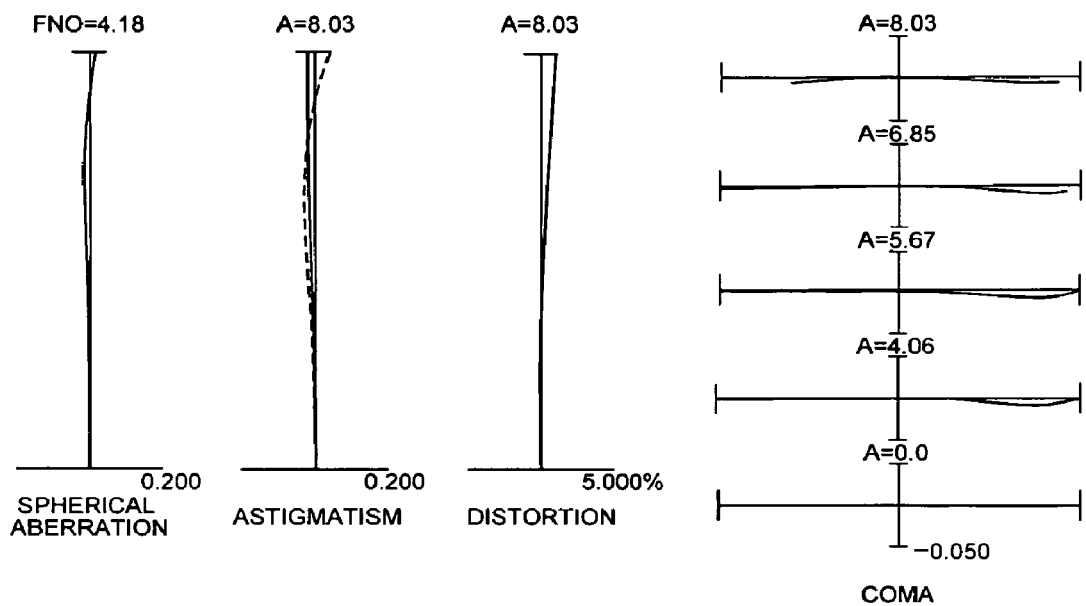
FIG. 14A shows various aberrations of the zoom lens system according to Example 3 of the first embodiment at d-line upon focusing on infinity in the telephoto side intermediate focal length state.
Figure 14B:
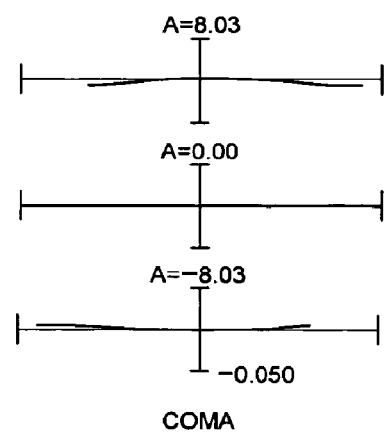
FIG. 14B shows coma of the zoom lens system according to Example 3 of the first embodiment at d-line upon focusing on infinity when the front lens group G3a is shifted by 0.1 mm perpendicularly to the optical axis in the telephoto side intermediate focal length state.
Figure 15A:
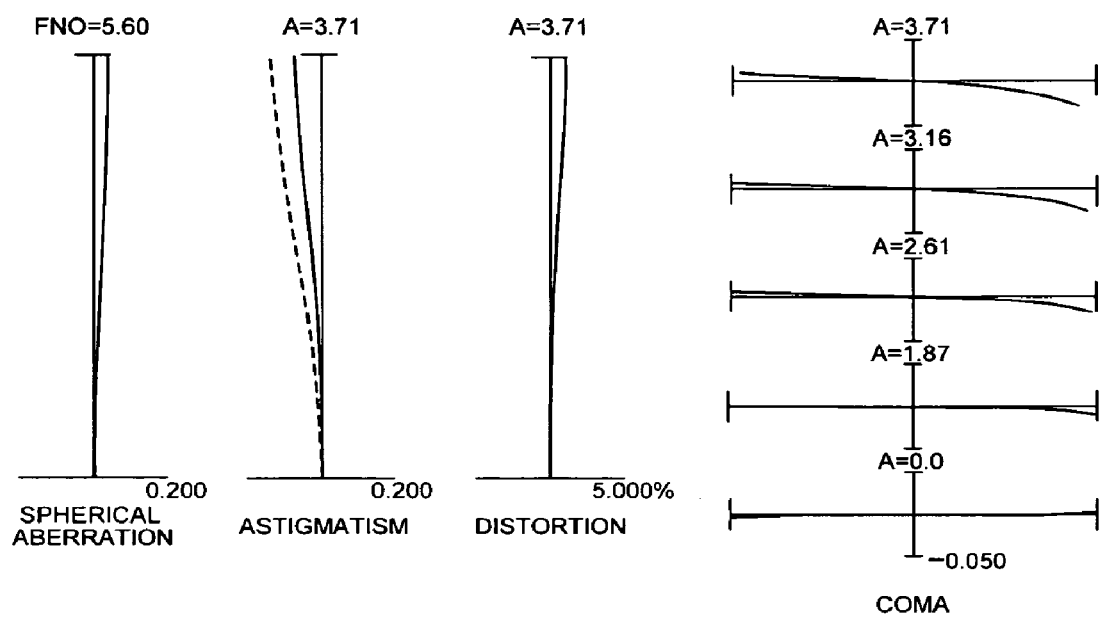
FIG. 15A shows various aberrations of the zoom lens system according to Example 3 of the first embodiment at d-line upon focusing on infinity in the telephoto end state.
Figure 15B:
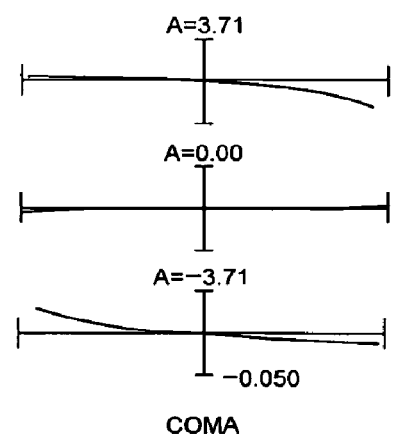
FIG. 15B shows coma of the zoom lens system according to Example 3 of the first embodiment at d-line upon focusing on infinity when the front lens group G3a is shifted by 0.1 mm perpendicularly to the optical axis in the telephoto end state.

FIG. 11 shows cross-sectional views of a zoom lens system according to Example 3 of the first embodiment of the present invention upon focusing on infinity in which, in order from top to bottom, a wide-angle end state (W), a wide-angle side intermediate focal length state (M1), a telephoto side intermediate focal length state (M2), and a telephoto end state (T) are shown, respectively.

The zoom lens system according to Example 3 is composed of, in order from an object along an optical axis, a first lens group G1 having positive refractive power, a second lens group G2 having negative refractive power, a third lens group G3 having positive refractive power, a fourth lens group G4 having positive refractive power, and a fifth lens group G5 having positive refractive power.

In the zoom lens system according to Example 3, when the state of lens group positions varies from the wide-angle end state to the telephoto end state upon focusing on infinity, the first lens group G1 moves with respect to the image plane I, the second lens group moves at first to the image plane I and then moves to the object side, the third lens group G3 moves to the object side, the fourth lens group G4 moves to the object side, and the fifth lens group G5 moves with respect to the image plane I along the optical axis such that a variable distance between the first lens group G1 and the second lens group G2 increases, a variable distance between the second lens group G2 and the third lens group G3 decreases, a variable distance between the third lens group G3 and the fourth lens group G4 decreases, and a variable distance between the fourth lens group G4 and the fifth lens group G5 increases.

In detail, when the state of lens group positions varies from the wide-angle end state to the telephoto end state, the fifth lens group G5 moves to the image plane I from the wide-angle end state to the wide-angle side intermediate focal length state, moves to the object side from the wide-angle side intermediate focal length state to the telephoto side intermediate focal length state, and moves to the image plane I from the telephoto side intermediate focal length state to the telephoto end state.

The first lens group G1 according to Example 3 of the first embodiment is composed of, in order from the object along the optical axis, a cemented positive lens constructed by a negative meniscus lens having a convex surface facing to the object side cemented with a double convex positive lens having a larger curvature surface facing to the object side, and a positive meniscus lens having a convex surface facing to the object side.

The second lens group G2 is composed of, in order from the object along the optical axis, a negative meniscus lens having a convex surface facing to the object side and an aspherical surface facing to the image plane I, a double concave negative lens having a stronger refractive power surface facing to the object side, and a double convex positive lens having a stronger refractive power surface facing to the object side.

The third lens group G3 is composed of, in order from the object along the optical axis, a front lens group G3a having positive refractive power, an aperture stop S, and a rear lens group G3b having negative refractive power. The front lens group G3a is composed of, in order from the object along the optical axis, a cemented negative lens constructed by a negative meniscus lens L31N having a convex surface facing to the object side cemented with a double convex positive lens L31P having a smaller curvature surface facing to the image side. The rear lens G3b is composed of, in order from the object along the optical axis, a cemented negative lens constructed by a double convex positive lens L32P having a larger curvature surface facing to the object side cemented with a double concave negative lens L32N.

In order to shift an image substantially perpendicularly to the optical axis, the front lens group G3a is movably arranged substantially perpendicularly to the optical axis.

The fourth lens group G4 is composed of, in order from the object along the optical axis, a double convex positive lens having an aspherical surface facing to the object side, and a cemented negative lens constructed by a double convex positive lens having a smaller curvature surface facing to the object side cemented with a double concave negative lens having a smaller curvature surface facing to the image side.

The fifth lens group G5 is composed of a double convex positive lens having a stronger refractive power surface facing to the object side.

Between the fifth lens group G5 and the image plane I, an optical low-pass filter LPF and a cover glass CG are arranged in order from the object along the optical axis.

Various values associated with Example 3 are listed in Table 3.

TABLE 3

[Specifications]

| | Lens State | | | |
|---|---|---|---|---|
| | W | M1 | M2 | T |
| f = | 9.17 | 14.00 | 40.00 | 86.94 |
| FNO = | 2.9 | 3.3 | 4.2 | 5.6 |
| 2ω = | 64.9 | 43.5 | 16.1 | 7.4 |

[Lens Data]

| | r | d | nd | vd |
|---|---|---|---|---|
| 1 | 71.2698 | 1.200 | 1.85026 | 32.35 |
| 2 | 35.1339 | 6.900 | 1.49782 | 82.52 |
| 3 | −1401.4800 | 0.100 | | |
| 4 | 32.8607 | 5.200 | 1.62041 | 60.29 |
| 5 | 161.2228 | (D5) | | |
| 6 | 93.9250 | 1.950 | 1.74330 | 49.23 |
| 7* | 8.9940 | 6.200 | | |
| 8 | −18.1325 | 0.900 | 1.58913 | 61.18 |
| 9 | 27.1703 | 0.700 | | |
| 10 | 23.7608 | 2.750 | 1.84666 | 23.78 |
| 11 | −162.3377 | (D11) | | |
| 12 | 31.1726 | 0.900 | 1.85026 | 32.35 |
| 13 | 17.8107 | 2.750 | 1.49782 | 82.52 |
| 14 | −32.0272 | 1.200 | | |
| 15 | ∞ | 1.200 | Aperture Stop S | |
| 16 | 12.5579 | 4.100 | 1.60562 | 43.73 |
| 17 | −15.9905 | 2.200 | 1.76200 | 40.11 |
| 18 | 15.8803 | (D18) | | |
| 19* | 23.6848 | 3.000 | 1.79668 | 45.37 |
| 20 | −21.5414 | 0.700 | | |
| 21 | 49.7067 | 3.100 | 1.49782 | 82.52 |
| 22 | −11.1874 | 2.100 | 1.83400 | 37.17 |
| 23 | 17.7867 | (D23) | | |
| 24 | 21.1435 | 3.000 | 1.48749 | 70.24 |
| 25 | −288.8441 | (D25) | | |
| 26 | ∞ | 2.760 | 1.51680 | 64.20 (LPF) |
| 27 | ∞ | 1.441 | | |
| 28 | ∞ | 0.500 | 1.51680 | 64.20 (CG) |
| 29 | ∞ | (Bf) | | |

[Aspherical Data]

Surface Number 7

κ = 0.9000
C4 = −1.76750E−05
C6 = −1.30430E−07
C8 = −2.02420E−09
C10 = +1.06150E−11

Surface Number 19

κ = 1.0000
C4 = −3.16770E−05
C6 = +5.29120E−08
C8 = −4.59950E−10
C10 = +6.02460E−12

TABLE 3-continued

[Variable Distances]

| | Lens State | | | |
|---|---|---|---|---|
| | W | M1 | M2 | T |
| F = | 9.17 | 14.00 | 40.00 | 86.94 |
| D5 = | 1.8000 | 8.5666 | 22.6824 | 28.3033 |
| D11 = | 30.2796 | 24.8673 | 10.3997 | 3.2000 |
| D18 = | 6.0750 | 4.3760 | 1.9073 | 1.8900 |
| D23 = | 4.5813 | 10.6699 | 15.9370 | 30.8487 |
| D25 = | 3.9359 | 2.0000 | 6.5627 | 4.3992 |

[Values for Conditional Expressions]

(1): (D5iT − D5iW)/fW = 0.05
(2): (−f2)/fT = 0.13
(3): f5/fT = 0.47
(4): f3a/f3b = −0.002
(5): (1 − β3aT)βRT = 1.25

As is apparent from Table 3, the zoom lens system according to Example 3 of the first embodiment is made compact.

FIGS. 12A, 13A, 14A, and 15A show various aberrations of the zoom lens system according to Example 3 of the first embodiment at d-line (λ=587.6 nm) upon focusing on infinity in the wide-angle end state, the wide-angle side intermediate focal length state, the telephoto side intermediate focal length state, and the telephoto end state, respectively.

FIGS. 12B, 13B, 14B, and 15B show coma of the zoom lens system according to Example 3 of the first embodiment at d-line (λ=587.6 nm) upon focusing on infinity when the front lens group G3a is shifted by 0.1 mm perpendicularly to the optical axis, in the wide-angle end state, the wide-angle side intermediate focal length state, the telephoto side intermediate focal length state, and the telephoto end state, respectively.

As is apparent from FIGS. 12A, 13A, 14A, and 15A, the zoom lens system according to Example 3 of the first embodiment shows high optical performance preferably correcting aberrations over entire range from the wide-angle end state to the telephoto end state.

Moreover, as is apparent from FIGS. 12B, 13B, 14B, and 15B, the zoom lens system according to Example 3 of the first embodiment shows high optical performance preferably correcting coma over entire range from the wide-angle end state to the telephoto end state even if the front lens group G3a is shifted substantially perpendicularly to the optical axis.

As described above, the first embodiment of the present invention makes it possible to provide a compact zoom lens system having a zoom ratio of about five or more with high optical performance suitable for a video camera and an electronic still camera using a solid-state imaging device and the like.

Moreover, the first embodiment of the present invention makes it possible to provide a compact zoom lens system securing high optical performance even if a portion of the optical system is shifted substantially perpendicularly to the optical axis in addition to having a zoom ratio of about five or more with high optical performance suitable for a video camera and an electronic still camera using a solid-state imaging device and the like.

Incidentally, it is needless to say that although zoom lens systems with a five-lens-group configuration are shown as Examples of the first embodiment of the present invention, a zoom lens system with a six-lens-group configuration or more-lens-group configuration is included in the spirit of the first embodiment of the present invention. Moreover, in the configuration of each lens group, a lens group simply adding additional lenses to the lens group configuration shown in Examples is included in the spirit or scope of the first embodiment of the present invention.

Second Embodiment

A zoom lens system according to a second embodiment of the present invention is explained below.

In a zoom lens system for a video camera and a electronic still camera using a solid-state imaging device as an imaging device, a position of an exit pupil of the zoom lens system is necessary to be located far away from an image plane due to the characteristics of the solid-state imaging device. Accordingly, it is preferable that a lens group locating near to the image plane has positive refractive power as a whole.

A zoom lens system according to the second embodiment of the present invention is composed of, in order from an object along the optical axis, a first lens group having positive refractive power, a second lens group having negative refractive power, a third lens group having positive refractive power, a fourth lens group having positive refractive power, and a fifth lens group having positive refractive power. With this construction, the zoom lens system makes it possible to locate the exit pupil far away from the image plane.

In the zoom lens system according to the second embodiment of the present invention, when a state of lens group positions varies from a wide-angle end state to a telephoto end state upon focusing on infinity, the first lens group moves with respect to an image plane, the second lens group moves at first to the image and then to the object, the third lens group moves to the object, and the fourth lens group moves to the object along the optical axis such that, a distance between the first lens group and the second lens group increases, a distance between the second lens group and the third lens group decreases, a distance between the third lens group and the fourth lens group varies, and a distance between the fourth lens group and the fifth lens group increases. In this construction, it is possible to obtain zooming effect efficiently and high optical performance and compactness with securing a high zoom ratio of four or more.

In the zoom lens system according to the second embodiment of the present invention, the third lens group is composed of, in order from the object along the optical axis, a front lens group having positive refractive power, an aperture stop, and a rear lens group. By shifting the front lens group substantially perpendicularly to the optical axis, an image blur on the image plane can be corrected. Moreover, preferable aberration correction can be carried out and high optical performance can be obtained upon shifting the front lens group substantially perpendicularly to the optical axis.

By satisfying the following conditional expression (7), the second embodiment of the present invention makes it possible to provide a compact zoom lens system having an angle of view in the wide-angle end state of 70 degrees or more and a zoom ratio of four or more with securing further high optical performance:

$$7.0 < f1/fW < 12.8 \quad (7)$$

where fW denotes the focal length of the zoom lens system in the wide-angle end state and f1 denotes the focal length of the first lens group.

Conditional expression (7) defines an appropriate range of the focal length of the first lens group.

When the ratio f1/fW is equal to or exceeds the upper limit of conditional expression (7), the focal length of the first lens group becomes relatively long, so that the first lens group cannot effectively contribute to zooming and, as a result, a high zoom ratio of about four or more cannot be secured. Moreover, since the moving amount of the first lens group becomes large, variation in aberration produced in the first lens group upon zooming becomes large, so that it becomes difficult to suppress aberrations over the whole range from the wide-angle end state to the telephoto end state. Furthermore, since the moving amount of the first lens group is large, the zoom lens system cannot be made compact.

On the other hand, when the ratio f1/fW is equal to or falls below the lower limit of conditional expression (7), since the focal length of the first lens group becomes relatively short, the angle of off-axis ray incident to the first lens group in the wide-angle end state relative to the optical axis becomes small, so that if the angle of view of 70 degrees or more in the wide-angle end state is to be realized, the diameter of the first lens group becomes excessively large and, as a result, the zoom lens system cannot be made compact. Moreover, aberrations produced in the first lens group becomes too large, so that high optical performance cannot be obtained.

In order to ensure the effect of the second embodiment of the present invention, it is preferable to set the upper limit of conditional expression (7) to 12.0 and the lower limit to 7.5.

In the zoom lens system according to the second embodiment of the present invention, it is preferable that the distance along the optical axis between the third lens group and the fourth lens group upon focusing on infinity in the telephoto end state is at least smaller than that in the wide-angle end state.

By moving the third lens group and the fourth lens group in this manner, the position of the combined principal point of the third lens group and the fourth lens group can be moved largely between the wide-angle end state and the telephoto end state, so that zoom effect can be obtained efficiently.

In the zoom lens system according to the second embodiment of the present invention, it is preferable that when zooming from the wide-angle end state to the telephoto end state upon focusing on infinity, the distance along the optical axis between the third lens group and the fourth lens group decreases.

By moving the third lens group and the fourth lens group in this manner, the position of the combined principal point of the third lens group and the fourth lens group can be moved largely, so that zoom effect can be obtained efficiently.

In the zoom lens system according to the second embodiment of the present invention, when the state of lens group positions varies from the wide-angle end state to the telephoto end state upon focusing on infinity, the fifth lens group preferably moves along the optical axis with respect to the image plane.

By moving the fifth lens group in this manner, zooming effect can be obtained efficiently, and when the state of lens group positions varies from the wide-angle end state to the telephoto end state, the position of the off-axis ray passing through the fifth lens group can be optimized, so that off-axis aberrations can be corrected over entire zoom range to obtain high optical performance.

In the zoom lens system according to the second embodiment of the present invention, it is preferable that the fifth lens group along the optical axis upon focusing on infinity locates at least nearer to the object in the telephoto end state than that in the wide-angle end state.

In the second embodiment of the present invention, when the state of lens group positions varies from the wide-angle end state to the telephoto end state, the distance between the fourth lens group and the fifth lens group increases to effectively carry out zooming. Then, since the height of the off-axis ray from the optical axis passing through the fifth lens group becomes higher in the telephoto end state than in the wide-angle end state, because of positive power of the fifth lens group, the position of the exit pupil of the zoom lens system suddenly becomes far from the image plane and variation in the position of the exit pupil becomes large, so that it becomes difficult to satisfy the requirement from the characteristics of the solid-state imaging device. By constructing the fifth lens group in this manner, variation in the position of the exit pupil can be small so as to satisfy the requirement from the characteristics of the solid-state imaging device.

In the zoom lens system according to the second embodiment of the present invention, the following conditional expression (8) is preferably satisfied:

$$3.0 < f5/fW < 10.0 \quad (8)$$

where fW denotes the focal length of the zoom lens system in the wide-angle end state, and f5 denotes the focal length of the fifth lens group.

Conditional expression (8) defines an appropriate range of the focal length of the fifth lens group.

When the ratio f5/fW is equal to or exceeds the upper limit of conditional expression (8), since the focal length of the fifth lens group becomes relatively long, the fifth lens group cannot make the position of the exit pupil effectively far away from the image plane, so that the requirement from the characteristics of the solid-state imaging device cannot be satisfied. Moreover, it becomes difficult to correct aberrations produced in the lens groups locating to the object side of the fourth lens group by the fifth lens group, so that high optical performance cannot be obtained.

On the other hand, when the ratio f5/fW is equal to or falls below the lower limit of conditional expression (8), refractive power of the fifth lens group relatively becomes too strong, so that it becomes difficult to correct curvature of field over entire zoom rang from the wide-angle end state to the telephoto end state with suppressing variation in the position of the exit pupil to satisfy the requirement from the characteristics of the solid-state imaging device and, as a result, high optical performance cannot be obtained.

In order to secure the effect of the second embodiment of the present invention, it is preferable that the upper limit of conditional expression (8) is set to 9.0. In order to further secure the effect of the second embodiment of the present invention, it is more preferable that the upper limit of conditional expression (8) is set to 8.0. In order to secure the effect of the second embodiment of the present invention, it is preferable that the lower limit of conditional expression (8) is set to 4.0.

In the zoom lens system according to the second embodiment of the present invention, the following conditional expression (9) is preferably satisfied:

$$5.8 < f1/(-f2) < 10.0 \quad (9)$$

where f1 denotes the focal length of the first lens group, and f2 denotes the focal length of the second lens group.

Conditional expression (9) defines an appropriate range of the ratio of the focal length of the first lens group relative to that of the second lens group.

When the ratio f1/(−f2) is equal to or exceeds the upper limit of conditional expression (9), the focal length of the first lens group becomes relatively large, so that the first lens group cannot effectively contribute to zooming and, as a result, a high zoom ratio of about four or more cannot be secured. Moreover, since the moving amount of the first lens group becomes large, it becomes difficult to keep aberration at a low level over entire zoom range from the wide-angle end state to the telephoto end state. Furthermore, since the moving amount of the first lens group becomes large, it is difficult that the zoom lens system is made compact. In addition, the focal length of the second lens group becomes relatively short, so that off-axis aberrations becomes excessively large and, as a result, high optical performance cannot be obtained.

On the other hand, when the ratio f1/(−f2) is equal to or falls below the lower limit of conditional expression (9), since the focal length of the first lens group becomes relatively short, the angle of the off-axis ray incident to the first lens group in the wide-angle end state relative to the optical axis becomes small, so that when the angle of view of 70 degrees or more is to be realized in the wide-angle end state, the diameter of the first lens group becomes excessively large and, as a result, the zoom lens system cannot be made compact. Moreover, aberrations produced in the first lens group becomes too large, so that high optical performance cannot be obtained. Furthermore, the focal length of the second lens group becomes relatively large, so that the second lens group cannot effectively contribute to zooming and, as a result, a high zoom ratio of about four or more cannot be secured. In addition, the moving amount of the second lens group becomes large, so that the zoom lens system cannot be made compact.

In the zoom lens system according to the second embodiment of the present invention, the following conditional expression (5) is preferably satisfied:

$$0.2 < (1-\beta 3aT)\beta RT < 3.0 \quad (5)$$

where β3aT denotes a using lateral magnification of the front lens group in the telephoto end state, and βRT denotes a using lateral magnification of the whole optical system locating between the front lens group and the image plane in the telephoto end state.

Conditional expression (5) is a so-called blurring correctional coefficient and defines an appropriate range of the shift amount of the image relative to the shift amount of the front lens group perpendicularly to the optical axis in the telephoto end state.

When the value (1−β3aT)βRT is equal to or exceeds the upper limit of conditional expression (5), the shift amount of the image relative to that of the front lens group perpendicularly to the optical axis becomes too large. Accordingly, control accuracy required to the front lens group becomes too high, so that a minute image blur caused by control error produces.

On the other hand, when the value (1−β3aT)βRT is equal to or falls below the lower limit of conditional expression (5), the shift amount of the image relative to that of the front lens group perpendicularly to the optical axis becomes relatively small. Accordingly, in order to secure enough shifting amount of image to cancel out the image blur by the camera shake, the shift amount of the front lens group perpendicularly to the optical axis has to be large, so that decentering coma becomes worse. Moreover, vibration reduction mechanism becomes large, so that the zoom lens system cannot be made compact.

In order to secure the effect of the present invention, it is preferable that the upper limit of conditional expression (5) is set to 2.2 and the lower limit to 0.45.

In the zoom lens system according to the second embodiment of the present invention, it is preferable that the front lens group is composed only of a cemented lens constructed by, in order from the object along the optical axis, a negative lens cemented with a positive lens, and the rear lens group is composed only of a cemented lens constructed by, in order from the object along the optical axis, a positive lens cemented with a negative lens.

By constructing the front lens group locating to the object side of the aperture stop and the rear lens group locating to the image side of the aperture stop in this manner, the lens construction becomes a so-called symmetric type locating the aperture stop in between, so that on-axis aberrations can be effectively corrected and aberration correction of the zoom lens system can be effectively carried out as a whole and, as a result, high optical performance can be obtained.

In the zoom lens system according to the second embodiment of the present invention, the following conditional expression (10) is preferably satisfied:

$$-0.50 < f3a/f3b < 0.80 \qquad (10)$$

where f3a denotes the focal length of the front lens group and f3b denotes the focal length of the rear lens group.

Conditional expression (10) defines an appropriate range of the ratio of the focal length of the front lens group to that of the rear lens group.

When the ratio f3a/f3b is equal to or exceeds the upper limit of the conditional expression (10), refractive power of the rear lens group becomes strong relative to that of the front lens group. Accordingly, positive refractive power arranged to the image side of the aperture stop becomes excessively stronger than that arranged to the object side of the aperture stop in combination with the forth lens group having positive refractive power arranged to the image side of the rear lens group. Therefore, it becomes difficult to correct off-axis aberrations, so that high optical performance cannot be obtained.

On the other hand, when the ratio f3a/f3b is equal to or falls below the lower limit of conditional expression (10), refractive power of the third lens group as a whole becomes weak to be difficult to effectively contribute to zooming, so that a high zoom ratio of about four or more cannot be secured. Moreover, since the moving amount of the third lens group becomes large, variation in aberration produced in the third lens group upon zooming becomes large, so that it becomes difficult to keep aberrations at a low level over whole zoom range from the wide-angle end state to the telephoto end state. Since the moving amount of the third lens group is large, the zoom lens system cannot be made compact.

In order to secure the effect of the present invention, it is preferable that the upper limit of conditional expression (10) is set to 0.70 and the lower limit to 0.00. In order to further secure the effect of the present invention, it is more preferable that the lower limit is set to 0.38.

In the zoom lens system according to the second embodiment of the present invention, it is preferable that the second lens group includes an aspherical lens.

By including an aspherical lens in the second lens group, off-axis aberrations produced in the second lens group can effectively be corrected, so that high optical performance can be obtained.

In the zoom lens system according to the second embodiment of the present invention, it is preferable that the fourth lens group includes an aspherical lens.

By including an aspherical lens in the fourth lens group, spherical aberration produced in the fourth lens group can effectively be corrected, so that high optical performance can be obtained.

A zoom lens system according to the second embodiment of the present invention seen from another point of view is composed of, in order from an object along the optical axis, a first lens group having positive refractive power, a second lens group having negative refractive power, a third lens group having positive refractive power, a fourth lens group having positive refractive power, and a fifth lens group having positive refractive power. With this construction, the zoom lens system makes it possible to locate the exit pupil far away from the image plane.

In the zoom lens system according to the second embodiment of the present invention seen from another point of view, when a state of lens group positions varies from a wide-angle end state to a telephoto end state upon focusing on infinity, the first lens group moves with respect to an image plane, the second lens group moves at first to the image and then to the object, the third lens group moves to the object, and the fourth lens group moves to the object along the optical axis such that, a distance between the first lens group and the second lens group increases, a distance between the second lens group and the third lens group decreases, a distance between the third lens group and the fourth lens group varies, and a distance between the fourth lens group and the fifth lens group increases. In this construction, it is possible to obtain zooming effect efficiently.

By satisfying the following conditional expressions (7) through (9), the second embodiment of the present invention seen from another point of view makes it possible to provide a compact zoom lens system having an angle of view in the wide-angle end state of 70 degrees or more and a zoom ratio of four or more with securing further high optical performance:

$$7.0 < f1/fW < 12.8 \qquad (7)$$

$$3.0 < f5/fW < 10.0 \qquad (8)$$

$$5.8 < f1/(-f2) < 10.0 \qquad (9)$$

where fW denotes the focal length of the zoom lens system in the wide-angle end state, f1 denotes the focal length of the first lens group, f2 denotes the focal length of the second lens group and f5 denotes the focal length of the fifth lens group.

Conditional expression (7) defines an appropriate range of the focal length of the first lens group and further explanation is omitted as already described above.

Conditional expression (8) defines an appropriate range of the focal length of the fifth lens group and further explanation is omitted as already described above.

Conditional expression (9) defines an appropriate range of the ratio of the focal length of the first lens group relative to that of the second lens group and further explanation is omitted as already described above.

In the zoom lens system according to the second embodiment of the present invention seen from another point of view, it is preferable that the distance along the optical axis between the third lens group and the fourth lens group upon focusing on infinity in the telephoto end state is at least smaller than that in the wide-angle end state.

By moving the third lens group and the fourth lens group in this manner, the position of the combined principal point of the third lens group and the fourth lens group can be moved largely between the wide-angle end state and the telephoto end state, so that zoom effect can be obtained efficiently.

In the zoom lens system according to the second embodiment of the present invention seen from another point of view, it is preferable that when zooming from the wide-angle end state to the telephoto end state upon focusing on infinity, the distance along the optical axis between the third lens group and the fourth lens group decreases.

By moving the third lens group and the fourth lens group in this manner, the position of the combined principal point of the third lens group and the fourth lens group can be moved largely, so that zoom effect can be obtained efficiently.

In the zoom lens system according to the second embodiment of the present invention seen from another point of view, when the state of lens group positions varies from the wide-angle end state to the telephoto end state upon focusing on infinity, the fifth lens group preferably moves along the optical axis with respect to the image plane.

By moving the fifth lens group in this manner, zooming effect can be obtained efficiently, and when the state of lens group positions varies from the wide-angle end state to the telephoto end state, the position of the off-axis ray passing through the fifth lens group can be optimized, so that off-axis aberrations can be corrected over entire zoom range to obtain high optical performance.

In the zoom lens system according to the second embodiment of the present invention seen from another point of view, it is preferable that the fifth lens group along the optical axis upon focusing on infinity locates at least nearer to the object in the telephoto end state than that in the wide-angle end state.

In the second embodiment of the present invention seen from another point of view, when the state of lens group positions varies from the wide-angle end state to the telephoto end state, the distance between the fourth lens group and the fifth lens group increases to effectively carry out zooming. Then, since the height of the off-axis ray from the optical axis passing through the fifth lens group becomes higher in the telephoto end state than in the wide-angle end state, because of positive power of the fifth lens group, the position of the exit pupil of the zoom lens system suddenly becomes far from the image plane and variation in the position of the exit pupil becomes large, so that it becomes difficult to satisfy the requirement from the characteristics of the solid-state imaging device. By constructing the fifth lens group in this manner, variation in the position of the exit pupil can be small so as to satisfy the requirement from the characteristics of the solid-state imaging device.

In the zoom lens system according to the second embodiment of the present invention seen from another point of view, it is preferable that the third lens group includes, in order from the object along the optical axis, a front lens group having positive refractive power, an aperture stop, and a rear lens group.

In the zoom lens system according to the second embodiment, the third lens group has a large contribution to zooming and assumes an important role of aberration correction in the whole lens system. With constructing the third lens group such that the aperture stop locates between the front lens group having positive refractive power and the rear lens group, it becomes possible to effectively correct on-axis aberrations, so that high optical performance can be obtained.

In the zoom lens system according to the second embodiment of the present invention seen from another point of view, it is preferable that the front lens group is composed only of a cemented lens constructed by, in order from the object along the optical axis, a negative lens cemented with a positive lens, and the rear lens group is composed only of a cemented lens constructed by, in order from the object along the optical axis, a positive lens cemented with a negative lens.

By constructing the front lens group locating to the object side of the aperture stop and the rear lens group locating to the image side of the aperture stop in this manner, the lens construction becomes a so-called symmetric type locating the aperture stop in between, so that on-axis aberrations can be effectively corrected and aberration correction of the zoom lens system can be effectively carried out as a whole and, as a result, high optical performance can be obtained.

In the zoom lens system according to the second embodiment of the present invention seen from another point of view, the following conditional expression (10) is preferably satisfied:

$$-0.50 < f3a/f3b < 0.80 \qquad (10)$$

where f3$a$ denotes the focal length of the front lens group and f3$b$ denotes the focal length of the rear lens group.

Conditional expression (10) defines an appropriate range of the ratio of the focal length of the front lens group to that of the rear lens group and further explanation is omitted as already described above.

In the zoom lens system according to the second embodiment of the present invention seen from another point of view, it is preferable that the second lens group includes an aspherical lens.

By including an aspherical lens in the second lens group, off-axis aberrations produced in the second lens group can effectively be corrected, so that high optical performance can be obtained.

In the zoom lens system according to the second embodiment of the present invention seen from another point of view, it is preferable that the fourth lens group includes an aspherical lens.

By including an aspherical lens in the fourth lens group, spherical aberration produced in the fourth lens group can effectively be corrected, so that high optical performance can be obtained.

EXAMPLE 4

Figure 16:
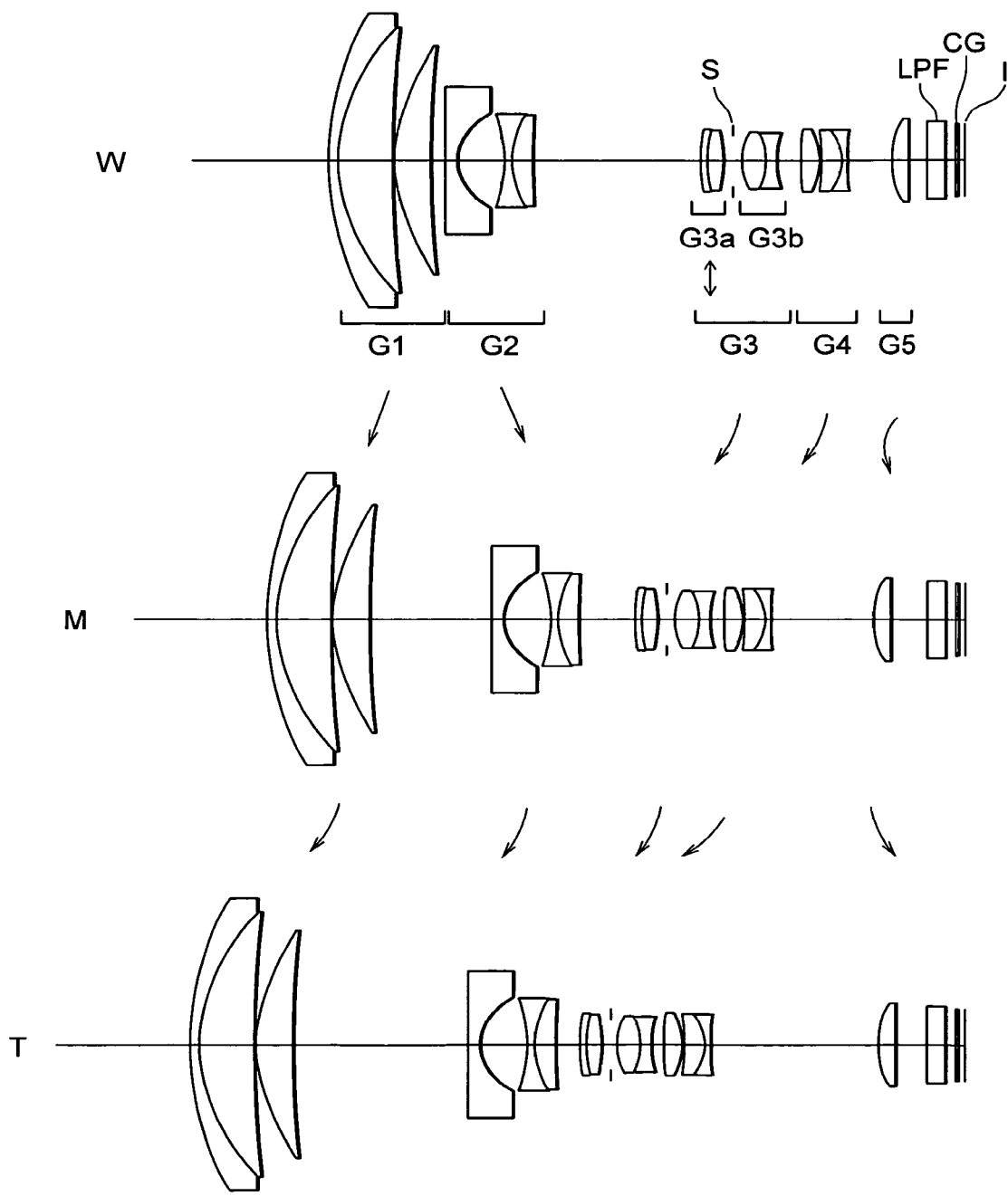
FIG. 16 shows cross-sectional views of a zoom lens system according to Example 4 of a second embodiment of the present invention upon focusing on infinity, in which W denotes a wide-angle end state, M denotes an intermediate focal length state, and T denotes a telephoto end state.

FIG. 16 shows cross-sectional views of a zoom lens system according to Example 4 of a second embodiment of the present invention upon focusing on infinity, in which W denotes a wide-angle end state, M denotes an intermediate focal length state, and T denotes a telephoto end state.

In FIG. 16, a zoom lens system according to Example 4 of the second embodiment of the present invention is composed of, in order from an object along an optical axis, a first lens group G1 having positive refractive power, a second lens group G2 having negative refractive power, a third lens group G3 having positive refractive power, a fourth lens group G4 having positive refractive power, and a fifth lens group G5 having positive refractive power. When a state of lens group positions varies from a wide-angle end state to a telephoto end state upon focusing on infinity, the first lens group G1 moves with respect to the image plane I, the second lens group G2 moves at first to the image plane I side and then to the object side, the third lens group G3 moves to the object, the fourth lens group G4 moves to the object, and the fifth lens group G5 moves with respect to the image plane I and locates nearer to the object in the telephoto end state than in the wide-angle end state such that a distance between the first lens group G1 and the second lens group G2 increases, a distance between the second lens group G2 and the third lens group G3 decreases, a distance between the third lens group G3 and the fourth lens group G4 decreases with a varying manner, a distance between the fourth lens group G4 and the fifth lens group G5 increases.

The first lens group G1 having positive refractive power as a whole is composed of, in order from the object along the optical axis, a cemented lens constructed by a negative meniscus lens having a convex surface facing to the object side cemented with a positive meniscus lens having a convex surface facing to the object side, and a positive meniscus lens having a convex surface facing to the object side.

The second lens group G2 having negative refractive power as a whole is composed of, in order from the object along the optical axis, a negative meniscus lens having an aspherical surface facing to the image side, a double concave negative lens having a stronger curvature surface facing to the image side, and a positive meniscus lens having a convex surface facing to the object side.

The third lens group G3 having positive refractive power as a whole is composed of, in order from the object along the optical axis, a front lens group G3a, an aperture stop S, and a rear lens group G3b. The front lens group G3a having positive refractive power as a whole is composed of a cemented lens constructed by a negative meniscus lens having a convex surface facing to the object side cemented with a double convex positive lens having a stronger curvature surface facing to the object side. The rear lens group G3b having positive refractive power as a whole is composed of a cemented lens constructed by a double convex positive lens having both surfaces with almost same curvature cemented with double concave negative lens having a stronger curvature surface facing to the object side. In order to shift image perpendicularly to the optical axis, the front lens group G3a can shift perpendicularly to the optical axis.

The fourth lens group G4 having positive refractive power as a whole is composed of, in order from the object along the optical axis, a double convex positive lens having an aspherical surface facing to the object side, and a cemented lens constructed by a positive meniscus lens having a convex surface facing to the image side cemented with a double concave negative lens having a stronger curvature surface facing to the object side.

The fifth lens group G5 having positive refractive power as a whole is composed of a positive meniscus lens having a convex surface facing to the object side.

An optical low-pass filter LPF for cutting off resolving power of about Nyquist frequency or more of the solid-state imaging device is arranged to the image side of the fifth lens group G5 and a cover glass CG for protecting the surface of the imaging device is arranged to the image side of the LPF.

Various values associated with Example 4 are listed in Table 4. In [Specifications], TL denotes a total lens length (unit: mm) that is a distance between the most object side lens surface to the image plane,

TABLE 4

[Specifications]

| | Lens State | | |
|---|---|---|---|
| | Wide-Angle End | Intermediate Focal Length | Telephoto End |
| f = | 7.30 | 24.00 | 48.70 |
| FNO = | 2.9 | 3.9 | 4.8 |
| 2ω = | 76.8 | 25.7 | 12.8 |
| TL = | 93.8 | 103.0 | 114.0 |

[Lens Data]

| | r | d | nd | νd |
|---|---|---|---|---|
| 1 | 57.0839 | 1.2000 | 1.85026 | 32.35 |
| 2 | 31.9927 | 8.2500 | 1.49782 | 82.52 |
| 3 | 229.0922 | 0.1000 | | |
| 4 | 32.5008 | 5.5000 | 1.62041 | 60.29 |
| 5 | 180.7580 | (D5) | | |
| 6 | 348.6512 | 2.2500 | 1.79668 | 45.37 |
| 7* | 8.4204 | 6.7600 | | |
| 8 | −22.6529 | 0.9000 | 1.51633 | 64.14 |
| 9 | 13.9142 | 0.3000 | | |
| 10 | 14.8081 | 3.2000 | 1.84666 | 23.78 |
| 11 | 137.4384 | (D11) | | |
| 12 | 35.9124 | 0.9000 | 1.80100 | 34.96 |
| 13 | 18.8088 | 2.5000 | 1.49782 | 82.52 |
| 14 | −31.7991 | 1.2000 | | |
| 15 | ∞ | 1.2000 | | Aperture Stop S |
| 16 | 10.4440 | 3.6000 | 1.60562 | 43.73 |
| 17 | −10.6282 | 1.8000 | 1.72342 | 37.95 |
| 18 | 15.3008 | (D18) | | |
| 19* | 40.4812 | 2.8500 | 1.79668 | 45.37 |
| 20 | −12.7297 | 0.2000 | | |
| 21 | −37.4296 | 3.0000 | 1.49782 | 82.52 |
| 22 | −8.1540 | 1.0000 | 1.80100 | 34.96 |
| 23 | 63.9580 | (D23) | | |
| 24 | 19.8524 | 2.6000 | 1.51633 | 64.14 |
| 25 | 1344.6027 | (D25) | | |
| 26 | ∞ | 2.7600 | 1.51680 | 64.20 (LPF) |
| 27 | ∞ | 1.4410 | | |
| 28 | ∞ | 0.5000 | 1.51680 | 64.20 (CG) |
| 29 | ∞ | (Bf) | | |

[Aspherical Data]

Surface Number 7

κ = 0.7000
C4 = 1.0988E−06
C6 = −7.2334E−07
C8 = 1.1607E−08
C10 = −1.2470E−10

Surface Number 19

κ = 1.0000
C4 = −1.0498E−04
C6 = −4.3631E−07
C8 = 1.7227E−08
C10 = −4.4410E−10

[Variable Distances]

| | Lens State | | |
|---|---|---|---|
| | Wide-Angle End | Intermediate Focal Length | Telephoto End |
| f = | 7.30 | 24.00 | 48.70 |
| D5 = | 1.8000 | 17.8458 | 25.5276 |
| D11 = | 24.6785 | 8.2615 | 3.2000 |
| D18 = | 3.3239 | 1.5579 | 1.5000 |

TABLE 4-continued

| | | | |
|---|---|---|---|
| D23 = | 6.3759 | 15.2556 | 24.6538 |
| D25 = | 2.6222 | 5.0974 | 4.1067 |

[Values for Conditional Expressions]

(7): f1/fW = 7.93
(8): f5/fW = 5.34
(9): f1/(−f2) = 5.99
(5): (1 − β3aT)βRT = 0.832
(10): f3a/f3b = 0.443

Figure 17A:
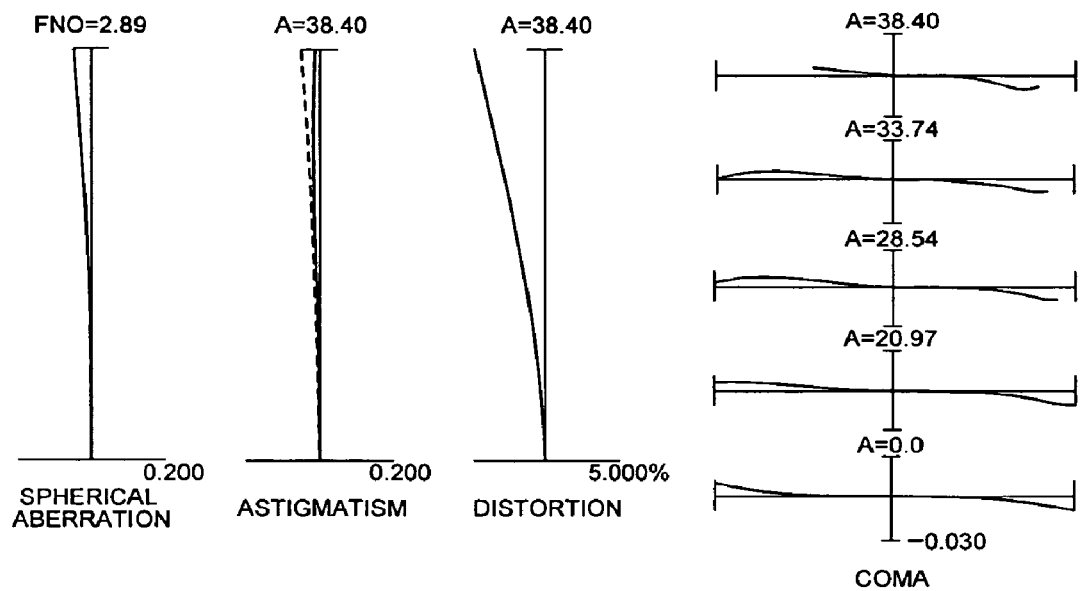
FIG. 17A shows various aberrations of the zoom lens system according to Example 4 of the second embodiment at d-line ($\lambda$=587.6 nm) in the wide-angle end state (W).
Figure 17B:
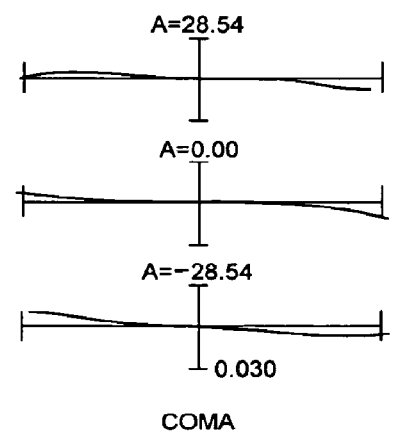
FIG. 17B shows coma of the zoom lens system according to Example 4 of the second embodiment at d-line ($\lambda$=587.6 nm) in the wide-angle end state (W) upon shifting a front lens group perpendicularly to the optical axis by 0.5 mm.
Figure 18A:
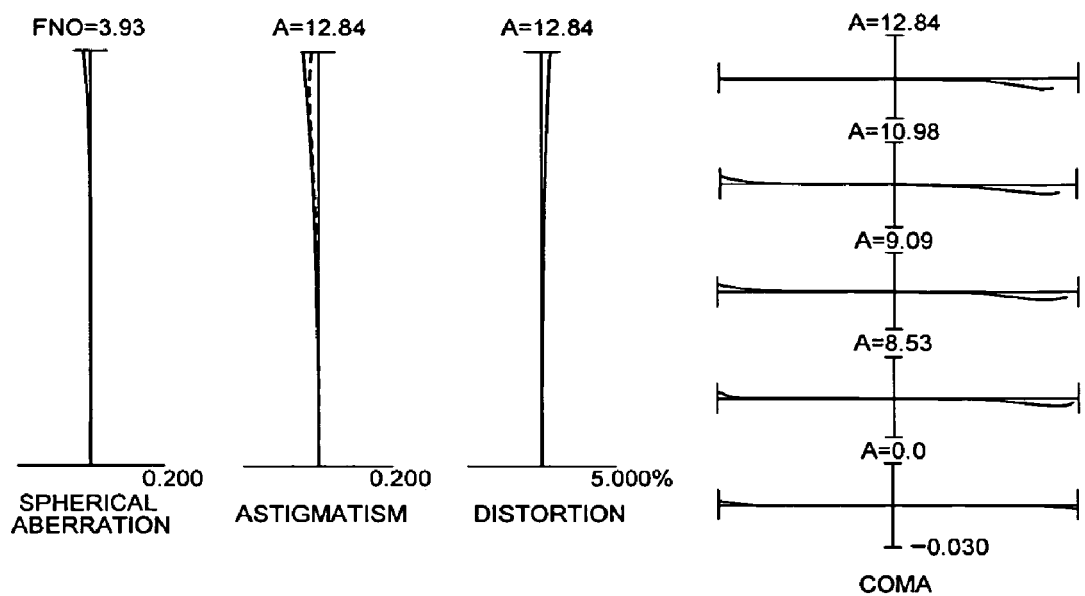
FIG. 18A shows various aberrations of the zoom lens system according to Example 4 of the second embodiment at d-line (λ=587.6 nm) in the intermediate focal length state (M).
Figure 18B:
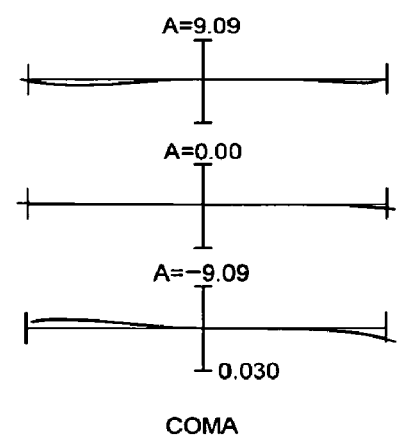
FIG. 18B shows coma of the zoom lens system according to Example 4 of the second embodiment at d-line (λ=587.6 nm) in the intermediate focal length state (M) upon shifting the front lens group perpendicularly to the optical axis by 0.5 mm.
Figure 19A:
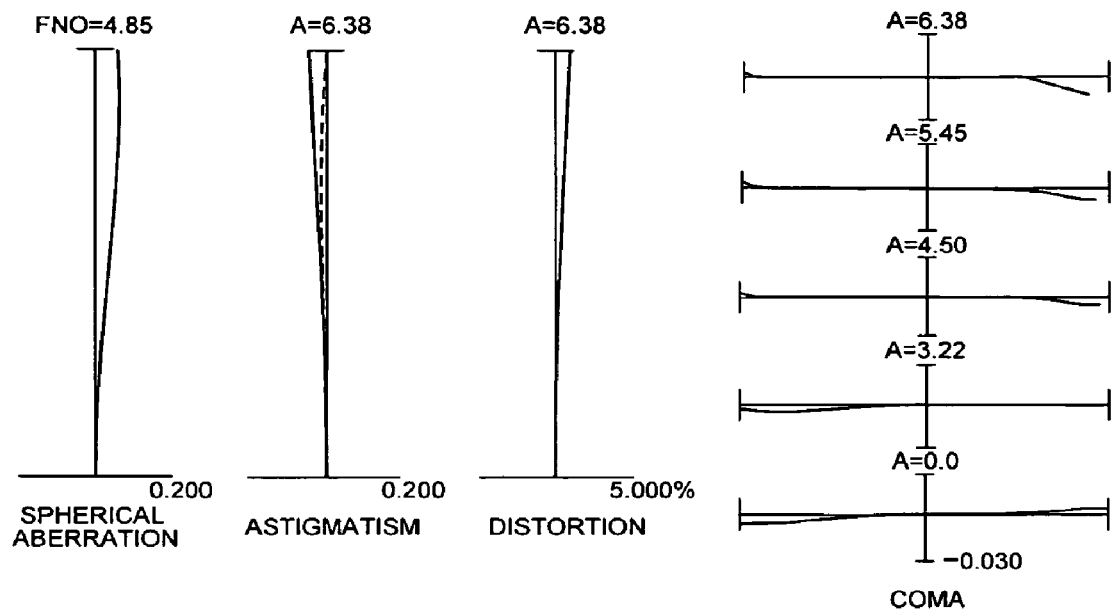
FIG. 19A shows various aberrations of the zoom lens system according to Example 4 of the second embodiment at d-line (λ=587.6 nm) in the telephoto end state (T).
Figure 19B:
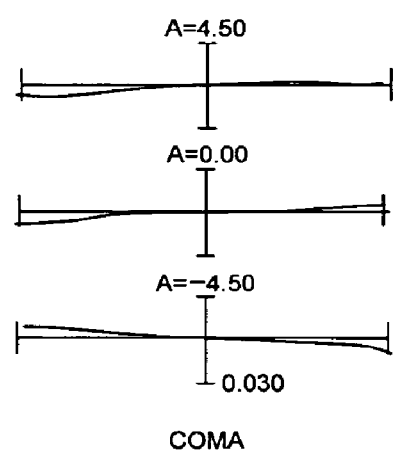
FIG. 19B shows coma of the zoom lens system according to Example 4 of the second embodiment at d-line (λ=587.6 nm) in the telephoto end state (T) upon shifting the front lens group perpendicularly to the optical axis by 0.5 mm.

FIG. 17A shows various aberrations of the zoom lens system according to Example 4 of the second embodiment at d-line (λ=587.6 nm) in the wide-angle end state (W) not performing vibration reduction. FIG. 17B shows coma of the zoom lens system according to Example 4 of the second embodiment at d-line (λ=587.6 nm) in the wide-angle end state (W) upon shifting the front lens group perpendicularly to the optical axis by 0.5 mm. FIG. 18A shows various aberrations of the zoom lens system according to Example 4 of the second embodiment at d-line (λ=587.6 nm) in the intermediate focal length state (M) not performing vibration reduction. FIG. 18B shows coma of the zoom lens system according to Example 4 of the second embodiment at d-line (λ=587.6 nm) in the intermediate focal length state (M) upon shifting the front lens group perpendicularly to the optical axis by 0.5 mm. FIG. 19A shows various aberrations of the zoom lens system according to Example 4 of the second embodiment at d-line (λ=587.6 nm) in the telephoto end state (T) not performing vibration reduction. FIG. 19B shows coma of the zoom lens system according to Example 4 of the second embodiment at d-line (λ=587.6 nm) in the telephoto end state (T) upon shifting the front lens group perpendicularly to the optical axis by 0.5 mm.

As is apparent from each graphs, the zoom lens system according to Example 4 of the second embodiment shows high optical performance. It is obvious that the zoom lens system is compact having the total lens length from 93.8 mm to 114.0 mm.

EXAMPLE 5

Figure 20:
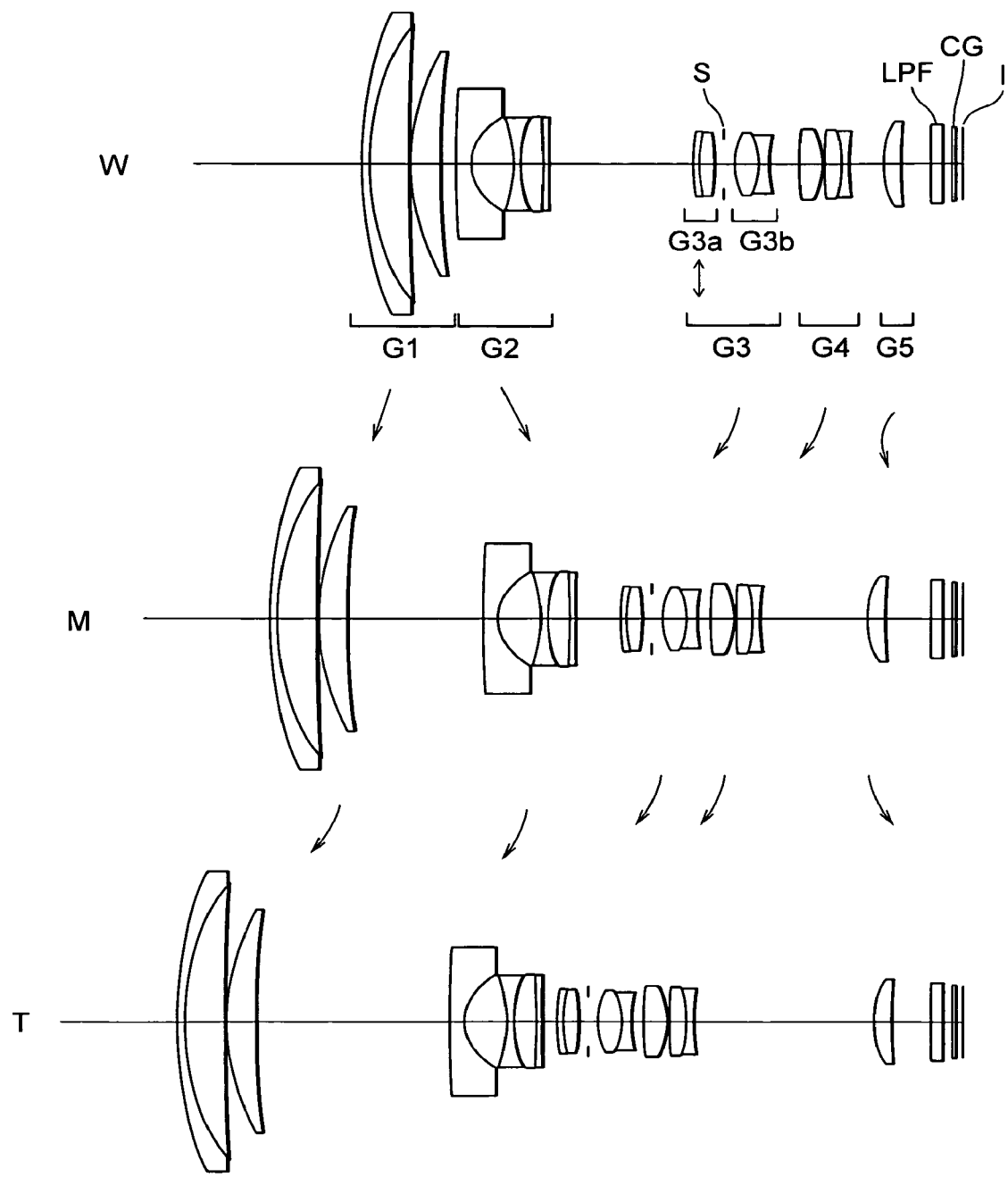
FIG. 20 shows cross-sectional views of a zoom lens system according to Example 5 of the second embodiment of the present invention upon focusing on infinity, in which W denotes a wide-angle end state, M denotes an intermediate focal length state, and T denotes a telephoto end state.

FIG. 20 shows cross-sectional views of a zoom lens system according to Example 5 of the second embodiment of the present invention upon focusing on infinity, in which W denotes a wide-angle end state, M denotes an intermediate focal length state, and T denotes a telephoto end state.

In FIG. 20, a zoom lens system according to Example 5 of the second embodiment of the present invention is composed of, in order from an object along an optical axis, a first lens group G1 having positive refractive power, a second lens group G2 having negative refractive power, a third lens group G3 having positive refractive power, a fourth lens group G4 having positive refractive power, and a fifth lens group G5 having positive refractive power. When a state of lens group positions varies from a wide-angle end state to a telephoto end state upon focusing on infinity, the first lens group G1 moves with respect to the image plane I, the second lens group G2 moves at first to the image plane I side and then to the object side, the third lens group G3 moves to the object, the fourth lens group G4 moves to the object, and the fifth lens group G5 moves with respect to the image plane I and locates nearer to the object in the telephoto end state than in the wide-angle end state such that a distance between the first lens group G1 and the second lens group G2 increases, a distance between the second lens group G2 and the third lens group G3 decreases, a distance between the third lens group G3 and the fourth lens group G4 decreases with a varying manner, a distance between the fourth lens group G4 and the fifth lens group G5 increases.

The first lens group G1 having positive refractive power as a whole is composed of, in order from the object along the optical axis, a cemented lens constructed by a negative meniscus lens having a convex surface facing to the object side cemented with a positive meniscus lens having a convex surface facing to the object side, and a positive meniscus lens having a convex surface facing to the object side.

The second lens group G2 having negative refractive power as a whole is composed of, in order from the object along the optical axis, a negative meniscus lens having an aspherical surface facing to the image side, a double concave negative lens having a stronger curvature surface facing to the image side, and a cemented lens constructed by a double convex positive lens having a stronger curvature surface facing to the object side cemented with a double concave negative lens having a stronger curvature surface facing to the object side.

The third lens group G3 having positive refractive power as a whole is composed of, in order from the object along the optical axis, a front lens group G3a, an aperture stop S, and a rear lens group G3b. The front lens group G3a having positive refractive power as a whole is composed of a cemented lens constructed by a negative meniscus lens having a convex surface facing to the object side cemented with a double convex positive lens having a stronger curvature surface facing to the object side. The rear lens group G3b having positive refractive power as a whole is composed of a cemented lens constructed by a double convex positive lens having both surfaces with almost same curvature cemented with double concave negative lens having a stronger curvature surface facing to the object side. In order to shift image perpendicularly to the optical axis, the front lens group G3a can shift perpendicularly to the optical axis.

The fourth lens group G4 having positive refractive power as a whole is composed of, in order from the object along the optical axis, a double convex positive lens having an aspherical surface facing to the object side, and a cemented lens constructed by a double convex positive lens having a stronger curvature surface facing to the image side cemented with a double concave negative lens having a stronger curvature surface facing to the object side.

The fifth lens group G5 having positive refractive power as a whole is composed of a positive meniscus lens having a convex surface facing to the object side.

An optical low-pass filter LPF for cutting off resolving power of about Nyquist frequency or more of the solid-state imaging device is arranged to the image side of the fifth lens group G5 and a cover glass CG for protecting the surface of the imaging device is arranged to the image side of the LPF.

Various values associated with Example 5 are listed in Table 5.

TABLE 5

[Specifications]

| | Lens State | | |
|---|---|---|---|
| | Wide-Angle End | Intermediate Focal Length | Telephoto End |
| f = | 7.30 | 24.00 | 48.70 |
| FNO = | 2.9 | 4.0 | 5.0 |
| 2ω = | 76.2 | 25.3 | 12.7 |
| TL = | 89.4 | 103.0 | 117.0 |

[Lens Data]

| | r | d | nd | νd |
|---|---|---|---|---|
| 1 | 68.7733 | 1.2000 | 1.84666 | 23.78 |
| 2 | 44.6048 | 6.0000 | 1.62041 | 60.29 |
| 3 | 502.6841 | 0.1000 | | |
| 4 | 39.2284 | 4.5500 | 1.49700 | 81.61 |
| 5 | 179.0209 | (D5) | | |
| 6 | 231.9477 | 2.2500 | 1.79668 | 45.37 |
| 7* | 8.1352 | 6.4000 | | |
| 8 | −24.3449 | 0.9000 | 1.62041 | 60.29 |
| 9 | 19.8092 | 0.1000 | | |
| 10 | 16.7821 | 3.4000 | 1.84666 | 23.78 |
| 11 | −112.6407 | 0.9000 | 1.67790 | 55.34 |
| 12 | 129.3558 | (D12) | | |
| 13 | 45.0022 | 0.9000 | 1.80100 | 34.96 |
| 14 | 22.0792 | 2.5000 | 1.49782 | 82.52 |
| 15 | −27.9147 | 1.2000 | | |
| 16 | ∞ | 1.5000 | Aperture Stop S | |
| 17 | 11.6350 | 3.7000 | 1.60738 | 56.82 |
| 18 | −11.2356 | 1.6000 | 1.71700 | 47.93 |
| 19 | 19.1180 | (D19) | | |
| 20* | 42.2272 | 3.5000 | 1.67790 | 54.89 |
| 21 | −13.6179 | 0.1000 | | |
| 22 | 104.8201 | 2.6000 | 1.48749 | 70.24 |
| 23 | −18.2010 | 1.0000 | 1.80100 | 34.96 |
| 24 | 23.5017 | (D24) | | |
| 25 | 16.0661 | 2.5000 | 1.48749 | 70.24 |
| 26 | 53.8612 | (D26) | | |
| 27 | ∞ | 1.7200 | 1.51680 | 64.20 (LPF) |
| 28 | ∞ | 1.4410 | | |
| 29 | ∞ | 0.5000 | 1.51680 | 64.20 (CG) |
| 30 | ∞ | (Bf) | | |

[Aspherical Data]

Surface Number 7

κ = 0.8300
C4 = −1.1807E−05
C6 = −2.8221E−07
C8 = 9.6728E−10
C10 = −3.6526E−11

Surface Number 20

κ = 1.0000
C4 = −1.6050E−04
C6 = −4.4980E−07
C8 = 1.2616E−08
C10 = −3.1336E−10

[Variable Distances]

| | Lens State | | |
|---|---|---|---|
| | Wide-Angle End | Intermediate Focal Length | Telephoto End |
| f = | 7.30 | 24.00 | 48.70 |
| D5 = | 2.2068 | 19.9136 | 28.5702 |
| D12 = | 21.2565 | 6.7047 | 2.4000 |
| D19 = | 4.4227 | 2.0462 | 1.6990 |
| D24 = | 5.4752 | 16.2164 | 27.1884 |
| D26 = | 4.5105 | 6.7630 | 5.5814 |

[Values for Conditional Expressions]

(7): f1/fW = 8.68
(8): f5/fW = 6.30
(9): f1/(−f2) = 6.92
(5): (1 − β3aT)β3RT = 0.862
(10): f3a/f3b = 0.559

Figure 21A:
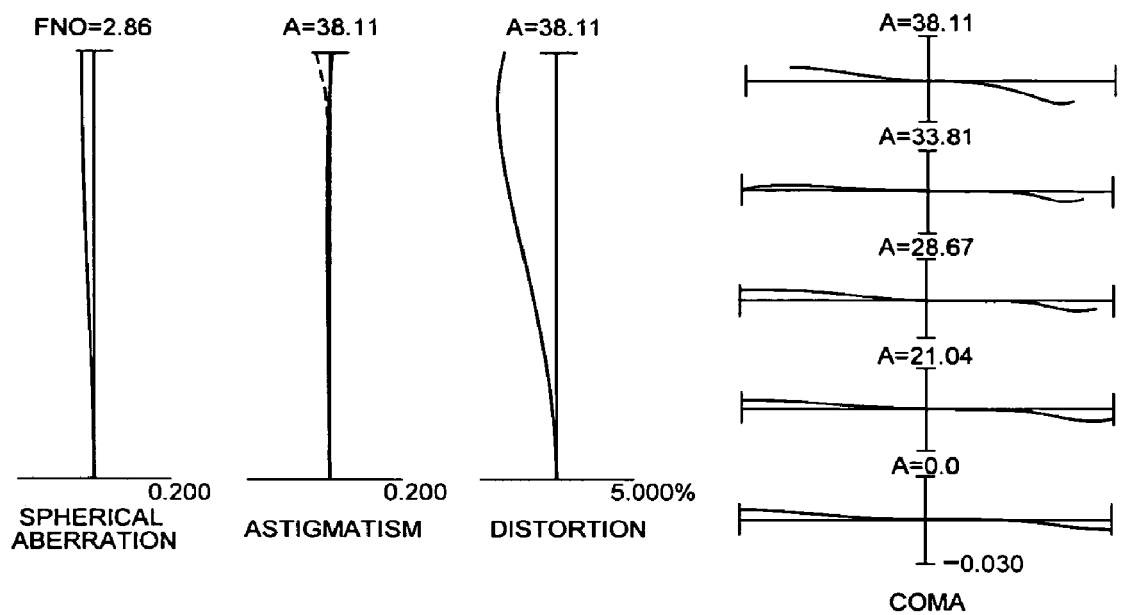
FIG. 21A shows various aberrations of the zoom lens system according to Example 5 of the second embodiment at d-line (λ=587.6 nm) in the wide-angle end state (W).
Figure 21B:
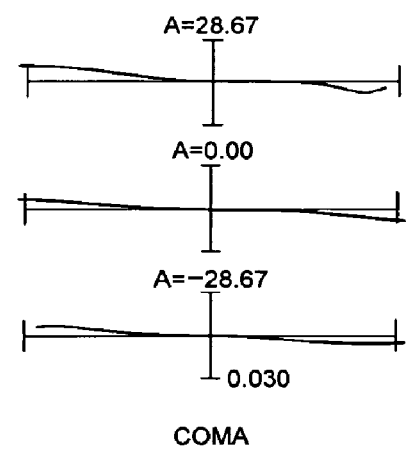
FIG. 21B shows coma of the zoom lens system according to Example 5 of the second embodiment at d-line (λ=587.6 nm) in the wide-angle end state (W) upon shifting the front lens group perpendicularly to the optical axis by 0.5 mm.
Figure 23A:
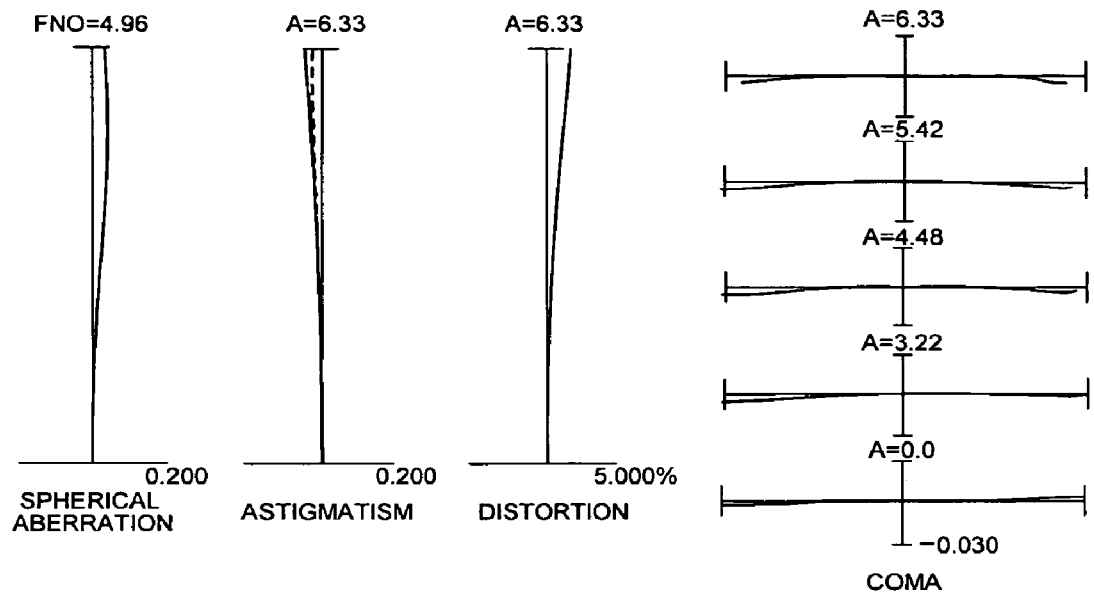
FIG. 23A shows various aberrations of the zoom lens system according to Example 5 of the second embodiment at d-line (λ=587.6 nm) in the telephoto end state (T).
Figure 23B:
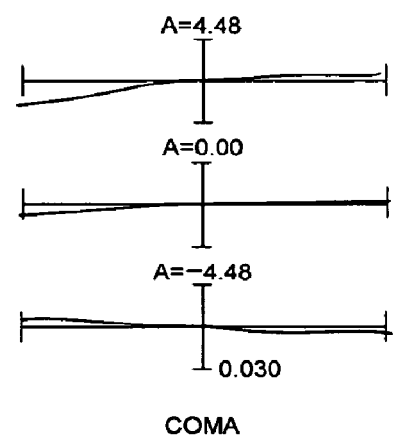
FIG. 23B shows coma of the zoom lens system according to Example 5 of the second embodiment at d-line (λ=587.6 nm) in the telephoto end state (T) upon shifting the front lens group perpendicularly to the optical axis by 0.5 mm.

FIG. 21A shows various aberrations of the zoom lens system according to Example 5 of the second embodiment at d-line (λ=587.6 nm) in the wide-angle end state (W) not performing vibration reduction. FIG. 21B shows coma of the zoom lens system according to Example 5 of the second embodiment at d-line (λ=587.6 nm) in the wide-angle end state (W) upon shifting the front lens group perpendicularly to the optical axis by 0.5 mm. FIG. 22A shows various aberrations of the zoom lens system according to Example 5 of the second embodiment at d-line (λ=587.6 nm) in the intermediate focal length state (M) not performing vibration reduction. FIG. 22B shows coma of the zoom lens system according to Example 5 of the second embodiment at d-line (λ=587.6 nm) in the intermediate focal length state (M) upon shifting the front lens group perpendicularly to the optical axis by 0.5 mm. FIG. 23A shows various aberrations of the zoom lens system according to Example 5 of the second embodiment at d-line (λ=587.6 nm) in the telephoto end state (T) not performing vibration reduction. FIG. 23B shows coma of the zoom lens system according to Example 5 of the second embodiment at d-line (λ=587.6 nm) in the telephoto end state (T) upon shifting the front lens group perpendicularly to the optical axis by 0.5 mm.

As is apparent from each graphs, the zoom lens system according to Example 5 of the second embodiment shows high optical performance. It is obvious that the zoom lens system is compact having the total lens length from 89.4 mm to 117.0 mm.

EXAMPLE 6

Figure 24:
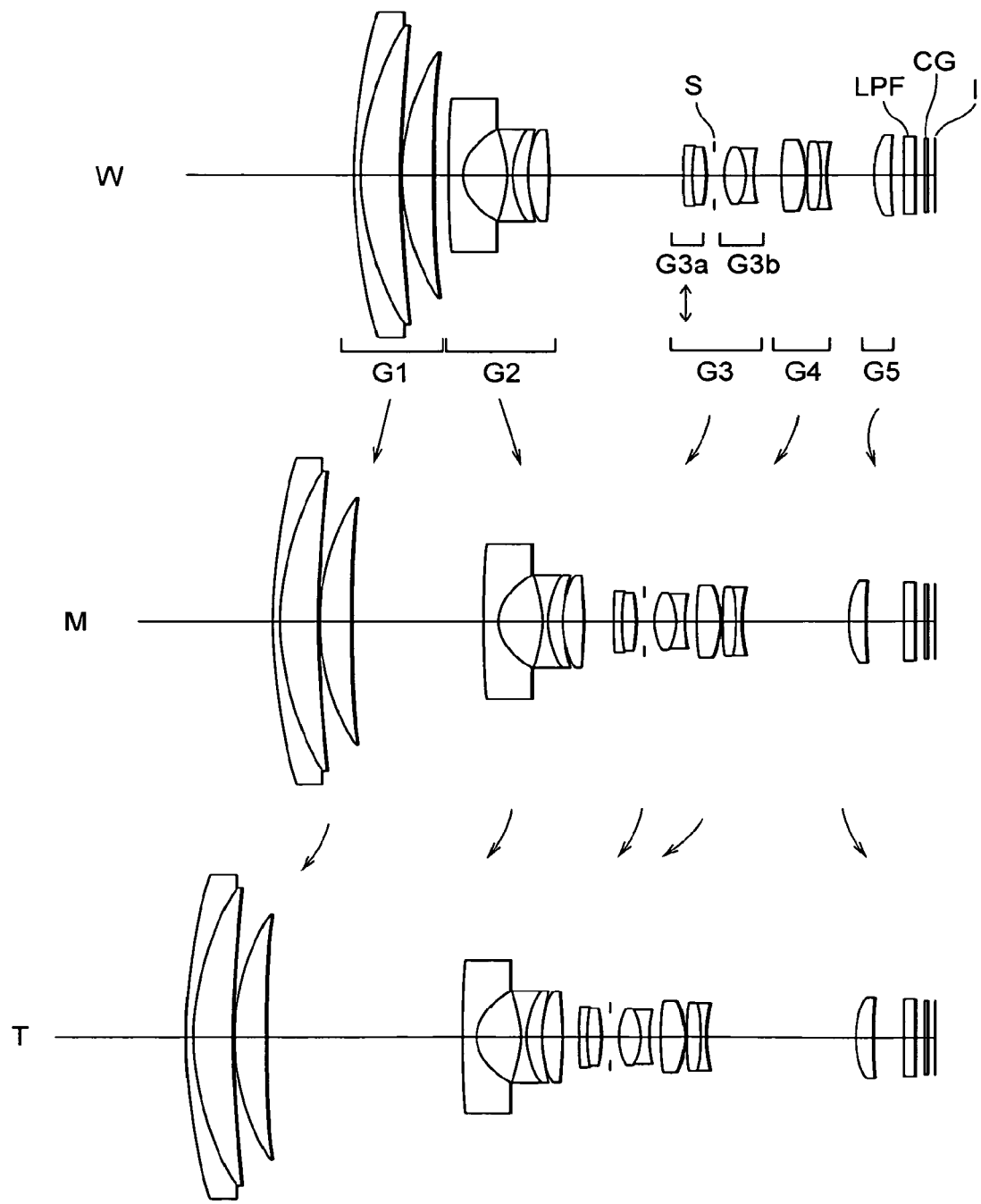
FIG. 24 shows cross-sectional views of a zoom lens system according to Example 6 of the second embodiment of the present invention upon focusing on infinity, in which W denotes a wide-angle end state, M denotes an intermediate focal length state, and T denotes a telephoto end state.

FIG. 24 shows cross-sectional views of a zoom lens system according to Example 6 of the second embodiment of the present invention upon focusing on infinity, in which W denotes a wide-angle end state, M denotes an intermediate focal length state, and T denotes a telephoto end state.

In FIG. 24, a zoom lens system according to Example 6 of the second embodiment of the present invention is composed of, in order from an object along an optical axis, a first lens group G1 having positive refractive power, a second lens group G2 having negative refractive power, third lens group G3 having positive refractive power, a fourth lens group G4 having positive refractive power, and a fifth lens group G5 having positive refractive power. When a state of lens group positions varies from a wide-angle end state to a telephoto end state upon focusing on infinity, the first lens group G1 moves with respect to the image plane I, the second lens group G2 moves at first to the image plane I side and then to the object side, the third lens group G3 moves to the object, the fourth lens group G4 moves to the object, and the fifth lens group G5 moves with respect to the image plane I and locates nearer to the object in the telephoto end state than in the wide-angle end state such that a distance between the first lens group G1 and the second lens group G2 increases, a distance between the second lens group G2 and the third lens group G3 decreases, a distance between the third lens group G3 and the fourth lens group G4 decreases with a varying manner, a distance between the fourth lens group G4 and the fifth lens group G5 increases.

The first lens group G1 having positive refractive power as a whole is composed of, in order from the object along the optical axis, a cemented lens constructed by a negative meniscus lens having a convex surface facing to the object side cemented with a positive meniscus lens having a convex surface facing to the object side, and a positive meniscus lens having a convex surface facing to the object side.

The second lens group G2 having negative refractive power as a whole is composed of, in order from the object along the optical axis, a negative meniscus lens having an aspherical surface facing to the image side, a cemented lens constructed by a double concave negative lens having a stronger curvature surface facing to the image side cemented with a positive meniscus lens having a convex surface facing to the object side, and a double convex positive lens having a stronger curvature surface facing to the object.

The third lens group G3 having positive refractive power as a whole is composed of, in order from the object along the optical axis, a front lens group G3a, an aperture stop S, and a rear lens group G3b. The front lens group G3a having positive refractive power as a whole is composed of a cemented lens constructed by a negative meniscus lens having a convex surface facing to the object side cemented with a double convex positive lens having a stronger curvature surface facing to the object side. The rear lens group G3b having positive refractive power as a whole is composed of a cemented lens constructed by a double convex positive lens having a stronger curvature surface facing to the object cemented with double concave negative lens having a stronger curvature surface facing to the object side. In order to shift image perpendicularly to the optical axis, the front lens group G3a can shift perpendicularly to the optical axis.

The fourth lens group G4 having positive refractive power as a whole is composed of, in order from the object along the optical axis, a double convex positive lens having an aspherical surface facing to the object side, and a cemented lens constructed by a double convex positive lens having a stronger curvature surface facing to the image side cemented with a double concave negative lens having a stronger curvature surface facing to the image side.

The fifth lens group G5 having positive refractive power as a whole is composed of a positive meniscus lens having a convex surface facing to the object side.

An optical low-pass filter LPF for cutting off resolving power of about Nyquist frequency or more of the solid-state imaging device is arranged to the image side of the fifth lens group G5 and a cover glass CG for protecting the surface of the imaging device is arranged to the image side of the LPF.

Various values associated with Example 6 are listed in Table 6.

TABLE 6

[Specifications]

| | Lens State | | |
|---|---|---|---|
| | Wide-Angle End | Intermediate Focal Length | Telephoto End |
| f = | 6.28 | 20.00 | 33.30 |
| FNO = | 2.9 | 4.1 | 4.7 |
| 2ω = | 85.1 | 30.5 | 18.4 |
| TL = | 89.1 | 101.7 | 115.0 |

[Lens Data]

| | r | d | nd | νd |
|---|---|---|---|---|
| 1 | 94.9248 | 1.2000 | 1.84666 | 23.78 |
| 2 | 50.5101 | 6.0000 | 1.81600 | 46.63 |
| 3 | 181.5798 | 0.1000 | | |
| 4 | 40.5566 | 5.0000 | 1.49700 | 81.61 |
| 5 | 187.2247 | (D5) | | |
| 6 | 154.5189 | 2.3000 | 1.79668 | 45.37 |
| 7* | 7.7128 | 6.5500 | | |
| 8 | −27.8647 | 0.9000 | 1.80400 | 46.58 |
| 9 | 13.4648 | 2.3000 | 1.84666 | 23.78 |
| 10 | 21.8957 | 0.2000 | | |
| 11 | 19.3217 | 3.1000 | 1.84666 | 23.78 |
| 12 | −133.2414 | (D12) | | |
| 13 | 55.5404 | 1.3000 | 1.80100 | 34.96 |
| 14 | 24.2673 | 2.3000 | 1.49700 | 81.61 |
| 15 | −25.0156 | 1.2000 | | |
| 16 | ∞ | 1.2000 | Aperture Stop S | |
| 17 | 10.7357 | 4.1000 | 1.56384 | 60.69 |
| 18 | −11.8874 | 1.1000 | 1.72000 | 50.24 |
| 19 | 19.9745 | (D19) | | |
| 20* | 35.0436 | 3.8000 | 1.67790 | 54.89 |
| 21 | −13.3593 | 0.1000 | | |
| 22 | 29.1998 | 2.3000 | 1.48749 | 70.24 |
| 23 | −23.6547 | 0.9000 | 1.80100 | 34.96 |
| 24 | 15.3609 | (D24) | | |
| 25 | 15.0119 | 2.5000 | 1.48749 | 70.24 |
| 26 | 46.5577 | (D26) | | |
| 27 | ∞ | 1.7200 | 1.51680 | 64.20 (LPF) |
| 28 | ∞ | 1.4410 | | |
| 29 | ∞ | 0.5000 | 1.51680 | 64.20 (CG) |
| 30 | ∞ | (Bf) | | |

[Aspherical Data]

Surface Number 7

κ = 0.7000
C4 = −7.4797E−06
C6 = −1.3581E−07
C8 = −4.3349E−09
C10 = 4.8790E−11

Surface Number 20

κ = 1.0000
C4 = −1.9526E−04
C6 = −3.6202E−07
C8 = 2.1862E−09
C10 = −1.5049E−10

[Variable Distances]

| | Lens State | | |
|---|---|---|---|
| | Wide-Angle End | Intermediate Focal Length | Telephoto End |
| f = | 6.28 | 20.00 | 33.30 |
| D5 = | 2.2000 | 20.0116 | 30.1865 |
| D12 = | 20.7197 | 4.6820 | 2.4000 |
| D19 = | 3.8511 | 1.4736 | 1.3000 |

TABLE 6-continued

| D24 = | 7.2599 | 16.5136 | 23.1922 |
|---|---|---|---|
| D26 = | 2.0000 | 5.9210 | 4.7838 |

[Values for Conditional Expressions]

(7): f1/fW = 11.89
(8): f5/fW = 7.05
(9): f1/(−f2) = 8.52
(5): (1 − β3aT)βRT = 0.775
(10): f3a/f3b = 0.511

Figure 25A:
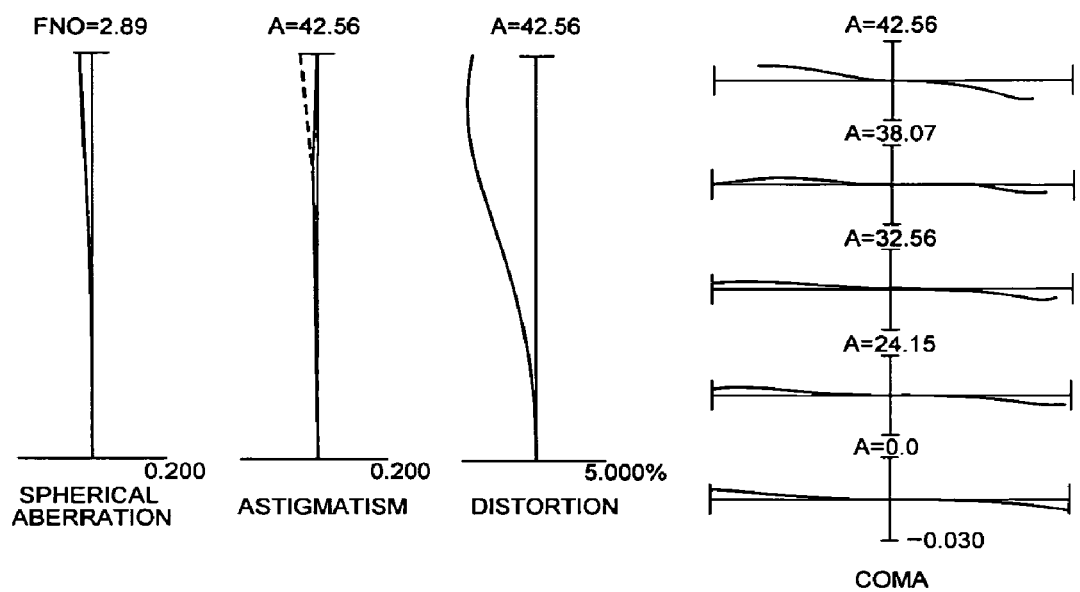
FIG. 25A shows various aberrations of the zoom lens system according to Example 6 of the second embodiment at d-line (λ=587.6 nm) in the wide-angle end state (W).
Figure 25B:
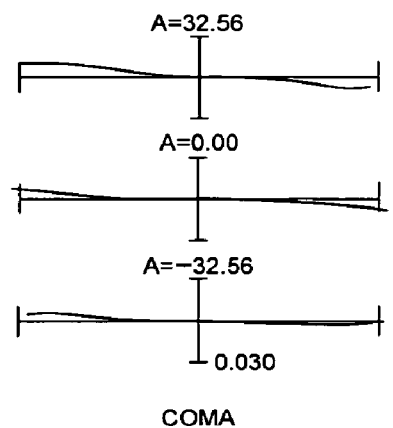
FIG. 25B shows coma of the zoom lens system according to Example 6 of the second embodiment at d-line (λ=587.6 nm) in the wide-angle end state (W) upon shifting the front lens group perpendicularly to the optical axis by 0.5 mm.
Figure 26A:
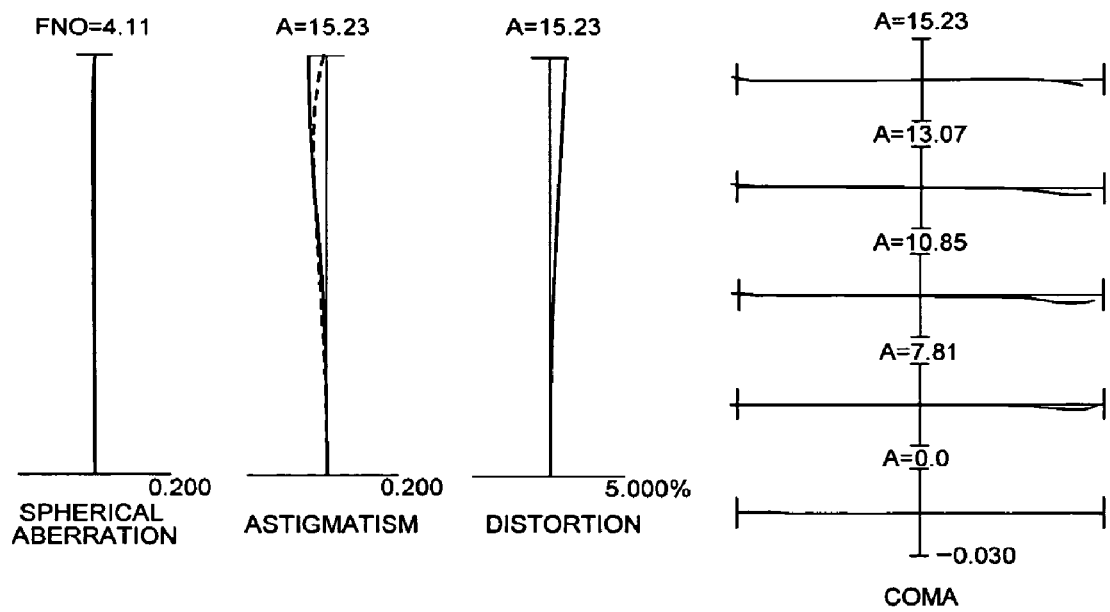
FIG. 26A shows various aberrations of the zoom lens system according to Example 6 of the second embodiment at d-line (λ=587.6 nm) in the intermediate focal length state (M).
Figure 26B:
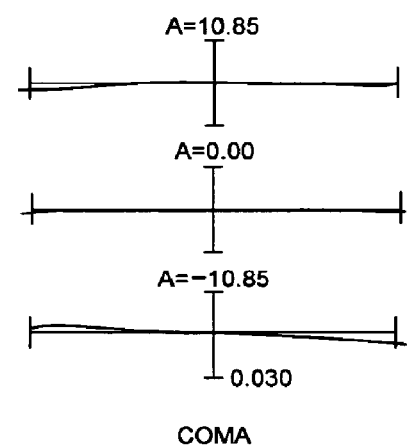
FIG. 26B shows coma of the zoom lens system according to Example 6 of the second embodiment at d-line (λ587.6 nm) in the intermediate focal length state (M) upon shifting the front lens group perpendicularly to the optical axis by 0.5 mm.
Figure 27A:
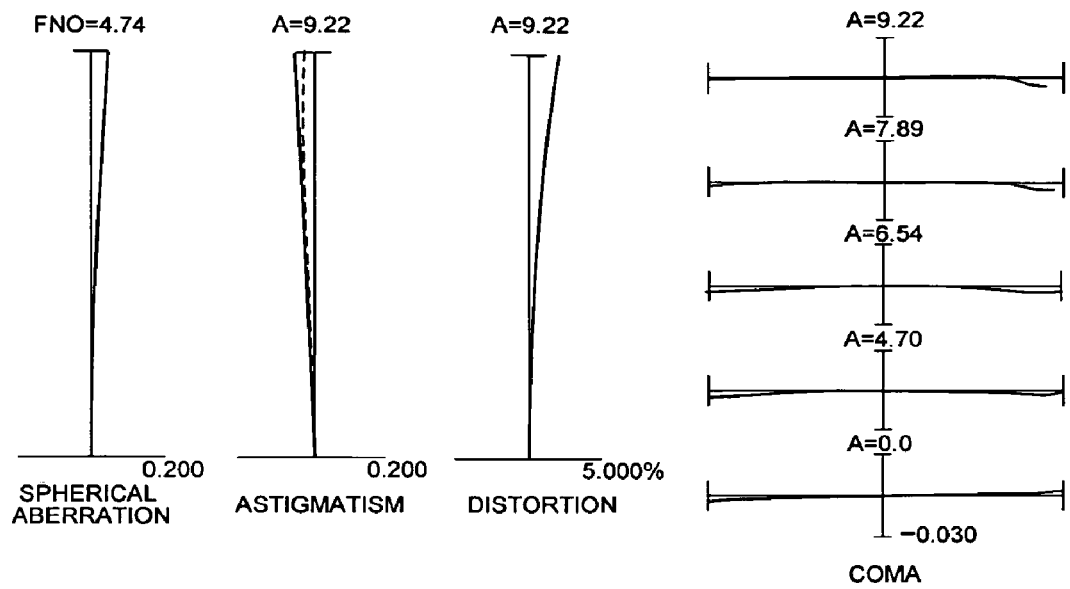
FIG. 27A shows various aberrations of the zoom lens system according to Example 6 of the second embodiment at d-line (λ=587.6 nm) in the telephoto end state (T).
Figure 27B:
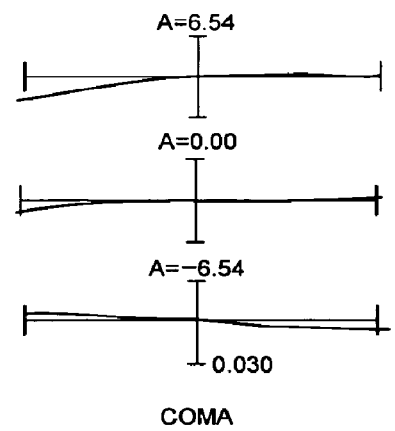
FIG. 27B shows coma of the zoom lens system according to Example 6 of the second embodiment at d-line (λ=587.6 nm) in the telephoto end state (T) upon shifting the front lens group perpendicularly to the optical axis by 0.5 mm.

FIG. 25A shows various aberrations of the zoom lens system according to Example 6 of the second embodiment at d-line (λ=587.6 nm) in the wide-angle end state (W) not performing vibration reduction. FIG. 25B shows coma of the zoom lens system according to Example 6 of the second embodiment at d-line (λ=587.6 nm) in the wide-angle end state (W) upon shifting the front lens group perpendicularly to the optical axis by 0.5 mm. FIG. 26A shows various aberrations of the zoom lens system according to Example 6 of the second embodiment at d-line (λ=587.6 nm) in the intermediate focal length state (M) not performing vibration reduction. FIG. 26B shows coma of the zoom lens system according to Example 6 of the second embodiment at d-line (λ=587.6 nm) in the intermediate focal length state (M) upon shifting the front lens group perpendicularly to the optical axis by 0.5 mm. FIG. 27A shows various aberrations of the zoom lens system according to Example 6 of the second embodiment at d-line (λ=587.6 nm) in the telephoto end state (T) not performing vibration reduction. FIG. 27B shows coma of the zoom lens system according to Example 6 of the second embodiment at d-line (λ=587.6 nm) in the telephoto end state (T) upon shifting the front lens group perpendicularly to the optical axis by 0.5 mm.

As is apparent from each graphs, the zoom lens system according to Example 6 of the second embodiment shows high optical performance. It is obvious that the zoom lens system is compact having the total lens length from 89.1 mm to 115.0 mm.

EXAMPLE 7

Figure 28:
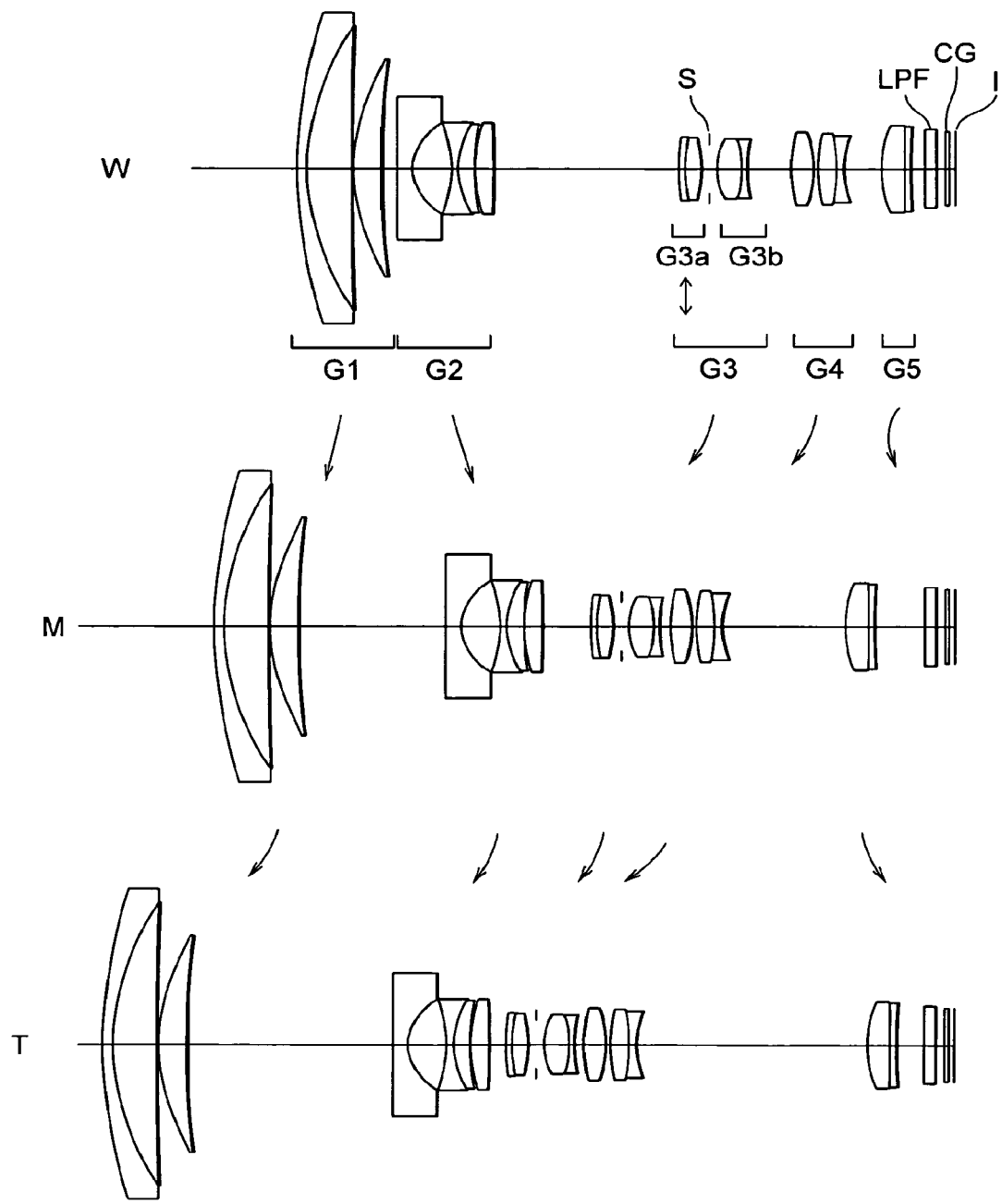
FIG. 28 shows cross-sectional views of a zoom lens system according to Example 7 of the second embodiment of the present invention upon focusing on infinity, in which W denotes a wide-angle end state, M denotes an intermediate focal length state, and T denotes a telephoto end state.

FIG. 28 shows cross-sectional views of a zoom lens system according to Example 7 of the second embodiment of the present invention upon focusing on infinity, in which W denotes a wide-angle end state, M denotes an intermediate focal length state, and T denotes a telephoto end state.

In FIG. 28, a zoom lens system according to Example 7 of the second embodiment of the present invention is composed of, in order from an object along an optical axis, a first lens group G1 having positive refractive power, a second lens group G2 having negative refractive power, a third lens group G3 having positive refractive power, a fourth lens group G4 having positive refractive power, and a fifth lens group G5 having positive refractive power. When a state of lens group positions varies from a wide-angle end state to a telephoto end state upon focusing on infinity, the first lens group G1 moves with respect to the image plane I, the second lens group G2 moves at first to the image plane I side and then to the object side, the third lens group G3 moves to the object, the fourth lens group G4 moves to the object, and the fifth lens group G5 moves with respect to the image plane I and locates nearer to the object in the telephoto end state than in the wide-angle end state such that a distance between the first lens group G1 and the second lens group G2 increases, a distance between the second lens group G2 and the third lens group G3 decreases, a distance between the third lens group G3 and the fourth lens group G4 decreases with a varying manner, a distance between the fourth lens group G4 and the fifth lens group G5 increases.

The first lens group G1 having positive refractive power as a whole is composed of, in order from the object along the optical axis, a cemented lens constructed by a negative meniscus lens having a convex surface facing to the object side cemented with a positive meniscus lens having a convex surface facing to the object side, and a positive meniscus lens having a convex surface facing to the object side.

The second lens group G2 having negative refractive power as a whole is composed of, in order from the object along the optical axis, a double concave negative lens having an aspherical surface facing to the image side, a cemented lens constructed by a double concave negative lens having a stronger curvature surface facing to the image side cemented with a positive meniscus lens having a convex surface facing to the object side, and a double convex positive lens having a stronger curvature surface facing to the object.

The third lens group G3 having positive refractive power as a whole is composed of, in order from the object along the optical axis, a front lens group G3a, an aperture stop S, and a rear lens group G3b. The front lens group G3a having positive refractive power as a whole is composed of a cemented lens constructed by a negative meniscus lens having a convex surface facing to the object side cemented with a double convex positive lens having a stronger curvature surface facing to the object side. The rear lens group G3b having positive refractive power as a whole is composed of a cemented lens constructed by a double convex positive lens having a stronger curvature surface facing to the object cemented with double concave negative lens having a stronger curvature surface facing to the object side. In order to shift image perpendicularly to the optical axis, the front lens group G3a can shift perpendicularly to the optical axis.

The fourth lens group G4 having positive refractive power as a whole is composed of, in order from the object along the optical axis, a double convex positive lens having an aspherical surface facing to the object side, and a cemented lens constructed by a double convex positive lens having a stronger curvature surface facing to the image side cemented with a double concave negative lens having a stronger curvature surface facing to the image side.

The fifth lens group G5 having positive refractive power as a whole is composed of a positive meniscus lens having a convex surface facing to the object side.

An optical low-pass filter LPF for cutting off resolving power of about Nyquist frequency or more of the solid-state imaging device is arranged to the image side of the fifth lens group G5 and a cover glass CG for protecting the surface of the imaging device is arranged to the image side of the LPF.

Various values associated with Example 7 are listed in Table 7.

TABLE 7

[Specifications]

| | Lens State | | |
|---|---|---|---|
| | Wide-Angle End | Intermediate Focal Length | Telephoto End |
| f = | 7.30 | 32.00 | 74.00 |
| FNO = | 2.9 | 4.4 | 5.8 |
| 2ω = | 76.6 | 19.3 | 8.3 |
| TL = | 98.7 | 111.2 | 128.0 |

[Lens Data]

| | r | d | nd | νd |
|---|---|---|---|---|
| 1 | 91.6356 | 1.2000 | 1.84666 | 23.78 |
| 2 | 43.7716 | 7.1000 | 1.78800 | 47.38 |
| 3 | 747.0564 | 0.1000 | | |
| 4 | 38.7003 | 4.3000 | 1.49700 | 81.61 |
| 5 | 157.8453 | (D5) | | |
| 6 | −18910.9160 | 2.2000 | 1.77377 | 47.18 |
| 7* | 9.0966 | 6.1000 | | |
| 8 | −25.1060 | 0.9000 | 1.77250 | 49.61 |
| 9 | 14.6234 | 2.5000 | 1.75520 | 27.51 |
| 10 | 42.2604 | 0.1000 | | |
| 11 | 25.5677 | 2.9000 | 1.84666 | 23.78 |
| 12 | −321.7062 | (D12) | | |
| 13 | 41.3021 | 0.9000 | 1.85026 | 32.35 |
| 14 | 21.8613 | 2.5500 | 1.49700 | 81.61 |
| 15 | −27.2167 | 1.200 | | |
| 16 | ∞ | 1.2000 | | Aperture Stop S |
| 17 | 12.2623 | 3.7000 | 1.60738 | 56.82 |
| 18 | −14.9954 | 0.9000 | 1.74320 | 49.32 |
| 19 | 19.6395 | (D19) | | |
| 20* | 22.6189 | 3.5000 | 1.60602 | 57.44 |
| 21 | −18.2518 | 0.6000 | | |
| 22 | 28.7503 | 2.9000 | 1.48749 | 70.24 |
| 23 | −26.2714 | 1.0000 | 1.80440 | 39.59 |
| 24 | 12.5700 | (D24) | | |
| 25 | 18.6304 | 3.4000 | 1.75500 | 52.32 |
| 26 | −181.4509 | 0.9000 | 1.84666 | 23.78 |
| 27 | 66.4720 | (D27) | | |
| 28 | ∞ | 1.7200 | 1.51680 | 64.20 (LPF) |
| 29 | ∞ | 1.4410 | | |
| 30 | ∞ | 0.5000 | 1.51680 | 64.20 (CG) |
| 31 | ∞ | (Bf) | | |

[Aspherical Data]

Surface Number 7

κ = 0.9000
C4 = −2.0162E−05
C6 = −4.4138E−07
C8 = 5.9139E−09
C10 = −1.1983E−10

Surface Number 20

κ = 1.0000
C4 = −1.1033E−04
C6 = −3.3050E−07
C8 = 6.1431E−09
C10 = −1.0856E−10

[Variable Distances]

| | Lens State | | |
|---|---|---|---|
| | Wide-Angle End | Intermediate Focal Length | Telephoto End |
| f = | 7.30 | 32.00 | 74.00 |
| D5 = | 2.2000 | 22.0532 | 30.5865 |
| D12 = | 27.4585 | 6.9401 | 2.4000 |
| D19 = | 6.3397 | 1.5162 | 1.3000 |
| D24 = | 5.5885 | 18.4195 | 34.5624 |
| D27 = | 2.2607 | 7.5000 | 4.3401 |

TABLE 7-continued

[Values for Conditional Expressions]

(7): f1/fW = 8.36
(8): f5/fW = 4.79
(9): f1/(−f2) = 6.16
(5): (1 − β3aT)βRT = 1.119
(10): f3a/f3b = 0.390

Figure 29A:
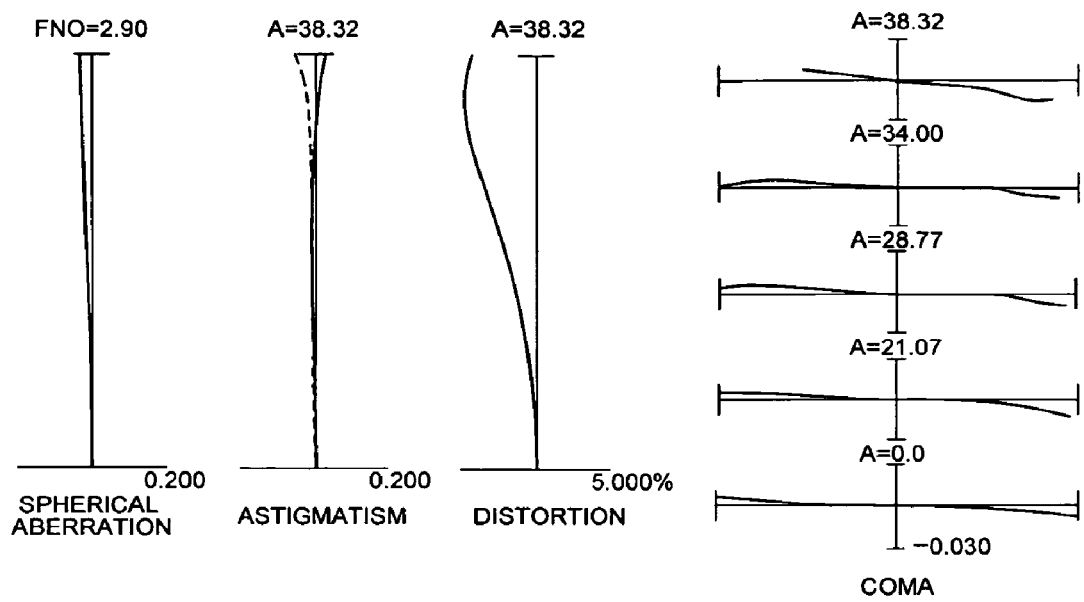
FIG. 29A shows various aberrations of the zoom lens system according to Example 7 of the second embodiment at d-line (λ=587.6 nm) in the wide-angle end state (W).
Figure 29B:
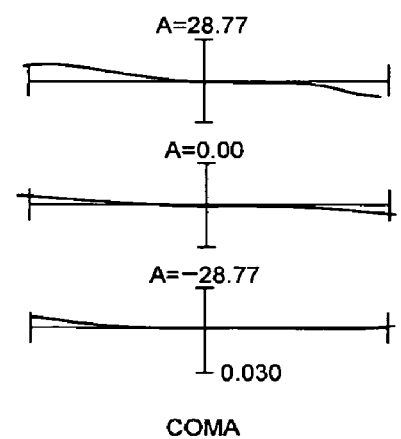
FIG. 29B shows coma of the zoom lens system according to Example 7 of the second embodiment at d-line (λ=587.6 nm) in the wide-angle end state (W) upon shifting the front lens group perpendicularly to the optical axis by 0.5 mm.
Figure 30A:
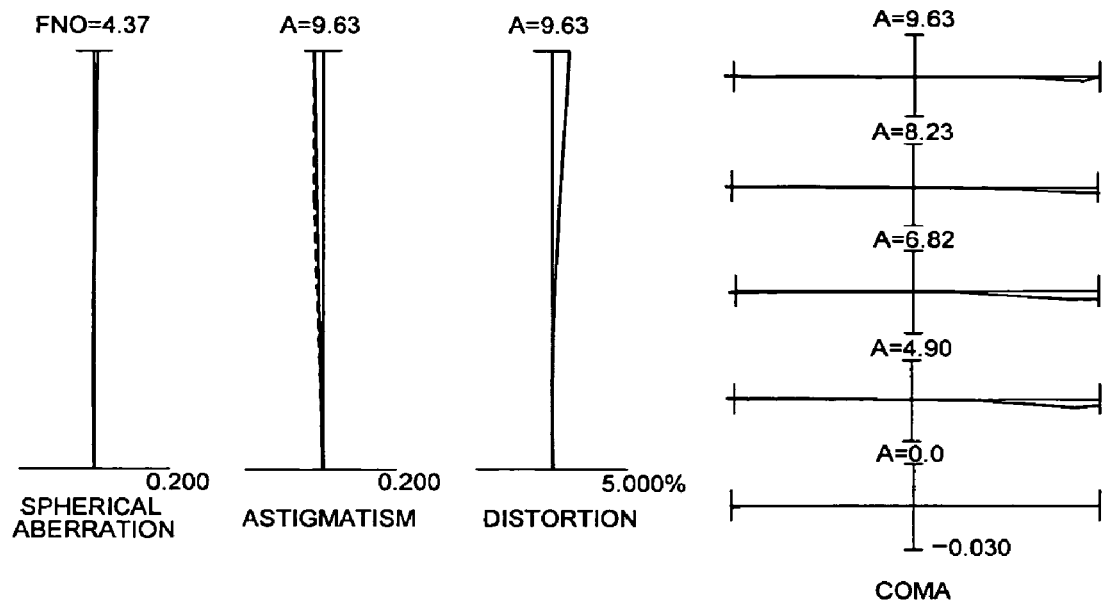
FIG. 30A shows various aberrations of the zoom lens system according to Example 7 of the second embodiment at d-line (λ=587.6 nm) in the intermediate focal length state (M).
Figure 30B:
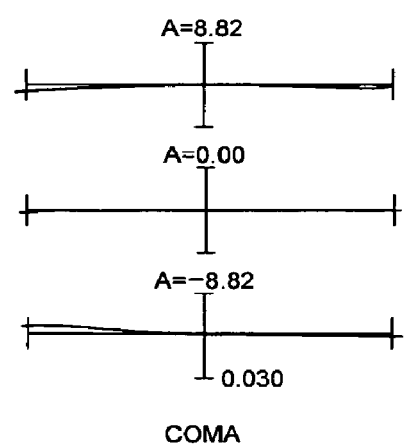
FIG. 30B shows coma of the zoom lens system according to Example 7 of the second embodiment at d-line (λ=587.6 nm) in the intermediate focal length state (M) upon shifting the front lens group perpendicularly to the optical axis by 0.5 mm.
Figure 31A:
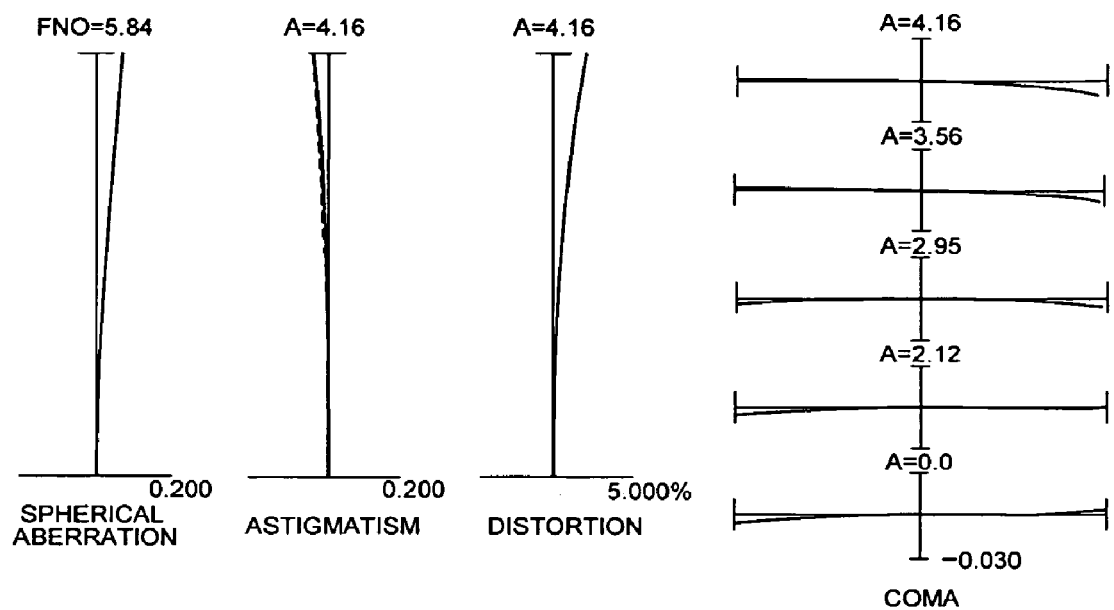
FIG. 31A shows various aberrations of the zoom lens system according to Example 7 of the second embodiment at d-line (λ=587.6 nm) in the telephoto end state (T).
Figure 31B:
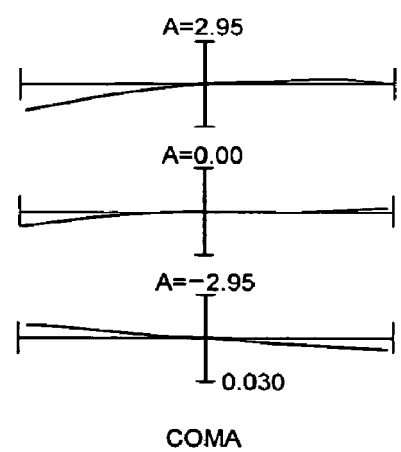
FIG. 31B shows coma of the zoom lens system according to Example 7 of the second embodiment at d-line (λ=587.6 nm) in the telephoto end state (T) upon shifting the front lens group perpendicularly to the optical axis by 0.5 mm.

FIG. 29A shows various aberrations of the zoom lens system according to Example 7 of the second embodiment at d-line (λ=587.6 nm) in the wide-angle end state (W) not performing vibration reduction. FIG. 29B shows coma of the zoom lens system according to Example 7 of the second embodiment at d-line (λ=587.6 nm) in the wide-angle end state (W) upon shifting the front lens group perpendicularly to the optical axis by 0.5 mm. FIG. 30A shows various aberrations of the zoom lens system according to Example 7 of the second embodiment at d-line (λ=587.6 nm) in the intermediate focal length state (M) not performing vibration reduction. FIG. 30B shows coma of the zoom lens system according to Example 7 of the second embodiment at d-line (λ=587.6 nm) in the intermediate focal length state (M) upon shifting the front lens group perpendicularly to the optical axis by 0.5 mm. FIG. 31A shows various aberrations of the zoom lens system according to Example 7 of the second embodiment at d-line (λ=587.6 nm) in the telephoto end state (T) not performing vibration reduction. FIG. 31B shows coma of the zoom lens system according to Example 7 of the second embodiment at d-line (λ=587.6 nm) in the telephoto end state (T) upon shifting the front lens group perpendicularly to the optical axis by 0.5 mm.

As is apparent from each graphs, the zoom lens system according to Example 7 of the second embodiment shows high optical performance. It is obvious that the zoom lens system is compact having the total lens length from 98.7 mm to 128.0 mm.

Incidentally, it is needless to say that although zoom lens systems with a five-lens-group configuration are shown as Examples of the second embodiment of the present invention, a zoom lens system simply added a lens group to a five-lens-group configuration is included in the spirit of the second embodiment of the present invention.

Moreover, in the configuration of each lens group, a lens group simply adding additional lens elements to the lens group shown in Examples is included in the spirit or scope of the second embodiment of the present invention.

Third Embodiment

A zoom lens system capable of shifting according to a third embodiment of the present invention is explained below.

A zoom lens system capable of shifting (hereinafter simply called a zoom lens system) according to the third embodiment is composed of, in order from an object, a first lens group having positive refractive power, a second lens group having negative refractive power, a third lens group having positive refractive power, a fourth lens group having positive refractive power, a fifth lens group having positive refractive power. When a state of lens group positions varies from a wide-angle end state (where the zoom lens system comes to the shortest focal length) to a telephoto end state (where the zoom lens system comes to the longest focal length), the first, third, and fourth lens groups move to the object, the second lens group moves to an image such that a distance between the first lens group and the second lens group varies, a distance between the second lens group and the third lens group decreases, a distance between the third lens group and the fourth lens group varies, and a distance between the fourth lens group and the fifth lens group increases, and focusing is carried by the fifth lens group. The third lens group is composed of a front lens group and a rear lens group locating at a distance from the front lens group. By shifting the front lens group as a shift lens group substantially perpendicularly to the optical axis the image can be shifted substantially perpendicularly to the optical axis. By constructing each lens group as explained below, a zoom lens system capable of shifting can be realized.

The function of each lens group is explained below. The first lens group has an effect for converging bundle of rays and is arranged near to the image as much as possible so as to pass off-axis rays away from the optical axis in the wide-angle end state, so that the diameter of the first lens group is made smaller. In the telephoto end state, converging effect of the first lens group is heightened by moving the first lens group to the object side in order to significantly widen the distance to the second lens group, so that the total lens length of the zoom lens system is shortened.

The second lens group has a function for enlarging an image of the object formed by the first lens group. Upon zooming from the wide-angle end state to the telephoto end state, the second lens group heightens the enlargement ratio by widening the distance between the first lens group and the second lens group and varies the focal length.

The third lens group has an effect for conversing bundle of rays expanded by the second lens group. In order to realize high optical performance, it is preferable that the third lens group is composed of a plurality of lens groups.

In order to obtain a preferable image upon shifting, it is necessary that spherical aberration, sine condition and Petzval sum are preferably corrected. Correction of spherical aberration and sine condition is for suppressing decentering coma producing at the center of the image upon shifting the shift lens group substantially perpendicularly to the optical axis. Correction of Petzval sum is for suppressing curvature of field producing on the periphery of the image upon shifting the shift lens group substantially perpendicularly to the optical axis.

In the third embodiment of the present invention, the third lens group is composed of a front lens group and a rear lens group locating at a distance from the front lens group. With this construction, both of the lens groups move integrally with keeping the fixed distance, so that variation in aberrations becomes minimum upon zooming. Upon shifting, the image is shifted by shifting the front lens group substantially perpendicularly to the optical axis.

The fourth lens group has an effect for converging bundle of rays converged by the third lens group. Upon varying the focal length, variation in image plane relative to the variation in the focal length can be suppressed by actively varying the distance between the third lens group and the fourth lens group.

The fifth lens group is fixed upon zooming and carries out focusing the image of the object formed by the first lens group through the fourth lens group as well as controlling the position of the exit pupil.

In a solid-state imaging device (such as a CCD), a micro-lens array is generally arranged in front of the imaging device in order to enhance light sensing efficiency.

Accordingly, in an optical system using for the above-described camera, it is necessary that the position of the exit pupil is locating far away from the light sensing surface of the imaging device.

In a zoom lens system capable of shifting an image, when the image is shifted by shifting a shift lens group substantially perpendicularly to the optical axis, the shift amount of the image "Δ" relative to the shift amount of the shift lens group "δ" is shown by the following expression (a):

$$\Delta/\delta = (1-\beta a) \times \beta b \tag{a}$$

Where βa denotes the lateral magnification of the shift lens group, βb denotes the lateral magnification of a lens group composed of all optical elements locating to the image side of the shift lens group. The right side of expression (a), which is $(1-\beta a) \times \beta b$, is assumed to be called as a "blurring coefficient".

The focal length of the zoom lens system is shown by the following expression (b):

$$f = fa \times \beta a \times \beta b \tag{b}$$

By modifying expression (b), the following expression (b*) is derived:

$$\beta b = f/(fa \times \beta a) \tag{b*}$$

where f denotes the focal length of the zoom lens system, fa denotes a combined focal length of the lens group composed of all optical elements locating to the object side of the shift lens group, and fa×βa denotes a combined focal length of a lens group composed of all optical elements locating to the object side of the shift lens group and the shift lens group.

Substituting expression (b*) into expression (a), the following expression (c) is derived:

$$\Delta/\delta = ((1-\beta a)/\beta a) \times (f/fa) \tag{c}$$

When βa comes close to 1, the ratio of the shift amount of the image Δ relative to the shift amount of the shift lens δ comes close to 0. In other words, the image does not move even if the shift lens is moved, so that image shift cannot be carried out. On the other hand, when 1/βa comes close to 0, the ratio of the shift amount of the image Δ relative to the shift amount of the shift lens δ comes close to 1, so that image shift can be carried out. Moreover, when f/fa becomes small, image shift can be carried out.

In the zoom lens system capable of shifting an image according to the third embodiment of the present invention, the following conditional expressions (11) through (14) are satisfied:

$$0.02 < |1/\beta 3aW| < 0.08 \tag{11}$$

$$3.9 < (\beta 3aT)^2 < 7.4 \tag{12}$$

$$0.15 < fW/f3a < 0.19 \tag{13}$$

$$1.1 < f5/fT < 4.2 \tag{14}$$

where β3aW denotes a using lateral magnification of the shift lens group (the front lens group) in the wide-angle end state, β3aT denotes a using lateral magnification of the shift lens group in the telephoto end state, f3a denotes the focal length of the front lens group as the shift lens group, f5 denotes the focal length of the fifth lens group, fW denotes the focal length of the zoom lens system in the wide-angle end state, and fT denotes the focal length of the zoom lens system in the telephoto end state.

Conditional expression (11) defines an appropriate range of the using lateral magnification β3aW of the shift lens group in the wide-angle end state.

When the value |1/β3aW| is equal to or exceeds the upper limit of conditional expression (11), the shift amount of the shift lens group necessary to shift the image by a given amount becomes excessively large. Accordingly, a drive mechanism for driving the shift lens group becomes large, so that the purpose of the present invention to make the zoom lens system compact cannot be accomplished. On the other hand, when the value (β3aT)² is equal to or falls below the lower limit of conditional expression (11), the image shifts largely even if the shift lens group shifts by a minute amount, so that it becomes difficult to control the position of the shift lens group.

Conditional expression (12) defines an appropriate range of the using lateral magnification β3aT of the shift lens group in the telephoto end state.

When the value (β3aT)² is equal to or falls blow the lower limit of conditional expression (12), the shift amount of the shift lens group necessary to shift the image by a given amount becomes excessively large. Accordingly, a drive mechanism for driving the shift lens group becomes large, so that the purpose of the present invention to make the zoom lens system compact cannot be accomplished. On the other hand, when the value |1/β3aW| is equal to or exceeds the upper limit of conditional expression (12), the image shifts largely even if the shift lens group shifts by a minute amount, so that it becomes difficult to control the position of the shift lens group.

Conditional expression (13) defines an appropriate range of the focal length of the front lens group as the shift lens group. When the ratio fW/f3a is equal to or exceeds the upper limit of conditional expression (13), refractive power of the front lens group becomes strong, so that aberrations produced in the front lens group becomes large. On the other hand, when the ratio fW/f3a is equal to or falls below the lower limit of conditional expression (13), refractive power of the front lens group becomes weak and the zoom lens system does not become afocal at the front lens group, so that variation in optical performance of the zoom lens system upon shifting the front lens group becomes large. It is undesirable.

Conditional expression (14) defines an appropriate range of the focal length of the fifth lens group. When the ratio f5/fT is equal to or exceeds the upper limit of conditional expression (14), refractive power of the fifth lens group becomes large and the aberrations produced in the fifth lens group becomes excessively large, so that it becomes difficult to shorten the closest shooting distance. On the other hand, when the ratio f5/fT is equal to or falls below the lower limit of conditional expression (14), refractive power of the fifth lens group becomes weak and although it becomes advantageous to correct various aberrations, the moving amount for focusing becomes large, so that when the system is installed in a camera, it becomes difficult to save space.

In a zoom lens system according to the third embodiment of the present invention, it is preferable that the front lens group of the third lens group has positive refractive power, and the rear lens group of the third lens group has positive refractive power, and the following conditional expression (15) is preferably satisfied:

$$1.3 < f3a/f3 < 1.6 \quad (15)$$

where f3 denotes the focal length of the third lens group.

Conditional expression (15) defines an appropriate range of the focal length of the front lens group of the third lens group. When the ratio f3a/f3 is equal to or exceeds the upper limit of conditional expression (15), Petzval sum becomes large in positive direction, so that the zoom lens system cannot be fast. On the other hand, when the ratio f3a/f3 is equal to or falls below the limit of conditional expression (15), Petzval sum becomes large in negative direction. Moreover, in order to obtain a given shift amount of the image, the more lens shift amount becomes necessary, so that the zoom lens system becomes large. It is undesirable.

In the zoom lens system according to the third embodiment of the present invention, it is preferable that the third lens group is constructed as described below in order to suppress variation in optical performance of the zoom lens system upon shifting to a minimum level.

The third lens group is preferably composed of, in order from the object, a front lens group having a cemented positive lens (the object side positive partial lens group) constructed by two lens elements that are a negative lens cemented with a positive lens, and a rear lens group having a cemented positive lens (the image side positive partial lens group) constructed by two lens elements that are a positive lens cemented with a negative lens.

As described above, in the front lens group, it is necessary that spherical aberration and sine condition are corrected. The above-described aberrations can be corrected by a cemented positive lens constructed by two lens elements that are a negative lens element and a positive lens element.

Spherical aberration has to be corrected even in the whole third lens group and off-axis aberrations have to be in a given state. Accordingly, it is necessary that spherical aberration is corrected in the rear lens group. By constructing the rear lens group by a cemented positive lens composed of two lens elements that are a positive lens element and a negative lens element, degradation of optical performance of the zoom lens system can be suppressed to a minimum level.

In the zoom lens system capable of shifting an image according to the third embodiment of the present invention, an aperture stop is preferably arranged to the object side adjacent to the front lens group in order to balance further high optical performance with degradation of optical performance upon sifting.

Generally, in a zoom lens system capable of shifting an image, in order to keep degradation of optical performance to a minimum level, lens shift is carried out by a lens group locating near to the aperture stop where off-axis bundle of rays passes near to the optical axis upon zooming, so that optical performance can be kept well.

Moreover, in the zoom lens system capable of shifting an image according to the third embodiment of the present invention, in order to prevent miss shooting by an image blur caused by a camera shake liable to happen to a high-zoom-ratio zoom lens, a shake detector for detecting a lens shake of a zoom lens system and a driver are arranged in combination with the shift lens group. A whole part or a portion of a lens group among the lens groups composing the zoom lens system is decentered as a shift lens group.

An image blur can be corrected by shifting an image by means of driving the shift lens group in order to correct the image blur (variation in an image position) caused by a lens shake detected by the shake detector. As described above, the zoom lens system capable of shifting an image according to the third embodiment of the present invention can be used for a vibration reduction optical system.

In the zoom lens system according to the third embodiment of the present invention, an aspherical lens is arranged in each of the second lens group and the fourth lens group.

By arranging an aspherical lens in the second lens group, variation in off-axis aberrations produced upon zooming from the wide-angle end state to the telephoto end state can be corrected well. By arranging an aspherical lens in the fourth lens group, variation in on-axis aberrations produced independently in the fourth lens group can be corrected well.

In the zoom lens system according to the third embodiment of the present invention, although the zoom lens system is composed of five lens groups, a lens group can be added to any distance between adjacent lens groups or another lens group can be added adjacent to the object side or the image side of any lens group.

Each example of the third embodiment is explained below with reference to accompanying drawings.

Figure 32:
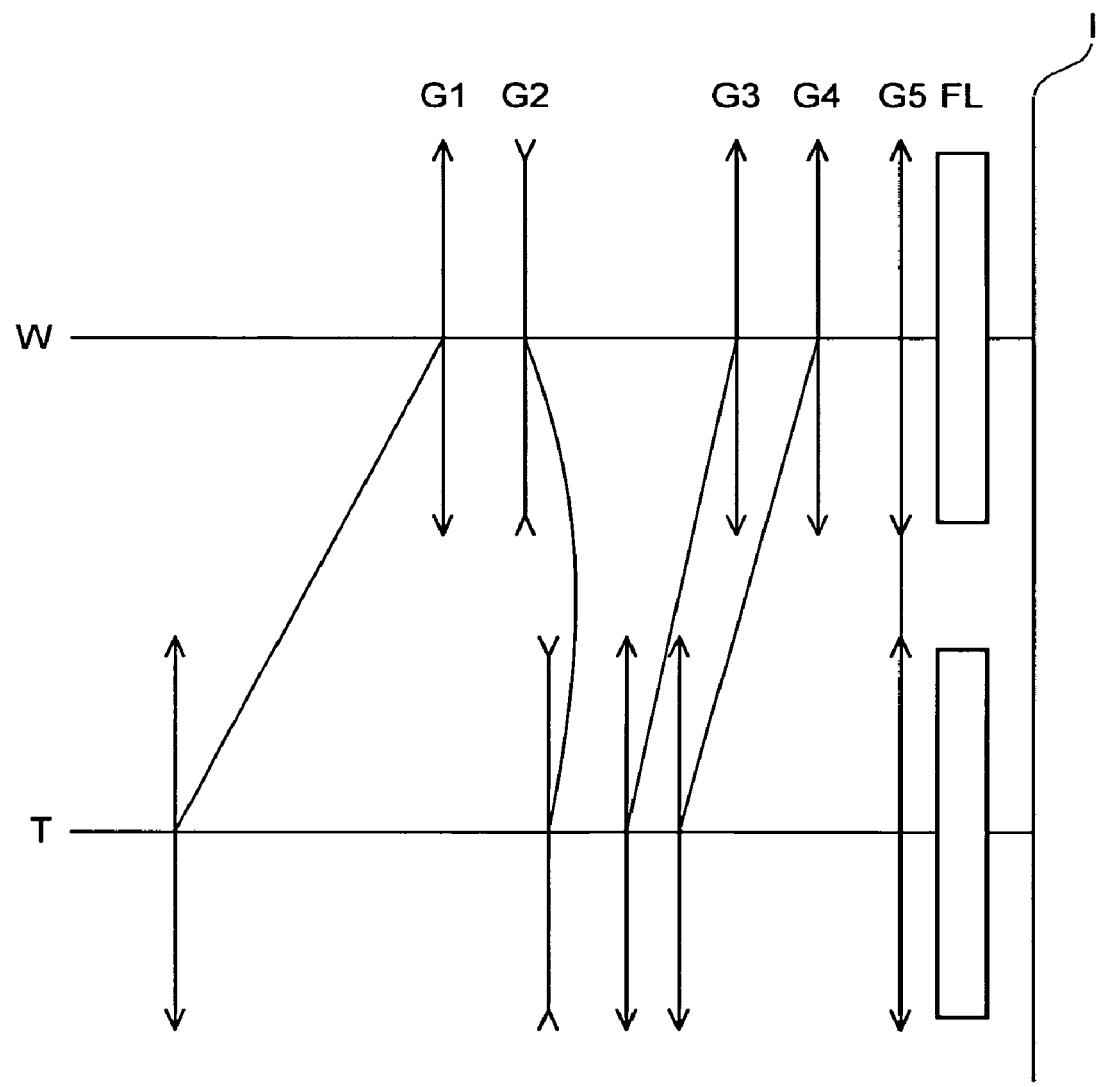
FIG. 32 is a graph showing power arrangement of a zoom lens system according to a third embodiment of the present invention together with zoom trajectories of respective lens groups in a wide-angle end state (W) and in a telephoto end state (T).

FIG. 32 is a graph showing power arrangement of a zoom lens system according to a third embodiment of the present invention together with zoom trajectories of respective lens groups in a wide-angle end state (W) and in a telephoto end state (T).

As shown in FIG. 32, a zoom lens system according to each example of the third embodiment is composed of, in order from an object, a first lens group G1 having positive refractive power, a second lens group G2 having negative refractive power, a third lens group G3 having positive refractive power, a fourth lens group G4 having positive refractive power, a fifth lens group G5 having positive refractive power, and a filter group FL composed of a low-pass filter, an infrared-cut filter, and the like. When a state of lens group positions varies from a wide-angle end state to a telephoto end state (in other word, zooming), the first lens group G1, the third lens group G3, and the fourth lens group G4 move to the object side, and the second lens group G2 moves such that a distance between the first lens group G1 and the second lens group G2 varies, a distance between the second lens group G2 and the third lens group G3 decreases, a distance between the third lens group G3 and the fourth lens group G4 varies, and a distance between the fourth lens group G4 and the fifth lens group G5 increases, and the fifth lens group carries out focusing.

EXAMPLE 8

Figure 33:
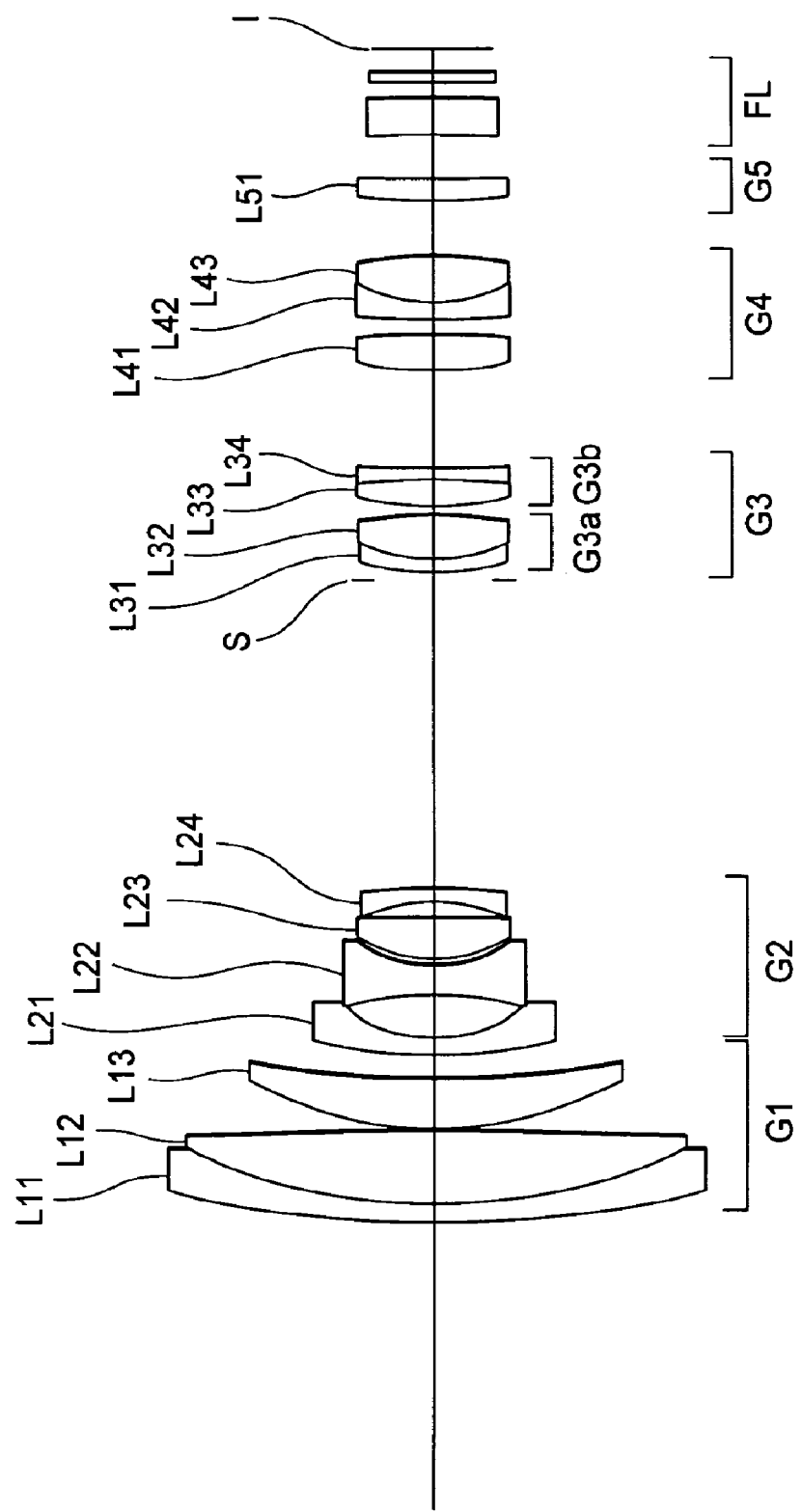
FIG. 33 is a sectional view showing lens construction of a zoom lens system according to Example 8 of the third embodiment of the present invention.

FIG. 33 is a sectional view showing lens construction of a zoom lens system according to Example 8 of the third embodiment of the present invention. In the zoom lens system according to Example 8, the first lens group G1 is composed of, in order from the object, a cemented positive lens constructed by a negative meniscus lens L11 having a concave surface facing to the image cemented with a double convex positive lens L12, and a positive meniscus lens L13 having a convex surface facing to the object. The second lens group G2 is composed of, in order from the object, a negative meniscus lens L21 having a convex surface facing to the object, a double concave negative lens L22, a positive meniscus lens L23 having a convex surface facing to the object, and a negative meniscus lens L24 having a concave surface facing to the object. The third lens group G3 is composed of, in order from the object, a cemented positive lens constructed by a negative meniscus lens L31 having a concave surface facing to the image cemented with a double convex positive lens L32, and a cemented positive lens constructed by a double convex positive lens L33 cemented with a double concave negative lens L34. The fourth lens group G4 is composed of, in order from the object, a double convex positive lens L41 having an aspherical surface facing to the object, and a cemented positive lens constructed by a negative meniscus lens L42 having a concave surface facing to the image cemented with a double convex positive lens L43. The fifth lens group G5 is composed of a positive meniscus lens L51 having a convex surface facing to the object. The filter group FL is composed of a low-pass filter, an infrared-cut filter, and the like.

The aperture stop S is arranged to the most object side of the third lens group G3 and moved together with the third lens group G3 upon zooming from the wide-angle end state to the telephoto end state.

In the third lens group G3 of the zoom lens system according to Example 8, the front lens group G3a is composed of a cemented positive lens constructed by a negative meniscus lens L31 having a concave surface facing to the image cemented with a double convex positive lens L32 and the rear lens group G3b is composed of a cemented positive lens constructed by a double convex positive lens L33 cemented with a double concave negative lens L34. The front lens group G3a is shifted substantially perpendicularly to the optical axis so as to shift an image, so that degradation of optical performance caused by camera shake and the like is corrected.

Various values associated with Example 8 are listed in Table 8.

TABLE 8

[Specifications]

| Lens State | | | | |
|---|---|---|---|---|
|  | W | M1 | M2 | T |
| f = | 5.82 | 16.27 | 30.00 | 44.23 |
| FNO = | 2.49 | 2.96 | 3.11 | 3.69 |
| 2ω = | 65.41 | 24.85 | 13.32 | 9.06 |

[Lens Data]

| | r | d | nd | νd |
|---|---|---|---|---|
| 1 | 65.7542 | 1.30 | 1.846660 | 23.78 |
| 2 | 35.5502 | 5.30 | 1.696800 | 55.52 |
| 3 | −513.0080 | 0.10 | | |
| 4 | 23.0000 | 3.65 | 1.497820 | 82.52 |
| 5 | 56.7395 | (D5) | | |
| 6 | 31.8468 | 1.19 | 1.834810 | 42.72 |
| 7 | 8.4511 | 3.03 | | |
| 8 | −25.2188 | 2.25 | 1.713000 | 53.85 |
| 9 | 8.3223 | 0.39 | | |
| 10 | 9.2050 | 2.80 | 1.846660 | 23.78 |
| 11 | 8345.6811 | 0.95 | | |
| 12 | −12.3953 | 0.98 | 1.713000 | 53.85 |
| 13 | −49.5178 | (D13) | | |
| 14 | 0.0000 | 0.50 | Aperture Stop S | |
| 15 | 17.0723 | 0.90 | 1.806100 | 40.94 |
| 16 | 10.0000 | 3.25 | 1.497820 | 82.52 |
| 17 | −36.7863 | 0.55 | | |
| 18 | 17.6621 | 2.00 | 1.487490 | 70.24 |
| 19 | −53.2711 | 0.90 | 1.563840 | 60.69 |
| 20 | 50.0000 | (D20) | | |
| 21* | 21.0867 | 2.50 | 1.589130 | 61.24 |
| 22 | −86.0015 | 1.01 | | |
| 23 | 41.5428 | 1.20 | 1.834000 | 37.17 |
| 24 | 9.7214 | 3.27 | 1.487490 | 70.24 |
| 25 | −32.0692 | (D25) | | |
| 26 | 37.4821 | 1.54 | 1.487490 | 70.24 |
| 27 | 100.0000 | (D27) | | |
| 28 | 0.0000 | 2.70 | 1.544370 | 70.51 |
| 39 | 0.0000 | 1.00 | | |

TABLE 8-continued

| | | | | |
|---|---|---|---|---|
| 30 | 0.0000 | 0.80 | 1.516800 | 64.20 |
| 31 | 0.0000 | (Bf) | | |

[Aspherical Data]
Surface Number 21

κ = +3.6973
C4 = −8.6004E−05
C6 = 4.1289E−07
C8 = −1.9509E−08
C10 = 2.4814E−10

[Variable Distances]

Lens State

| | W | M1 | M2 | T |
|---|---|---|---|---|
| f= | 5.8200 | 15.9986 | 29.9974 | 44.2275 |
| D5= | 1.6000 | 11.1835 | 18.5714 | 19.0651 |
| D13= | 21.5573 | 9.1193 | 6.2890 | 2.7603 |
| D20= | 6.9388 | 2.7636 | 2.5157 | 2.2721 |
| D25= | 3.8367 | 12.4830 | 14.3968 | 22.0353 |
| D27= | 3.1700 | 3.1700 | 3.1700 | 3.1700 |
| Bf= | 1.3301 | 1.3302 | 1.3301 | 1.3300 |

[Values for Conditional Expressions]

Figure 34A:
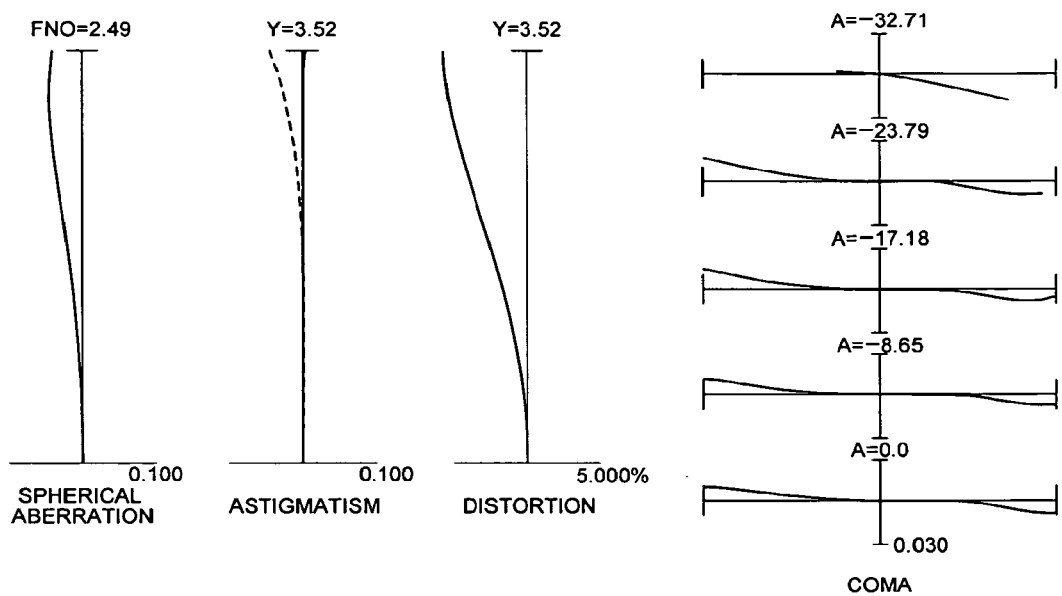
FIG. 34A is graphs showing various aberrations of the zoom lens system according to Example 8 in a wide-angle end state W focusing on infinity.
Figure 34B:
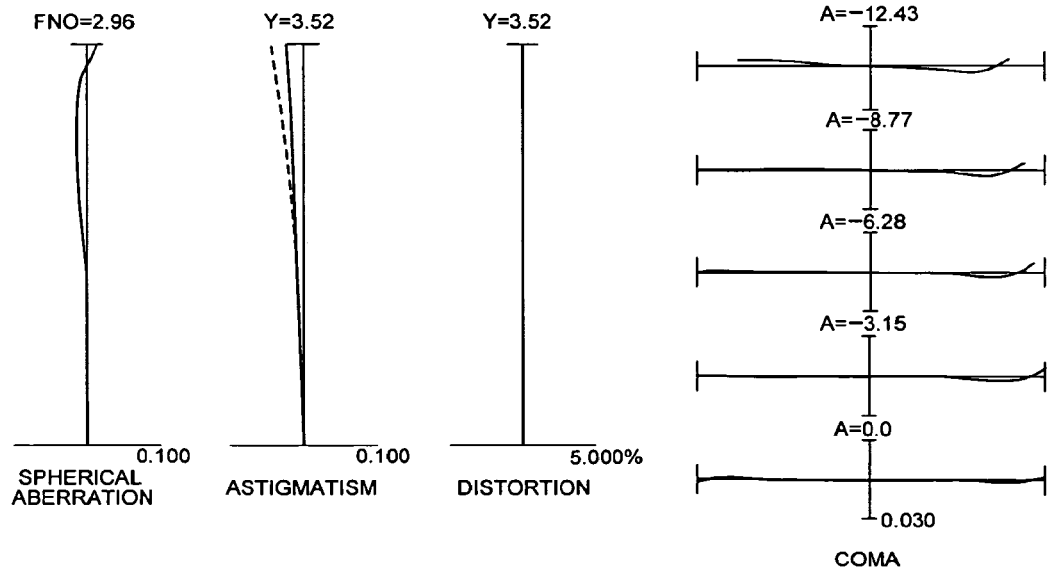
FIG. 34B is graphs showing various aberrations of the zoom lens system according to Example 8 in a wide-angle side intermediate focal length state M1 focusing on infinity.
Figure 35A:
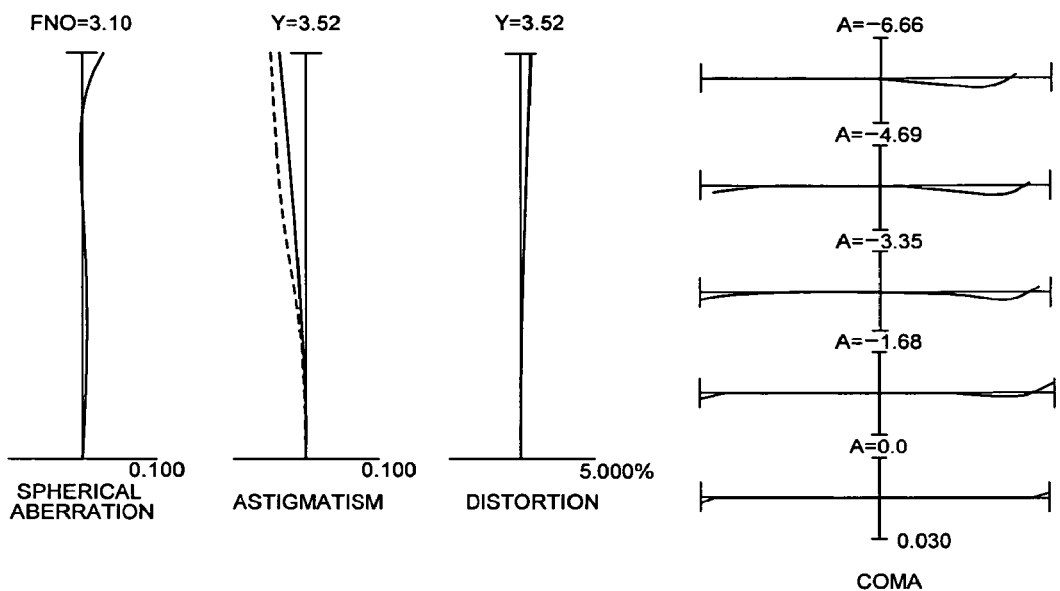
FIG. 35A is graphs showing various aberrations of the zoom lens system according to Example 8 in a telephoto side intermediate focal length state M2 focusing on infinity.
Figure 35B:
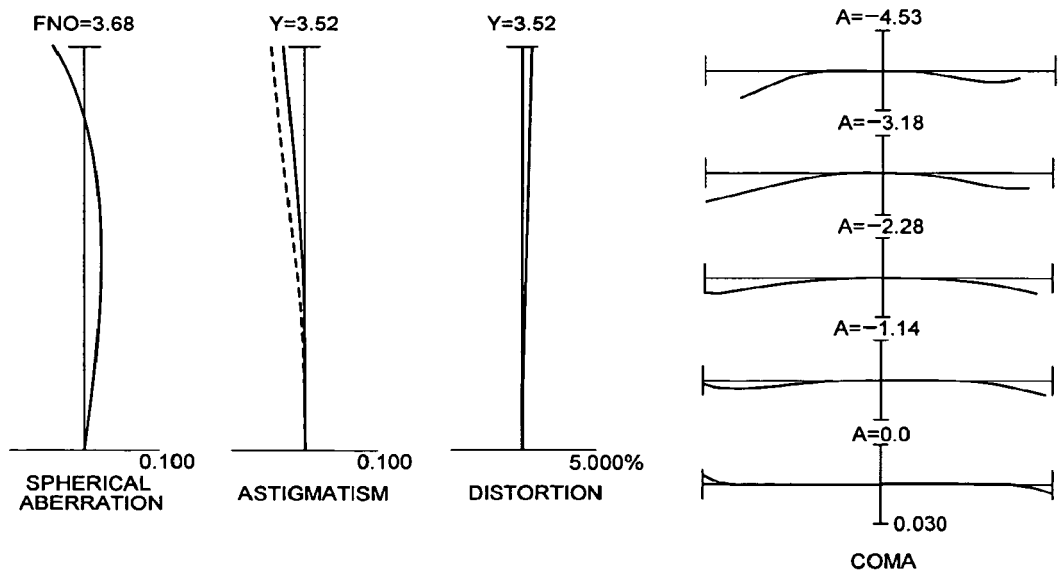
FIG. 35B is graphs showing various aberrations of the zoom lens system according to Example 8 in a telephoto end state T focusing on infinity.

$\beta 3aW = -19.28274$
$\beta 3aT = 2.297$
$fW = 5.82002$
$fT = 44.22752$
$f3 = 22.28895$
$f3a = 33.52776$
$f5 = 121.99999$
(11): $|1/\beta 3aW| = 0.05190$
(12): $(\beta 3aT)^2 = 5.27621$
(13): $fW/f3a = 0.17359$
(14): $f5/fT = 2.75846$
(15): $f3a/f3 = 1.50423$ FIGS. 34A through 36D are graphs showing various aberrations of the zoom lens system according to Example 8 of the third embodiment at d-line ($\lambda$=587.6 nm). FIG. 34A is graphs showing various aberrations in a wide-angle end state W (f=5.82 mm) focusing on infinity. FIG. 34B is graphs showing various aberrations in a wide-angle side intermediate focal length state M1 (f=16.00 mm) focusing on infinity. FIG. 35A is graphs showing various aberrations in a telephoto side intermediate focal length state M2 (f=30.00 mm) focusing on infinity. FIG. 35B is graphs showing various aberrations in a telephoto end state T (f=44.23 mm) focusing on infinity. FIG. 36A is graphs showing lateral aberrations in the wide-angle end state W (f=5.82 mm) upon shifting. FIG. 36B is graphs showing lateral aberrations in the wide-angle side intermediate focal length state M1 (f=16.00 mm) upon shifting. FIG. 36C is graphs showing lateral aberrations in the telephoto side intermediate focal length state M2 (f=30.00 mm) upon shifting. FIG. 36D is graphs showing lateral aberrations in the telephoto end state T (f=44.23 mm) upon shifting.

In graphs showing coma, values corresponding to each image height 0, 0.88, 1.76, 2.46, and 3.52 are shown. In graphs showing spherical aberration, solid line indicates spherical aberration and broken line indicates sine condition. In the following Examples, the same explanation of graphs as Example 8 is used, so that duplicated explanations are omitted.

As is apparent from various graphs, the zoom lens system according to Example 8 of the third embodiment has superb optical performance with preferably correcting various aberrations in each focal length from the wide-angle end state W to the telephoto end state T.

EXAMPLE 9

Figure 37:
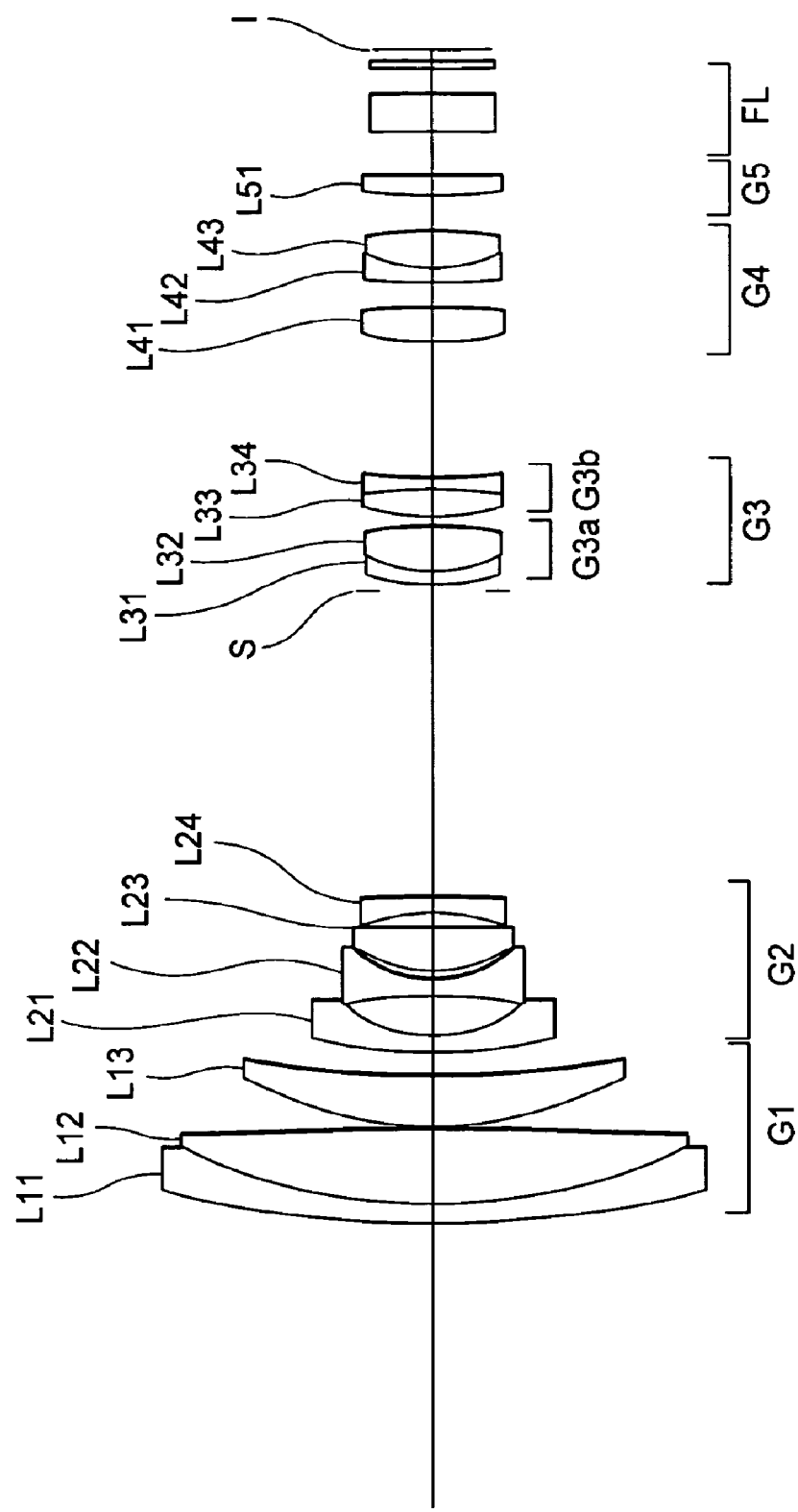
FIG. 37 is a sectional view showing lens construction of a zoom lens system according to Example 9 of the third embodiment of the present invention.

FIG. 37 is a sectional view showing lens construction of a zoom lens system according to Example 9 of the third embodiment of the present invention. In the zoom lens system according to Example 9, the first lens group G1 is composed of, in order from the object, a cemented positive lens constructed by a negative meniscus lens L11 having a concave surface facing to the image cemented with a double convex positive lens L12, and a positive meniscus lens L13 having a convex surface facing to the object. The second lens group G2 is composed of, in order from the object, a negative meniscus lens L21 having a convex surface facing to the object, a double concave negative lens L22, a positive meniscus lens L23 having a convex surface facing to the object, and a negative meniscus lens L24 having a concave surface facing to the object. The third lens group G3 is composed of, in order from the object, a cemented positive lens constructed by a negative meniscus lens L31 having a concave surface facing to the image cemented with a double convex positive lens L32, and a cemented positive lens constructed by a double convex positive lens L33 cemented with a double concave negative lens L34. The fourth lens group G4 is composed of, in order from the object, a double convex positive lens L41 having an aspherical surface facing to the object, and a cemented negative lens constructed by a negative meniscus lens L42 having a concave surface facing to the image cemented with a double convex positive lens L43. The fifth lens group G5 is composed of a positive meniscus lens L51 having a convex surface facing to the object. The filter group FL is composed of a low-pass filter, an infrared-cut filter, and the like.

The aperture stop S is arranged to the most object side of the third lens group G3 and moved together with the third lens group G3 upon zooming from the wide-angle end state to the telephoto end state.

In the third lens group G3 of the zoom lens system according to Example 9, the front lens group G3a is composed of a cemented positive lens constructed by a negative meniscus lens L31 having a concave surface facing to the image cemented with a double convex positive lens L32 and the rear lens group G3b is composed of a cemented positive lens constructed by a double convex positive lens L33 cemented with a double concave negative lens L34. The front lens group G3a is shifted substantially perpendicularly to the optical axis so as to shift an image, so that degradation of optical performance caused by camera shake and the like is corrected.

Various values associated with Example 9 are listed in Table 9.

TABLE 9

[Specifications]

| | Lens State | | | |
|---|---|---|---|---|
| | W | M1 | M2 | T |
| f = | 5.82 | 16.27 | 30.00 | 44.23 |
| FNO = | 2.78 | 3.16 | 3.51 | 3.99 |
| 2ω = | 65.41 | 24.40 | 13.31 | 9.04 |

[Lens Data]

| | r | d | nd | νd |
|---|---|---|---|---|
| 1 | 70.1853 | 1.30 | 1.84666 | 23.78 |
| 2 | 35.4090 | 5.30 | 1.69680 | 55.52 |
| 3 | −407.7267 | 0.10 | | |
| 4 | 23.0223 | 3.65 | 1.49782 | 82.52 |
| 5 | 57.0441 | (D5) | | |
| 6 | 29.6267 | 1.10 | 1.83481 | 42.72 |
| 7 | 8.4583 | 2.90 | | |
| 8 | −32.8579 | 1.35 | 1.71300 | 53.85 |
| 9 | 7.7756 | 0.45 | | |
| 10 | 8.6226 | 3.10 | 1.84666 | 23.78 |
| 11 | 205.2110 | 0.95 | | |
| 12 | −12.2779 | 1.20 | 1.71300 | 53.85 |
| 13 | −70.5745 | (D13) | | |
| 14 | ∞ | 0.50 | Aperture Stop S | |
| 15 | 17.5772 | 0.90 | 1.80610 | 40.94 |
| 16 | 9.9998 | 3.20 | 1.49782 | 82.52 |
| 17 | −33.2983 | 0.55 | | |
| 18 | 17.5780 | 2.00 | 1.48749 | 70.24 |
| 19 | −50.4870 | 0.90 | 1.56384 | 60.69 |
| 20 | 50.3217 | (D20) | | |
| 21* | 18.8065 | 2.50 | 1.58913 | 61.24 |
| 22 | −36.7072 | 1.60 | | |
| 23 | 59.1905 | 1.20 | 1.83400 | 37.17 |
| 24 | 9.7003 | 2.50 | 1.48749 | 70.24 |
| 25 | −70.4858 | (D25) | | |
| 26 | 32.9648 | 1.45 | 1.48749 | 70.24 |
| 27 | 100.2276 | (D27) | | |
| 28 | ∞ | 2.70 | 1.54437 | 70.51 |
| 29 | ∞ | 1.69 | | |
| 30 | ∞ | 0.50 | 1.51680 | 64.20 |
| 31 | ∞ | (Bf) | | |

[Aspherical Data]
Surface Number 21

κ = +1.0000
C4 = −6.9258E−05
C6 = 9.7550E−07
C8 = −5.9311E−08
C10 = 1.1428E−09

[Variable Distances]

| | Lens State | | | |
|---|---|---|---|---|
| | W | M1 | M2 | T |
| f = | 5.8199 | 16.2722 | 29.9984 | 44.2306 |
| D5 = | 1.6000 | 13.1903 | 18.5369 | 20.0370 |
| D13 = | 21.4272 | 9.8382 | 5.8813 | 2.9902 |
| D20 = | 9.5165 | 4.4212 | 3.8763 | 3.9143 |
| D25 = | 2.6565 | 10.2994 | 14.5032 | 20.1783 |
| D27 = | 2.8001 | 2.8001 | 2.8001 | 2.8001 |
| Bf = | 0.8058 | 0.8058 | 0.8056 | 0.8057 |

[Values for Conditional Expressions]

$\beta 3aW$ = −24.159
$\beta 3aT$ = 2.31493
fW = 5.81991
fT = 44.23063
f3 = 22.19071
f3a = 33.50923
f5 = 100.05532
(11): $|1/\beta 3aW|$ = 0.04139
(12): $(\beta 3aT)^2$ = 5.35890
(13): fW/f3a = 0.17368
(14): f5/fT = 2.26213
(15): f3a/f3 = 1.51006

Figure 38A:
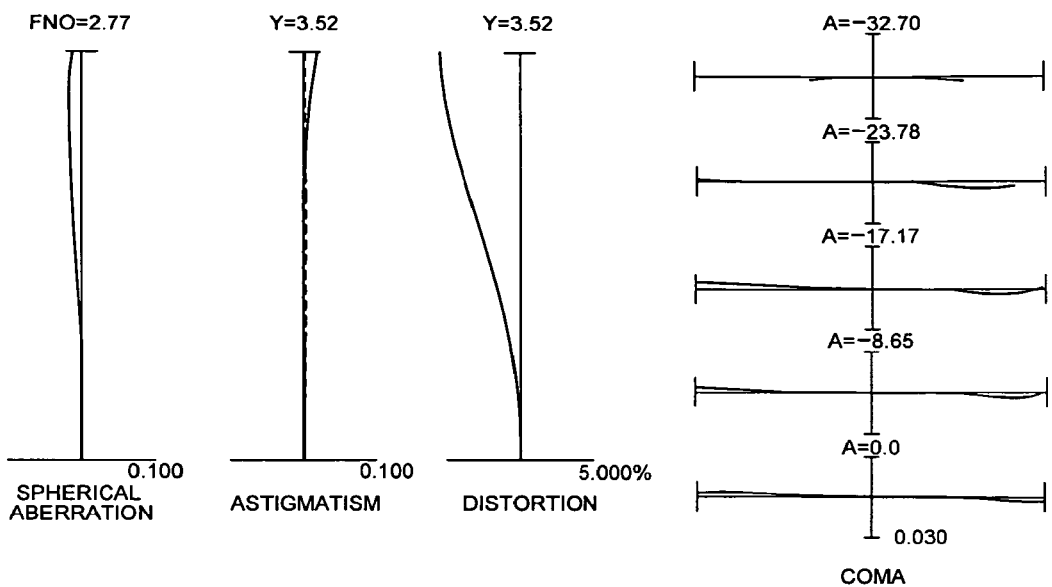
FIG. 38A is graphs showing various aberrations of the zoom lens system according to Example 9 in a wide-angle end state W focusing on infinity.
Figure 38B:
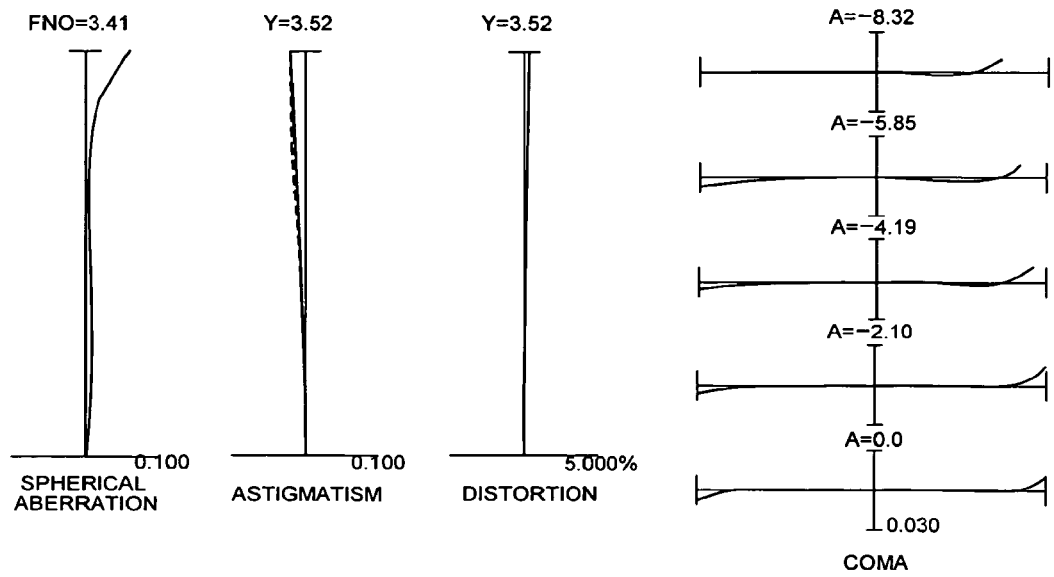
FIG. 38B is graphs showing various aberrations of the zoom lens system according to Example 9 in a wide-angle side intermediate focal length state M1 focusing on infinity.
Figure 39A:
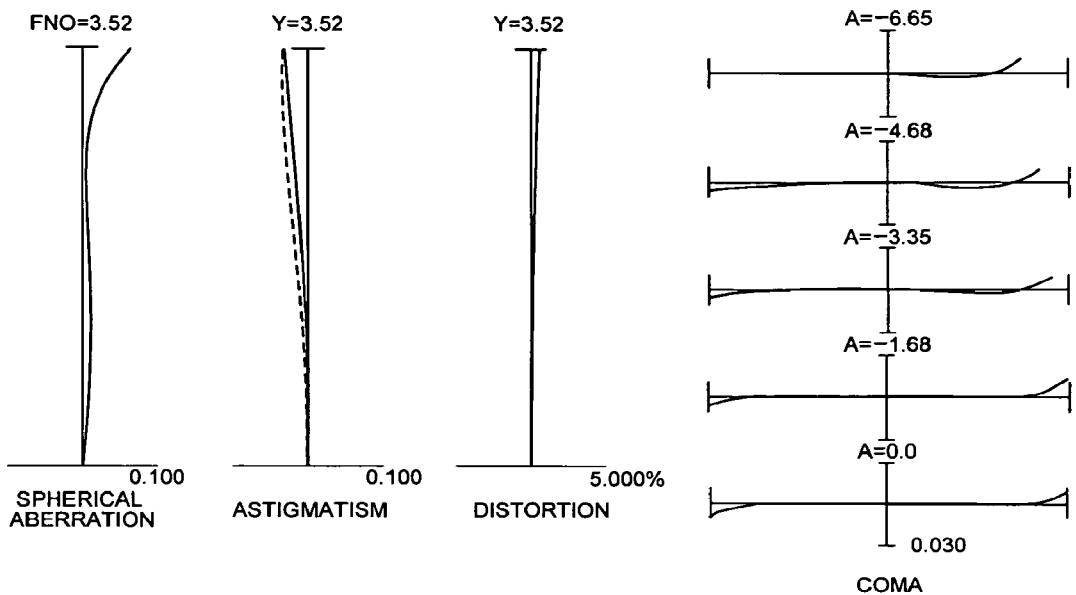
FIG. 39A is graphs showing various aberrations of the zoom lens system according to Example 9 in a telephoto side intermediate focal length state M2 focusing on infinity.
Figure 39B:
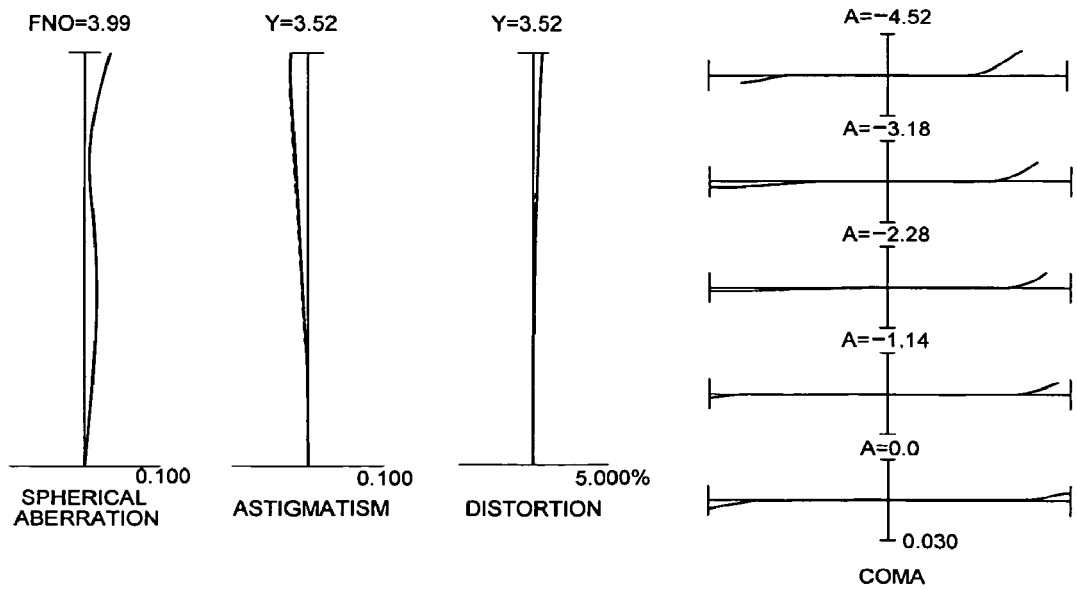
FIG. 39B is graphs showing various aberrations of the zoom lens system according to Example 9 in a telephoto end state T focusing on infinity.
Figure 40A:
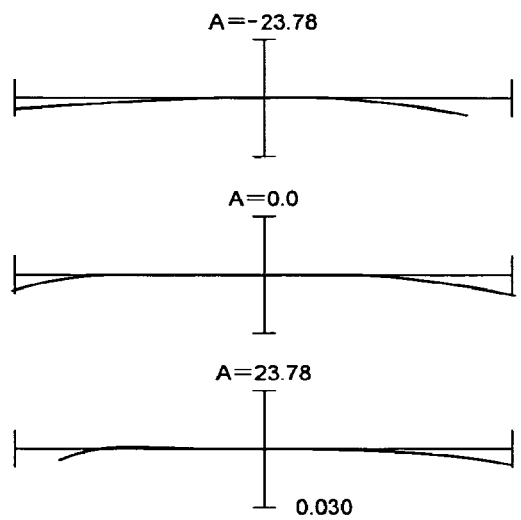
FIG. 40A is graphs showing lateral aberrations of the zoom lens system according to Example 9 in the wide-angle end state W upon shifting.
Figure 40B:
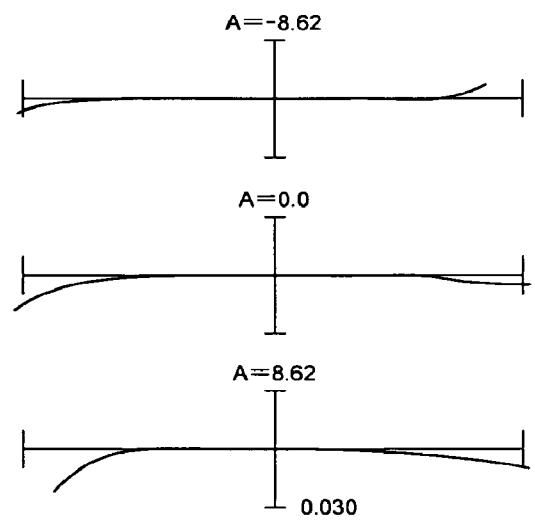
FIG. 40B is graphs showing lateral aberrations of the zoom lens system according to Example 9 in the wide-angle side intermediate focal length state M1 upon shifting.
Figure 40C:
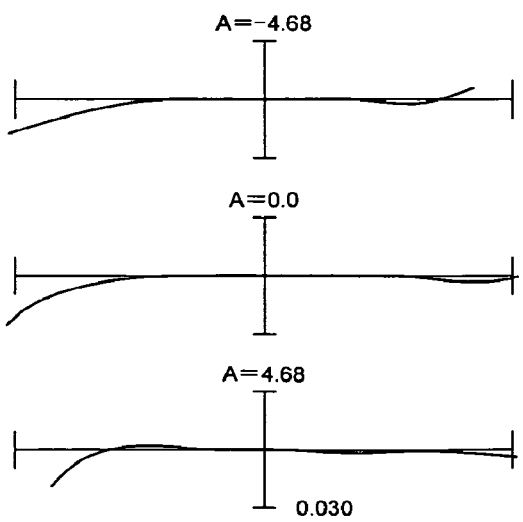
FIG. 40C is graphs showing lateral aberrations of the zoom lens system according to Example 9 in the telephoto side intermediate focal length state M2 upon shifting.
Figure 40D:
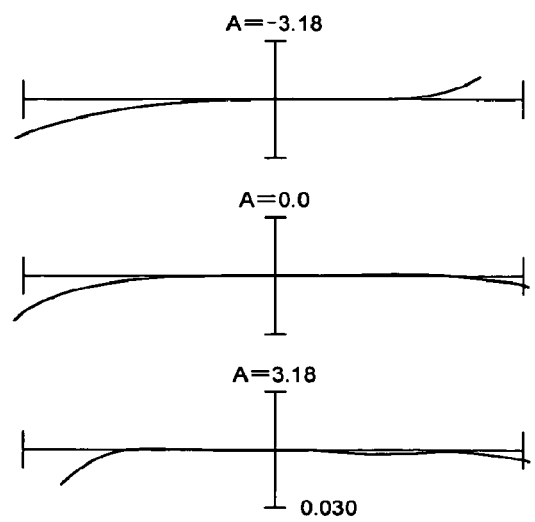
FIG. 40D is graphs showing lateral aberrations of the zoom lens system according to Example 9 in the telephoto end state T upon shifting.

FIGS. 38A through 40D are graphs showing various aberrations of the zoom lens system according to Example 9 of the third embodiment at d-line (λ=587.6 nm). FIG. 38A is graphs showing various aberrations in a wide-angle end state W (f=5.82 mm) focusing on infinity. FIG. 38B is graphs showing various aberrations in a wide-angle side intermediate focal length state M1 (f=16.27 mm) focusing on infinity. FIG. 39A is graphs showing various aberrations in a telephoto side intermediate focal length state M2 (f=30.00 mm) focusing on infinity. FIG. 39B is graphs showing various aberrations in a telephoto end state T (f=44.23 mm) focusing on infinity. FIG. 40A is graphs showing lateral aberrations in the wide-angle end state W (f=5.82 mm) upon shifting. FIG. 40B is graphs showing lateral aberrations in the wide-angle side intermediate focal length state M1 (f=16.27 mm) upon shifting. FIG. 40C is graphs showing lateral aberrations in the telephoto side intermediate focal length state M2 (f=30.00 mm) upon shifting. FIG. 40D is graphs showing lateral aberrations in the telephoto end state T (f=44.23 mm) upon shifting.

As is apparent from various graphs, the zoom lens system according to Example 9 of the third embodiment has superb optical performance with preferably correcting various aberrations in each focal length from the wide-angle end state W to the telephoto end state T.

EXAMPLE 10

FIG. 41 is a sectional view showing lens construction of a zoom lens system according to Example 10 of the third embodiment of the present invention. In the zoom lens system according to Example 10, the first lens group G1 is composed of, in order from the object, a cemented positive lens constructed by a negative meniscus lens L11 having a concave surface facing to the image cemented with a double convex positive lens L12, and a positive meniscus lens L13 having a convex surface facing to the object. The second lens group G2 is composed of, in order from the object, a negative meniscus lens L21 having a convex surface facing to the object, a double concave negative lens L22, a positive meniscus lens L23 having a convex surface facing to the object, and a negative meniscus lens L24 having a concave surface facing to the object. The third lens group G3 is composed of, in order from the object, a cemented positive lens constructed by a negative meniscus lens L31 having a concave surface facing to the image cemented with a double convex positive lens L32, and a cemented positive lens constructed by a double convex positive lens L33 cemented with a double concave negative lens L34. The fourth lens group G4 is composed of, in order from the object, a double convex positive lens L41 having an aspherical surface facing to the object, and a cemented negative lens constructed by a negative meniscus lens L42 having a concave surface facing to the image cemented with a double convex positive lens L43. The fifth lens group G5 is composed of a positive meniscus lens L51 having a convex surface facing to the object. The filter group FL is composed of a low-pass filter, an infrared-cut filter, and the like.

The aperture stop S is arranged to the most object side of the third lens group G3 and moved together with the third lens group G3 upon zooming from the wide-angle end state to the telephoto end state.

In the third lens group G3 of the zoom lens system according to Example 10, the front lens group G3a is composed of a cemented positive lens constructed by a negative meniscus lens L31 having a concave surface facing to the image cemented with a double convex positive lens L32 and the rear lens group G3b is composed of a cemented positive lens constructed by a double convex positive lens L33 cemented with a double concave negative lens L34. The front lens group G3a is shifted substantially perpendicularly to the optical axis so as to shift an image, so that degradation of optical performance caused by camera shake and the like is corrected.

Various values associated with Example 10 are listed in Table 10.

TABLE 10

[Specifications]

| | Lens State | | | |
|---|---|---|---|---|
| | W | M1 | M2 | T |
| f = | 5.82 | 16.27 | 30.00 | 44.23 |
| FNO = | 2.78 | 3.17 | 3.51 | 4.10 |
| 2ω = | 65.41 | 24.41 | 13.31 | 9.05 |

[Lens Data]

| | r | d | nd | νd |
|---|---|---|---|---|
| 1 | 70.1623 | 1.30 | 1.84666 | 23.78 |
| 2 | 35.3843 | 5.30 | 1.69680 | 55.52 |
| 3 | −403.4706 | 0.10 | | |
| 4 | 23.0000 | 3.65 | 1.49782 | 82.52 |
| 5 | 56.7395 | (D5) | | |
| 6 | 28.9849 | 1.10 | 1.83481 | 42.72 |
| 7 | 8.4431 | 2.90 | | |
| 8 | −31.5003 | 1.35 | 1.71300 | 53.85 |
| 9 | 7.7737 | 0.45 | | |
| 10 | 8.6356 | 3.10 | 1.84666 | 23.78 |
| 11 | 216.9322 | 0.95 | | |
| 12 | −12.3144 | 1.20 | 1.71300 | 53.85 |
| 13 | −69.8020 | (D13) | | |
| 14 | ∞ | 0.50 | Aperture Stop S | |
| 15 | 17.5716 | 0.90 | 1.80610 | 40.94 |
| 16 | 10.0000 | 3.20 | 1.49782 | 82.52 |
| 17 | −33.3548 | 0.55 | | |
| 18 | 17.5774 | 2.00 | 1.48749 | 70.24 |
| 19 | −52.9813 | 0.90 | 1.56384 | 60.69 |
| 20 | 50.0000 | (D20) | | |
| 21* | 18.7998 | 2.50 | 1.58913 | 61.24 |
| 22 | −36.7012 | 1.60 | | |
| 23 | 59.3010 | 1.20 | 1.83400 | 37.17 |
| 24 | 9.7000 | 2.50 | 1.48749 | 70.24 |
| 25 | −70.3391 | (D25) | | |
| 26 | 32.9284 | 1.45 | 1.48749 | 70.24 |
| 27 | 100.0000 | (D27) | | |
| 28 | ∞ | 2.70 | 1.54437 | 70.51 |
| 29 | ∞ | 1.00 | | |
| 30 | ∞ | 0.80 | 1.51680 | 64.20 |
| 31 | ∞ | (Bf) | | |

[Aspherical Data]
Surface Number 21

κ = +1.0227
C4 = −6.8989E−05
C6 = 1.0060E−06
C8 = −6.1528E−08
C10 = 1.1967E−09

[Variable Distances]

| | Lens State | | | |
|---|---|---|---|---|
| | W | M1 | M2 | T |
| f = | 5.8200 | 16.2716 | 30.0001 | 44.2323 |
| D5 = | 1.6000 | 13.1964 | 18.5357 | 19.5242 |
| D13 = | 21.4272 | 9.8320 | 5.8827 | 2.8026 |
| D20 = | 9.5165 | 4.1914 | 3.8756 | 3.6555 |
| D25 = | 2.6562 | 10.3094 | 14.5025 | 21.4177 |
| D27 = | 2.8001 | 2.8001 | 2.8001 | 2.8001 |
| Bf = | 1.3001 | 1.3002 | 1.3003 | 1.3005 |

[Values for Conditional Expressions]

β3aW = −24.34281
β3aT = 2.25499
fW = 5.81995
fT = 44.23234
f3 = 22.19417
f3a = 33.51941
f5 = 99.99999
(11): |1/β3aW| = 0.04108
(12): (β3aT)$^2$ = 5.08498
(13): fW/f3a = 0.17363
(14): f5/fT = 2.26079
(15): f3a/f3 = 1.51028

Figure 42A:
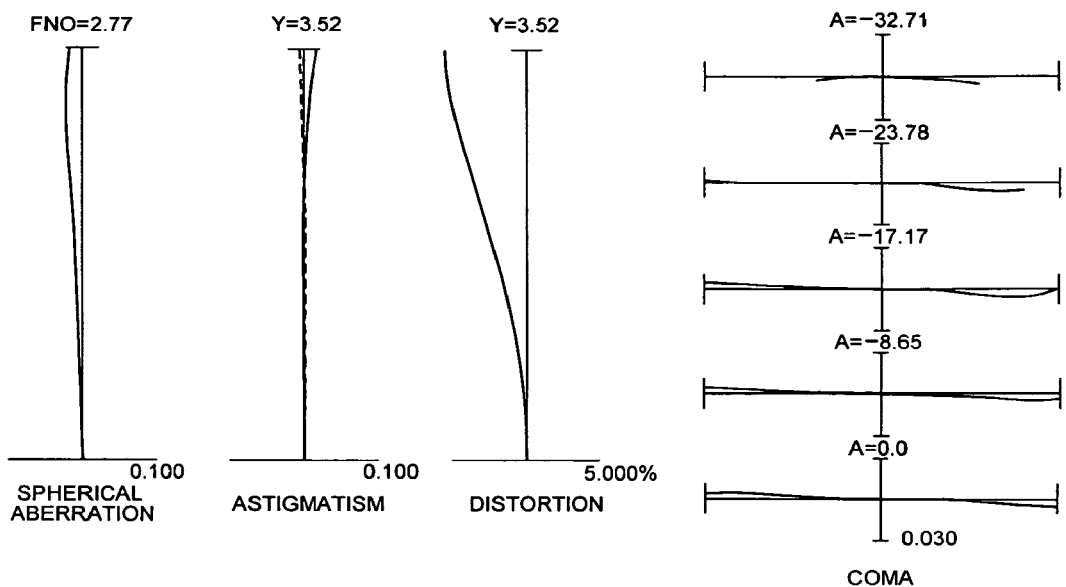
FIG. 42A is graphs showing various aberrations of the zoom lens system according to Example 10 in a wide-angle end state W focusing on infinity.
Figure 42B:
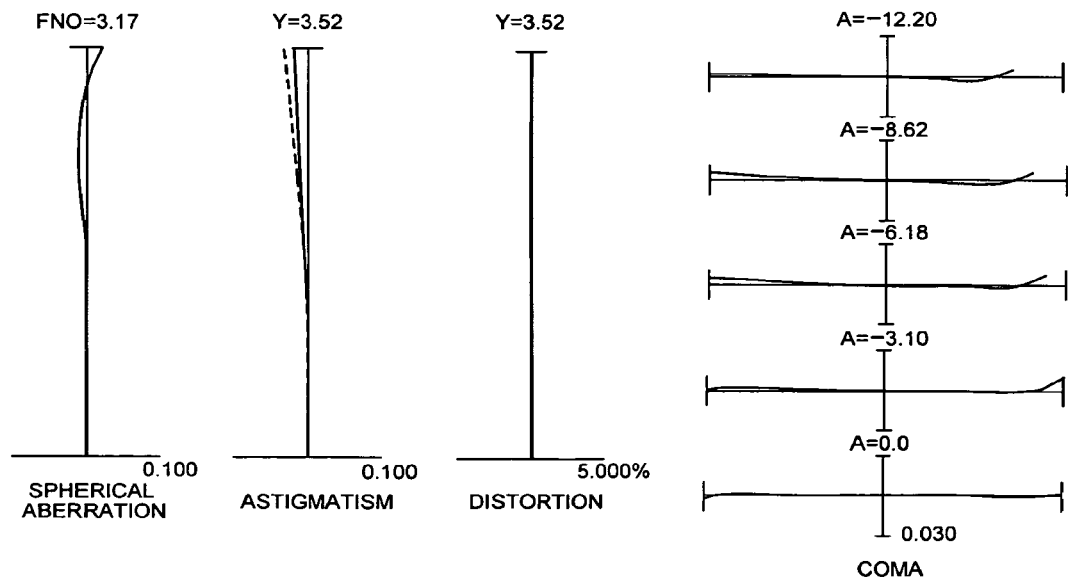
FIG. 42B is graphs showing various aberrations of the zoom lens system according to Example 10 in a wide-angle side intermediate focal length state M1 focusing on infinity.
Figure 43A:
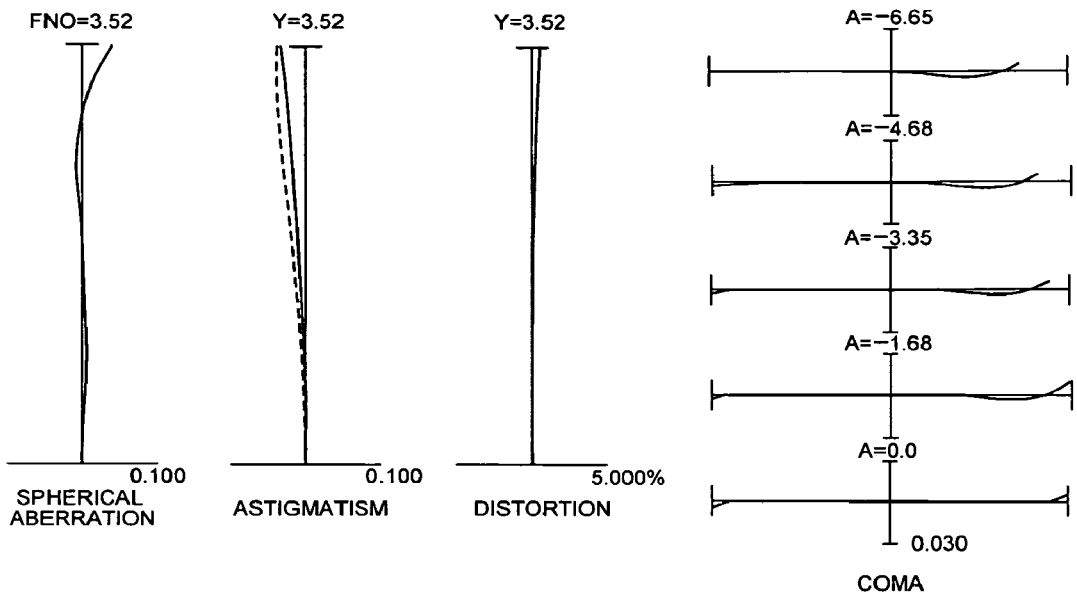
FIG. 43A is graphs showing various aberrations of the zoom lens system according to Example 10 in a telephoto side intermediate focal length state M2 focusing on infinity.
Figure 43B:
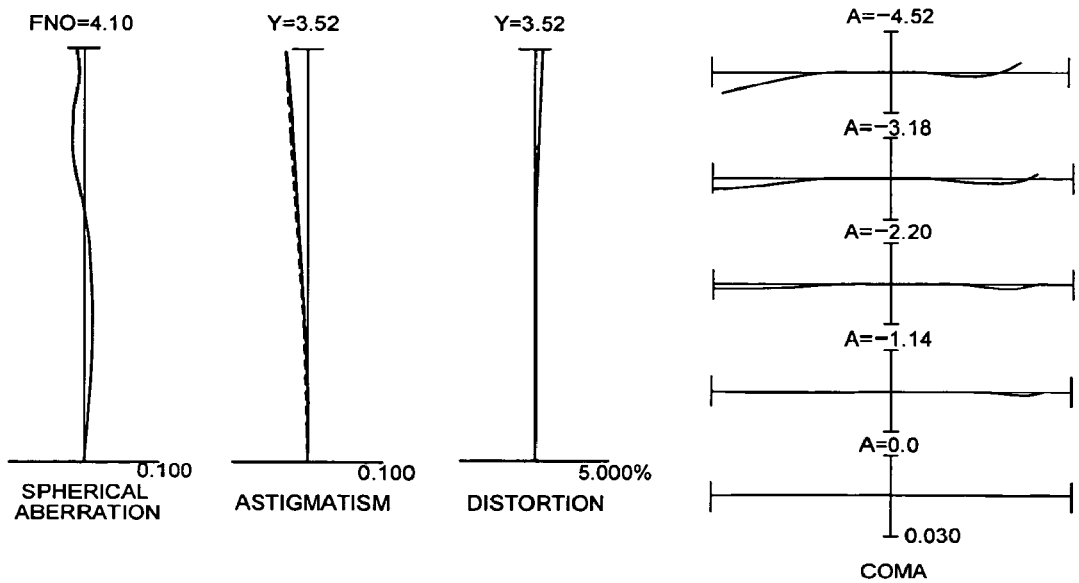
FIG. 43B is graphs showing various aberrations of the zoom lens system according to Example 10 in a telephoto end state T focusing on infinity.
Figure 44A:
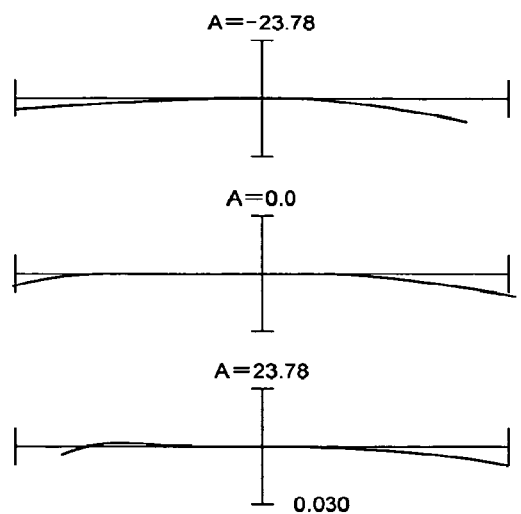
FIG. 44A is graphs showing lateral aberrations of the zoom lens system according to Example 10 in the wide-angle end state W upon shifting.
Figure 44B:
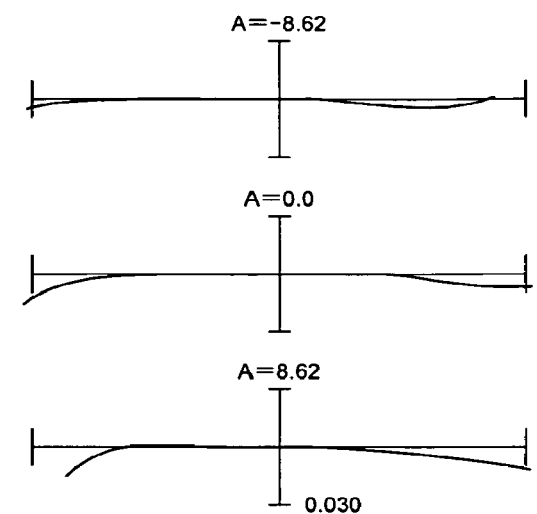
FIG. 44B is graphs showing lateral aberrations of the zoom lens system according to Example 10 in the wide-angle side intermediate focal length state M1 upon shifting.
Figure 44C:
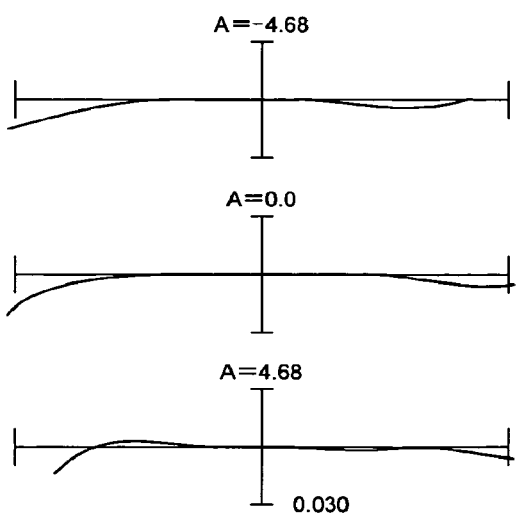
FIG. 44C is graphs showing lateral aberrations of the zoom lens system according to Example 10 in the telephoto side intermediate focal length state M2 upon shifting.
Figure 44D:
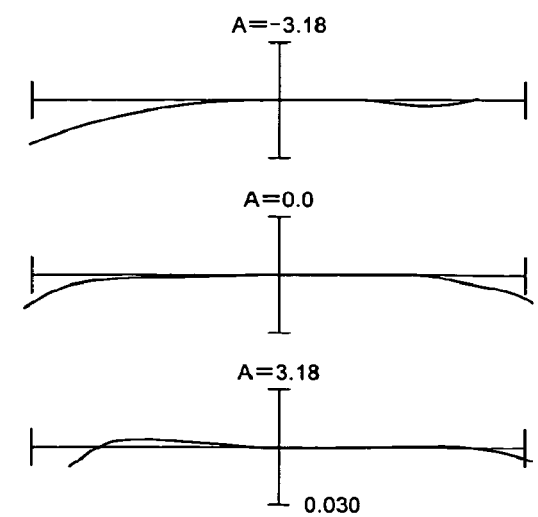
FIG. 44D is graphs showing lateral aberrations of the zoom lens system according to Example 10 in the telephoto end state T upon shifting.

FIGS. 42A through 44D are graphs showing various aberrations of the zoom lens system according to Example 10 of the third embodiment at d-line (λ=587.6 nm). FIG. 42A is graphs showing various aberrations in a wide-angle end state W (f=5.82 mm) focusing on infinity. FIG. 42B is graphs showing various aberrations in a wide-angle side intermediate focal length state M1 (f=16.27 mm) focusing on infinity. FIG. 43A is graphs showing various aberrations in a telephoto side intermediate focal length state M2 (f=30.00 mm) focusing on infinity. FIG. 43B is graphs showing various aberrations in a telephoto end state T (f=44.23 mm) focusing on infinity. FIG. 44A is graphs showing lateral aberrations in the wide-angle end state W (f=5.82 mm) upon shifting. FIG. 44B is graphs showing lateral aberrations in the wide-angle side intermediate focal length state M1 (f=16.27 mm) upon shifting. FIG. 44C is graphs showing lateral aberrations in the telephoto side intermediate focal length state M2 (f=30.00 mm) upon shifting. FIG. 44D is graphs showing lateral aberrations in the telephoto end state T (f=44.23 mm) upon shifting.

As is apparent from various graphs, the zoom lens system according to Example 10 of the third embodiment has superb optical performance with preferably correcting various aberrations in each focal length from the wide-angle end state W to the telephoto end state T.

EXAMPLE 11

Figure 45:
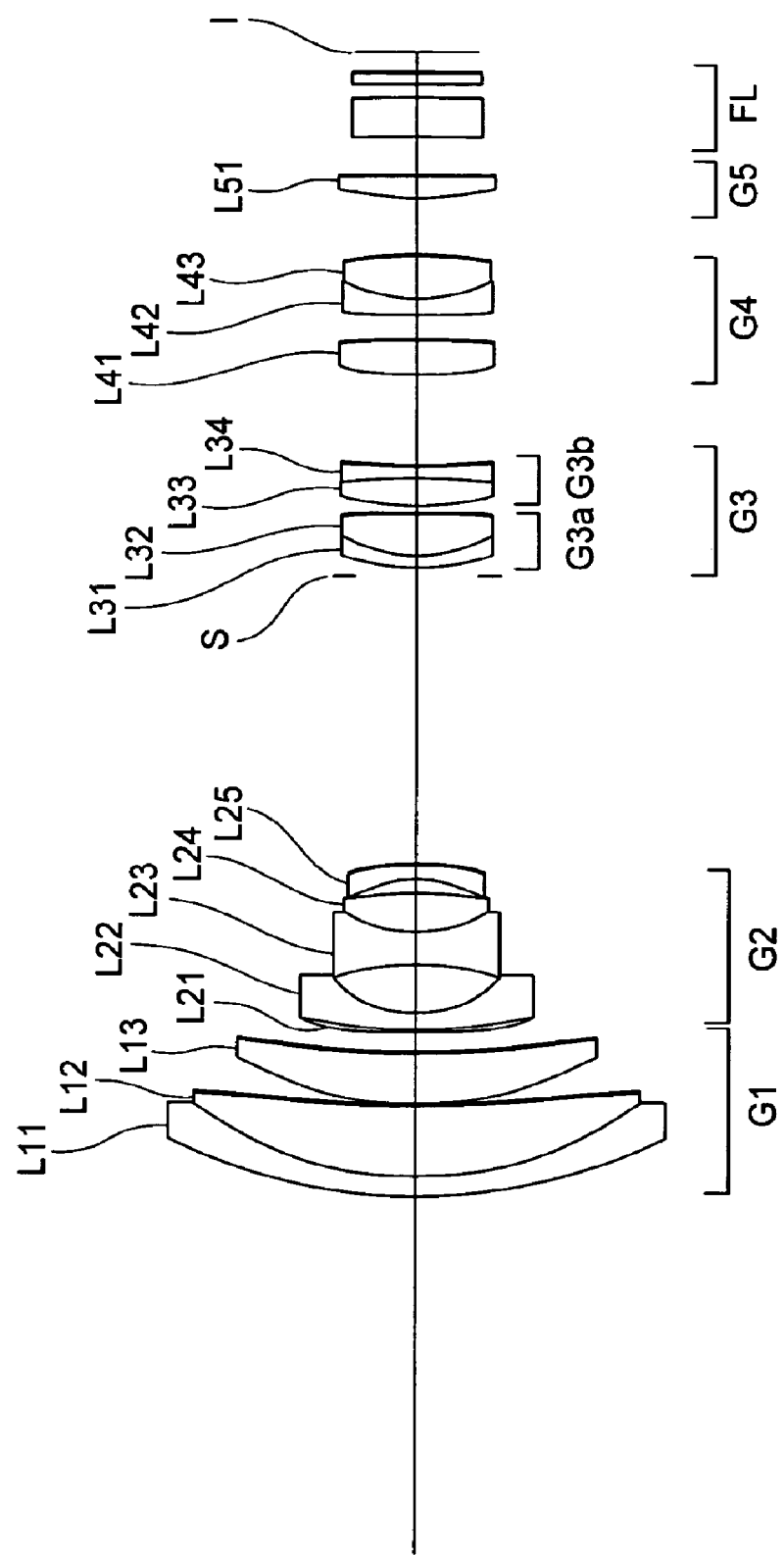
FIG. 45 is a sectional view showing lens construction of a zoom lens system according to Example 11 of the third embodiment of the present invention.

FIG. 45 is a sectional view showing lens construction of a zoom lens system according to Example 11 of the third embodiment of the present invention. In the zoom lens system according to Example 11, the first lens group G1 is composed of, in order from the object, a cemented positive lens constructed by a negative meniscus lens L11 having a concave surface facing to the image cemented with a double convex positive lens L12, and a positive meniscus lens L13 having a convex surface facing to the object. The second lens group G2 is composed of, in order from the object, a cemented negative lens constructed by a negative meniscus lens L21 having a concave surface facing to the image and an aspherical surface facing to the object cemented with a negative meniscus lens L22 having a concave surface facing to the image, a cemented negative lens constructed by a double concave negative lens L23 cemented with a double convex positive lens L24, and a negative meniscus lens L25 having a concave surface facing to the object. The third lens group G3 is composed of, in order from the object, a cemented positive lens constructed by a negative meniscus lens L31 having a concave surface facing to the image cemented with a double convex positive lens L32, and a cemented positive lens constructed by a double convex positive lens L33 cemented with a double concave negative lens L34. The fourth lens group G4 is composed of, in order from the object, a double convex positive lens L41 having an aspherical surface facing to the object, and a cemented negative lens constructed by a negative meniscus lens L42 having a concave surface facing to the image cemented with a double convex positive lens L43. The fifth lens group G5 is composed of a positive meniscus lens L51 having a convex surface facing to the object. The filter group FL is composed of a low-pass filter, an infrared-cut filter, and the like.

The aperture stop S is arranged to the most object side of the third lens group G3 and moved together with the third lens group G3 upon zooming from the wide-angle end state to the telephoto end state.

In the third lens group G3 of the zoom lens system according to Example 11, the front lens group G3a is composed of a cemented positive lens constructed by a negative meniscus lens L31 having a concave surface facing to the image cemented with a double convex positive lens L32 and the rear lens group G3b is composed of a cemented positive lens constructed by a double convex positive lens L33 cemented with a double concave negative lens L34. The front lens group G3a is shifted substantially perpendicularly to the optical axis so as to shift an image, so that degradation of optical performance caused by camera shake and the like is corrected.

Various values associated with Example 11 are listed in Table 11.

TABLE 11

[Specifications]

| | Lens State | | | |
|---|---|---|---|---|
| | W | M1 | M2 | T |
| f = | 5.82 | 16.00 | 30.00 | 44.23 |
| FNO = | 2.49 | 2.99 | 3.17 | 3.77 |
| 2ω = | 64.68 | 25.03 | 13.45 | 9.10 |

[Lens Data]

| | r | d | nd | vd |
|---|---|---|---|---|
| 1 | 35.6044 | 1.30 | 1.846660 | 23.78 |
| 2 | 23.0000 | 5.30 | 1.713000 | 53.85 |
| 3 | 100.9202 | 0.10 | | |

TABLE 11-continued

| | | | | |
|---|---|---|---|---|
| 4 | 23.4629 | 3.65 | 1.497820 | 82.52 |
| 5 | 59.8785 | (D5) | | |
| 6* | 88.5329 | 0.13 | 1.553890 | 38.09 |
| 7 | 39.6571 | 1.10 | 1.834810 | 42.72 |
| 8 | 7.5344 | 3.45 | | |
| 9 | −15.0929 | 2.25 | 1.717000 | 47.93 |
| 10 | 9.9592 | 2.80 | 1.846660 | 23.78 |
| 11 | −28.7399 | 0.95 | | |
| 12 | −8.4622 | 1.20 | 1.713000 | 53.85 |
| 13 | −17.6123 | (D13) | | |
| 14 | ∞ | 0.50 | Aperture Stop S | |
| 15 | 15.0669 | 0.90 | 1.806100 | 40.94 |
| 16 | 9.1457 | 3.20 | 1.497820 | 82.52 |
| 17 | −49.8115 | 0.55 | | |
| 18 | 18.7910 | 2.00 | 1.487490 | 70.24 |
| 19 | −43.4181 | 0.90 | 1.563840 | 60.69 |
| 20 | 50.0000 | (D20) | | |
| 21* | 19.7825 | 2.50 | 1.589130 | 61.24 |
| 22 | −49.1300 | 1.70 | | |
| 23 | 86.3436 | 1.20 | 1.834000 | 37.17 |
| 24 | 9.7000 | 3.30 | 1.487490 | 70.24 |
| 25 | −31.5477 | (D25) | | |
| 26 | 22.7664 | 1.60 | 1.487490 | 70.24 |
| 27 | 100.0000 | (D27) | | |
| 28 | ∞ | 2.70 | 1.516800 | 64.20 |
| 29 | ∞ | 1.00 | | |
| 30 | ∞ | 0.80 | 1.544370 | 70.51 |
| 31 | ∞ | (Bf) | | |

[Aspherical Data]

Surface Number 6

κ = +11.000
C4 = 1.4314E−04
C6 = −2.1112E−07
C8 = −1.6666E−08
C10 = 2.8708E−10

Surface Number 21

κ = +2.2791
C4 = −7.6070E−05
C6 = −2.6563E−07
C8 = 2.2570E−08
C10 = −3.3764E−10

[Variable Distances]

| | Lens State | | | |
|---|---|---|---|---|
| | W | M1 | M2 | T |
| f= | 5.8200 | 16.0001 | 30.0004 | 44.2326 |
| D5= | 1.6000 | 11.1393 | 17.4393 | 18.0958 |
| D13= | 20.5326 | 9.0517 | 5.9063 | 2.5118 |
| D20= | 6.5000 | 2.2817 | 2.0773 | 1.7158 |
| D25= | 4.0651 | 12.5666 | 15.0321 | 22.5666 |
| D27= | 2.7701 | 2.7701 | 2.7701 | 2.7701 |
| Bf= | 1.3300 | 1.3300 | 1.3298 | 1.3296 |

[Values for Conditional Expressions]

β3aW = −17.54465
β3aT = 2.49249
fW = 5.82002
fT = 44.23262
f3 = 23.23575
f3a = 33.35755
f5 = 60.05977
(11): |1/β3aW| = 0.05700
(12): (β3aT)$^2$ = 6.21251
(13): fW/f3a = 0.17447
(14): f5/fT = 1.35782
(15): f3a/f3 = 1.43561

FIGS. 46A through 48D are graphs showing various aberrations of the zoom lens system according to Example 11 of the third embodiment at d-line (λ=587.6 nm). FIG.

Figure 46A:
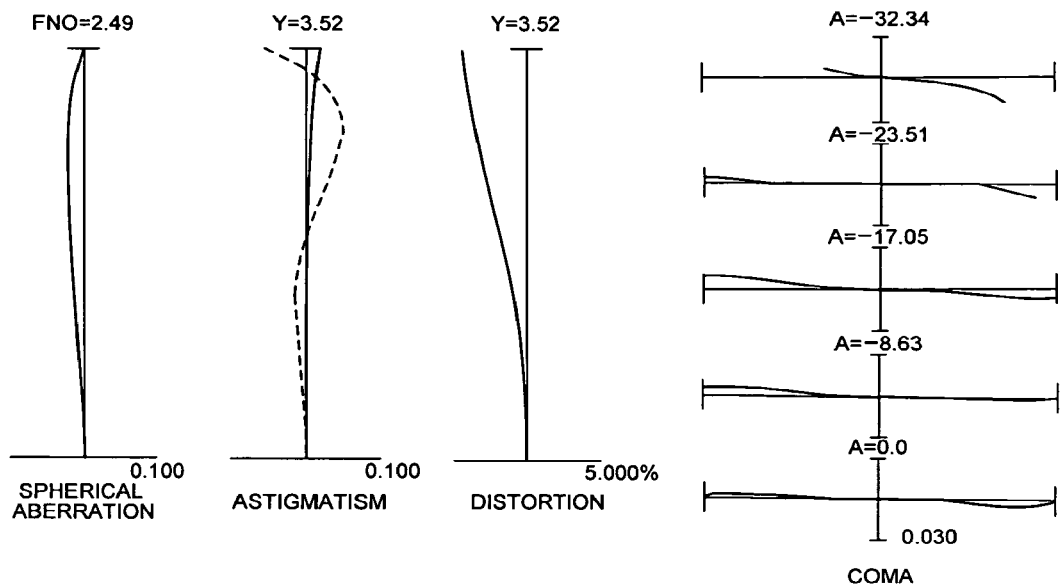
FIG. 46A is graphs showing various aberrations of the zoom lens system according to Example 11 in a wide-angle end state W focusing on infinity.
Figure 46B:
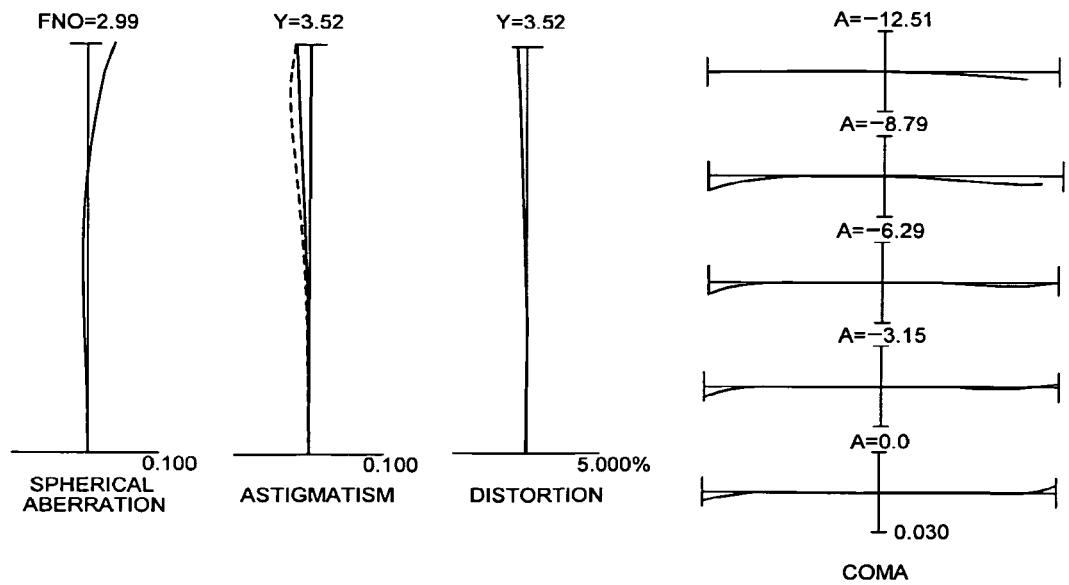
FIG. 46B is graphs showing various aberrations of the zoom lens system according to Example 11 in a wide-angle side intermediate focal length state M1 focusing on infinity.
Figure 47A:
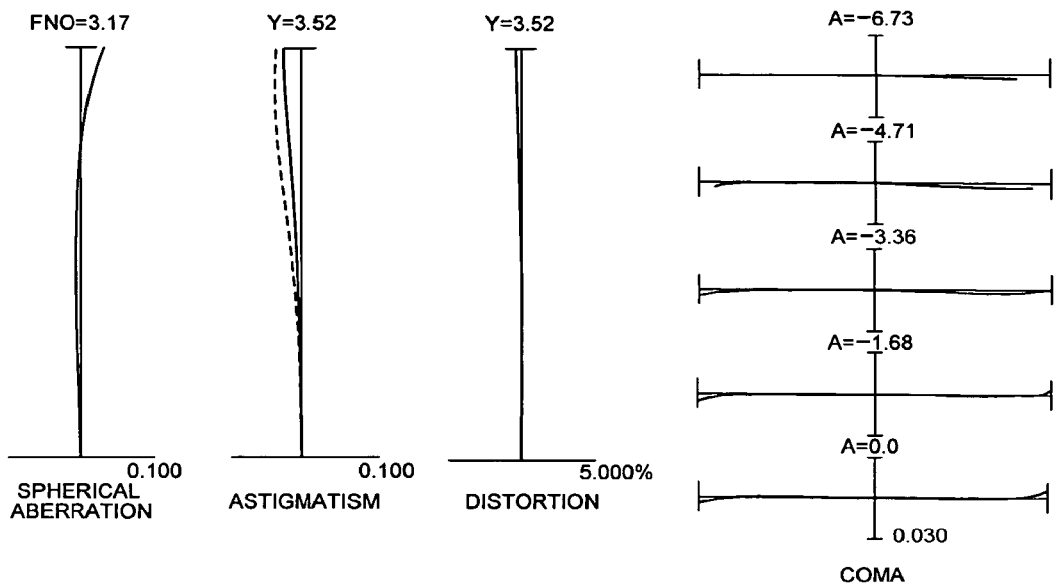
FIG. 47A is graphs showing various aberrations of the zoom lens system according to Example 11 in a telephoto side intermediate focal length state M2 focusing on infinity.
Figure 47B:
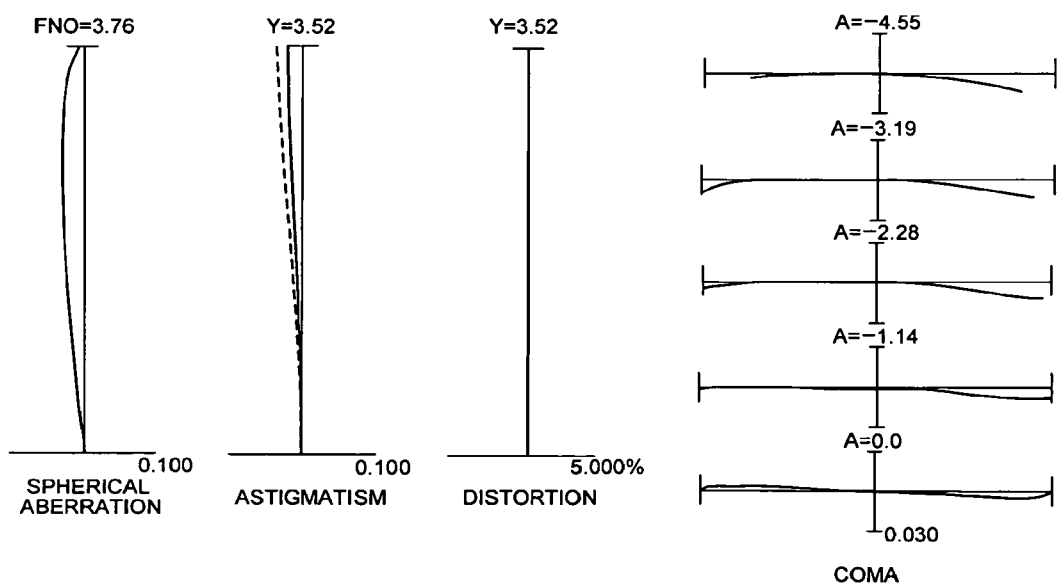
FIG. 47B is graphs showing various aberrations of the zoom lens system according to Example 11 in a telephoto end state T focusing on infinity.
Figure 48A:
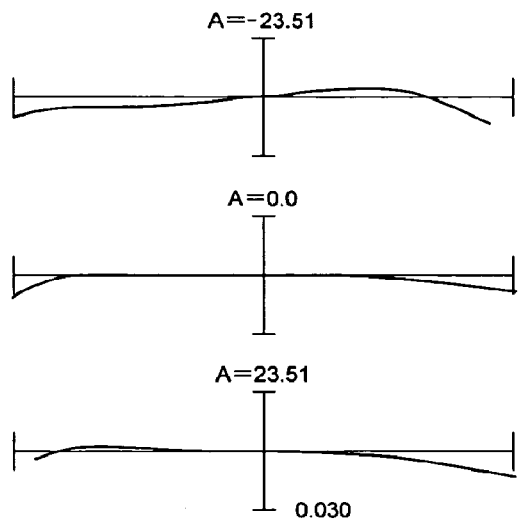
FIG. 48A is graphs showing lateral aberrations of the zoom lens system according to Example 11 in the wide-angle end state W upon shifting.
Figure 48B:
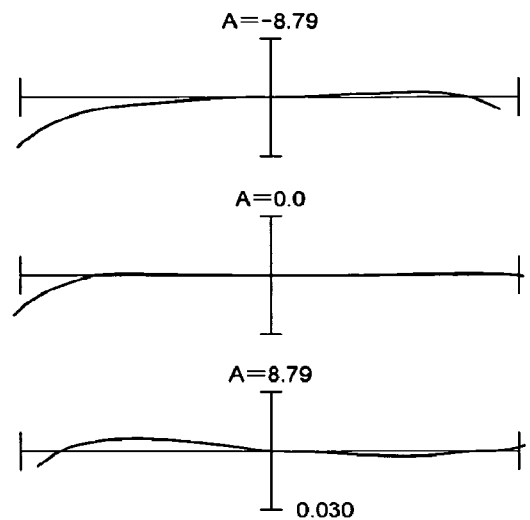
FIG. 48B is graphs showing lateral aberrations of the zoom lens system according to Example 11 in the wide-angle side intermediate focal length state M1 upon shifting.
Figure 48C:
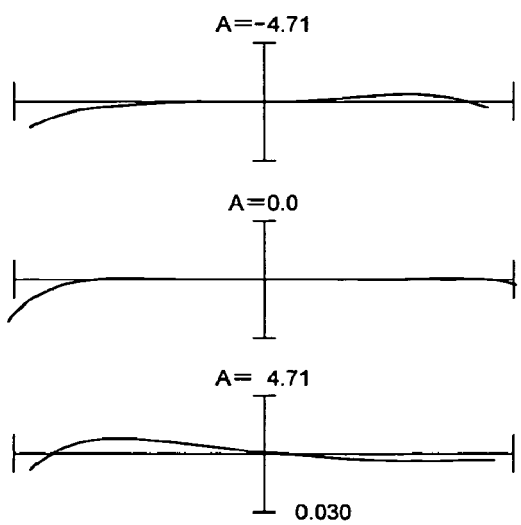
FIG. 48C is graphs showing lateral aberrations of the zoom lens system according to Example 11 in the telephoto side intermediate focal length state M2 upon shifting.
Figure 48D:
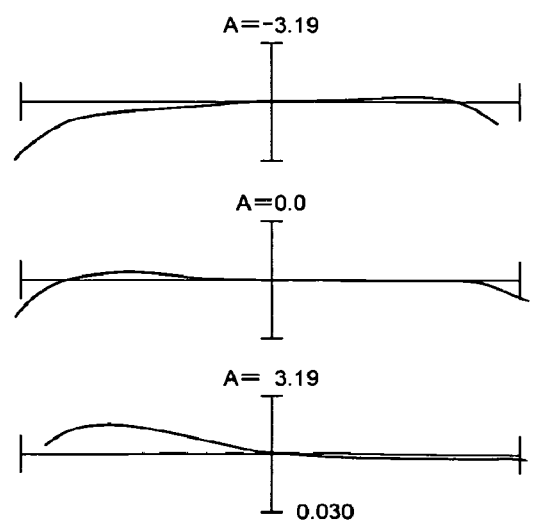
FIG. 48D is graphs showing lateral aberrations of the zoom lens system according to Example 11 in the telephoto end state T upon shifting.

46A is graphs showing various aberrations in a wide-angle end state W (f=5.82 mm) focusing on infinity. FIG. 46B is graphs showing various aberrations in the wide-angle side intermediate focal length state M1 (f=16.00 mm) focusing on infinity. FIG. 47A is graphs showing various aberrations in the telephoto side intermediate focal length state M2 (f=30.00 mm) focusing on infinity. FIG. 47B is graphs showing various aberrations in the telephoto end state T (f=44.23 mm) focusing on infinity. FIG. 48A is graphs showing lateral aberrations in the wide-angle end state W (f=5.82 mm) upon shifting. FIG. 48B is graphs showing lateral aberrations in the wide-angle side intermediate focal length state M1 (f=16.00 mm) upon shifting. FIG. 48C is graphs showing lateral aberrations in the telephoto side intermediate focal length state M2 (f=30.00 mm) upon shifting. FIG. 48D is graphs showing lateral aberrations in the telephoto end state T (f=44.23 mm) upon shifting.

As is apparent from various graphs, the zoom lens system according to Example 11 of the third embodiment has superb optical performance with preferably correcting various aberrations in each focal length from the wide-angle end state W to the telephoto end state T.

Fourth Embodiment

A zoom lens system capable of shifting according to a fourth embodiment of the present invention is explained below.

A zoom lens system capable of shifting (hereinafter simply called a zoom lens system) according to the third embodiment is composed of, in order from an object, a first lens group having positive refractive power, a second lens group having negative refractive power, a third lens group having positive refractive power, a fourth lens group having positive refractive power, a fifth lens group having positive refractive power. When a state of lens group positions varies from a wide-angle end state (where the zoom lens system comes to the shortest focal length) to a telephoto end state (where the zoom lens system comes to the longest focal length), the first lens group moves with respect to an image plane, a distance between the first lens group and the second lens group varies, a distance between the second lens group and the third lens group decreases, a distance between the third lens group and the fourth lens group decreases, and a distance between the fourth lens group and the fifth lens group increases. The third lens group is composed of, in order from the object, an aperture stop, a front lens group and a rear lens group. By shifting the front lens group as a shift lens group substantially perpendicularly to the optical axis the image can be shifted substantially perpendicularly to the optical axis.

By constructing each lens group in this manner, a zoom lens system according to the fourth embodiment of the present invention can obtain an angle of view in the wide-angle end state of 75 degrees or more, a zoom ratio of about seven to ten and superb optical performance.

The function of each lens group is explained below.

The first lens group has an effect for converging bundle of rays and is arranged near to the image as much as possible so as to pass off-axis rays away from the optical axis in the wide-angle end state, so that the diameter of the first lens group is made smaller. In the telephoto end state, converging effect of the first lens group is heightened by moving the first lens group to the object side in order to significantly widen the distance to the second lens group, so that the total lens length of the zoom lens system is shortened.

The second lens group has a function for enlarging an image of the object formed by the first lens group. Upon zooming from the wide-angle end state to the telephoto end state, the second lens group heightens the enlargement ratio by widening the distance between the first lens group and the second lens group and varies the focal length.

The third lens group has an effect for conversing bundle of rays expanded by the second lens group. In order to realize high optical performance, the third lens group is composed of a plurality of lens groups.

In order to obtain a preferable image upon shifting, it is necessary that spherical aberration, sine condition and Petzval sum are corrected. Correction of spherical aberration and sine condition is for suppressing decentering coma producing at the center of the image upon shifting the shift lens group substantially perpendicularly to the optical axis. Correction of Petzval sum is for suppressing curvature of field producing on the periphery of the image upon shifting the shift lens group substantially perpendicularly to the optical axis.

In the fourth embodiment of the present invention, the third lens group is composed of a front lens group and a rear lens group locating at a distance from the front lens group. With this construction, both of the lens groups move integrally with keeping the fixed distance, so that variation in aberrations becomes minimum upon zooming. Upon shifting, the image is shifted by shifting the front lens group substantially perpendicularly to the optical axis.

The fourth lens group has an effect for converging bundle of rays converged by the third lens group. Upon varying the focal length, variation in aberration in the image plane relative to the variation in the focal length can be suppressed by actively varying the distance between the third lens group and the fourth lens group.

The fifth lens group is fixed upon zooming and carries out focusing the image of the object formed by the first lens group through the fourth lens group as well as controlling the position of the exit pupil.

In a solid-state imaging device (such as a CCD), a micro-lens array is generally arranged in front of the imaging device in order to enhance light sensing efficiency. Accordingly, in an optical system using for the above-described camera, it is necessary that the position of the exit pupil is locating far away from the light sensing surface of the imaging device.

In a zoom lens system capable of shifting an image, when the image is shifted by shifting a shift lens group substantially perpendicularly to the optical axis, the shift amount of the image "Δ" relative to that of the shift lens group "δ" is shown by the following expression (a):

$$\Delta = \delta \times (1-\beta a) \times \beta b \qquad (a)$$

where βa denotes the lateral magnification of the shift lens group, βb denotes the lateral magnification of a lens group composed of all optical elements locating to the image side of the shift lens group.

Substituting expression (a), expression (b) is derived:

$$\Delta/\delta = (1-\beta a) \times \beta b \qquad (b).$$

The right side of expression (a), which is $(1-\beta a) \times \beta b$, is assumed to be called as a "blurring coefficient".

The focal length of the zoom lens system is shown by the following expression (c):

$$f = fa \times \beta a \times \beta b \qquad (c)$$

By modifying expression (c), the following expression (d) is derived:

$$\beta b = f/(fa \times \beta a) \quad \text{(d)}$$

where f denotes the focal length of the zoom lens system, fa denotes a combined focal length of the lens group composed of all optical elements locating to the object side of the shift lens group, and fa×βa denotes a combined focal length of a lens group composed of all optical elements locating to the object side of the shift lens group and the shift lens group.

Substituting expressions (b) and (c) into expression (a), the following expression (e) is derived:

$$\Delta/\delta = ((1-\beta a)/\beta a) \times (f/fa) \quad \text{(e)}$$

In expression (e), when βa comes close to 1, the ratio of the shift amount of the image Δ relative to the shift amount of the shift lens δ comes close to 0. In other words, the image does not move even if the shift lens is moved, so that image shift cannot be carried out. On the other hand, when 1/βa comes close to 0, the ratio of the shift amount of the image Δ relative to the shift amount of the shift lens δ comes close to 1, so that image shift can be carried out. Moreover, when f/fa becomes small, image shift can be carried out.

When the blurring coefficient, which is the right side of expression (b), becomes large, the image shifts largely even if the shift lens group shifts by a minute amount, so that it becomes difficult to control the position of the shift lens group. On the other hand, when the blurring coefficient becomes small, in order to shift the image, the shift lens group has to be moves excessively large. Accordingly, the diameter of the lens system becomes large and the drive mechanism also becomes large, so that the blurring coefficient has to be set suitably.

In a zoom lens system according to the fourth embodiment of the present invention with the above-described construction, it is preferable that the following conditional expression (16) is satisfied:

$$10.0 < f1/fW < 14.0 \quad \text{(16)}$$

where fW denotes the focal length of the zoom lens system in the wide-angle end state and f1 denotes the focal length of the first lens group.

Conditional expression (16) defines an appropriate range of the focal length of the first lens group.

When the ratio f1/fW is equal to or exceeds the upper limit of conditional expression (16), refractive power of the first lens group becomes relatively weak, so the first lens group cannot effectively contribute to zooming, as a result, a high zoom ratio of about seven or more cannot be secured. In addition, the moving amount of the first lens group becomes large, so that variation in aberrations producing independently in the first lens group upon zooming becomes large. As a result, degradation of optical performance occurred all over the range from the wide-angle end state to the telephoto end state.

On the other hand, when the ratio f1/fW is equal to or falls below the lower limit of conditional expression (16), refractive power of the first lens group becomes relatively strong, so the angle of the off-axis ray incident to the first lens group relative to the optical axis becomes small in the wide-angle end state, as a result, when a wide angle of view of 75 degrees or more is to be realized, the diameter of the first lens group becomes large, so that it is against the purpose of the invention to be compact. In addition, since refractive power of the first lens group becomes strong, aberrations producing independently in the first lens group becomes excessively large, so that the purpose of the present invention to obtain high optical performance cannot be accomplished.

In order to secure the effect of the present invention, it is preferable to set the upper limit of conditional expression (16) to 13.5. In order to further secure the effect of the present invention, it is more preferable to set the upper limit of conditional expression (16) to 13.0. In order to further secure the effect of the present invention, it is further more preferable to set the lower limit of conditional expression (16) to 10.5.

In a zoom lens system according to the fourth embodiment of the present invention, when a state of lens group positions varies from the wide-angle end state to the telephoto end state upon focusing on infinity, the fifth lens group is preferably fixed relative to the image plane.

In a solid-state imaging device (such as a CCD), a micro-lens array is generally arranged in front of the imaging device in order to enhance light sensing efficiency. Accordingly, in an optical system using for a digital still camera, and the like, it is necessary that the position of the exit pupil is locating far away from the light sensing surface of the imaging device. By fixing the fifth lens group upon zooming from the wide-angle end state to the telephoto end state, the position of the exit pupil can be corrected preferably over entire zoom range.

In a zoom lens system according to the fourth embodiment of the present invention, in order to balance high optical performance and degradation of optical performance upon shifting the shift lens group, the third lens group is preferably constructed as follows.

It is preferable that the third lens group is composed of, in order from the object, an aperture stop, a cemented positive lens (a front lens group: an object side positive partial lens group) constructed by a negative meniscus lens having a convex surface facing to the object cemented with a positive lens having a convex surface facing to the object, and a cemented positive lens (a rear lens group: an image side positive partial lens group) constructed by a positive lens having a convex surface facing to the object cemented with a double concave negative lens.

As described above, it is necessary that the front lens group is corrected with spherical aberration and sine condition. The above-described aberrations can be corrected by the cemented lens constructed by two lenses of the negative lens and the positive lens.

In the whole third lens group, spherical aberration has to be corrected and off-axis aberrations have to be in a given state. Accordingly, it is necessary that spherical aberration is corrected in the rear lens group. By constructing the rear lens group by the cemented positive lens composed of a positive lens cemented with a negative lens, degradation in optical performance can be suppressed to minimum.

In a zoom lens system according to the fourth embodiment of the present invention, the following conditional expression (17) is preferably satisfied:

$$1.0 < f3a/f3 < 1.5 \quad \text{(17)}$$

where f3 denotes the focal length of the third lens group and f3a denotes the focal length of the front lens group.

Conditional expression (17) defines an appropriate range of the focal length of the front lens group of the third lens group.

When the ratio f3a/f3 is equal to or exceeds the upper limit of conditional expression (17), Petzval sum becomes large in positive direction, so that the zoom lens system cannot be fast.

On the other hand, when the ratio f3a/f3 is equal to or falls below the limit of conditional expression (17), Petzval sum becomes large in negative direction. Moreover, in order to obtain a given shift amount of the image, the more lens shift amount becomes necessary, so that the zoom lens system becomes large. It is undesirable.

In order to secure the effect of the present invention, it is preferable to set the upper limit of conditional expression (17) to 1.45 and the lower limit to 1.10. In order to further secure the effect of the present invention, it is more preferable to set the lower limit of conditional expression (17) to 1.15.

In a zoom lens system according to the fourth embodiment of the present invention, in order to suppress variation in optical performance upon shifting, the following conditional expression (18) is preferably satisfied:

$$0.8 < (1-\beta 3aT) \times \beta RT < 1.2 \qquad (18)$$

where β3aT denotes a using lateral magnification of the front lens group in the telephoto end state, and βRT denotes a using lateral magnification of the whole optical system locating between the front lens group and the image plane in the telephoto end state.

Conditional expression (18) defines an appropriate range of a so-called blurring coefficient that is the shift amount of the image relative to the shift amount of the front lens group substantially perpendicularly to the optical axis in the telephoto end state.

When the value (1−β3aT)βRT is equal to or exceeds the upper limit of conditional expression (18), the shift amount of the image relative to that of the front lens group perpendicularly to the optical axis becomes too large. Accordingly, the image shifts largely even if the front lens group shifts a minute amount, so that it becomes difficult to control the position of the front lens group, as a result, sufficient accuracy cannot be obtained.

On the other hand, when the value (1−β3aT)βRT is equal to or falls below the lower limit of conditional expression (18), the shift amount of the image relative to that of the front lens group perpendicularly to the optical axis becomes relatively small. Accordingly, in order to secure enough shifting amount of image to cancel out the image blur by the camera shake, the shift amount of the front lens group perpendicularly to the optical axis becomes excessively large. Accordingly, the drive mechanism for shifting the shift lens group becomes large, so that the purpose of the present invention to obtain a compact zoom lens system cannot be accomplished.

In order to secure the effect of the present invention, it is preferable to set the upper limit of conditional expression (18) to 1.10. In order to further secure the effect of the present invention, it is more preferable to set the upper limit of conditional expression (18) to 1.05. In order to secure the effect of the present invention, it is preferable to set the lower limit of conditional expression (18) to 0.90. In order to further secure the effect of the present invention, it is more preferable to set the lower limit of conditional expression (18) to 0.95.

In a zoom lens system according to the fourth embodiment of the present invention, the following conditional expression (19) is preferably satisfied:

$$7.0 < f1/|f2| < 11.0 \qquad (19)$$

where f2 is the focal length of the second lens group.

Conditional expression (19) defines an appropriate range of the ratio of the focal length of the first lens group to that of the second lens group.

When the ratio f1/|f2| is equal to or exceeds the upper limit of conditional expression (19), refractive power of the first lens group becomes relatively weak and the first lens group cannot effectively contribute to zooming, so that a high zoom ratio of about seven or more cannot be secured. In addition, the moving amount of the first lens group becomes large, so that variation in aberrations produced in the first lens group upon zooming becomes large. As a result, degradation in optical performance becomes difficult to suppress over entire zoom range from the wide-angle end state to the telephoto end state. Furthermore, refractive power of the second lens group becomes relatively strong, so production of off-axis aberration cannot be suppressed, as a result, high optical performance cannot be obtained.

On the other hand, when the ratio f1/|f2| is equal to or falls below the lower limit of conditional expression (19), refractive power of the first lens group becomes relatively strong, so that the angle of off-axis ray incident to the first lens group relative to the optical axis becomes small in the wide-angle state. Accordingly, when a wide angle of view of about 75 degrees or more in the wide-angle end state is to be realized, the diameter of the first lens group becomes large, so that it is contradictory to the purpose of invention to be compact. Moreover, since refractive power of the second lens group becomes relatively weak, the second lens group becomes difficult to effectively contribute to zooming, so that a high zoom ratio of about seven or more cannot be secured.

In order to secure the effect of the present invention, it is preferable to set the upper limit of conditional expression (19) to 11.5. In order to further secure the effect of the present invention, it is more preferable to set the upper limit of conditional expression (19) to 11.0. In order to secure the effect of the present invention, it is preferable to set the lower limit of conditional expression (19) to 7.5.

In a zoom lens system according to the fourth embodiment of the present invention, the following conditional expression (20) is preferably satisfied:

$$0.10 < fW/f3a < 0.20 \qquad (20).$$

Conditional expression (20) defines an appropriate range of the focal length of the front lens group.

When the ratio fW/f3a is equal to or exceeds the upper limit of conditional expression (20), refractive power of the front lens group becomes strong, so that aberrations produced in the front lens group becomes large.

On the other hand, when the ratio fW/f3a is equal to or falls below the lower limit of conditional expression (20), refractive power of the front lens group becomes weak and the zoom lens system does not become afocal at the front lens group, so that variation in optical performance of the zoom lens system upon shifting the front lens group becomes large. It is undesirable.

In order to secure the effect of the present invention, it is preferable to set the upper limit of conditional expression (20) to 0.19. In order to secure the effect of the present invention, it is preferable to set the lower limit of conditional expression (20) to 0.11.

In a zoom lens system according to the fourth embodiment of the present invention, it is preferable that focusing from infinity to a close object is carried out by moving the fifth lens group to the object.

As described above, the fifth lens group carries out focusing of an image of the object formed by the first through fourth lens groups and controls the position of the exit pupil. By moving the fifth lens group upon focusing, the position of the exit pupil can be more preferably corrected.

In a zoom lens system according to the fourth embodiment of the present invention, the following conditional expression (21) is preferably satisfied:

$$4.0 < f5/fW < 9.0 \tag{21}$$

where f5 denotes the focal length of the fifth lens group.

Conditional expression (21) defines an appropriate range of the focal length of the fifth lens group.

When the ratio f5/fW is equal to or exceeds the upper limit of conditional expression (21), refractive power of the fifth lens group becomes weak, so that although it is effective to correct various aberrations, the moving amount upon focusing becomes large and the driving mechanical for focusing becomes large, there is a possibility to interfere other parts. As a result, it becomes impossible to save space upon installing into a camera body.

On the other hand, when the ratio f5/fW is equal to or falls below the lower limit of conditional expression (21), refractive power of the fifth lens group becomes strong, so that aberrations produced independently in the fifth lens group becomes excessively large and variation in optical performance upon focusing on close object becomes large. It is undesirable. As a result, it becomes difficult to shorten the closest shooting distance.

In order to secure the effect of the present invention, it is preferable to set the upper limit of conditional expression (21) to 8.5. In order to secure the effect of the present invention, it is preferable to set the lower limit of conditional expression (21) to 4.2. In order to further secure the effect of the present invention, it is more preferable to set the lower limit of conditional expression (21) to 4.5.

In a zoom lens system according to the fourth embodiment of the present invention, the fourth lens group preferably includes at least one aspherical lens. By arranging an aspherical lens in the fourth lens group, variation in on-axis aberrations produced independently in the fourth lens group can be corrected preferably.

Moreover, in the zoom lens system according to the fourth embodiment of the present invention, a shake detector for detecting a lens shake of the zoom lens system and a driver are arranged in combination with the zoom lens system to correct an image blur (variation in an image position) caused by a lens shake by means of shifting the front lens group of the third lens group as a shift lens group perpendicularly to the optical axis. However, a whole part or a portion of a lens group among the lens groups composing the zoom lens system other than the front lens group may be decentered as a shift lens group perpendicularly to the optical axis to correct an image blur (variation in an image position) caused by a lens shake in combination with a shake detector for detecting a lens shake of the zoom lens system and a driver for driving the shift lens group.

A zoom lens system according to the fourth embodiment of the present invention seen from another point of view includes, in order from an object, a first lens group having positive refractive power, a second lens group having negative refractive power, a third lens group having positive refractive power, a fourth lens group having positive refractive power, and a fifth lens group having positive refractive power. When a state of lens group positions varies from a wide-angle end state (where the zoom lens system comes to the shortest focal length) to a telephoto end state (where the zoom lens system comes to the longest focal length), the first lens group moves with respect to an image plane, the fifth lens group is fixed, a distance between the first lens group and the second lens group varies, a distance between the second lens group and the third lens group decreases, a distance between the third lens group and the fourth lens group decreases, and a distance between the fourth lens group and the fifth lens group increases.

By constructing each lens group in this manner, a zoom lens system according to the fourth embodiment of the present invention seen from another point of view can obtain an angle of view in the wide-angle end state of 75 degrees or more, a zoom ratio of about seven to ten and superb optical performance.

In a zoom lens system according to the fourth embodiment of the present invention seen from another point of view, the fifth lens group is fixed upon zooming and carries out focusing the image of the object formed by the first lens group through the fourth lens group as well as controlling the position of the exit pupil.

In a solid-state imaging device (such as a CCD), a micro-lens array is generally arranged in front of the imaging device in order to enhance light sensing efficiency. Accordingly, in an optical system using for the above-described camera, it is necessary that the position of the exit pupil is locating far away from the light sensing surface of the imaging device.

In a zoom lens system according to the fourth embodiment of the present invention seen from another point of view, the following conditional expression (16) is preferably satisfied with the above-described construction:

$$10.0 < f1/fW < 14.0 \tag{16}$$

where fW denotes the focal length of the zoom lens system in the wide-angle end state and f1 denotes the focal length of the first lens group.

Conditional expression (16) defines an appropriate range of the focal length of the first lens group and further explanation is omitted as already described above.

In a zoom lens system according to the fourth embodiment of the present invention seen from another point of view, focusing from infinity to a close object is preferably carried out by moving the fifth lens group to the object.

The fifth lens group carries out focusing of an image of the object formed by the first through fourth lens groups and controls the position of the exit pupil. By moving the fifth lens group upon focusing, the position of the exit pupil can be more preferably corrected.

In a zoom lens system according to the fourth embodiment of the present invention seen from another point of view, the following conditional expression (21) is preferably satisfied:

$$4.0 < f5/fw < 9.0 \tag{21}$$

where f5 denotes the focal length of the fifth lens group.

Conditional expression (21) defines an appropriate range of the focal length of the fifth lens group and further explanation is omitted as already described above.

In a zoom lens system according to the fourth embodiment of the present invention seen from another point of view, the fourth lens group preferably has at least one aspherical lens. By arranging an aspherical lens in the fourth lens group, variation in on-axis aberrations produced independently in the fourth lens group can be corrected preferably.

In a zoom lens system according to the fourth embodiment of the present invention seen from another point of view, the following conditional expression (19) is preferably satisfied:

$$7.0 < |f1/f2| < 11.0 \tag{19}$$

where f2 is the focal length of the second lens group.

Conditional expression (19) defines an appropriate range of the ratio of the focal length of the first lens group to that of the second lens group and further explanation is omitted as already described above.

In a zoom lens system according to the fourth embodiment of the present invention seen from another point of view, in order to obtain further high optical performance, the third lens group is preferably constructed as described below.

It is preferable that the third lens group is composed of, in order from the object, an aperture stop, a cemented positive lens (a front lens group: an object side positive partial lens group) constructed by a negative meniscus lens having a convex surface facing to the object cemented with a positive lens having a convex surface facing to the object, and a cemented positive lens (a rear lens group: an image side positive partial lens group) constructed by a positive lens having a convex surface facing to the object cemented with a double concave negative lens and further explanation is omitted as already described above.

In a zoom lens system according to the fourth embodiment of the present invention seen from another point of view, the following conditional expression (17) is preferably satisfied:

$$1.0 < f3a/f3 < 1.5 \tag{17}$$

where f3 denotes the focal length of the third lens group and f3a denotes the focal length of the front lens group.

Conditional expression (17) defines an appropriate range of the focal length of the front lens group of the third lens group and further explanation is omitted as already described above.

In a zoom lens system according to the fourth embodiment of the present invention seen from another point of view, the following conditional expression (20) is preferably satisfied:

$$0.10 < fW/f3a < 0.20 \tag{20}$$

Conditional expression (20) defines an appropriate range of the focal length of the front lens group and further explanation is omitted as already described above.

Each example according to the fourth embodiment of the present invention is explained below with reference to accompanying drawings.

Figure 49:
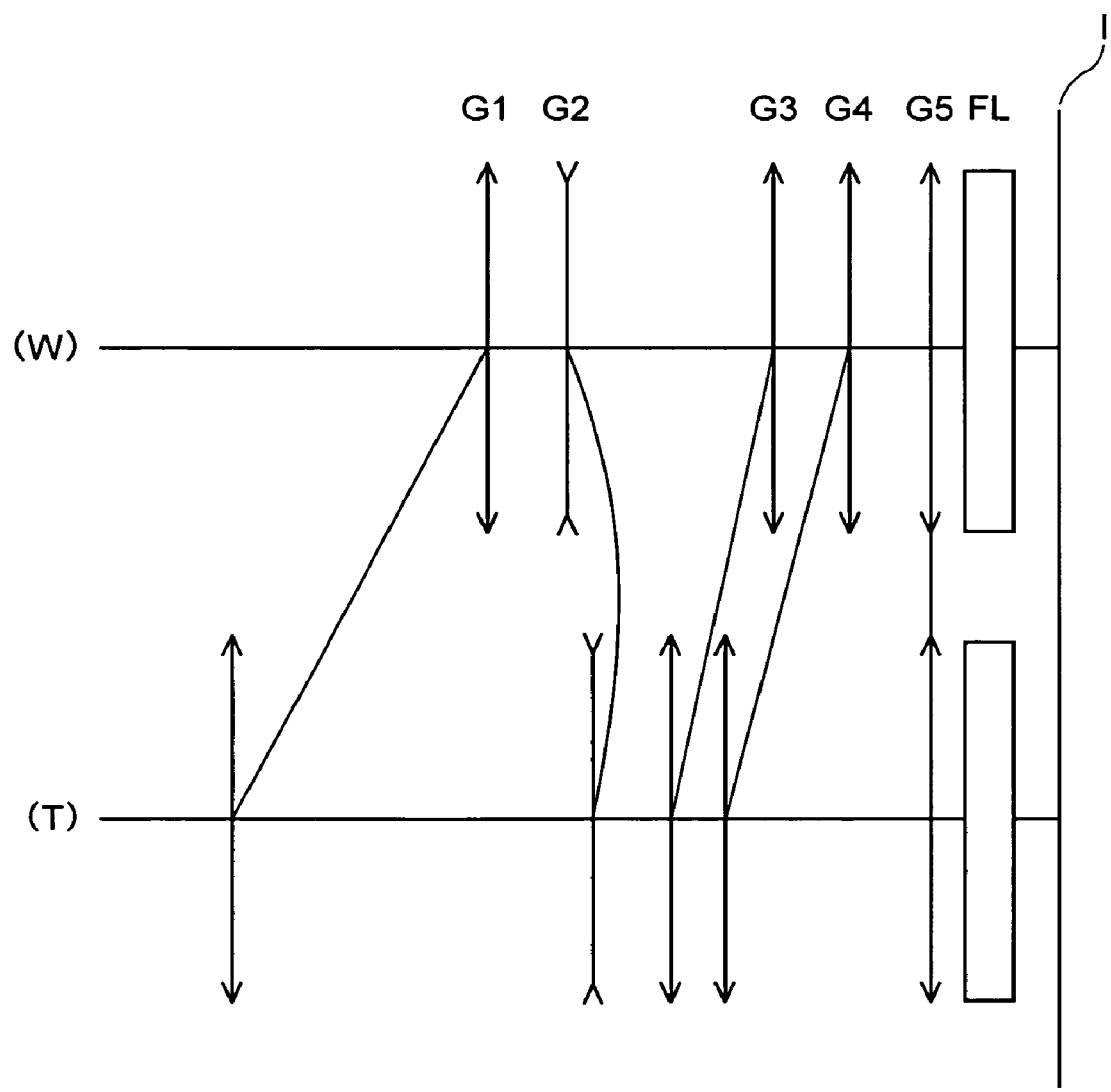
FIG. 49 is a graph showing power arrangement of a zoom lens system according to a fourth embodiment of the present invention together with zoom trajectories of respective lens groups in a wide-angle end state (W) and in a telephoto end state (T).

FIG. 49 is a graph showing power arrangement of a zoom lens system according to a fourth embodiment of the present invention together with zoom trajectories of respective lens groups in a wide-angle end state (W) and in a telephoto end state (T).

As shown in FIG. 49, a zoom lens system according to each example of the fourth embodiment is composed of, in order from an object, a first lens group G1 having positive refractive power, a second lens group G2 having negative refractive power, a third lens group G3 having positive refractive power, a fourth lens group G4 having positive refractive power, fifth lens group G5 having positive refractive power, and a filter group FL including a low-pass filter, an infrared-cut filter, and the like. When a state of lens group positions varies from a wide-angle end state W to a telephoto end state T (in other words, zooming), the first lens group G1, the third lens group G3, and the fourth lens group G4 move to the object, the second lens group G2 moves, and the fifth lens group G5 is fixed such that a distance between the first lens group G1 and the second lens group G2 varies, a distance between the second lens group G2 and the third lens group G3 decreases, a distance between the third lens group G3 and the fourth lens group G4 decreases, and a distance between the fourth lens group G4 and the fifth lens group G5 increases.

EXAMPLE 12

Figure 50:
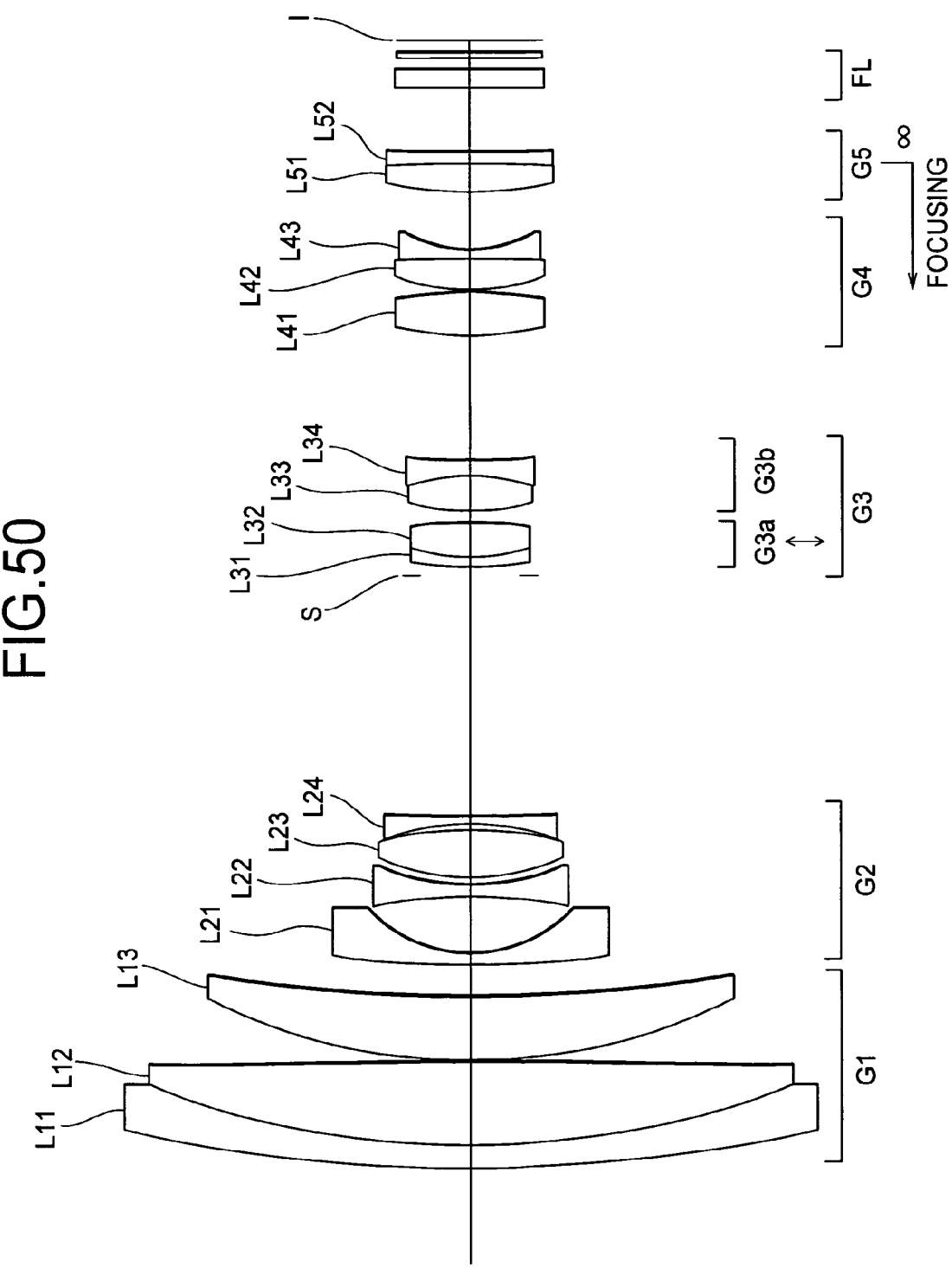
FIG. 50 is a sectional view showing lens construction of a zoom lens system according to Example 12 of the fourth embodiment of the present invention.

FIG. 50 is a sectional view showing lens construction of a zoom lens system according to Example 12 of the fourth embodiment of the present invention.

In FIG. 50, the first lens group G1 is composed of, in order from the object, a cemented positive lens constructed by a negative meniscus lens L11 having a concave surface facing to the image cemented with a double convex positive lens L12, and a positive meniscus lens L13 having a convex surface facing to the object.

The second lens group G2 is composed of, in order from the object, a negative meniscus lens L21 having a concave surface facing to the image, a double concave negative lens L22, a double convex positive lens L23, and a double concave negative lens L24.

The third lens group G3 is composed of, in order from the object, a front lens group G3a, and a rear lens group G3b. The front lens group G3a is composed of a cemented positive lens constructed by, in order from the object, a negative meniscus lens L31 having a concave surface facing to the image cemented with a double convex positive lens L32. The rear lens group G3b is composed of a cemented positive lens constructed by, in order from the object, a double convex positive lens L33 cemented with a double concave negative lens L34. By shifting the front lens group G3a substantially perpendicularly to the optical axis, the image in the image plane I is shifted so as to correct an image blur caused by a camera shake, and the like.

The fourth lens group G4 is composed of, in order from the object, a double convex positive lens L41 having an aspherical surface facing to the image, and a cemented negative lens constructed by a double convex positive lens L42 cemented with a double concave negative lens L43.

The fifth lens group G5 is composed of a cemented positive lens constructed by a double convex positive lens L51 cemented with a double concave negative lens L52.

The filter group FL is composed of a low-pass filter, an infrared-cut filter, and the like. The image plane I is formed on an imaging device which is not shown. The imaging device is made of a CCD, CMOS, and the like.

An aperture stop S is arranged to the most object side of the third lens group G3 and moves with the third lens group G3 in a body upon zooming from the wide-angle end state W to the telephoto end state T.

In a zoom lens system according to Example 12 of the fourth embodiment, focusing from infinity to a close object is carried out by moving the fifth lens group G5 to the object side.

Various values associated with Example 12 are listed in Table 12.

TABLE 12

[Specifications]

| | Lens State | | |
|---|---|---|---|
| | Wide-Angle End | Intermediate Focal Length | Telephoto End |
| f = | 7.31 | 25.90 | 74.15 |
| FNO = | 2.76 | 3.89 | 5.17 |
| 2ω = | 79.11 | 24.53 | 8.67 |

[Lens Data]

| | r | d | nd | vd |
|---|---|---|---|---|
| 1 | 122.6426 | 2.00 | 1.84666 | 23.78 |
| 2 | 67.7364 | 7.60 | 1.65160 | 58.55 |
| 3 | −1028.7917 | 0.16 | | |
| 4 | 45.8473 | 5.76 | 1.49782 | 82.52 |
| 5 | 109.9865 | (D5) | | |
| 6 | 65.9247 | 1.20 | 1.83481 | 42.71 |
| 7 | 10.9822 | 5.00 | | |
| 8 | −42.7356 | 1.27 | 1.80400 | 46.57 |
| 9 | 18.4559 | 0.53 | | |
| 10 | 16.2393 | 4.32 | 1.84666 | 23.78 |
| 11 | −30.7004 | 0.54 | | |
| 12 | −20.4028 | 0.80 | 1.80400 | 46.57 |
| 13 | 99.2103 | (D13) | | |
| 14 | ∞ | 0.80 | Aperture Stop S | |
| 15 | 26.0353 | 0.88 | 1.80610 | 40.88 |
| 16 | 14.9176 | 3.20 | 1.49782 | 82.52 |
| 17 | −39.3491 | 1.00 | | |
| 18 | 19.7164 | 3.19 | 1.48749 | 70.23 |
| 19 | −16.7642 | 1.50 | 1.58313 | 59.37 |
| 20 | 40.0882 | (D20) | | |
| 21 | 23.2974 | 4.05 | 1.58913 | 61.25 |
| 22* | −36.4868 | 0.10 | | |
| 23 | 14.9843 | 2.84 | 1.70154 | 41.24 |
| 24 | −383.8313 | 0.80 | 1.72825 | 28.46 |
| 25 | 10.2279 | (D25) | | |
| 26 | 26.1278 | 2.50 | 1.75700 | 47.82 |
| 27 | −500.0000 | 1.20 | 1.84666 | 23.78 |
| 28 | 95.9573 | (D28) | | |
| 29 | ∞ | 1.72 | 1.54437 | 70.51 |
| 30 | ∞ | 0.96 | | |
| 31 | ∞ | 0.50 | 1.51680 | 64.19 |
| 32 | ∞ | (Bf) | | |

[Aspherical Data]
Surface Number 22

κ = +2.5525
C4 = +4.2527E−05
C6 = −1.4947E−07
C8 = +4.4089E−09
C10 = −4.6296E−11

[Variable Distances]

| | Lens State | | |
|---|---|---|---|
| | Wide-Angle End | Intermediate Focal Length | Telephoto End |
| f | 7.3130 | 25.9000 | 74.1501 |
| D5 | 2.8000 | 29.9959 | 48.5802 |
| D13 | 22.0612 | 8.0154 | 2.5000 |
| D20 | 11.1574 | 2.3439 | 0.5379 |
| D25 | 5.1608 | 20.8305 | 35.4940 |
| D28 | 5.7863 | 5.7863 | 5.7863 |
| Bf | 1.0151 | 1.0150 | 1.0151 |

[Values for Conditional Expressions]

fW = 7.3130
f1 = 90.1775
f2 = −9.5537
f3 = 33.8394
f3a = 43.8944
f5 = 48.7650
β3aT = 2.2606
βRT = −0.8226
(16): f1/fW = 12.3311
(17): f3a/f3 = 1.2971
(18): (1 − β3aT) × βRT = 1.0370
(19): f1/|f2| = 9.4390
(20): fW/f3a = 0.1666
(21): f5/fW = 6.6683

Figure 51A:
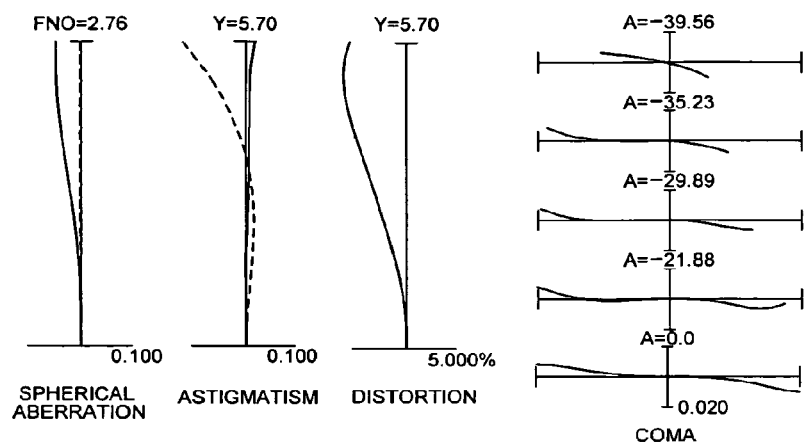
FIG. 51A shows various aberrations at d-line ($\lambda$=587.6 nm) of the zoom lens system according to Example 12 of the fourth embodiment in a wide-angle end state (f=7.31 mm).
Figure 51B:
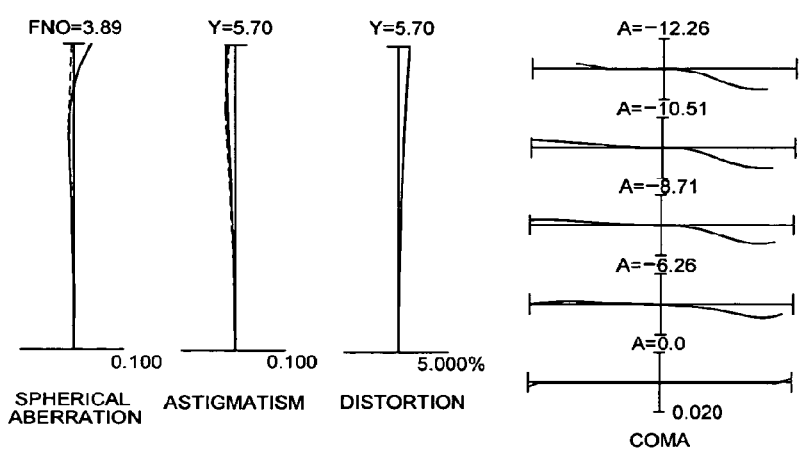
FIG. 51B shows various aberrations at d-line ($\lambda$=587.6 nm) of the zoom lens system according to Example 12 of the fourth embodiment in an intermediate focal length state (f=25.90 mm).
Figure 51C:
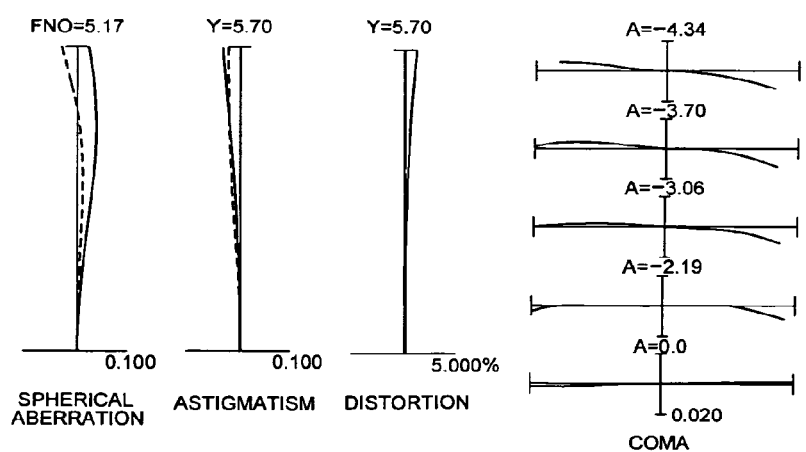
FIG. 51C shows various aberrations at d-line ($\lambda$=587.6 nm) of the zoom lens system according to Example 12 of the fourth embodiment in a telephoto end state (f=74.15 mm).

FIGS. 51A, 51B, and 51C show various aberrations at d-line (λ=587.6 nm) of the zoom lens system according to Example 12 of the fourth embodiment in which FIG. 51A shows various aberrations in a wide-angle end state (f=7.31 mm), FIG. 51B shows various aberrations in an intermediate focal length state (f=25.90 mm), and FIG. 51C shows various aberrations in a telephoto end state (f=74.15 mm).

Figure 52A:
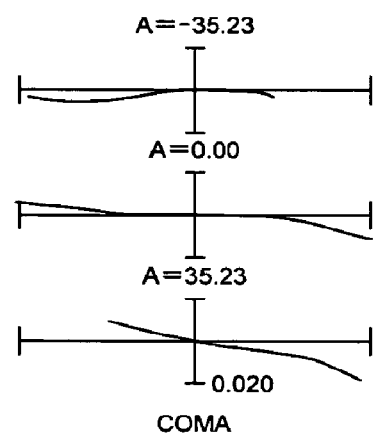
FIG. 52A shows lateral aberrations upon shifting at d-line ($\lambda$=587.6 nm) of the zoom lens system according to Example 12 of the fourth embodiment in the wide-angle end state (f=7.31 mm).
Figure 52B:
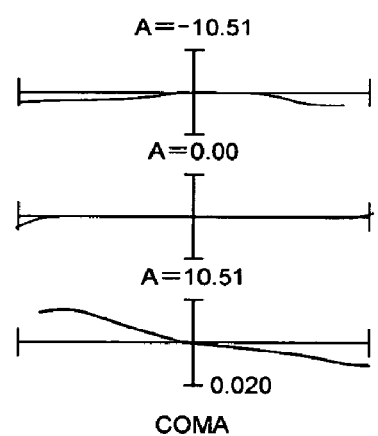
FIG. 52B shows lateral aberrations upon shifting at d-line ($\lambda$=587.6 nm) of the zoom lens system according to Example 12 of the fourth embodiment in the intermediate focal length state (f=25.90 mm).
Figure 52C:
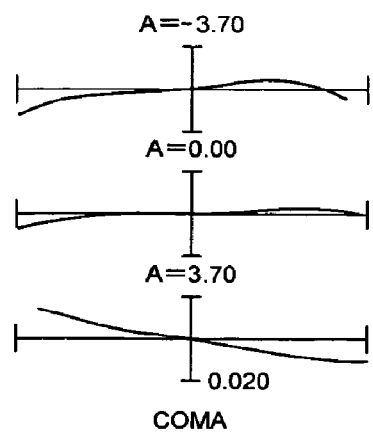
FIG. 52C shows lateral aberrations upon shifting at d-line ($\lambda$=587.6 nm) of the zoom lens system according to Example 12 of the fourth embodiment in the telephoto end state (f=74.15 mm).

FIGS. 52A, 52B, and 52C show lateral aberrations upon shifting at d-line (λ=587.6 nm) of the zoom lens system according to Example 12 of the fourth embodiment in which FIG. 52A shows lateral aberrations in the wide-angle end state (f=7.31 mm), FIG. 52B shows lateral aberrations in the intermediate focal length state (f=25.90 mm), and FIG. 52C shows lateral aberrations in the telephoto end state (f=74.15 mm).

As is apparent from various graphs, the zoom lens system according to Example 12 of the fourth embodiment has superb optical performance with preferably correcting various aberrations in each focal length from the wide-angle end state W to the telephoto end state T.

EXAMPLE 13

Figure 53:
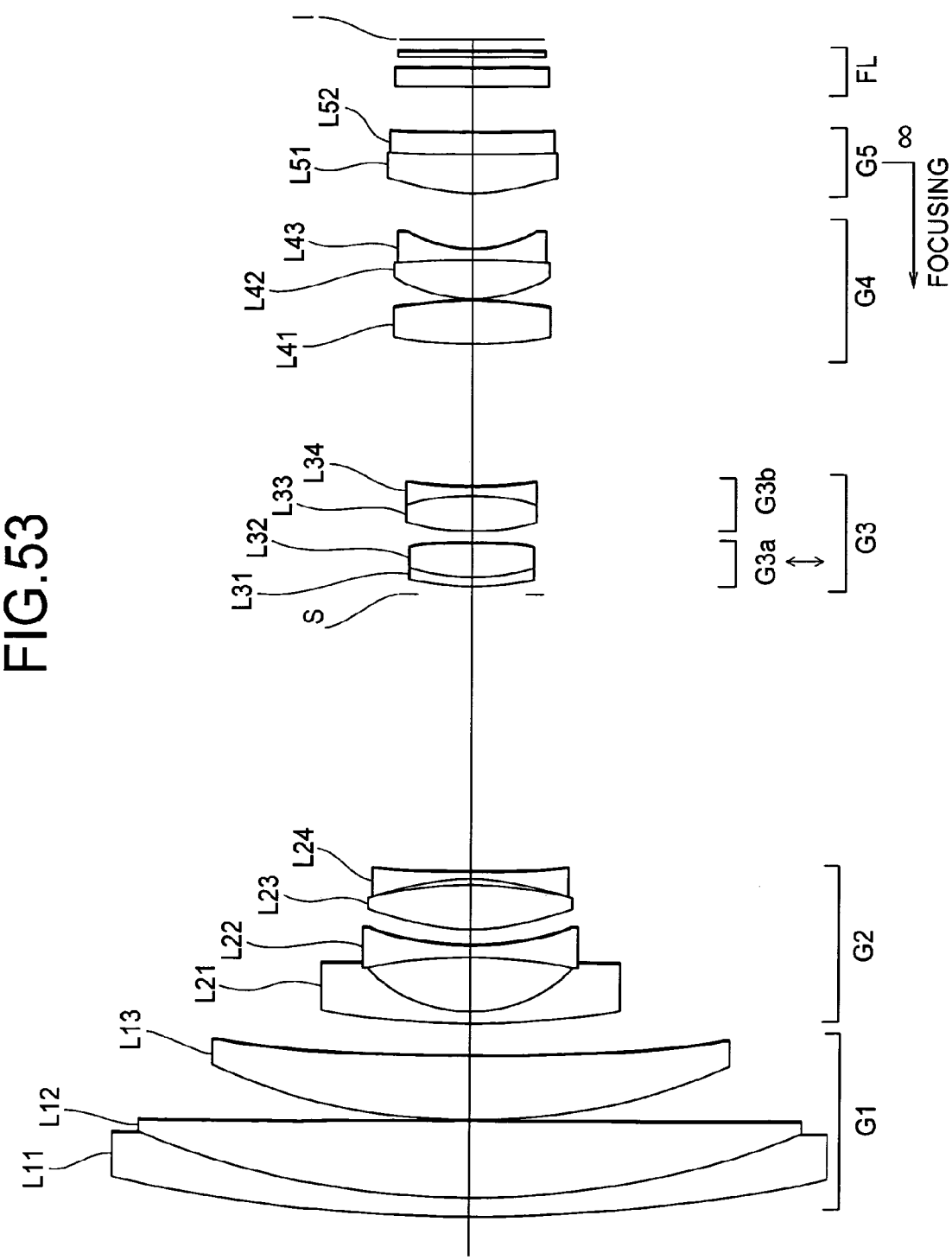
FIG. 53 is a sectional view showing lens construction of a zoom lens system according to Example 13 of the fourth embodiment of the present invention.

FIG. 53 is a sectional view showing lens construction of a zoom lens system according to Example 13 of the fourth embodiment of the present invention.

In FIG. 53, the first lens group G1 is composed of, in order from the object, a cemented positive lens constructed by a negative meniscus lens L11 having a concave surface facing to the image cemented with a positive meniscus lens L12 having a convex surface facing to the object, and a positive meniscus lens L13 having a convex surface facing to the object.

The second lens group G2 is composed of, in order from the object, a negative meniscus lens L21 having a concave surface facing to the image, a double concave negative lens L22, a double convex positive lens L23, and a double concave negative lens L24.

The third lens group G3 is composed of, in order from the object, a front lens group G3a, and a rear lens group G3b. The front lens group G3a is composed of a cemented positive lens constructed by, in order from the object, a negative meniscus lens L31 having a concave surface facing to the image cemented with a double convex positive lens L32. The rear lens group G3b is composed of a cemented positive lens constructed by, in order from the object, a double convex positive lens L33 cemented with a double concave negative lens L34. By shifting the front lens group G3a substantially perpendicularly to the optical axis, the image in the image plane I is shifted so as to correct an image blur caused by a camera shake, and the like.

The fourth lens group G4 is composed of, in order from the object, a double convex positive lens L41 having an aspherical surface facing to the image, and a cemented negative lens constructed by a double convex positive lens L42 cemented with a double concave negative lens L43.

The fifth lens group G5 is composed of a cemented positive lens constructed by a positive meniscus lens L51 having a convex surface facing to the object cemented with a negative meniscus lens L52 having a concave surface facing to the image.

The filter group FL is composed of a low-pass filter, an infrared-cut filter, and the like. The image plane I is formed on an imaging device which is not shown. The imaging device is made of a CCD, CMOS, and the like.

An aperture stop S is arranged to the most object side of the third lens group G3 and moves with the third lens group G3 in a body upon zooming from the wide-angle end state W to the telephoto end state T.

In a zoom lens system according to Example 13 of the fourth embodiment, focusing from infinity to a close object is carried out by moving the fifth lens group G5 to the object side.

Various values associated with Example 13 are listed in Table 13.

TABLE 13

[Specifications]

| | Lens State | | |
|---|---|---|---|
| | Wide-Angle End | Intermediate Focal Length | Telephoto End |
| f= | 7.31 | 27.23 | 74.15 |
| FNO= | 2.73 | 3.86 | 5.00 |
| 2ω= | 78.99 | 23.30 | 8.67 |

[Lens Data]

| | r | d | nd | νd |
|---|---|---|---|---|
| 1 | 125.6867 | 1.80 | 1.84666 | 23.78 |
| 2 | 67.8325 | 7.05 | 1.69680 | 55.53 |
| 3 | 5219.0416 | 0.10 | | |
| 4 | 49.8182 | 5.85 | 1.49782 | 82.52 |
| 5 | 151.8211 | (D5) | | |
| 6 | 60.2359 | 1.20 | 1.83481 | 42.71 |
| 7 | 11.4013 | 5.00 | | |
| 8 | −44.0857 | 1.20 | 1.80400 | 46.57 |
| 9 | 22.0419 | 1.40 | | |
| 10 | 19.3196 | 4.05 | 1.84666 | 23.78 |
| 11 | −32.2769 | 0.50 | | |
| 12 | −22.2314 | 0.80 | 1.80400 | 46.57 |
| 13 | 78.4505 | (D13) | | |
| 14 | ∞ | 0.80 | Aperture Stop S | |
| 15 | 30.2774 | 0.80 | 1.80610 | 40.92 |
| 16 | 16.9537 | 3.20 | 1.49782 | 82.52 |
| 17 | −38.4719 | 1.00 | | |
| 18 | 20.0239 | 3.25 | 1.48749 | 70.23 |
| 19 | −16.3449 | 0.90 | 1.56384 | 60.66 |
| 20 | 40.4349 | (D20) | | |
| 21 | 33.8057 | 4.05 | 1.58913 | 61.25 |
| 22* | −31.5525 | 0.10 | | |
| 23 | 13.5000 | 3.40 | 1.61800 | 63.33 |
| 24 | −97.1544 | 1.10 | 1.74950 | 35.28 |
| 25 | 10.7948 | (D25) | | |
| 26 | 19.6813 | 3.50 | 1.49700 | 81.54 |
| 27 | 123.6358 | 2.00 | 1.80518 | 25.42 |
| 28 | 100.0002 | (D28) | | |
| 29 | ∞ | 1.72 | 1.54437 | 70.51 |
| 30 | ∞ | 0.96 | 1.00000 | |

TABLE 13-continued

| 31 | ∞ | 0.50 | 1.51680 | 64.19 |
|---|---|---|---|---|
| 32 | ∞ | (Bf) | | |

[Aspherical Data]
Surface Number 22

κ = +6.5279
C4 = +4.8222E−05
C6 = −2.9856E−08
C8 = +3.3439E−09
C10 = −2.5394E−11

[Variable Distances]

| | Lens State | | |
|---|---|---|---|
| | Wide-Angle End | Intermediate Focal Length | Telephoto End |
| f | 7.3130 | 27.2316 | 74.1500 |
| D5 | 2.7953 | 30.3814 | 48.0353 |
| D13 | 25.5561 | 8.6466 | 2.6048 |
| D20 | 12.8639 | 3.9223 | 2.8261 |
| D25 | 5.0135 | 21.9932 | 36.3460 |
| D28 | 4.1093 | 4.1093 | 4.1093 |
| Bf | 0.9900 | 0.9900 | 0.9900 |

[Values for Conditional Expressions]

fW = 7.3130
f1 = 89.8269
f2 = −10.1353
f3 = 34.7673
f3a = 47.1639
f5 = 49.3397
β3aT = 2.3011
βRT = −0.7685
(16): f1/fW = 12.2832
(17): f3a/f3 = 1.3566
(18): (1 − β3aT) × βRT = 0.9999
(19): f1/|f2| = 8.8628
(20): fW/f3a = 0.1551
(21): f5/fW = 6.7468

FIGS. 54A, 54B, and 54C show various aberrations at d-line (λ=587.6 nm) of the zoom lens system according to Example 13 of the fourth embodiment in which FIG. 54A shows various aberrations in a wide-angle end state (f=7.31 mm), FIG. 54B shows various aberrations in an intermediate focal length state (f=27.23 mm), and FIG. 54C shows various aberrations in a telephoto end state (f=74.15 mm).

Figure 55A:
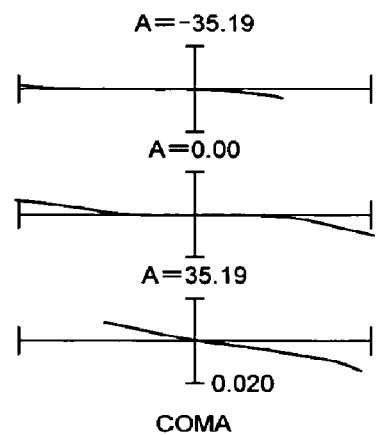
FIG. 55A shows lateral aberrations upon shifting at d-line ($\lambda$=587.6 nm) of the zoom lens system according to Example 13 of the fourth embodiment in the wide-angle end state (f=7.31 mm).
Figure 55B:
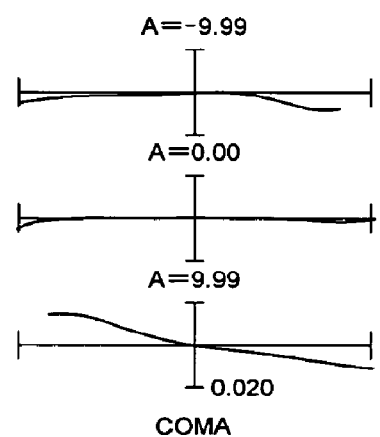
FIG. 55B shows lateral aberrations upon shifting at d-line ($\lambda$=587.6 nm) of the zoom lens system according to Example 13 of the fourth embodiment in the intermediate focal length state (f=27.23 mm).
Figure 55C:
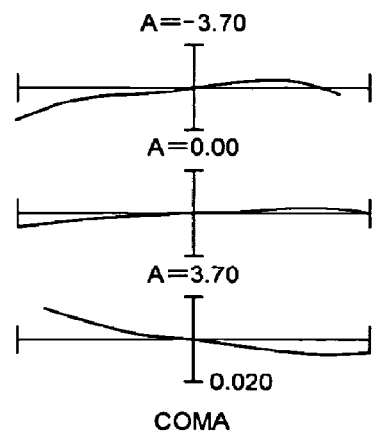
FIG. 55C shows lateral aberrations upon shifting at d-line (λ=587.6 nm) of the zoom lens system according to Example 13 of the fourth embodiment in the telephoto end state (f=74.15 mm).

FIGS. 55A, 55B, and 55C show lateral aberrations upon shifting at d-line (λ=587.6 nm) of the zoom lens system according to Example 13 of the fourth embodiment in which FIG. 55A shows lateral aberrations in the wide-angle end state (f=7.31 mm), FIG. 55B shows lateral aberrations in the intermediate focal length state (f=27.23 mm), and FIG. 55C shows lateral aberrations in the telephoto end state (f=74.15 mm).

As is apparent from various graphs, the zoom lens system according to Example 13 of the fourth embodiment has superb optical performance with preferably correcting various aberrations in each focal length from the wide-angle end state W to the telephoto end state T.

EXAMPLE 14

Figure 56:
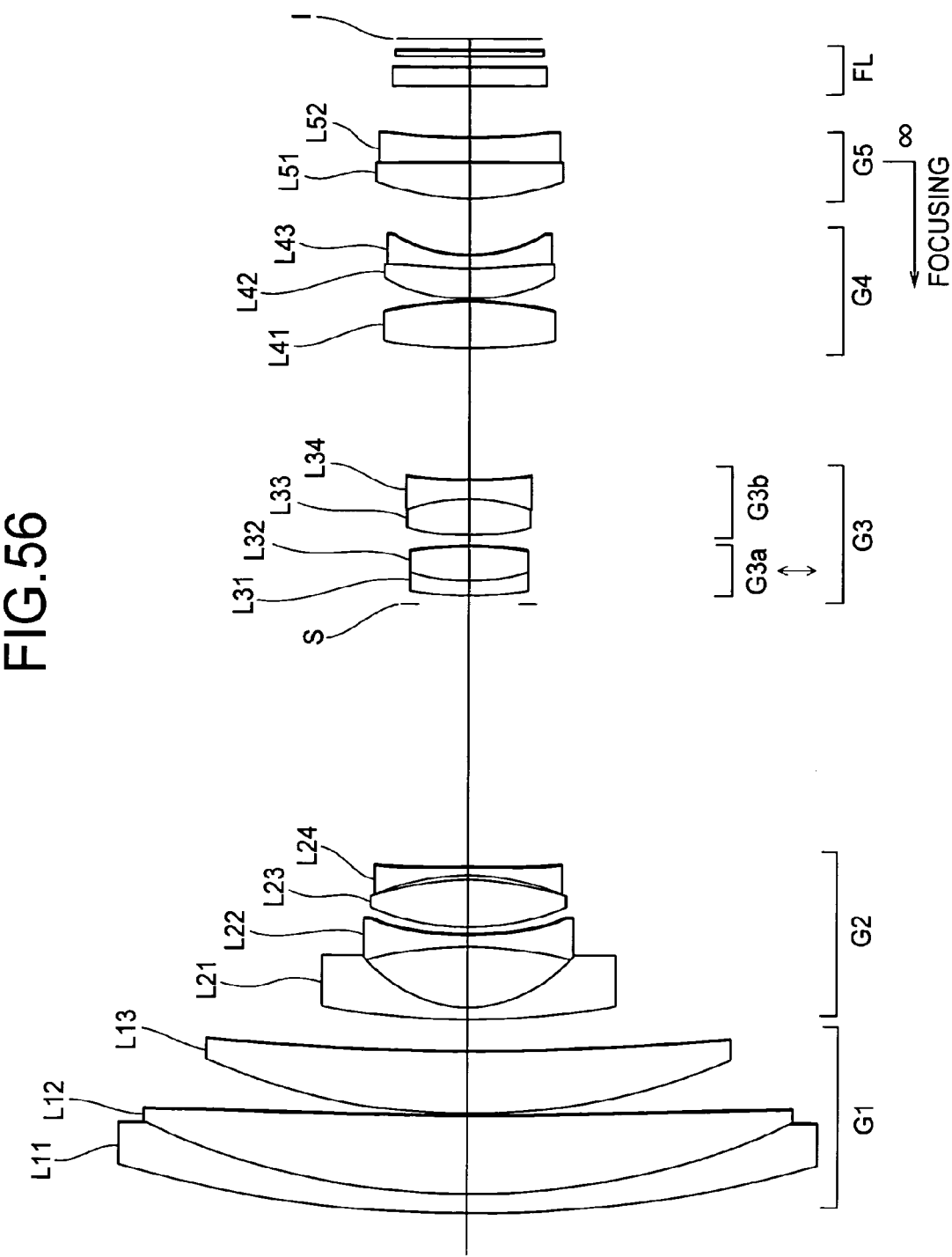
FIG. 56 is a sectional view showing lens construction of a zoom lens system according to Example 14 of the fourth embodiment of the present invention.

FIG. 56 is a sectional view showing lens construction of a zoom lens system according to Example 14 of the fourth embodiment of the present invention.

In FIG. 56, the first lens group G1 is composed of, in order from the object, a cemented positive lens constructed by a negative meniscus lens L11 having a concave surface facing to the image cemented with a positive meniscus lens L12 having a convex surface facing to the object, and a positive meniscus lens L13 having a convex surface facing to the object.

The second lens group G2 is composed of, in order from the object, a negative meniscus lens L21 having a concave surface facing to the image, a double concave negative lens L22, a double convex positive lens L23, and a double concave negative lens L24.

The third lens group G3 is composed of, in order from the object, a front lens group G3a, and a rear lens group G3b. The front lens group G3a is composed of a cemented positive lens constructed by, in order from the object, a negative meniscus lens L31 having a concave surface facing to the image cemented with a double convex positive lens L32. The rear lens group G3b is composed of a cemented positive lens constructed by, in order from the object, a double convex positive lens L33 cemented with a double concave negative lens L34. By shifting the front lens group G3a substantially perpendicularly to the optical axis, the image in the image plane I is shifted so as to correct an image blur caused by a camera shake, and the like.

The fourth lens group G4 is composed of, in order from the object, a double convex positive lens L41 having an aspherical surface facing to the image, and a cemented negative lens constructed by a positive meniscus lens L42 having a convex surface facing to the object cemented with a negative meniscus lens L43 having a concave surface facing to the image.

The fifth lens group G5 is composed of a cemented positive lens constructed by a double convex positive lens L51 cemented with a double concave negative lens L52.

The filter group FL is composed of a low-pass filter, an infrared-cut filter, and the like. The image plane I is formed on an imaging device which is not shown. The imaging device is made of a CCD, CMOS, and the like.

An aperture stop S is arranged to the most object side of the third lens group G3 and moves with the third lens group G3 in a body upon zooming from the wide-angle end state W to the telephoto end state T.

In a zoom lens system according to Example 14 of the fourth embodiment, focusing from infinity to a close object is carried out by moving the fifth lens group G5 to the object side.

Various values associated with Example 14 are listed in Table 14.

TABLE 14

[Specifications]

| | Lens State | | |
|---|---|---|---|
| | Wide-Angle End | Intermediate Focal Length | Telephoto End |
| f = | 7.31 | 27.48 | 74.15 |
| FNO = | 2.78 | 4.04 | 5.24 |
| 2ω = | 79.09 | 23.17 | 8.67 |

[Lens Data]

| | r | d | nd | vd |
|---|---|---|---|---|
| 1 | 97.4770 | 1.80 | 1.84666 | 23.78 |
| 2 | 59.4591 | 7.30 | 1.65160 | 58.55 |
| 3 | 524.4776 | 0.10 | | |
| 4 | 52.1087 | 5.80 | 1.49782 | 82.52 |
| 5 | 204.9638 | (D5) | | |

TABLE 14-continued

| 6 | 55.4805 | 1.20 | 1.83481 | 42.71 |
|---|---|---|---|---|
| 7 | 10.6897 | 5.44 | | |
| 8 | −32.3153 | 1.30 | 1.77250 | 49.60 |
| 9 | 23.3868 | 0.50 | | |
| 10 | 18.5497 | 4.35 | 1.84666 | 23.78 |
| 11 | −26.7997 | 0.48 | | |
| 12 | −19.7645 | 0.80 | 1.80440 | 39.58 |
| 13 | 147.1549 | (D13) | | |
| 14 | ∞ | 0.80 | Aperture Stop S | |
| 15 | 30.8781 | 1.41 | 1.80610 | 40.92 |
| 16 | 17.2152 | 3.20 | 1.49782 | 82.52 |
| 17 | −36.0844 | 1.00 | | |
| 18 | 22.3687 | 3.30 | 1.48749 | 70.23 |
| 19 | −14.3457 | 1.85 | 1.56384 | 60.66 |
| 20 | 50.0000 | 0.50 | | |
| 21 | 40.7070 | 4.20 | 1.58913 | 61.25 |
| 22* | −30.7364 | 0.10 | | |
| 23 | 13.5000 | 2.95 | 1.63930 | 44.87 |
| 24 | 70.5860 | 1.21 | 1.79504 | 28.54 |
| 25 | 11.0891 | (D25) | | |
| 26 | 19.6012 | 3.50 | 1.75500 | 52.32 |
| 27 | −400.0000 | 2.20 | 1.80518 | 25.42 |
| 28 | 50.0000 | (D28) | | |
| 29 | ∞ | 1.72 | 1.54437 | 70.51 |
| 30 | ∞ | 0.96 | 1.00000 | |
| 31 | ∞ | 0.50 | 1.51680 | 64.19 |
| 32 | ∞ | (Bf) | | |

[Aspherical Data]
Surface Number 22

$\kappa$ = +2.8898
C4 = +2.9483E−05
C6 = −6.7818E−08
C8 = +2.2201E−09
C10 = −1.9587E−11

[Variable Distances]

| | Lens State | | |
|---|---|---|---|
| | Wide-Angle End | Intermediate Focal Length | Telephoto End |
| f | 7.3130 | 27.4787 | 74.1500 |
| D5 | 2.8000 | 30.0706 | 47.3798 |
| D13 | 24.1145 | 8.2545 | 2.5000 |
| D20 | 11.9322 | 1.3984 | 0.5000 |
| D25 | 5.0000 | 23.9224 | 39.3644 |
| D28 | 4.6293 | 4.6293 | 4.6293 |
| Bf | 0.9922 | 0.9921 | 0.9921 |

[Values for Conditional Expressions]

fW = 7.3130
f1 = 88.9069
f2 = −10.2236
f3 = 34.7598
f3a = 45.8176
f5 = 41.1706
β3aT = 2.4014
βRT = −0.7191
(16): f1/fW = 12.1574
(17): f3a/f3 = 1.3181
(18): (1 − β3aT) × βRT = 1.0077
(19): f1/|f2| = 8.6963
(20): fW/f3a = 0.1596
(21): f5/fW = 5.6298

Figure 57A:
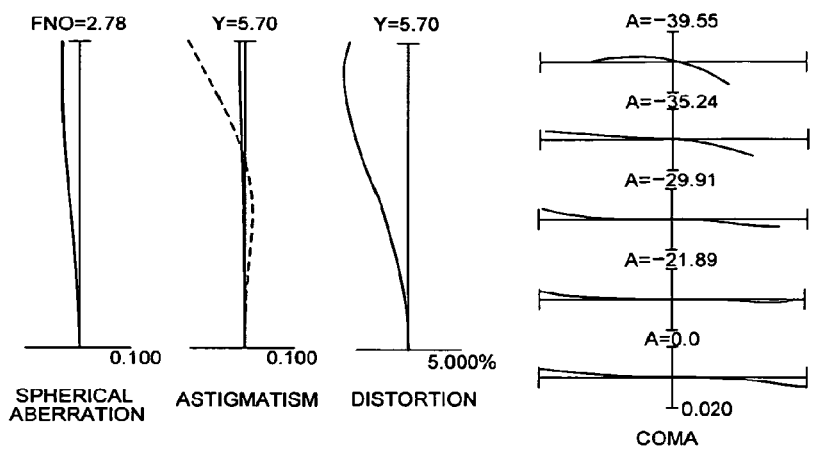
FIG. 57A shows various aberrations at d-line (λ=587.6 nm) of the zoom lens system according to Example 14 of the fourth embodiment in a wide-angle end state (f=7.31 mm).
Figure 57B:
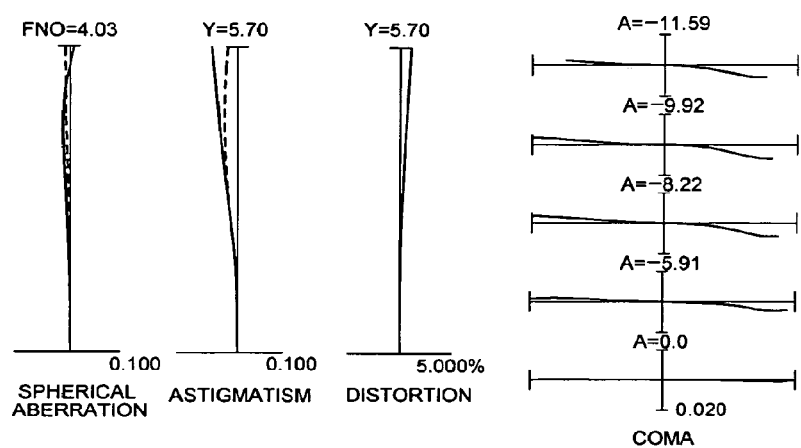
FIG. 57B shows various aberrations at d-line (λ=587.6 nm) of the zoom lens system according to Example 14 of the fourth embodiment in an intermediate focal length state (f=27.48 mm).
Figure 57C:
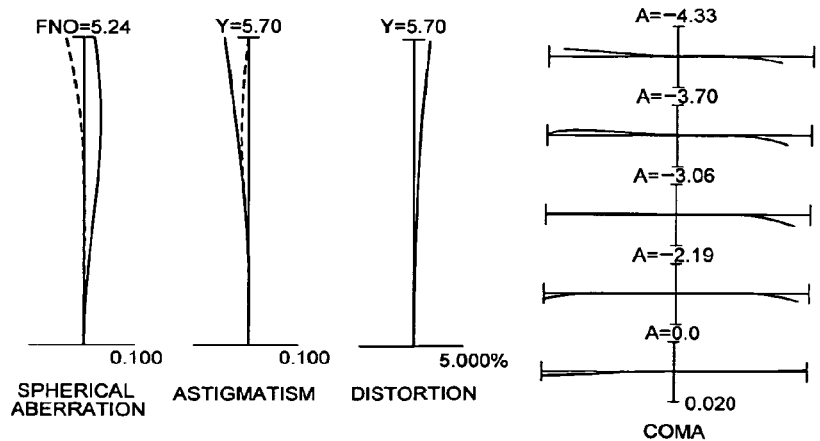
FIG. 57C shows various aberrations at d-line (λ=587.6 nm) of the zoom lens system according to Example 14 of the fourth embodiment in a telephoto end state (f=74.15 mm).

FIGS. 57A, 57B, and 57C show various aberrations at d-line (λ=587.6 nm) of the zoom lens system according to Example 14 of the fourth embodiment in which FIG. 57A shows various aberrations in a wide-angle end state (f=7.31 mm), FIG. 57B shows various aberrations in an intermediate focal length state (f=27.48 mm), and FIG. 57C shows various aberrations in a telephoto end state (f=74.15 mm).

Figure 58A:
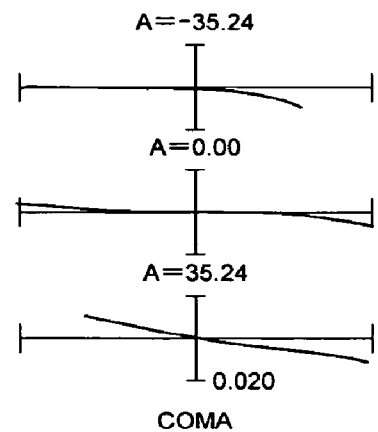
FIG. 58A shows lateral aberrations upon shifting at d-line (λ=587.6 nm) of the zoom lens system according to Example 14 of the fourth embodiment in the wide-angle end state (f=7.31 mm).
Figure 58B:
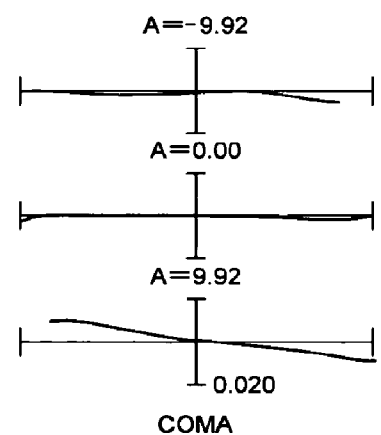
FIG. 58B shows lateral aberrations upon shifting at d-line (λ=587.6 nm) of the zoom lens system according to Example 14 of the fourth embodiment in the intermediate focal length state (f=27.48 mm).
Figure 58C:
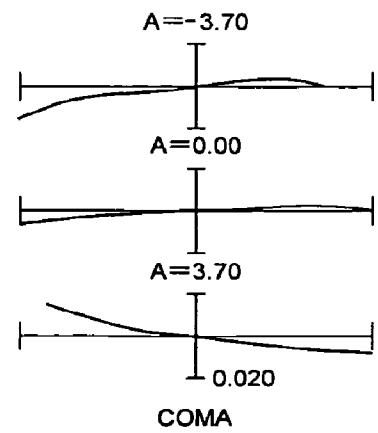
FIG. 58C shows lateral aberrations upon shifting at d-line (λ=587.6 nm) of the zoom lens system according to Example 14 of the fourth embodiment in the telephoto end state (f=74.15 mm).

FIGS. 58A, 58B, and 58C show lateral aberrations upon shifting at d-line (λ=587.6 nm) of the zoom lens system according to Example 14 of the fourth embodiment in which FIG. 58A shows lateral aberrations in the wide-angle end state (f=7.31 mm), FIG. 58B shows lateral aberrations in the intermediate focal length state (f=27.48 mm), and FIG. 58C shows lateral aberrations in the telephoto end state (f=74.15 mm).

As is apparent from various graphs, the zoom lens system according to Example 14 of the fourth embodiment has superb optical performance with preferably correcting various aberrations in each focal length from the wide-angle end state W to the telephoto end state T.

EXAMPLE 15

FIG. 59 is a sectional view showing lens construction of a zoom lens system according to Example 15 of the fourth embodiment of the present invention.

In FIG. 59, the first lens group G1 is composed of, in order from the object, a cemented positive lens constructed by a negative meniscus lens L11 having a concave surface facing to the image cemented with a positive meniscus lens L12 having a convex surface facing to the object, and a positive meniscus lens L13 having a convex surface facing to the object.

The second lens group G2 is composed of, in order from the object, a negative meniscus lens L21 having a concave surface facing to the image, a double concave negative lens L22, a double convex positive lens L23, and a double concave negative lens L24.

The third lens group G3 is composed of, in order from the object, a front lens group G3a, and a rear lens group G3b. The front lens group G3a is composed of a cemented positive lens constructed by, in order from the object, a negative meniscus lens L31 having a concave surface facing to the image cemented with a double convex positive lens L32. The rear lens group G3b is composed of a cemented positive lens constructed by, in order from the object, a double convex positive lens L33 cemented with a double concave negative lens L34. By shifting the front lens group G3a substantially perpendicularly to the optical axis, the image in the image plane I is shifted so as to correct an image blur caused by a camera shake, and the like.

The fourth lens group G4 is composed of, in order from the object, a double convex positive lens L41 having an aspherical surface facing to the image, and a cemented negative lens constructed by a positive meniscus lens L42 having a convex surface facing to the object cemented with a negative meniscus lens L43 having a concave surface facing to the image.

The fifth lens group G5 is composed of a cemented positive lens constructed by a double convex positive lens L51 cemented with a double concave negative lens L52.

The filter group FL is composed of a low-pass filter, an infrared-cut filter, and the like. The image plane I is formed on an imaging device which is not shown. The imaging device is made of a CCD, CMOS, and the like.

An aperture stop S is arranged to the most object side of the third lens group G3 and moves with the third lens group G3 in a body upon zooming from the wide-angle end state W to the telephoto end state T.

In a zoom lens system according to Example 15 of the fourth embodiment, focusing from infinity to a close object is carried out by moving the fifth lens group G5 to the object side.

Various values associated with Example 15 are listed in Table 15.

TABLE 15

[Specifications]

| | Lens State | | |
|---|---|---|---|
| | Wide-Angle End | Intermediate Focal Length | Telephoto End |
| f= | 7.31 | 27.50 | 86.40 |
| FNO= | 2.70 | 3.91 | 5.43 |
| 2ω= | 79.14 | 23.17 | 7.45 |

[Lens Data]

| | r | d | nd | νd |
|---|---|---|---|---|
| 1 | 82.8560 | 1.70 | 1.84666 | 23.78 |
| 2 | 53.7263 | 7.38 | 1.65160 | 58.55 |
| 3 | 301.4766 | 0.10 | | |
| 4 | 55.7153 | 5.80 | 1.49782 | 82.52 |
| 5 | 219.4287 | (D5) | | |
| 6 | 54.9985 | 1.20 | 1.83481 | 42.71 |
| 7 | 10.6469 | 5.50 | | |
| 8 | −33.4982 | 1.20 | 1.77250 | 49.60 |
| 9 | 23.9610 | 0.50 | | |
| 10 | 18.6438 | 4.40 | 1.84666 | 23.78 |
| 11 | −27.6262 | 0.49 | | |
| 12 | −20.2678 | 0.80 | 1.80440 | 39.58 |
| 13 | 142.9604 | (D13) | | |
| 14 | ∞ | 0.80 | Aperture Stop S | |
| 15 | 28.7946 | 1.96 | 1.80610 | 40.92 |
| 16 | 16.3971 | 3.20 | 1.49782 | 82.52 |
| 17 | −39.8655 | 1.00 | | |
| 18 | 22.7205 | 3.20 | 1.48749 | 70.23 |
| 19 | −15.2325 | 1.05 | 1.56384 | 60.66 |
| 20 | 50.0000 | (D20) | | |
| 21 | 27.1863 | 4.20 | 1.58913 | 61.25 |
| 22* | −38.3195 | 0.10 | | |
| 23 | 16.2745 | 2.74 | 1.63930 | 44.87 |
| 24 | 49.9910 | 1.13 | 1.79504 | 28.54 |
| 25 | 11.8165 | (D25) | | |
| 26 | 21.1657 | 3.50 | 1.75500 | 52.32 |
| 27 | −250.0000 | 2.20 | 1.80518 | 25.42 |
| 28 | 58.3737 | (D28) | | |
| 29 | ∞ | 1.72 | 1.54437 | 70.51 |
| 30 | ∞ | 0.96 | | |
| 31 | ∞ | 0.50 | 1.51680 | 64.19 |
| 32 | ∞ | (Bf) | | |

[Aspherical Data]
Surface Number 22

κ = +2.3115
C4 = +2.8377E−05
C6 = −8.3876E−08
C8 = +2.1857E−09
C10 = −1.9709E−11

[Variable Distances]

| | Lens State | | |
|---|---|---|---|
| | Wide-Angle End | Intermediate Focal Length | Telephoto End |
| f | 7.3130 | 27.4968 | 86.4004 |
| D5 | 2.8000 | 30.0853 | 48.9465 |
| D13 | 26.5465 | 9.4764 | 2.5000 |
| D20 | 12.3712 | 1.5905 | 0.5000 |
| D25 | 5.0000 | 24.4219 | 44.7056 |

TABLE 15-continued

| | | | |
|---|---|---|---|
| D28 | 5.0447 | 5.0447 | 5.0447 |
| Bf | 0.9990 | 0.9990 | 0.9990 |

[Values for Conditional Expressions]

fW = 7.3130
f1 = 90.3865
f2 = −10.3770
f3 = 35.5404
f3a = 46.2697
f5 = 42.9763
β3aT = 2.4042
βRT = −0.7799
(16): f1/fW = 12.3597
(17): f3a/f3 = 1.3019
(18): (1 − β3aT) × βRT = 1.0952
(19): f1/|f2| = 8.7103
(20): fW/f3a = 0.1581
(21): f5/fW = 5.8767

Figure 60A:
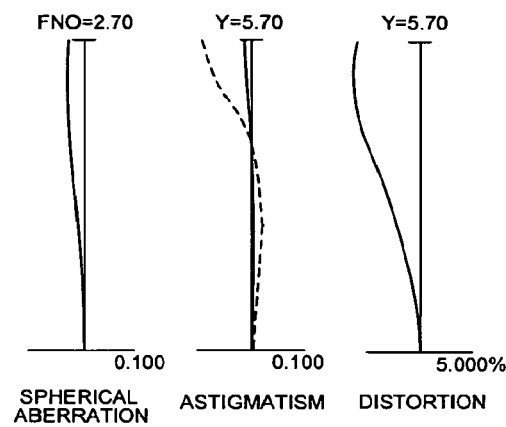
FIG. 60A shows various aberrations at d-line (λ=587.6 nm) of the zoom lens system according to Example 15 of the fourth embodiment in a wide-angle end state (f=7.31 mm).
Figure 60B:
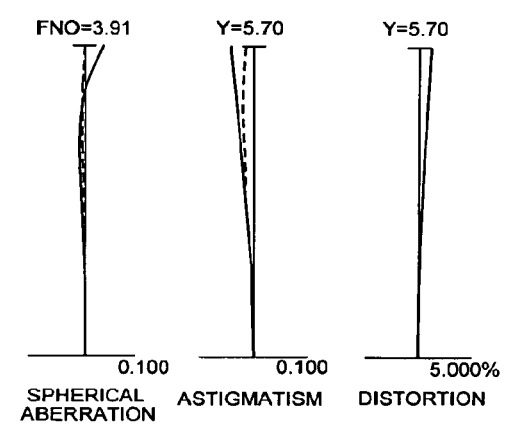
FIG. 60B shows various aberrations at d-line (λ=587.6 nm) of the zoom lens system according to Example 15 of the fourth embodiment in an intermediate focal length state (f=27.50 mm).
Figure 60C:
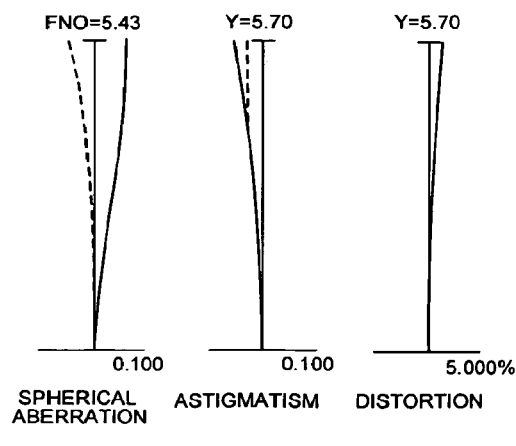
FIG. 60C shows various aberrations at d-line (λ=587.6 nm) of the zoom lens system according to Example 15 of the fourth embodiment in a telephoto end state (f=86.40 mm).

FIGS. 60A, 60B, and 60C show various aberrations at d-line (λ=587.6 nm) of the zoom lens system according to Example 15 of the fourth embodiment in which FIG. 60A shows various aberrations in a wide-angle end state (f=7.31 mm), FIG. 60B shows various aberrations in an intermediate focal length state (f=27.50 mm), and FIG. 60C shows various aberrations in a telephoto end state (f=86.40 mm).

Figure 61A:
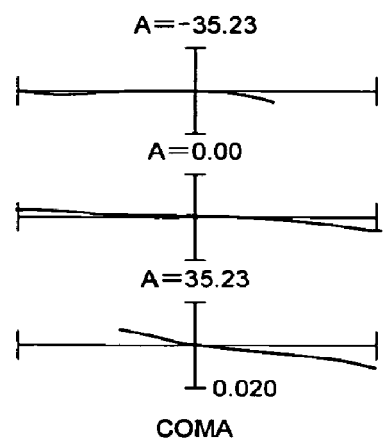
FIG. 61A shows lateral aberrations upon shifting at d-line (λ=587.6 nm) of the zoom lens system according to Example 15 of the fourth embodiment in the wide-angle end state (f=7.31 mm).
Figure 61B:
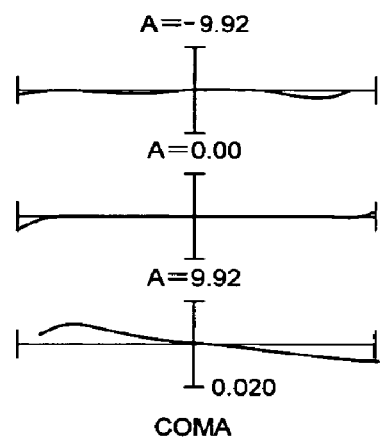
Figure 61C:
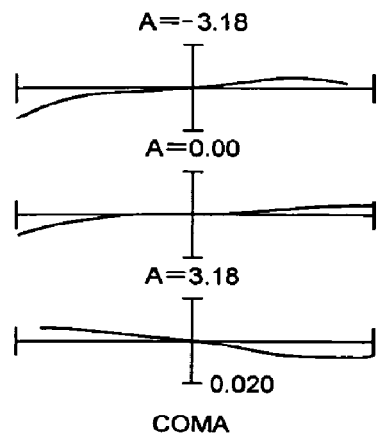

FIGS. 61A, 61B, and 61C show lateral aberrations upon shifting at d-line (λ=587.6 nm) of the zoom lens system according to Example 15 of the fourth embodiment in which FIG. 61A shows lateral aberrations in the wide-angle end state (f=7.31 mm), FIG. 61B shows lateral aberrations in the intermediate focal length state (f=27.50 mm), and FIG. 61C shows lateral aberrations in the telephoto end state (f=86.40 mm).

As is apparent from various graphs, the zoom lens system according to Example 15 of the fourth embodiment has superb optical performance with preferably correcting various aberrations in each focal length from the wide-angle end state W to the telephoto end state T.

Incidentally, it is needless to say that although a zoom lens systems with a five-lens-group configuration are shown as examples of the fourth embodiment of the present invention, a zoom lens system simply added a lens group to a five-lens-group configuration is included in the spirit of the fourth embodiment of the present invention.

Moreover, in the configuration of each lens group, a lens group simply adding additional lens elements to the lens group shown in examples is included in the spirit or scope of the fourth embodiment of the present invention.

Additional advantages and modification will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object:
   a first lens group having positive refractive power;
   a second lens group having negative refractive power;
   a third lens group having positive refractive power;
   a fourth lens group having positive refractive power; and
   a fifth lens group having positive refractive power,
   wherein when a state of lens group positions varies from a wide-angle end state to a telephoto end state, the first lens group moves with respect to an image plane, the fifth lens group is fixed with respect to the image plane, a distance between the first lens group and the second lens group varies, a distance between the second lens group and the third lens group decreases, a distance between the third lens group and the fourth lens group decreases, and a distance between the fourth lens group and the fifth lens group increases, and
   the following conditional expression being satisfied:

$10.0 < f1/fW < 14.0$ where fW denotes the focal length of the zoom lens system in the wide-angle end state and f1 denotes the focal length of the first lens group.

2. The zoom lens system according to claim 1, wherein focusing from infinity to a close object is carried out by moving the fifth lens group to the object.

3. The zoom lens system according to claim 1, wherein the following conditional expression is satisfied:

$4.0 < f5/fW < 9.0$ where f5 denotes the focal length of the fifth lens group.

4. The zoom lens system according to claim 1, wherein the following conditional expression is satisfied:

$7.0 < f1/|f2| < 11.0$ where f2 denotes the focal length of the second lens group.

5. The zoom lens system according to claim 1, wherein the third lens group is composed of, in order from the object, an aperture stop, a front lens group, and a rear lens group, the front lens group is composed of a cemented lens constructed by, in order from the object, a negative meniscus lens having a convex surface facing to the object cemented with a positive lens having a convex surface facing to the object, and the rear lens group is composed of a cemented lens constructed by, in order from the object, a positive lens having a convex surface facing to the object cemented with a double concave negative lens.

6. The zoom lens system according to claim 1, wherein the following conditional expression is satisfied:

$1.0 < f3a/f3 < 1.5$ where f3 denotes the focal length of the third lens group, and f3a denotes the focal length of the front lens group.

7. The zoom lens system according to claim 1, wherein the following conditional expression is satisfied:

$0.10 < fW/f3a < 0.20$ where f3a denotes the focal length of the front lens group.

* * * * *

UNITED STATES PATENT AND TRADEMARK OFFICE
CERTIFICATE OF CORRECTION

PATENT NO. : 7,336,425 B2 Page 1 of 1
APPLICATION NO. : 11/548954
DATED : February 26, 2008
INVENTOR(S) : Toshinori Take It is certified that error appears in the above-identified patent and that said Letters Patent is hereby corrected as shown below:

On the title page, in item (12), "Obama et al." should read --Take--.

On the title page, item (75), the listing of inventors should read as follows:

--(75) Inventor: Toshinori Take, Tokyo (JP)--.

Signed and Sealed this

Fourteenth Day of April, 2009

JOHN DOLL
*Acting Director of the United States Patent and Trademark Office*